(12) United States Patent
Li et al.

(10) Patent No.: US 12,544,374 B2
(45) Date of Patent: Feb. 10, 2026

(54) AZA-QUINOLINE COMPOUNDS AND USES THEREOF

(71) Applicant: Novartis AG, Basel (CH)

(72) Inventors: Ling Li, Shanghai (CN); Xuan Dai, Shanghai (CN); Michael Dore, Quebec (CA); Xiang-Ju Justin Gu, Shanghai (CN); Kun Chin Liu, Shanghai (CN); Sing Yeung Frankie Mak, Cintech IV (SG); Yuan Mi, Shanghai (CN); Counde Oyang, Sunnyvale, CA (US); Julien Papillon, Cambridge, MA (US); Wei (Vicky) Qi, Shanghai (CN); Xiaoxia Yan, Shanghai (CN); Zhengtian Yu, Shanghai (CN); Ji Yue (Jeff) Zhang, Shanghai (CN); Kehao Zhao, Newton, MA (US)

(73) Assignee: NOVARTIS AG, Basel (CH)

( * ) Notice: Subject to any disclaimer, the term of this patent is extended or adjusted under 35 U.S.C. 154(b) by 748 days.

(21) Appl. No.: 17/632,990

(22) PCT Filed: Sep. 24, 2020

(86) PCT No.: PCT/CN2020/117487
§ 371 (c)(1),
(2) Date: Feb. 4, 2022

(87) PCT Pub. No.: WO2021/057853
PCT Pub. Date: Apr. 1, 2021

(65) Prior Publication Data
US 2022/0280509 A1    Sep. 8, 2022

(30) Foreign Application Priority Data

Sep. 26, 2019    (WO) ................ PCT/CN2019/108296

(51) Int. Cl.
| A61K 31/506 | (2006.01) |
| A61K 31/5377 | (2006.01) |
| A61K 31/541 | (2006.01) |
| A61K 45/06 | (2006.01) |
| A61P 35/00 | (2006.01) |
| C07D 471/04 | (2006.01) |

(52) U.S. Cl.
CPC ........ *A61K 31/506* (2013.01); *A61K 31/5377* (2013.01); *A61K 31/541* (2013.01); *A61K 45/06* (2013.01); *A61P 35/00* (2018.01); *C07D 471/04* (2013.01)

(58) Field of Classification Search
CPC .............. A61K 2300/00; A61K 31/444; A61K 31/506; A61K 31/5377; A61K 31/541; A61K 45/06; A61P 35/00; C07D 471/04
See application file for complete search history.

(56) References Cited

U.S. PATENT DOCUMENTS

| 10,220,036 B2 | 3/2019 | Chan et al. |
| 10,676,479 B2 | 6/2020 | Chan et al. |
| 10,689,378 B2 | 6/2020 | Chan et al. |
| 2018/0162845 A1 | 6/2018 | Brackley, III et al. |
| 2019/0255041 A1 | 8/2019 | Jin et al. |

FOREIGN PATENT DOCUMENTS

| CN | 107108637 A | 8/2017 |
| CN | 107849032 A | 3/2018 |
| CN | 109790166 A | 5/2019 |
| CN | 109906224 A | 6/2019 |
| WO | WO-2014155301 A1 | 10/2014 |
| WO | WO-2016103155 A1 | 6/2016 |
| WO | WO-2017002064 A1 | 1/2017 |
| WO | WO-2017221092 A1 | 12/2017 |
| WO | WO-2017221100 A1 | 12/2017 |
| WO | WO-2021057853 A1 | 4/2021 |

OTHER PUBLICATIONS

Kadoch et al., "PRC2 and SWI/SNF Chromatin Remodeling Complexes in Health and Disease," Biochemistry, 55, 1600-1614 (Year: 2016).*
Cecil Textbook of Medicine, 20th Ed., vol. 1 (Year: 1997).*
Wu et al., Small-molecule inhibitors, immune checkpoint inhibitors, and more: FDA-approved novel therapeutic drugs for solid tumors from 1991 to 2021; Journal of Hematology & Oncology, 15, 143 (Year: 2022).*
Khanna et al. "Design, synthesis, and pharmacological evaluation of second generation EZH2 inhibitors with long residence time" ACS Medicinal Chemistry Letters (2020); 11(6):1205-1212.

* cited by examiner

*Primary Examiner* — Jeffrey H Murray
*Assistant Examiner* — Daniel John Burkett
(74) *Attorney, Agent, or Firm* — Seed Intellectual Property Law Firm LLP

(57) ABSTRACT

Provided aza-quinoline compounds of Formula (I), pharmaceutical compositions comprising such compounds; and the use of such compounds for treating a disease or condition mediate by Enhancer of Zeste Homolog 2 (EZH2), Polycomb Repressive Complex 2 (PRC2), or a combination thereof.

27 Claims, No Drawings

AZA-QUINOLINE COMPOUNDS AND USES THEREOF

CROSS-REFERENCE TO RELATED APPLICATIONS

This application is a U.S. National Phase Application, filed under 35 U.S.C. 371, of International Application No. PCT/CN2020/117487, filed on Sep. 24, 2020, which claims priority to PCT/CN2019/108296, filed on Sep. 26, 2019, the entire contents of each of which are incorporated by reference herein in their entireties.

FIELD OF THE INVENTION

The present invention relates to compounds, compositions and methods for inhibiting Enhancer of Zeste Homolog (EZH2), Polycomb Repressive Complex 2 (PRC2), or a combination thereof.

BACKGROUND OF THE INVENTION

The site specific lysine methylation on histones is one of the important epigenetic mechanisms in controlling and mediating many fundamental biological processes. The Polycomb Repressive Complex 2 (PRC2) methylates the histone H3 lysine 27 (H3K27) at the genomic region of target genes, and thereby represses gene transcription. PRC2 requires minimally three core subunits including SUZ12 (suppressor of zeste 12), EED (embryonic ectoderm development) and the catalytic subunit EZH1 or EZH2 (enhancer of zeste homolog ½). EZH1 and EZH2 are homolog proteins and can both be integrated into PRC2 respectively, although with different tissue- and temporal distribution. In PRC2, EZH2 can directly bind the cofactor S-adenosyl methionine (SAM) and transfer the methyl group to histone H3K27 site to form mono-, di-, and tri-methylated lysine (H3K27me1, H3K27me2 and H3K27me3), which repress gene transcription. PRC2-EZH2 has higher activity than PRC2-EZH1, which predominantly catalyzes formation of H3K27me1 and some H3K27me2. EED may bind H3K27me2/3 and allosterically activate enzyme activity of PRC2 to promote spreading of the repressive marks.

EZH2 plays a critical function in development and adult tissue homeostasis, and is closely associated with many diseases. EZH2, SUZ12 and EED are overexpressed in many cancers, including but not limited to breast cancer, prostate cancer and hepatocellular carcinoma. EZH2 activating mutations, which lead to increased H3K27me3, have been identified in DLBCL (diffuse large B cell lymphoma), FL (follicular lymphoma), melanoma, and parathyroid adenocarcinoma patients. Inhibition of PRC2 methyltransferase activity by compounds competing with the cofactor SAM or binding directly to EED in DLBCL reverses high H3K27me3 state, re-activates expression of target genes and inhibits tumor growth/proliferation. Furthermore, EZH2 inhibitors may release the repression of Th1 chemokines in tumor cells and enhance T cell infiltration in ovarian and colorectal cancers.

Therefore, EZH2 provides a pharmacological target for DLBCL and other cancers. In addition, EZH2 also plays important roles in auto-immune diseases and other disorders. Together, there is a high need for small molecules that inhibit the activity of EZH2.

SUMMARY OF THE INVENTION

The present invention provides compounds that inhibit EZH2; and compositions and methods for treating or preventing a disease or condition mediated by EZH2, PRC2, or a combination thereof.

In one aspect, the present invention provides a compound of Formula (I), or a stereoisomer, enantiomer, enantiomeric mixture or pharmaceutically acceptable salt thereof:

Formula (I)

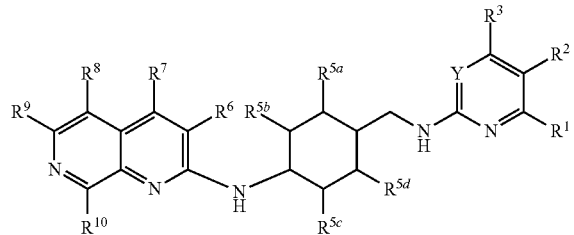

wherein:
Y is N or $CR^4$;
$R^1$, $R^3$ and $R^4$ are independently H, halogen or $-C_1-C_4$ alkyl;
$R^2$ is $-CN$, $-C_1-C_6$ alkyl, -hydroxy$C_1-C_4$ alkylene, $-C_1-C_6$ alkyl substituted with $-N(C_1-C_4$ alkyl)$_2$; $-C_1-C_4$alkoxy, $-C_2-C_4$alkoxy substituted with 1-2 hydroxyl or cyano; $-NH_2$, $-NR^{11}C(=O)R^{15}$, $-C(=O)NH_2$, $-(CH_2)_nR^{15}$, $-R^{15}$, $-NHC(=O)R^{11}$, $-NR^{12}C(=O)OR^{11}$, $-C(=O)NR^{11}R^{12}$, $-(CH_2)_nC(=O)NR^{11}R^{12}$, $-(CH_2)_nNR^{11}R^{15}$, $-(CH_2)_nC(=O)NR^{11}R^{15}$, $-C(=O)NR^{11}R^{15}$, $-CR^{13}R^{14}C(=O)NR^{11}R^{15}$, $-OCR^{11}R^{12}R^{13}$, $-(CH_2)_nC(=O)R^{15}$, $-C(=O)R^{15}$, $-CR^{13}R^{14}C(=O)R^{15}$, $-(CH_2)_nNR^{11}C(=O)R^{15}$, $-(CH_2)_nNR^{11}(CH_2)_2C(=O)R^{15}$, $-NR^{12}C(=O)(CH_2)_2C(=O)R^{15}$, $-(CH_2)_nOR^{15}$, $-(CH_2)_nNR^{11}C(=O)OCH_2R^{15}$, $-NR^{11}C(=O)OCH_2R^{15}$, $-(CH_2)_nNR^{11}(CH_2)_nR^{15}$,

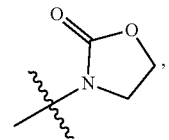

or a 5- to 6-membered heteroaryl having 1 to 4 ring members independently selected from O, S, N and $-NR^c$;
$R^{5a}$, $R^{5b}$, $R^{5c}$, $R^{5d}$ and $R^c$ are independently H or $-C_1-C_4$ alkyl;
$R^6$, $R^7$, $R^8$ and $R^9$ are independently H, halogen or $-C_1-C_4$ alkyl;
$R^{10}$ is H, halogen, $-C_1-C_4$ alkyl, $-C_1-C_4$ alkoxy, $-C_1-C_4$ haloalkoxy or $-NH(C_1-C_4$ alkyl);
$R^{11}$ is H, $-C_1-C_4$ alkyl, $-SO_2(C_1-C_4$ alkyl), -hydroxy$C_1-C_4$ alkylene, -cyano$C_1-C_4$ alkylene or $-C_1-C_4$ alkyl substituted with $-C_1-C_4$ alkoxy;
$R^{12}$ is H or $-C_1-C_4$ alkyl;
$R^{13}$ is H, halogen, $-CN$, $-OH$, $-C_1-C_4$alkyl or -hydroxy$C_1-C_4$ alkylene;
$R^{14}$ is H, halogen or $-C_1-C_4$ alkyl;

$R^{15}$ is

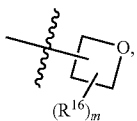

—$C_3$-$C_6$cycloalkyl, or a 4- to 6-membered heterocycloalkyl having 1-2 ring members independently selected from O, S, S(=O)$_2$, N and —$NR^{11}$; wherein said —$C_3$-$C_6$cycloalkyl and 4- to 6-membered heterocycloalkyl are independently unsubstituted or substituted with 1-2 substituents selected from —OH, —$C_1$-$C_4$ alkyl, -hydroxy$C_1$-$C_4$ alkylene, —$C_1$-$C_4$ alkoxy and —N($C_1$-$C_4$ alkyl)$_2$;

$R^{16}$, if present, is halogen, —CN, —OH, —$C_1$-$C_4$ alkyl or -hydroxy$C_1$-$C_4$ alkylene;

m is 0, 1 or 2;

each n is independently selected from 1 and 2; and provided that the compound of Formula (I) is not (2-((((1,4-trans)-4-((8-chloro-1,7-naphthyridin-2-yl)amino)cyclohexyl)methyl)amino)pyrimidin-5-yl)(4-methylpiperazin-1-yl)methanone.

In another aspect, the invention provides a pharmaceutical composition comprising a compound of Formula (I) or sub-formulae thereof, or a stereoisomer, enantiomer, enantiomeric mixture or pharmaceutically acceptable salt thereof; and one or more pharmaceutically acceptable carriers.

In yet another aspect, the invention provides a combination, in particular a pharmaceutical combination, comprising a compound of Formula (I) or sub-formulae thereof, or a stereoisomer, enantiomer, enantiomeric mixture or pharmaceutically acceptable salt thereof; and one or more therapeutically active agent(s).

The compounds of the invention, alone or in combination with one or more therapeutically active agent(s), can be used for treating or preventing a disease or condition mediated by EZH2, PRC2 or a combination thereof.

DETAILED DESCRIPTION OF THE INVENTION

The present invention provides compositions and methods for treating or preventing a disease or condition mediated by EZH2, PRC2 or a combination thereof.

Definitions

For purposes of interpreting this specification, the following definitions will apply and whenever appropriate, terms used in the singular will also include the plural and vice versa.

As used herein, the term "—$C_1$-$C_6$ alkyl" or "—$C_{1-6}$ alkyl" refer to a straight or branched hydrocarbon chain radical consisting solely of carbon and hydrogen atoms, containing no unsaturation, having from one to six carbon atoms, and which is attached to the rest of the molecule by a single bond. The term "—$C_1$-$C_4$ alkyl" or "—$C_{1-4}$ alkyl" are to be construed accordingly. Examples of —$C_1$-$C_6$ alkyl include, but are not limited to, methyl, ethyl, n-propyl, 1-methylethyl (iso-propyl), n-butyl, n-pentyl and 1,1-dimethylethyl (t-butyl).

As used herein, the term "—$C_1$-$C_4$ alkoxy" refers to a radical of the formula —$OR_a$ where $R_a$ is a $C_{1-4}$alkyl radical as generally defined above. Examples of $C_{1-6}$alkoxy include, but are not limited to, methoxy, ethoxy, propoxy, isopropoxy, butoxy, isobutoxy, pentoxy, and hexoxy.

The term "cycloalkyl," as used herein, refers to a saturated, monocyclic, fused bicyclic, fused tricyclic or bridged polycyclic ring system. Non-limiting examples of fused bicyclic or bridged polycyclic ring systems include bicyclo[1.1.1]pentane, bicyclo[2.1.1]hexane, bicyclo[2.2.1]heptane, bicyclo[3.1.1]heptane, bicyclo[3.2.1]octane, bicyclo[2.2.2]octane and adamantanyl. As used herein, the term "$C_3$-$C_6$cycloalkyl", refers to a saturated monocyclic group having at least 3, and at most 6, carbon atoms. Non-limiting examples of such "$C_3$-$C_6$cycloalkyl" groups include cyclopropyl, cyclobutyl, cyclopentyl and cyclohexyl groups.

"Halo" or "halogen" refer to bromo, chloro, fluoro or iodo.

As used herein, the term "-hydroxy$C_{1-4}$alkylene" refers to a —$C_{1-4}$alkyl radical as defined above, wherein one or more hydrogen atoms of the $C_{1-4}$alkyl radical is replaced by OH. Examples of hydroxy$C_{1-4}$alkyl include, but are not limited to, ethan-1-olyl, 2-methylpropan-1-olyl, hydroxy-methyl, 2-hydroxy-ethyl, 2-hydroxy-propyl and 3-hydroxy-propyl.

As used herein, the term "-cyano$C_{1-4}$ alkylene" refers to a —$C_{1-4}$alkyl radical as defined above, wherein one of the hydrogen atoms of the —$C_{1-4}$alkyl radical is replaced by CN.

The term "haloalkoxy", as used herein, refers to a haloalkyl linked to an oxygen, which may also be represented as —O—R', wherein the R' represents the haloalkyl group. The term "—$C_1$-$C_4$ haloalkoxy" is intended to include $C_1$, $C_2$, $C_3$ and $C_4$ haloalkoxy groups. Examples of haloalkoxy groups include, but are not limited to, fluoromethoxy, difluoromethoxy, trifluoromethoxy, chloromethoxy, dichloromethoxy, trichloromethoxy, pentafluoroethoxy, pentachloroethoxy, 2,2,2-trifluoroethoxy, heptafluoropropoxy, heptachloropropoxy, difluorochloromethoxy, dichlorofluoromethoxy, difluoroethoxy, trifluoroethoxy, difluoropropoxy, dichloroethoxy and dichloropropoxy.

As used herein, the term "heterocyclyl" or "heterocyclic" refers to a stable 4-7 membered non-aromatic monocyclic ring radical comprising 1, 2, or 3, heteroatoms individually selected from nitrogen, oxygen and sulfur. The heterocyclyl radical may be bonded via a carbon atom or heteroatom. The term "5-6 membered heterocyclyl" is to be construed accordingly. Examples of heterocyclyl include, but are not limited to, azetidinyl, oxetanyl, pyrrolinyl, pyrrolidyl, tetrahydrofuryl, tetrahydrothienyl, piperidyl, piperazinyl, tetrahydropyranyl or morpholinyl or perhydroazepinyl.

As used herein, the term "heteroaryl" refers to a 5-9 membered aromatic monocyclic or fused ring radical comprising 1, 2, 3 or 4 heteroatoms individually selected from nitrogen, oxygen and sulfur. The heteroaryl radical may be bonded via a carbon atom or heteroatom. The term "5-6 membered heteroaryl" is to be construed accordingly. Examples of 5-6 membered monocyclic heteroaryls include, but are not limited to, furyl, pyrrolyl, thienyl, pyrazolyl, imidazolyl, thiazolyl, isothiazolyl, oxazolyl, isoxazolyl, triazolyl, tetrazolyl, pyrazinyl, pyridazinyl, pyrimidyl or pyridyl. Examples of fused heteroaryls include but are not limited to 9-membered heteroaryls such as benzofuranyl; 2,3-dihydrobenzofuranyl, 1,3-dihydroisobenzofuranyl; benzo[d][1,3]dioxol-5-yl; imidazo[1,2-a]pyridinyl; pyrazolo[1,5-a]pyridinyl; 1H-indazolyl and 1H-benzo[d]-imidazolyl.

"EZH2" refers to Enhancer of Zeste Homolog 2.

"PRC2" refers to Polycomb Repressive Complex 2.

The term "PRC2-mediated disease or condition" refers to a disease or condition that is directly or indirectly regulated by PRC2. This includes, but is not limited to, any disease or condition which is directly or indirectly regulated by EZH2.

The term "disease or condition mediated by Enhancer of Zeste Homolog (EZH2), Polycomb Repressive Complex 2 (PRC2), or a combination of Enhancer of Zeste Homolog 2 (EZH2) and Polycomb Repressive Complex 2 (PRC2)" or the term "disease or condition mediated by EZH2, PRC2 or EZH2/PRC2" refer to a disease or condition that is directly or indirectly regulated by EZH2, PRC2 or EZH2 and PRC2.

As used herein, the term "subject" refers to mammals, primates (e.g., humans, male or female), dogs, rabbits, guinea pigs, pigs, rats and mice. In certain embodiments, the subject is a primate. In yet other embodiments, the subject is a human.

As used herein, the term "inhibit", "inhibition" or "inhibiting" refers to the reduction or suppression of a given condition, symptom, or disorder, or disease, or a significant decrease in the baseline activity of a biological activity or process.

As used herein, the term "treat", "treating" or "treatment" of any disease or disorder refers to alleviating or ameliorating the disease or disorder (i.e., slowing or arresting the development of the disease or at least one of the clinical symptoms thereof); or alleviating or ameliorating at least one physical parameter or biomarker associated with the disease or disorder, including those which may not be discernible to the patient.

As used herein, the term "prevent", "preventing" or "prevention" of any disease or disorder refers to the prophylactic treatment of the disease or disorder; or delaying the onset or progression of the disease or disorder As used herein, a subject is "in need of" a treatment if such subject would benefit biologically, medically or in quality of life from such treatment.

As used herein, the term "a therapeutically effective amount" of a compound of the present invention refers to an amount of the compound of the present invention that will elicit the biological or medical response of a subject, for example, reduction or inhibition of an enzyme or a protein activity, or ameliorate symptoms, alleviate conditions, slow or delay disease progression, or prevent a disease, etc.

As used herein, the term "pharmaceutical composition" refers to a compound of the invention, or a pharmaceutically acceptable salt thereof, together with at least one pharmaceutically acceptable carrier, in a form suitable for oral or parenteral administration.

As used herein, the term "pharmaceutically acceptable carrier" refers to a substance useful in the preparation or use of a pharmaceutical composition and includes, for example, suitable diluents, solvents, dispersion media, surfactants, antioxidants, preservatives, isotonic agents, buffering agents, emulsifiers, absorption delaying agents, salts, drug stabilizers, binders, excipients, disintegration agents, lubricants, wetting agents, sweetening agents, flavoring agents, dyes, and combinations thereof, as would be known to those skilled in the art (see, for example, Remington The Science and Practice of Pharmacy, 22$^{nd}$ Ed. Pharmaceutical Press, 2013, pp. 1049-1070).

As used herein, the term "a," "an," "the" and similar terms used in the context of the present invention (especially in the context of the claims) are to be construed to cover both the singular and plural unless otherwise indicated herein or clearly contradicted by the context.

Unless specified otherwise, the term "compounds of the present invention" or "compound of the present invention" refers to compounds of Formula (I) and subformulae thereof, including Formula (II) and subformulae thereof, and exemplified compounds and salts thereof; as well as stereoisomers (including diastereoisomers and enantiomers), rotamers, tautomers, isotopically labeled compounds (including deuterium substitutions), and inherently formed moieties. The "compounds of the present invention" further includes N-oxide derivatives of such compounds.

DESCRIPTION OF PREFERRED EMBODIMENTS

The present invention provides compounds that inhibit EZH2; and compositions and methods for treating or preventing a condition mediated by EZH2, PRC2 or a combination thereof.

Various enumerated embodiments of the invention are described herein. Features specified in each embodiment may be combined with other specified features to provide further embodiments of the present invention.

Embodiment 1. A compound of Formula (I), or a stereoisomer, enantiomer, enantiomeric mixture or a pharmaceutically acceptable salt thereof; as described above.

Embodiment 2. A compound of Formula (I), or a stereoisomer, enantiomer, enantiomeric mixture or a pharmaceutically acceptable salt thereof;

$R^2$ is —ON, —NH$_2$, —NR$^{11}$C(=O)R, —C(=O)NH$_2$, —(CH$_2$)$_n$R$^{15}$, —R$^{15}$, —NHC(=O)R$^{11}$, —NR$^{12}$C(=O)OR$^{11}$, —C(=O)NR$^{11}$R$^{12}$, —(CH$_2$)$_n$C(=O)NR$^{11}$R$^{12}$, —(CH$_2$)$_n$NR$^{11}$R$^{15}$, —(CH$_2$)$_n$C(=O)NR$^{11}$R$^{15}$, —C(=O)NR$^{11}$R$^{15}$, —CR$^{13}$R$^{14}$C(=O)NR$^{11}$R$^{15}$, —OCR$^{11}$R$^{12}$R$^{13}$, —(CH$_2$)$_n$C(=O)R$^{15}$, —C(=O)R$^{15}$, —CR$^{13}$R$^{14}$C(=O)R$^{15}$, —(CH$_2$)$_n$NR$^{11}$C(=O)R$^{15}$, —(CH$_2$)$_n$NR$^{11}$(CH$_2$)$_2$C(=O)R$^{15}$, —NR$^{12}$C(=O)(CH$_2$)$_2$C(=O)R$^{15}$, —(CH$_2$)$_n$OR$^{15}$, —(CH$_2$)$_n$NR$^{11}$C(=O)OCH$_2$R$^{15}$, —NR$^{11}$C(=O)OCH$_2$R$^{15}$, —(CH$_2$)$_n$NR$^{11}$(CH$_2$)$_n$R$^{15}$,

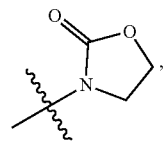 [SMILES: *N1CCOC1=O]

—C$_1$-C$_6$ alkyl substituted with one R$^a$, —C$_1$-C$_4$ alkoxy substituted with one R$^b$, or a 5- to 6-membered heteroaryl having 1 to 4 ring members independently selected from O, S, N and NR$^c$ wherein R$^c$ is H or —C$_1$-C$_4$ alkyl;

R$^{11}$ is H, —C$_1$-C$_4$ alkyl, —SO$_2$(C$_1$-C$_4$ alkyl) or —C$_1$-C$_4$ alkyl substituted with one R$^b$;

each R$^{13}$ is independently selected from H, halogen, CN, —OH, and —C$_1$-C$_4$alkyl substituted with 0-1 —OH groups;

R$^{15}$ is

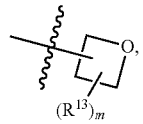

C$_3$-C$_6$cycloalkyl substituted with 0-1 R$^a$ groups, or a 4- to 6-membered heterocycloalkyl having 1-2 ring members independently selected from O, S, S(=O)$_2$, N and NR$^{11}$, wherein the heterocycloalkyl of R$^{15}$ is substituted with 0-1 R$^a$ groups;

$R^a$ is —OH, —CH$_2$OH, C$_1$-C$_4$ alkyl, C$_1$-C$_4$ alkoxy, or —N(C$_1$-C$_4$ alkyl)$_2$;

$R^b$ is independently selected from —CN, —OH and C$_1$-C$_4$ alkoxy;

m is 0, 1 or 2; and each n is independently selected from 1 and 2.

Embodiment 3. A compound according to Embodiment 1 or Embodiment 2, wherein said compound is of Formula (I-2), or a stereoisomer, enantiomer, enantiomeric mixture or a pharmaceutically acceptable salt thereof:

Formula (I-2)

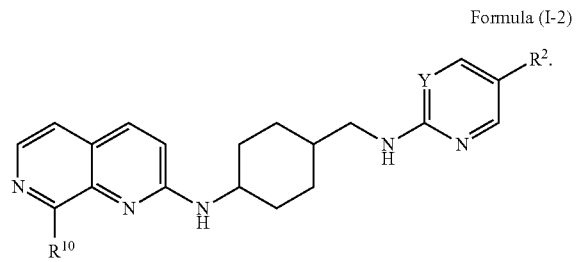

Embodiment 4. A compound according to Embodiment 1 or Embodiment 2, wherein said compound is of Formula (I-3), or a stereoisomer, enantiomer, enantiomeric mixture or a pharmaceutically acceptable salt thereof:

Formula (I-3)

Embodiment 5. A compound according to Embodiment 1 or Embodiment 2, wherein said compound is of Formula (I-4), or a stereoisomer, enantiomer, enantiomeric mixture or a pharmaceutically acceptable salt thereof:

Formula (I-4)

Embodiment 6. A compound according to Embodiment 1 or Embodiment 2, wherein said compound is of Formula (I-5), or a stereoisomer, enantiomer, enantiomeric mixture or a pharmaceutically acceptable salt thereof:

Formula (I-5)

Embodiment 7. A compound according to Embodiment 1 or Embodiment 2, wherein said compound is of Formula (I-6), or a stereoisomer, enantiomer, enantiomeric mixture or a pharmaceutically acceptable salt thereof:

Formula (I-6)

Embodiment 8. A compound according to Embodiment 1 or Embodiment 2, wherein said compound is of Formula (I-7), or a stereoisomer, enantiomer, enantiomeric mixture or a pharmaceutically acceptable salt thereof:

Formula (I-7)

Embodiment 9. A compound according to any one of Embodiments 1-8, or a stereoisomer, enantiomer, enantiomeric mixture or a pharmaceutically acceptable salt thereof; wherein $R^2$ is —CN, —NH$_2$, —C(=O)NH$_2$, —NHC(=O)R$^{11}$, —NR$^{12}$C(=O)OR$^{11}$, —C(=O)NR$^{11}$R$^{12}$, —(CH$_2$)$_n$C(=O)NR$^{11}$R$^{12}$, —(CH$_2$)$_n$NR$^{11}$R$^{15}$, —(CH$_2$)$_n$C(=O)NR$^{11}$R$^{15}$, —C(=O)NR$^{11}$R$^{15}$, —CR$^{13}$R$^{14}$C(=O)NR$^{11}$R$^{15}$, —OCR$^{11}$R$^{12}$R$^{13}$, —(CH$_2$)$_n$R$^{15}$, —NR$^{12}$C(=O)(CH$_2$)$_2$C(=O)R$^{15}$, —(CH$_2$)$_n$NR$^{11}$C(=O)OCH$_2$R$^{15}$, —NR$^{11}$C(=O)OCH$_2$R$^{15}$, —(CH$_2$)$_n$NR$^{11}$(CH$_2$)$_n$R$^{15}$, —(CH$_2$)$_n$C(=O)R$^{15}$, —C(=O)R$^{15}$, —CR$^{13}$R$^{14}$C(=O)R$^{15}$, —(CH$_2$)$_n$NR$^{11}$C(=O)R$^{15}$, —NR$^{11}$C(=O)R$^{15}$, —(CH$_2$)$_n$NR$^{11}$(CH$_2$)$_2$C(=O)R$^{15}$, —(CH$_2$)$_n$OR$^{15}$,

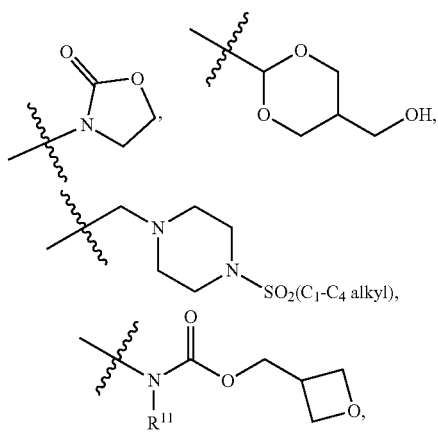

—$C_1$-$C_6$ alkyl substituted with one $R^a$, —$C_1$-$C_4$ alkoxy substituted with one $R^b$, or a 5- to 6-membered heteroaryl having 1 to 4 ring members independently selected from N and —$NR^c$; and $R^a$, $R^b$ and $R^c$ are as defined in Embodiment 2.

Embodiment 10. A compound according to any one of Embodiments 1-8, or a stereoisomer, enantiomer, enantiomeric mixture or a pharmaceutically acceptable salt thereof; wherein $R^2$ is —CN, —$NH_2$, —C(=O)$NH_2$, —NHC(=O)$R^{11}$, —$NR^{12}$C(=O)$OR^{11}$, —C(=O)$NR^{11}R^{12}$, —$(CH_2)_n$C(=O)$NR^{11}R^{12}$, —$(CH_2)_nNR^{11}R^{15}$, —$(CH_2)_nC$(=O)$NR^{11}R^{15}$, —C(=O)$NR^{11}R^{15}$, —$CR^{13}R^{14}$C(=O)$NR^{11}R^{15}$, —$OCR^{11}R^{12}R^{13}$, —$(CH_2)_nR^{15}$, —$NR^{12}$C(=O)$(CH_2)_2$C(=O)$R^{15}$, —$(CH_2)_nNR^{11}$C(=O)$OCH_2R^{15}$, —$NR^{11}$C(=O)$OCH_2R^{15}$, —$(CH_2)_nNR^{11}(CH_2)_nR^{15}$, —$(CH_2)_nC$(=O)$R^{15}$, —$CR^{13}R^{14}$C(=O)$R^{15}$, —$(CH_2)_nNR^{11}$C(=O)$R^{15}$, —$NR^{11}$C(=O)$R^{15}$, —$(CH_2)_nNR^{11}(CH_2)_2$C(=O)$R^{15}$, —$(CH_2)_nOR^{15}$,

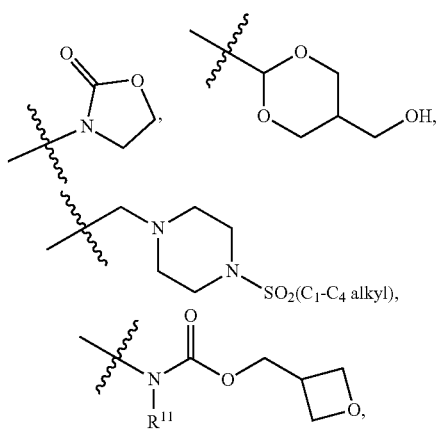

—$C_1$-$C_6$ alkyl substituted with one $R^a$, —$C_1$-$C_4$ alkoxy substituted with one $R^b$, or a 5- to 6-membered heteroaryl having 1 to 4 heteroatoms independently selected from N and —$NR^c$; and $R^a$, $R^b$ and $R^c$ are as defined in Embodiment 2.

Embodiment 11. A compound according to any one of Embodiments 1-8, or a stereoisomer, enantiomer, enantiomeric mixture or a pharmaceutically acceptable salt thereof; wherein $R^2$ is —CN, —$NH_2$, —C(=O)$NH_2$, —NHC(=O)$R^{11}$, —$NR^{12}$C(=O)$OR^{11}$, —C(=O)$NR^{11}R^{12}$, —$CH_2$C(=O)$NR^{11}R^{12}$, triazolyl,

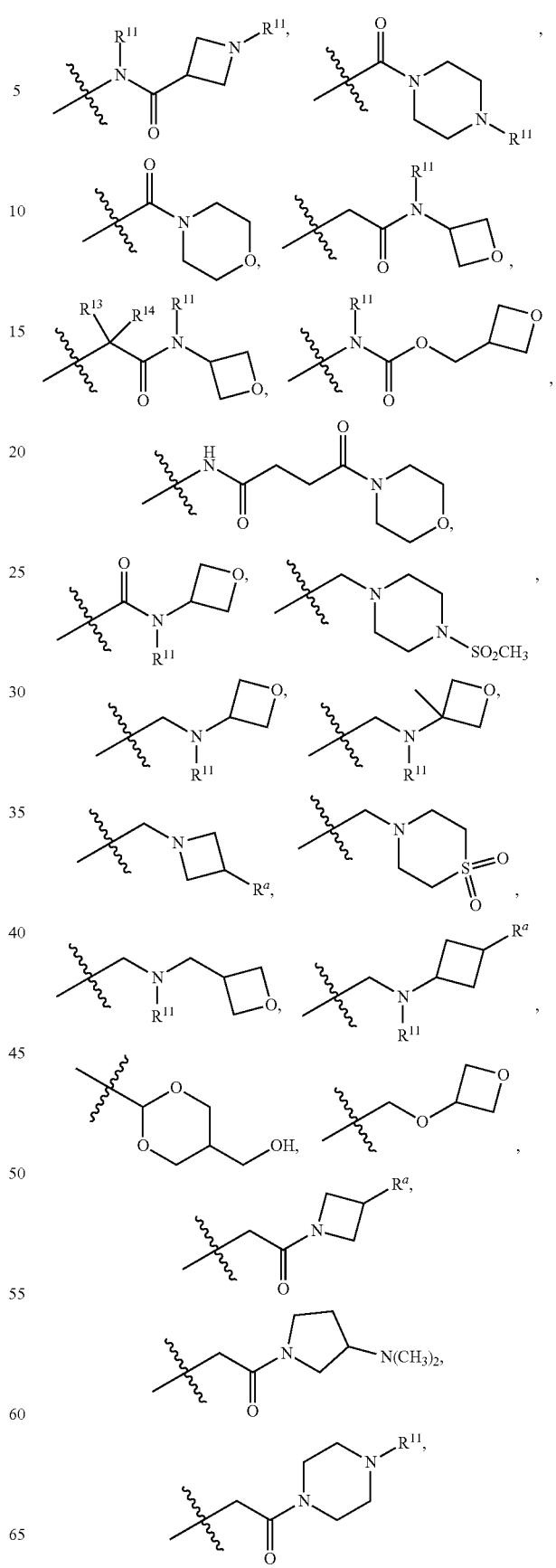

-continued

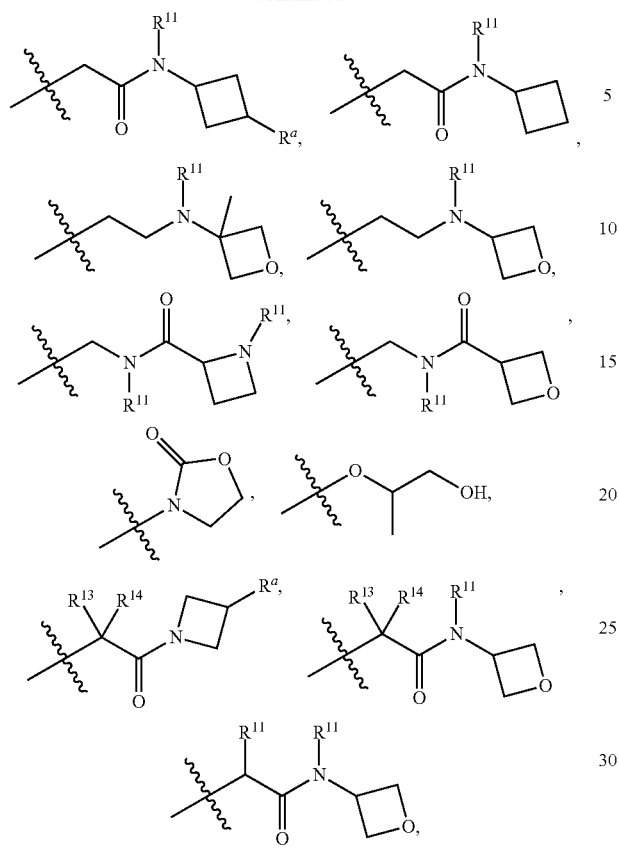

—$C_1$-$C_6$ alkyl substituted with one $R^a$ group, or a —$C_1$-$C_4$ alkoxy substituted with one $R^b$ group; and $R^a$ and $R^b$ are as defined in Embodiment 2.

Embodiment 12. A compound according to any one of Embodiments 1-8, or a stereoisomer, enantiomer, enantiomeric mixture or a pharmaceutically acceptable salt thereof; wherein $R^2$ is —$CH_2C(\!\!=\!\!O)NR^{11}R^{12}$,

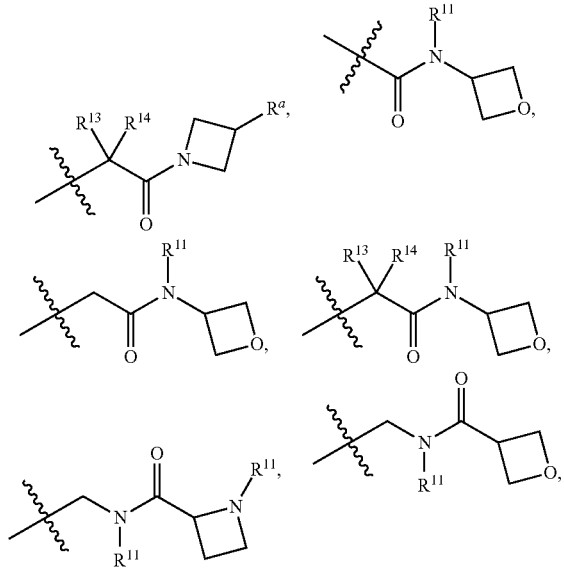

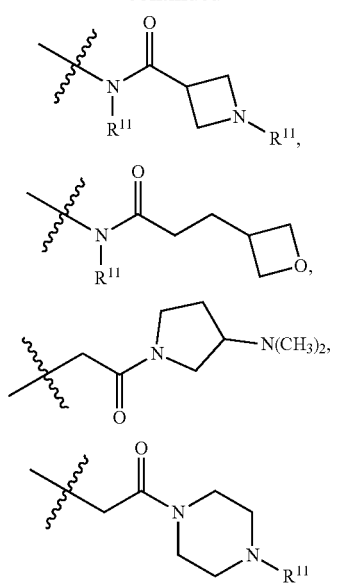

or a $C_1$-$C_6$ alkyl substituted with one $R^a$; and $R^a$ is as defined in Embodiment 2.

Embodiment 13. A compound according to any one of Embodiments 1-2 and 9-12, or a stereoisomer, enantiomer, enantiomeric mixture or a pharmaceutically acceptable salt thereof; wherein $R^{12}$ is H or —$CH_3$.

Embodiment 14. A compound according to any one of Embodiments 1-13, or a stereoisomer, enantiomer, enantiomeric mixture or a pharmaceutically acceptable salt thereof; wherein $R^2$ is

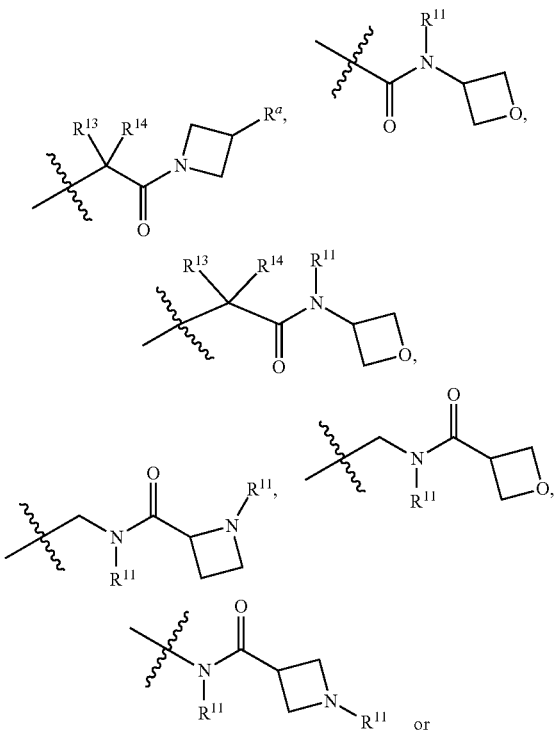

or

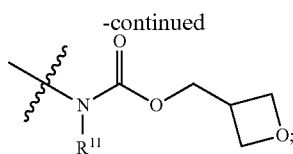

and

R$^a$ is as defined in Embodiment 2.

Embodiment 15. A compound according to any one of Embodiments 2-14, or a stereoisomer, enantiomer, enantiomeric mixture or a pharmaceutically acceptable salt thereof; wherein R$^a$ is —OH or —OCH$_3$.

Embodiment 16. A compound according to any one of Embodiments 1-8, or a stereoisomer, enantiomer, enantiomeric mixture or a pharmaceutically acceptable salt thereof; wherein R$^2$ is —(CH$_2$)$_{1-2}$C(=O)NR$^{11}$R$^{15}$ or —(CR$^{13}$R$^{14}$)—C(=O)NR$^{11}$R$^{15}$.

Embodiment 17. A compound according to Embodiment 16, or a stereoisomer, enantiomer, enantiomeric mixture or a pharmaceutically acceptable salt thereof; wherein R$^{15}$ is a 4- to 6-membered heterocycloalkyl having 1-2 heteroatoms independently selected from O, S and N; wherein said 4- to 6-membered heterocycloalkyl is unsubstituted or substituted with one substituent selected from —OH, —CH$_2$OH, —C$_1$-C$_4$ alkyl, —C$_1$-C$_4$ alkoxy and —N(C$_1$-C$_4$ alkyl)$_2$.

Embodiment 18. A compound according to Embodiment 16, or a stereoisomer, enantiomer, enantiomeric mixture or a pharmaceutically acceptable salt thereof; wherein R$^{15}$ is

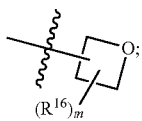

R$^{16}$, if present, is halogen, —CN, —OH, —C$_1$-C$_4$ alkyl or -hydroxyC$_1$-C$_4$ alkylene; and m is 0, 1 or 2.

Embodiment 19. A compound according to Embodiment 16, or a stereoisomer, enantiomer, enantiomeric mixture or a pharmaceutically acceptable salt thereof; wherein R$^{15}$ is

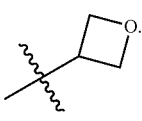 [SMILES: *C1COC1]

Embodiment 20. A compound according to any one of Embodiments 1-19, or a stereoisomer, enantiomer, enantiomeric mixture or a pharmaceutically acceptable salt thereof; wherein R$^2$ is —CN, —NH$_2$, —C(=O)NH$_2$, triazolyl,

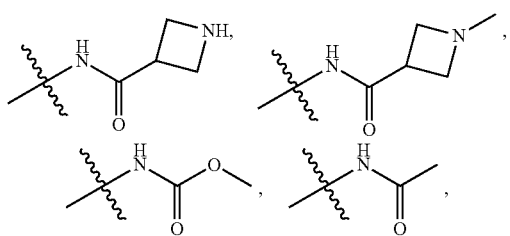

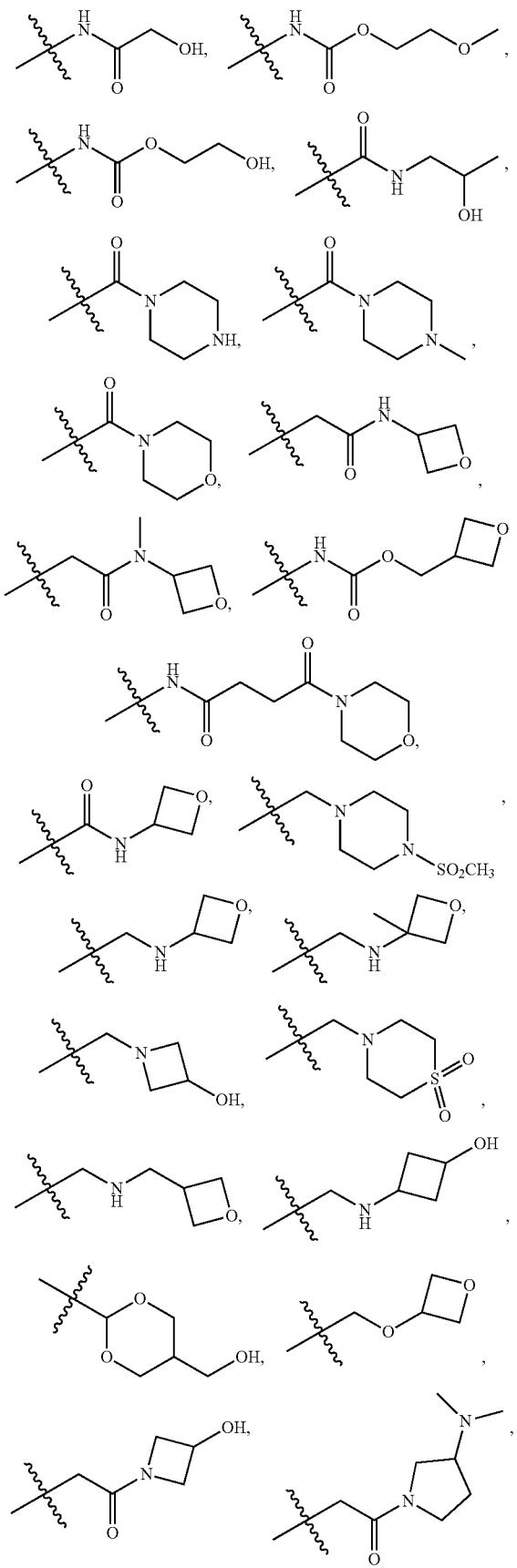

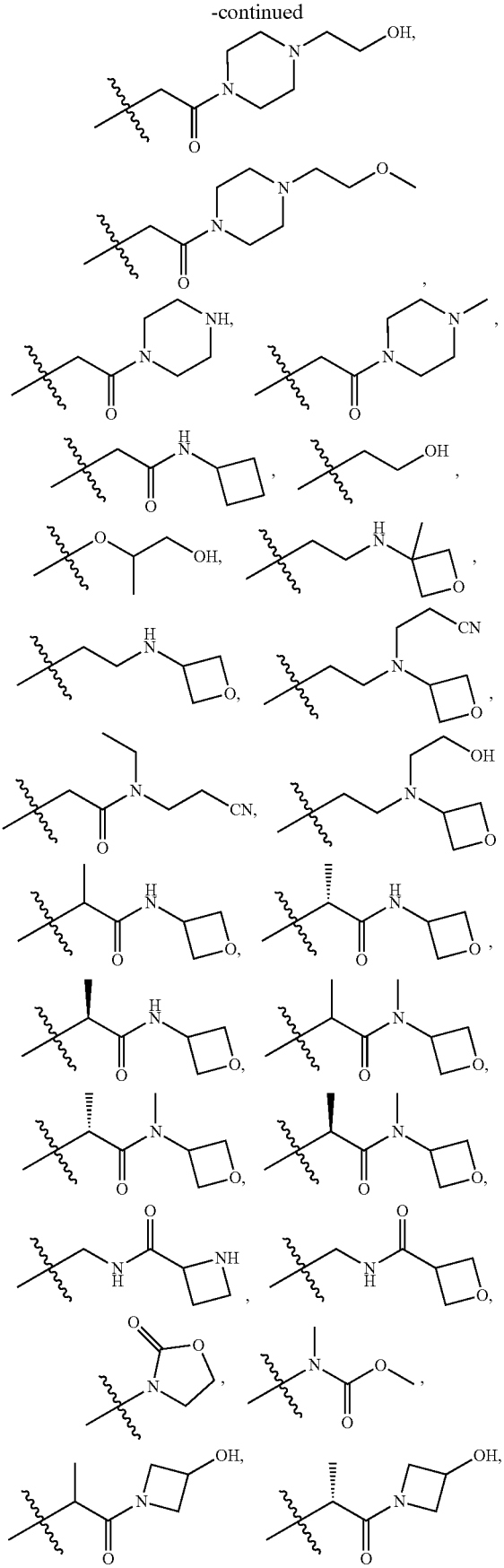
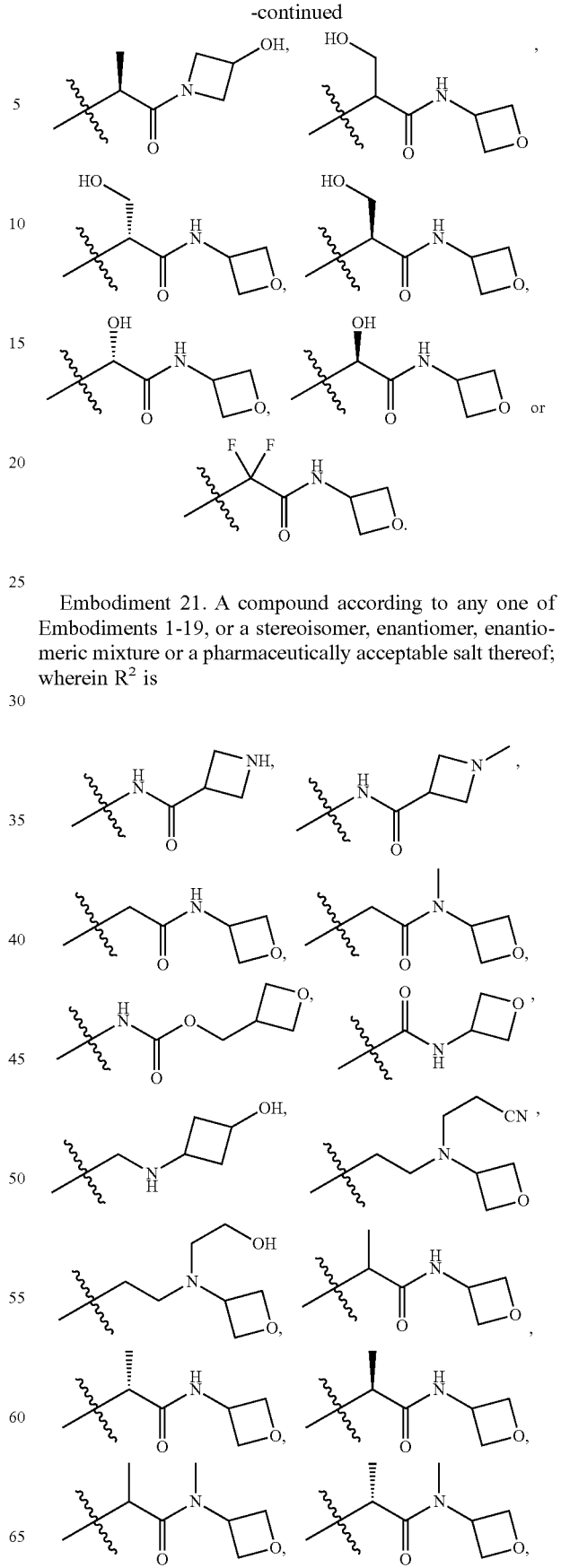
Embodiment 21. A compound according to any one of Embodiments 1-19, or a stereoisomer, enantiomer, enantiomeric mixture or a pharmaceutically acceptable salt thereof; wherein $R^2$ is -continued

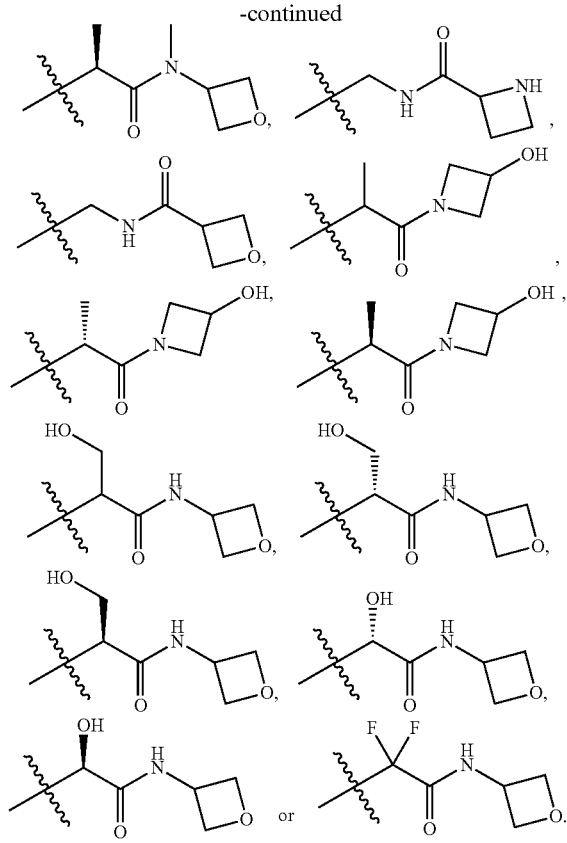

Embodiment 22. A compound according to Embodiment 1, wherein said compound is of Formula (II), or a stereoisomer, enantiomer, enantiomeric mixture or a pharmaceutically acceptable salt thereof;

Formula II

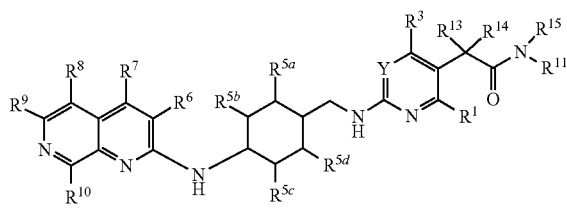

wherein:
Y is CH or N;
$R^1$, $R^3$, $R^5$, $R^{5b}$, $R^{5c}$ and $R^{5d}$ are independently H or —$C_1$-$C_4$ alkyl;
$R^6$, $R^7$, $R^8$ and $R^9$ are independently is H, halogen or —$C_1$-$C_4$ alkyl;
$R^{10}$ is halogen or —$C_1$-$C_4$ alkoxy;
$R^{11}$ is H, $C_1$-$C_4$ alkyl, -hydroxy$C_1$-$C_4$ alkylene or -cyano$C_1$-$C_4$ alkylene;
$R^{13}$ is H, halogen, —OH, —$C_1$-$C_4$ alkyl or -hydroxy$C_1$-$C_4$ alkylene;
$R^{14}$ is H, halogen or —$C_1$-$C_4$ alkyl;
$R^{15}$ is a 4- to 6-membered heterocycloalkyl having 1-2 heteroatoms independently selected from O, S and N; and wherein said 4- to 6-membered heterocycloalkyl is unsubstituted or substituted with 1-2 substituents selected from —OH, —$C_1$-$C_4$ alkyl, -hydroxy$C_1$-$C_4$ alkylene, —$C_1$-$C_4$ alkoxy and —N($C_1$-$C_4$ alkyl)$_2$.

Embodiment 23. A compound according to Embodiment 22, wherein said compound is of Formula (II-1), or a stereoisomer, enantiomer, enantiomeric mixture or a pharmaceutically acceptable salt thereof;

Formula (II-1)

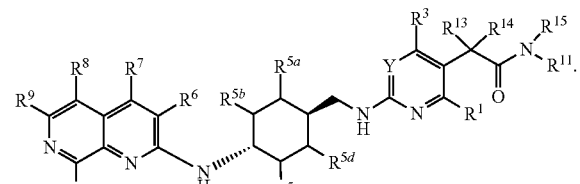

Embodiment 24. A compound according to Embodiment 22, wherein said compound is of Formula (II-2), or a stereoisomer, enantiomer, enantiomeric mixture or a pharmaceutically acceptable salt thereof;

Formula (II-2)

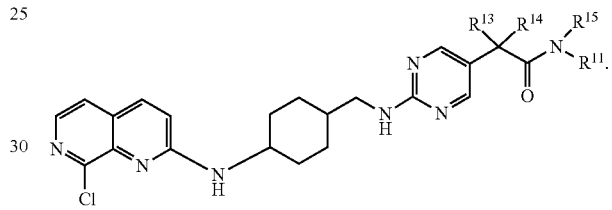

Embodiment 25. A compound according to Embodiment 22, wherein said compound is of Formula (II-3), or a stereoisomer, enantiomer, enantiomeric mixture or a pharmaceutically acceptable salt thereof;

Formula (II-3)

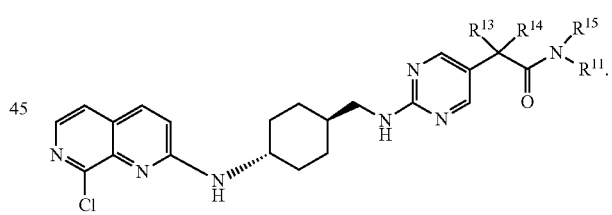

Embodiment 26. A compound according to any one of Embodiments 1-2, 9-19 and 22-25, or a stereoisomer, enantiomer, enantiomeric mixture of a pharmaceutically acceptable salt thereof; wherein $R^{11}$ is H, —$C_1$-$C_4$ alkyl or —$C_1$-$C_4$ alkyl substituted with one $R^b$; and $R^b$ is —CN, —OH or —OCH$_3$.

Embodiment 27. A compound according to any one of Embodiments 1-2, 9-19 and 22-26, or a stereoisomer, enantiomer, enantiomeric mixture or a pharmaceutically acceptable salt thereof; wherein $R^{13}$ is H, F, —CN, —OH, —CH$_3$ or —CH$_2$OH.

Embodiment 28. A compound according to any one of Embodiments 1-2, 9-19 and 22-27, or a stereoisomer, enantiomer, enantiomeric mixture or a pharmaceutically acceptable salt thereof; wherein $R^{14}$ is H, F or —CH$_3$.

Embodiment 29. A compound according to any one of Embodiments 1-2, 9-19 and 22-28, or a stereoisomer, enantiomer, enantiomeric mixture or a pharmaceutically acceptable salt thereof; wherein $R^{15}$ is azetidinyl or oxetanyl, each of which is unsubstituted or substituted with —OH, —$C_1$-$C_4$ alkyl or -hydroxy$C_1$-$C_4$ alkylene.

Embodiment 30. A compound according to Embodiment 29, or a stereoisomer, enantiomer, enantiomeric mixture or a pharmaceutically acceptable salt thereof; wherein $R^{15}$ is

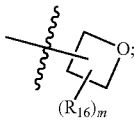

$R^{16}$, if present, is —$C_1$-$C_4$ alkyl; and m is 0-1. In a particular embodiment, $R^{15}$ is

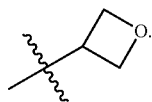 [SMILES: *C1COC1]

Embodiment 31. A compound according to Embodiment 1, wherein said compound is selected from Examples C1 to C22 and Examples C24 to C77; or a pharmaceutically acceptable salt thereof.

Embodiment 32. A compound according to Embodiment 1, wherein said compound is selected from:
$N^2$-(((1,4-trans)-4-((8-methoxy-1,7-naphthyridin-2-yl)amino)cyclohexyl)methyl)pyrimidine-2,5-diamine;
N-(2-((((1,4-trans)-4-((8-methoxy-1,7-naphthyridin-2-yl)amino)cyclohexyl)methyl)amino)pyrimidin-5-yl)azetidine-3-carboxamide;
N-(2-((((1,4-trans)-4-((8-methoxy-1,7-naphthyridin-2-yl)amino)cyclohexyl)methyl)amino)pyrimidin-5-yl)-1-methylazetidine-3-carboxamide;
2-((((1,4-trans)-4-((8-methoxy-1,7-naphthyridin-2-yl)amino)cyclohexyl)methyl)amino)pyrimidine-5-carbonitrile;
2-((((1,4-trans)-4-((8-methoxy-1,7-naphthyridin-2-yl)amino)cyclohexyl)methyl)amino)pyrimidine-5-carboxamide;
N-(2-((((1,4-trans)-4-((8-methoxy-1,7-naphthyridin-2-yl)amino)cyclohexyl)methyl)amino)pyrimidin-5-yl)acetamide;
2-hydroxy-N-(2-((((1,4-trans)-4-((8-methoxy-1,7-naphthyridin-2-yl)amino)cyclohexyl)methyl)amino)pyrimidin-5-yl)acetamide;
(2-((((1,4-trans)-4-((8-methoxy-1,7-naphthyridin-2-yl)amino)cyclohexyl)methyl)amino)pyrimidin-5-yl)(piperazin-1-yl)methanone;
N-(2-hydroxypropyl)-2-((((1,4-trans)-4-((8-methoxy-1,7-naphthyridin-2-yl)amino)cyclohexyl)methyl)amino)pyrimidine-5-carboxamide;
(2-((((1,4-trans)-4-((8-methoxy-1,7-naphthyridin-2-yl)amino)cyclohexyl)methyl)amino)pyrimidin-5-yl)(morpholino)methanone;
(2-((((1,4-trans)-4-((8-methoxy-1,7-naphthyridin-2-yl)amino)cyclohexyl)methyl)amino)pyrimidin-5-yl)(4-methylpiperazin-1-yl)methanone;
N-((1,4-trans)-4-(((5-(1H-1,2,4-triazol-5-yl)pyrimidin-2-yl)amino)methyl)cyclohexyl)-8-methoxy-1,7-naphthyridin-2-amine;
2-(2-(((((1,4-trans)-4-((8-methoxy-1,7-naphthyridin-2-yl)amino)cyclohexyl)methyl)amino)pyrimidin-5-yl)-N-(oxetan-3-yl)acetamide;
$N^2$-(((1,4-trans)-4-((8-chloro-1,7-naphthyridin-2-yl)amino)cyclohexyl)methyl)pyrimidine-2,5-diamine;
methyl (2-((((1,4-trans)-4-((8-chloro-1,7-naphthyridin-2-yl)amino)cyclohexyl)methyl)amino)pyrimidin-5-yl)carbamate;
2-methoxyethyl (2-((((1,4-trans)-4-((8-chloro-1,7-naphthyridin-2-yl)amino)cyclohexyl)methyl)amino)pyrimidin-5-yl)carbamate;
2-hydroxyethyl (2-((((1,4-trans)-4-((8-chloro-1,7-naphthyridin-2-yl)amino)cyclohexyl)methyl)amino)pyrimidin-5-yl)carbamate;
oxetan-3-ylmethyl (2-((((1,4-trans)-4-((8-chloro-1,7-naphthyridin-2-yl)amino)cyclohexyl)methyl)amino)pyrimidin-5-yl)carbamate;
N-(2-((((1,4-trans)-4-((8-chloro-1,7-naphthyridin-2-yl)amino)cyclohexyl)methyl)amino)pyrimidin-5-yl)-2-hydroxyacetamide;
N-(2-((((1,4-trans)-4-((8-chloro-1,7-naphthyridin-2-yl)amino)cyclohexyl)methyl)amino)pyrimidin-5-yl)-4-morpholino-4-oxobutanamide;
2-((((1,4-trans)-4-((8-chloro-1,7-naphthyridin-2-yl)amino)cyclohexyl)methyl)amino)pyrimidine-5-carbonitrile;
(2-((((1,4-trans)-4-((8-chloro-1,7-naphthyridin-2-yl)amino)cyclohexyl)methyl)amino)pyrimidin-5-yl)(morpholino)methanone;
(2-((((1,4-trans)-4-((8-chloro-1,7-naphthyridin-2-yl)amino)cyclohexyl)methyl)amino)pyrimidin-5-yl)(piperazin-1-yl)methanone;
2-((((1,4-trans)-4-((8-chloro-1,7-naphthyridin-2-yl)amino)cyclohexyl)methyl)amino)-N-(oxetan-3-yl)pyrimidine-5-carboxamide;
8-chloro-N-((1,4-trans)-4-(((5-((4-(methylsulfonyl)piperazin-1-yl)methyl)pyrimidin-2-yl)amino)methyl)cyclohexyl)-1,7-naphthyridin-2-amine;
8-chloro-N-((1,4-trans)-4-(((5-((oxetan-3-ylamino)methyl)pyrimidin-2-yl)amino)methyl)cyclohexyl)-1,7-naphthyridin-2-amine;
8-chloro-N-((1,4-trans)-4-(((5-(((3-methyloxetan-3-yl)amino)methyl)pyrimidin-2-yl)amino)methyl)cyclohexyl)-1,7-naphthyridin-2-amine;
1-((2-((((1,4-trans)-4-((8-chloro-1,7-naphthyridin-2-yl)amino)cyclohexyl)methyl)amino)pyrimidin-5-yl)methyl)azetidin-3-ol;
4-((2-((((1,4-trans)-4-((8-chloro-1,7-naphthyridin-2-yl)amino)cyclohexyl)methyl)amino)pyrimidin-5-yl)methyl)thiomorpholine 1,1-dioxide;
8-chloro-N-((1,4-trans)-4-(((5-(((oxetan-3-ylmethyl)amino)methyl)pyrimidin-2-yl)amino)methyl)cyclohexyl)-1,7-naphthyridin-2-amine;
8-chloro-N-((1,4-trans)-4-(((5-(((3-methoxycyclobutyl)amino)methyl)pyrimidin-2-yl)amino)methyl)cyclohexyl)-1,7-naphthyridin-2-amine;
3-(((2-((((1,4-trans)-4-((8-chloro-1,7-naphthyridin-2-yl)amino)cyclohexyl)methyl)amino)pyrimidin-5-yl)methyl)amino)cyclobutan-1-ol;
(2-(2-((((1,4-trans)-4-((8-chloro-1,7-naphthyridin-2-yl)amino)cyclohexyl)methyl)amino)pyrimidin-5-yl)-1,3-dioxan-5-yl)methanol;
8-chloro-N-((1,4-trans)-4-(((5-((oxetan-3-yloxy)methyl)pyrimidin-2-yl)amino)methyl)cyclohexyl)-1,7-naphthyridin-2-amine;
2-(2-((((1,4-trans)-4-((8-chloro-1,7-naphthyridin-2-yl)amino)cyclohexyl)methyl)amino)pyrimidin-5-yl)-N-(oxetan-3-yl)acetamide;

2-(2-((((1,4-trans)-4-((8-chloro-1,7-naphthyridin-2-yl)
amino)cyclohexyl)methyl)amino)pyrimidin-5-yl)-N-
methyl-N-(oxetan-3-yl)acetamide;
2-(2-((((1,4-trans)-4-((8-chloro-1,7-naphthyridin-2-yl)
amino)cyclohexyl)methyl)amino)pyrimidin-5-yl)-1-(3-
hydroxyazetidin-1-yl)ethan-1-one;
2-(2-((((1,4-trans)-4-((8-chloro-1,7-naphthyridin-2-yl)
amino)cyclohexyl)methyl)amino)pyrimidin-5-yl)-1-(3-
(dimethylamino)pyrrolidin-1-yl)ethan-1-one;
2-(2-((((1,4-trans)-4-((8-chloro-1,7-naphthyridin-2-yl)
amino)cyclohexyl)methyl)amino)pyrimidin-5-yl)-1-(4-
(2-hydroxyethyl)piperazin-1-yl)ethan-1-one;
2-(2-((((1,4-trans)-4-((8-chloro-1,7-naphthyridin-2-yl)
amino)cyclohexyl)methyl)amino)pyrimidin-5-yl)-1-(pip-
erazin-1-yl)ethan-1-one;
2-(6-((((1,4-trans)-4-((8-chloro-1,7-naphthyridin-2-yl)
amino)cyclohexyl)methyl)amino)pyridin-3-yl)-N-
(oxetan-3-yl)acetamide;
2-(2-((((1,4-trans)-4-((8-chloro-1,7-naphthyridin-2-yl)
amino)cyclohexyl)methyl)amino)pyrimidin-5-yl)-1-(4-
methylpiperazin-1-yl)ethan-1-one;
2-(2-((((1,4-trans)-4-((8-chloro-1,7-naphthyridin-2-yl)
amino)cyclohexyl)methyl)amino)pyrimidin-5-yl)-N-cy-
clobutylacetamide;
2-(2-((((1,4-trans)-4-((8-chloro-1,7-naphthyridin-2-yl)
amino)cyclohexyl)methyl)amino)pyrimidin-5-yl)-1-(4-
(2-methoxyethyl)piperazin-1-yl)ethan-1-one;
2-(2-((((1,4-trans)-4-((8-chloro-1,7-naphthyridin-2-yl)
amino)cyclohexyl)methyl)amino)pyrimidin-5-yl)ethan-
1-ol;
8-chloro-N-((1,4-trans)-4-(((5-(2-((3-methyloxetan-3-yl)
amino)ethyl)pyrimidin-2-yl)amino)methyl)cyclohexyl)-
1,7-naphthyridin-2-amine;
8-chloro-N-((1,4-trans)-4-(((5-(2-(oxetan-3-ylamino)ethyl)
pyrimidin-2-yl)amino)methyl)cyclohexyl)-1,7-naphthyri-
din-2-amine;
2-(2-((((1,4-trans)-4-((8-chloro-1,7-naphthyridin-2-yl)
amino)cyclohexyl)methyl)amino)pyrimidin-5-yl)-N-(2-
cyanoethyl)-N-(oxetan-3-yl)acetamide;
2-(2-((((1,4-trans)-4-((8-chloro-1,7-naphthyridin-2-yl)
amino)cyclohexyl)methyl)amino)pyrimidin-5-yl)-N-(2-
cyanoethyl)-N-ethylacetamide;
2-(2-((((1,4-trans)-4-((8-chloro-1,7-naphthyridin-2-yl)
amino)cyclohexyl)methyl)amino)pyrimidin-5-yl)-N-(2-
hydroxyethyl)-N-(oxetan-3-yl)acetamide;
2-(2-((((1,4-trans)-4-((8-chloro-1,7-naphthyridin-2-yl)
amino)cyclohexyl)methyl)amino)pyrimidin-5-yl)-N-
(oxetan-3-yl)propanamide;
(S)-2-(2-((((1,4-trans)-4-((8-chloro-1,7-naphthyridin-2-yl)
amino)cyclohexyl)methyl)amino)pyrimidin-5-yl)-N-
(oxetan-3-yl)propanamide;
(R)-2-(2-((((1,4-trans)-4-((8-chloro-1,7-naphthyridin-2-yl)
amino)cyclohexyl)methyl)amino)pyrimidin-5-yl)-N-
(oxetan-3-yl)propanamide;
2-(2-((((1,4-trans)-4-((8-chloro-1,7-naphthyridin-2-yl)
amino)cyclohexyl)methyl)amino)pyrimidin-5-yl)-N-
methyl-N-(oxetan-3-yl)propanamide;
(S)-2-(2-((((1,4-trans)-4-((8-chloro-1,7-naphthyridin-2-yl)
amino)cyclohexyl)methyl)amino)pyrimidin-5-yl)-N-
methyl-N-(oxetan-3-yl)propanamide;
(R)-2-(2-((((1,4-trans)-4-((8-chloro-1,7-naphthyridin-2-yl)
amino)cyclohexyl)methyl)amino)pyrimidin-5-yl)-N-
methyl-N-(oxetan-3-yl)propanamide;
N-((2-((((1,4-trans)-4-((8-chloro-1,7-naphthyridin-2-yl)
amino)cyclohexyl)methyl)amino)pyrimidin-5-yl)methyl)
azetidine-2-carboxamide;
N-((2-((((1,4-trans)-4-((8-chloro-1,7-naphthyridin-2-yl)
amino)cyclohexyl)methyl)amino)pyrimidin-5-yl)methyl)
oxetane-3-carboxamide;
2-((((1,4-trans)-4-((8-(methylamino)-1,7-naphthyridin-2-yl)
amino)cyclohexyl)methyl)amino)pyrimidine-5-carboni-
trile;
2-((((1,4-trans)-4-((8-(methylamino)-1,7-naphthyridin-2-yl)
amino)cyclohexyl)methyl)amino)pyrimidine-5-carbox-
amide;
$N^2$-((1,4-trans)-4-(((5-aminopyrimidin-2-yl)amino)methyl)
cyclohexyl)-$N^8$-methyl-1,7-naphthyridine-2,8-diamine;
N-(2-((((1,4-trans)-4-((8-(methylamino)-1,7-naphthyridin-
2-yl)amino)cyclohexyl)methyl)amino)pyrimidin-5-yl)ac-
etamide;
3-(2-((((1,4-trans)-4-((8-chloro-1,7-naphthyridin-2-yl)
amino)cyclohexyl)methyl)amino)pyrimidin-5-yl)oxazoli-
din-2-one;
methyl (2-((((1,4-trans)-4-((8-chloro-1,7-naphthyridin-2-yl)
amino)cyclohexyl)methyl)amino)pyrimidin-5-yl)
(methyl)carbamate;
$N^2$-(((1,4-trans)-4-((8-(difluoromethoxy)-1,7-naphthyridin-
2-yl)amino)cyclohexyl)methyl)pyrimidine-2,5-diamine;
N-((1,4-trans)-4-(((5-(4H-1,2,4-triazol-3-yl)pyrimidin-2-yl)
amino)methyl)cyclohexyl)-8-chloro-1,7-naphthyridin-2-
amine;
2-((2-((((1,4-trans)-4-((8-chloro-1,7-naphthyridin-2-yl)
amino)cyclohexyl)methyl)amino)pyrimidin-5-yl)oxy)
propan-1-ol;
2-(2-((((1,4-trans)-4-((8-chloro-1,7-naphthyridin-2-yl)
amino)cyclohexyl)methyl)amino)pyrimidin-5-yl)-1-(3-
hydroxyazetidin-1-yl)propan-1-one;
(S)-2-(2-((((1,4-trans)-4-((8-chloro-1,7-naphthyridin-2-yl)
amino)cyclohexyl)methyl)amino)pyrimidin-5-yl)-1-(3-
hydroxyazetidin-1-yl)propan-1-one;
(R)-2-(2-((((1,4-trans)-4-((8-chloro-1,7-naphthyridin-2-yl)
amino)cyclohexyl)methyl)amino)pyrimidin-5-yl)-1-(3-
hydroxyazetidin-1-yl)propan-1-one;
2-(2-((((1,4-trans)-4-((8-chloro-1,7-naphthyridin-2-yl)
amino)cyclohexyl)methyl)amino)pyrimidin-5-yl)-3-hy-
droxy-N-(oxetan-3-yl)propanamide;
(R)-2-(2-((((1,4-trans)-4-((8-chloro-1,7-naphthyridin-2-yl)
amino)cyclohexyl)methyl)amino)pyrimidin-5-yl)-3-hy-
droxy-N-(oxetan-3-yl)propanamide;
(S)-2-(2-((((1,4-trans)-4-((8-chloro-1,7-naphthyridin-2-yl)
amino)cyclohexyl)methyl)amino)pyrimidin-5-yl)-3-hy-
droxy-N-(oxetan-3-yl)propanamide;
(S)-2-(2-((((1,4-trans)-4-((8-chloro-1,7-naphthyridin-2-yl)
amino)cyclohexyl)methyl)amino)pyrimidin-5-yl)-2-hy-
droxy-N-(oxetan-3-yl)acetamide;
(R)-2-(2-((((1,4-trans)-4-((8-chloro-1,7-naphthyridin-2-yl)
amino)cyclohexyl)methyl)amino)pyrimidin-5-yl)-2-hy-
droxy-N-(oxetan-3-yl)acetamide, and
2-(2-((((1,4-trans)-4-((8-chloro-1,7-naphthyridin-2-yl)
amino)cyclohexyl)methyl)amino)pyrimidin-5-yl)-2,2-di-
fluoro-N-(oxetan-3-yl)acetamide;
or a pharmaceutically acceptable salt thereof.

Embodiment 33. A compound according to Embodiment 1, wherein said compound is selected from Examples C1-C7, C9, C12-C21 and Examples C25-C77; or a pharmaceutically acceptable salt thereof.

Embodiment 34. A compound according to Embodiment 1 or Embodiment 22, wherein said compound is selected from Examples C13, C36-C37, C42, C49, C51-57 and C72-C77; or a pharmaceutically acceptable salt thereof.

Embodiment 35. A compound according to Embodiment 1 or Embodiment 22, wherein said compound is 2-(2-(((4-((8-chloro-1,7-naphthyridin-2-yl)amino)cyclohexyl)

methyl)amino) pyrimidin-5-yl)-N-(oxetan-3-yl)acetamide; or a stereoisomer, enantiomer, enantiomeric mixture or a pharmaceutically acceptable salt thereof.

Embodiment 36. A compound according to Embodiment 1 or Embodiment 22, wherein said compound is 2-(2-((((1,4-trans)-4-((8-chloro-1,7-naphthyridin-2-yl)amino)cyclohexyl)methyl) amino)pyrimidin-5-yl)-N-(oxetan-3-yl)acetamide; or a pharmaceutically acceptable salt thereof. The compound is also known as 2-(2-(((((1r,4r)-4-((8-chloro-1,7-naphthyridin-2-yl)amino)cyclohexyl)methyl) amino)pyrimidin-5-yl)-N-(oxetan-3-yl)acetamide (Example C36).

Embodiment 37. A compound according to Embodiment 1 or Embodiment 22, wherein said compound is 2-(2-(((4-((8-chloro-1,7-naphthyridin-2-yl)amino)cyclohexyl) methyl) amino)pyrimidin-5-yl)-N-(oxetan-3-yl)propanamide; or a stereoisomer, enantiomer, enantiomeric mixture or a pharmaceutically acceptable salt thereof.

Embodiment 38. A compound according to Embodiment 1 or Embodiment 22, wherein said compound is 2-(2-((((1,4-trans)-4-((8-chloro-1,7-naphthyridin-2-yl)amino)cyclohexyl)methyl) amino)pyrimidin-5-yl)-N-(oxetan-3-yl)propanamide; or a stereoisomer, enantiomer, enantiomeric mixture or a pharmaceutically acceptable salt thereof. The compound is also known as 2-(2-(((((1r,4r)-4-((8-chloro-1,7-naphthyridin-2-yl)amino)cyclohexyl)methyl) amino)pyrimidin-5-yl)-N-(oxetan-3-yl)propanamide (Example C52).

Embodiment 39. A compound according to Embodiment 1 or Embodiment 22, wherein said compound is (S)-2-(2-(((((1,4-trans)-4-((8-chloro-1,7-naphthyridin-2-yl)amino)cyclohexyl)methyl) amino)pyrimidin-5-yl)-N-(oxetan-3-yl) propanamide; or a pharmaceutically acceptable salt thereof. The compound is also known as (S)-2-(2-(((((1r,4S)-4-((8-chloro-1,7-naphthyridin-2-yl)amino)cyclohexyl)methyl) amino)pyrimidin-5-yl)-N-(oxetan-3-yl)propanamide (Example C53).

Embodiment 40. A compound according to Embodiment 1 or Embodiment 22, wherein said compound is (R)-2-(2-(((((1,4-trans)-4-((8-chloro-1,7-naphthyridin-2-yl)amino)cyclohexyl)methyl) amino)pyrimidin-5-yl)-N-(oxetan-3-yl) propanamide; or a pharmaceutically acceptable salt thereof. The compound is also known as (R)-2-(2-(((((1r,4R)-4-((8-chloro-1,7-naphthyridin-2-yl)amino)cyclohexyl)methyl) amino)pyrimidin-5-yl)-N-(oxetan-3-yl)propanamide (Example C54).

Embodiment 41. A pharmaceutical composition comprising a compound according to any one of Embodiments 1-40 and one or more pharmaceutically acceptable carrier.

Embodiment 42. A combination comprising a compound according to any one of Embodiments 1-40 and one or more additional therapeutically active agent.

Embodiment 43. The combination according to Embodiment 42, wherein said one or more additional therapeutically active agent is an anti-cancer agent, an analgesic, an anti-inflammatory agent, immunomodulator, or a combination thereof.

Embodiment 44. A compound according to any one of Embodiments 1-40 and optionally in combination with a second therapeutic agent, for use in treating a disease or condition mediated by EZH2, PRC2 or EZH2/PRC2.

Embodiment 45. The compound according to Embodiment 44, wherein said second therapeutic agent is an anti-cancer agent, an analgesic, an anti-inflammatory agent or a combination thereof.

Embodiment 46. Use of a compound according to any one of Embodiments 1-40 and optionally in combination with a second therapeutic agent, in the manufacture of a medicament for a disease or condition mediated by EZH2, PRC2 or EZH2/PRC2.

Embodiment 47. A method for treating a disease or condition mediated by EZH2, PRC2 or EZH2/PRC2, comprising administering to a subject in need thereof, a therapeutically effective amount of a compound according to any one of Embodiments 1-40 and optionally in combination with a second therapeutic agent; thereby treating said disease or condition mediated by EZH2, PRC2 or EZH2/PRC2.

Embodiment 48. A method for treating a disease or condition that benefit from or is treatable by inhibition of EZH2, PRC2 or EZH2/PRC2, comprising administering to a subject in need thereof, a therapeutically effective amount of a compound according to any one of Embodiments 1-40 and optionally in combination with a second therapeutic agent; thereby treating said disease or condition that benefit from or is treatable by inhibition by EZH2, PRC2, or EZH2/PRC2.

Embodiment 49. The use of a compound according to Embodiment 46, or the method according to Embodiment 47 or 48, wherein said disease or condition mediated by EZH2, PRC2 or EZH2/PRC2, or said disease or condition that benefit from or is treatable by inhibition of EZH2, PRC2 or EZH2/PRC2, is diffuse large B cell lymphoma (DLBCL), follicular lymphoma, leukemia, multiple myeloma, gastric cancer, malignant rhabdoid tumor, hepatocellular carcinoma, prostate cancer, breast carcinoma, bile duct and gallbladder cancers, bladder carcinoma, neuroblastoma, glioma, glioblastoma and astrocytoma, cervical cancer, colon cancer, melanoma, endometrial cancer, esophageal cancer, head and neck cancer, lung cancer, nasopharyngeal carcinoma, ovarian cancer, pancreatic cancer, renal cell carcinoma, rectal cancer, thyroid cancers, parathyroid tumors, uterine tumors, rhabdomyosarcoma, Kaposi sarcoma, synovial sarcoma, osteosarcoma and Ewing's sarcoma.

Embodiment 50. The use of a compound according to Embodiment 46, or the method according to Embodiment 47 or 48, wherein said disease or condition mediated by EZH2, PRC2 or EZH2/PRC2, or said disease or condition that benefit from or is treatable by inhibition of EZH2, PRC2 or EZH2/PRC2, is diffuse large B cell lymphoma (DLBCL), follicular lymphoma, leukemia, multiple myeloma, gastric cancer, malignant rhabdoid tumor, and hepatocellular carcinoma.

Depending on the choice of the starting materials and procedures, the compounds can be present in the form of one of the possible stereoisomers or as mixtures thereof, for example as pure optical isomers, or as stereoisomer mixtures, such as racemates and diastereoisomer mixtures, depending on the number of asymmetric carbon atoms. The present invention is meant to include all such possible stereoisomers, including racemic mixtures, diasteriomeric mixtures and optically pure forms. Optically active (R)- and (S)-stereoisomers may be prepared using chiral synthons or chiral reagents, or resolved using conventional techniques. Substituents at atoms with unsaturated double bonds may, if possible, be present in cis-(Z)- or trans-(E)-form. If the compound contains a disubstituted cycloalkyl, the cycloalkyl substituent may have a cis- or trans-configuration.

Any asymmetric atom (e.g., carbon or the like) of the compound(s) of the present invention can be present in racemic or enantiomerically enriched, for example the (R)-, (S)- or (R,S)-configuration. In certain embodiments, each asymmetric atom has at least 50% enantiomeric excess, at least 60% enantiomeric excess, at least 70% enantiomeric excess, at least 80% enantiomeric excess, at least 90% enantiomeric excess, at least 95% enantiomeric excess, or at least 99% enantiomeric excess in the (R)- or (S)-configuration.

Accordingly, as used herein a compound of the present invention can be in the form of one of the possible stereoisomers, rotamers, atropisomers, tautomers or mixtures thereof, for example, as substantially pure geometric (cis or trans) stereoisomers, diastereomers, optical isomers (antipodes), racemates or mixtures thereof.

Any resulting mixtures of stereoisomers can be separated on the basis of the physicochemical differences of the constituents, into the pure or substantially pure geometric or optical isomers, diastereomers, racemates, for example, by chromatography and/or fractional crystallization.

Any resulting racemates of compounds of the present invention or of intermediates can be resolved into the optical antipodes by known methods, e.g., by separation of the diastereomeric salts thereof, obtained with an optically active acid or base, and liberating the optically active acidic or basic compound. In particular, a basic moiety may thus be employed to resolve the compounds of the present invention into their optical antipodes, e.g., by fractional crystallization of a salt formed with an optically active acid, e.g., tartaric acid, dibenzoyl tartaric acid, diacetyl tartaric acid, di-O,O'-p-toluoyl tartaric acid, mandelic acid, malic acid or camphor-10-sulfonic acid. Racemic compounds of the present invention or racemic intermediates can also be resolved by chiral chromatography, e.g., high pressure liquid chromatography (HPLC) using a chiral adsorbent.

Any formula given herein is also intended to represent unlabeled forms as well as isotopically labeled forms of the compounds. Isotopically labeled compounds have structures depicted by the formulas given herein except that one or more atoms are replaced by an atom having a selected atomic mass or mass number. Isotopes that can be incorporated into compounds of the invention include, for example, isotopes of hydrogen.

Further, incorporation of certain isotopes, particularly deuterium (i.e., $^2$H or D) may afford certain therapeutic advantages resulting from greater metabolic stability, for example increased in vivo half-life or reduced dosage requirements or an improvement in therapeutic index or tolerability. It is understood that deuterium in this context is regarded as a substituent of a compound of Formula (I) or sub-formulae thereof. The concentration of deuterium, may be defined by the isotopic enrichment factor. The term "isotopic enrichment factor" as used herein means the ratio between the isotopic abundance and the natural abundance of a specified isotope. If a substituent in a compound of this invention is denoted as being deuterium, such compound has an isotopic enrichment factor for each designated deuterium atom of at least 3500 (52.5% deuterium incorporation at each designated deuterium atom), at least 4000 (60% deuterium incorporation), at least 4500 (67.5% deuterium incorporation), at least 5000 (75% deuterium incorporation), at least 5500 (82.5% deuterium incorporation), at least 6000 (90% deuterium incorporation), at least 6333.3 (95% deuterium incorporation), at least 6466.7 (97% deuterium incorporation), at least 6600 (99% deuterium incorporation), or at least 6633.3 (99.5% deuterium incorporation). It should be understood that the term "isotopic enrichment factor" can be applied to any isotope in the same manner as described for deuterium.

Other examples of isotopes that can be incorporated into compounds of the invention include isotopes of hydrogen, carbon, nitrogen, oxygen, phosphorous, fluorine, and chlorine, such as $^3$H, $^{11}$C, $^{13}$C, $^{14}$C, $^{15}$N, $^{18}$F, $^{31}$P, $^{32}$P, $^{35}$S, $^{36}$Cl, $^{123}$I, $^{124}$I, $^{125}$I respectively. Accordingly it should be understood that the invention includes compounds that incorporate one or more of any of the aforementioned isotopes, including for example, radioactive isotopes, such as $^3$H and $^{14}$C, or those into which non-radioactive isotopes, such as $^2$H and $^{13}$C are present. Such isotopically labelled compounds are useful in metabolic studies (with $^{14}$C), reaction kinetic studies (with, for example $^2$H or $^3$H), detection or imaging techniques, such as positron emission tomography (PET) or single-photon emission computed tomography (SPECT) including drug or substrate tissue distribution assays, or in radioactive treatment of patients. In particular, an $^8$F or labeled compound may be particularly desirable for PET or SPECT studies. Isotopically-labeled compounds of Formula (I) or sub-formulae thereof can generally be prepared by conventional techniques known to those skilled in the art or by processes analogous to those described in the accompanying examples using an appropriate isotopically-labeled reagent in place of the non-labeled reagent previously employed.

The compounds of the present invention are either obtained in the free form, as a salt thereof. As used herein, the terms "salt" or "salts" refers to an acid addition or base addition salt of a compound of the invention. "Salts" include in particular "pharmaceutical acceptable salts". The term "pharmaceutically acceptable salts" refers to salts that retain the biological effectiveness and properties of the compounds of this invention and, which typically are not biologically or otherwise undesirable. In many cases, the compounds of the present invention are capable of forming acid and/or base salts by virtue of the presence of amino and/or carboxyl groups or groups similar thereto.

Pharmaceutically acceptable acid addition salts can be formed with inorganic acids and organic acids. Inorganic acids from which salts can be derived include, for example, hydrochloric acid, hydrobromic acid, sulfuric acid, nitric acid, phosphoric acid, and the like. Organic acids from which salts can be derived include, for example, acetic acid, propionic acid, glycolic acid, oxalic acid, maleic acid, malonic acid, succinic acid, fumaric acid, tartaric acid, citric acid, benzoic acid, mandelic acid, methanesulfonic acid, ethanesulfonic acid, toluenesulfonic acid, sulfosalicylic acid, and the like.

Pharmaceutically acceptable base addition salts can be formed with inorganic and organic bases. Inorganic bases from which salts can be derived include, for example, ammonium salts and metals from columns I to XII of the periodic table. In certain embodiments, the salts are derived from sodium, potassium, ammonium, calcium, magnesium, iron, silver, zinc, and copper; particularly suitable salts include ammonium, potassium, sodium, calcium and magnesium salts. Organic bases from which salts can be derived include, for example, primary, secondary, and tertiary amines, substituted amines including naturally occurring substituted amines, cyclic amines, basic ion exchange resins, and the like. Certain organic amines include isopropylamine, benzathine, cholinate, diethanolamine, diethylamine, lysine, meglumine, piperazine and tromethamine.

In another aspect, the present invention provides compounds of the present invention in acetate, ascorbate, adipate, aspartate, benzoate, besylate, bromide/hydrobromide, bicarbonate/carbonate, bisulfate/sulfate, camphorsulfonate, caprate, chloride/hydrochloride, chlorotheophyllinate, citrate, ethanedisulfonate, fumarate, gluceptate, gluconate, glucuronate, glutamate, glutarate, glycolate, hippurate, hydroiodide/iodide, isethionate, lactate, lactobionate, laurylsulfate, malate, maleate, malonate, mandelate, mesylate, methylsulphate, mucate, naphthoate, napsylate, nicotinate, nitrate, octadecanoate, oleate, oxalate, palmitate, pamoate, phosphate/hydrogen phosphate/dihydrogen phosphate, polygalacturonate, propionate, sebacate, stearate, succinate, sulfosalicylate, sulfate, tartrate, tosylate trifenatate, trifluoroacetate or xinafoate salt form.

Pharmacology and Utility

EZH2 is the catalytic subunit in PRC2; the other homolog, EZH1, is redundant with EZH2 in mouse and required for adult progenitor maintenance at EZH2-loss condition. Cofactor SAM-competitive or EED binding PRC2 inhibitors have been identified and represent variable selectivity on EZH2 compared with EZH1. Considering the role of EZH1 in adult tissue homeostasis, targeting EZH2 of PRC2 selectively may offer a novel and unique angle to be advantageous to, or complementary to, directly targeting the SAM competitive or EED mechanisms of PRC2. Therefore, targeting EZH2 selectively represents a highly attractive strategy for the development of a novel therapy for the treatment of cancer.

The compounds of the invention were assessed for their ability to inhibit PRC2 activity in a pentameric complex of EZH2/EZH1, SUZ12, EED, Rbap48 and AEBP in biochemical assays. The ability of compounds of the invention to inhibit cellular activity of PRC2 was assessed by analysing H3K27me3 in human cell lines. The ability of compounds of the invention to inhibit cancers was derived from their ability to modulate proliferation of human cancer cell lines bearing specific dependence to PRC2 activity to maintain cancerous growth. The compounds of the invention selectively target EZH2, with MOI distinct from the SAM-competitive inhibitors and the EED K27me3-pocket binders.

In one aspect, the invention provides compounds of Formula (I) or subformulae thereof, or a pharmaceutically acceptable salt thereof, that are useful for therapy; particularly, for treating or preventing a disease or condition that is mediated by EZH2, PRC2 or a combination thereof, such as cancers that depend on PRC2 activity to maintain cancerous growth.

In another aspect, the invention provides the use of a compound of Formula (I) or subformulae thereof, or a pharmaceutically acceptable salt thereof, for treating a disease or condition that benefit from or is treatable by inhibition of EZH2, PRC2 or a combination thereof; and for the manufacture of a medicament for treating a disease or condition that is treatable by inhibition of EZH2, PRC2 or a combination thereof.

Examples of diseases or conditions that are mediated by EZH2, PRC2 or EZH2/PRC2, or that benefit from or are treatable by inhibition of EZH2, PRC2 or EZH2/PRC2, include but is not limited to diffuse large B cell lymphoma (DLBCL), follicular lymphoma, leukemia, multiple myeloma, gastric cancer, malignant rhabdoid tumor, hepatocellular carcinoma, prostate cancer, breast carcinoma, bile duct and gallbladder cancers, bladder carcinoma, neuroblastoma, glioma, glioblastoma and astrocytoma, cervical cancer, colon cancer, melanoma, endometrial cancer, esophageal cancer, head and neck cancer, lung cancer, nasopharyngeal carcinoma, ovarian cancer, pancreatic cancer, renal cell carcinoma, rectal cancer, thyroid cancers, parathyroid tumors, uterine tumors, rhabdomyosarcoma, Kaposi sarcoma, synovial sarcoma, osteosarcoma and Ewing's sarcoma.

Pharmaceutical Compositions, Dosage and Administration

In another aspect, the present invention provides a pharmaceutical composition comprising a compound of the present invention, or a pharmaceutically acceptable salt thereof, and a pharmaceutically acceptable carrier.

In a further embodiment, the composition comprises at least two pharmaceutically acceptable carriers, such as those described herein. The pharmaceutical composition can be formulated for particular routes of administration such as oral administration, parenteral administration (e.g. by injection, infusion, transdermal or topical administration), and rectal administration. Topical administration may also pertain to inhalation or intranasal application. The pharmaceutical compositions of the present invention can be made up in a solid form (including, without limitation, capsules, tablets, pills, granules, powders or suppositories), or in a liquid form (including, without limitation, solutions, suspensions or emulsions). Tablets may be either film coated or enteric coated according to methods known in the art. Typically, the pharmaceutical compositions are tablets or gelatin capsules comprising the active ingredient together with one or more of:

a) diluents, e.g., lactose, dextrose, sucrose, mannitol, sorbitol, cellulose and/or glycine;

b) lubricants, e.g., silica, talcum, stearic acid, its magnesium or calcium salt and/or polyethyleneglycol; for tablets also c) binders, e.g., magnesium aluminum silicate, starch paste, gelatin, tragacanth, methylcellulose, sodium carboxymethylcellulose and/or polyvinylpyrrolidone; if desired d) disintegrants, e.g., starches, agar, alginic acid or its sodium salt, or effervescent mixtures and e) absorbents, colorants, flavors and sweeteners.

In another aspect, the compounds of the present invention are combined with other therapeutic agents, such as other anti-cancer agents, anti-allergic agents, anti-nausea agents (or anti-emetics), pain relievers, cytoprotective agents, immunomodulator and combinations thereof.

In one embodiment, the other therapeutic agent is an anti-cancer agent or chemotherapeutic agent. General chemotherapeutic agents considered for use in combination therapies include anastrozole (Arimidex®), bicalutamide (Casodex®), bleomycin sulfate (Blenoxane®), busulfan (Myleran®), busulfan injection (Busulfex®), capecitabine (Xeloda®), N4-pentoxycarbonyl-5-deoxy-5-fluorocytidine, carboplatin (Paraplatin®), carmustine (BiCNU®), chlorambucil (Leukeran®), cisplatin (Platinol®), cladribine (Leustatin®), cyclophosphamide (Cytoxan® or Neosar®), cytarabine, cytosine arabinoside (Cytosar-U®), cytarabine liposome injection (DepoCyt®), dacarbazine (DTIC-Dome®), dactinomycin (Actinomycin D, Cosmegan), daunorubicin hydrochloride (Cerubidine®), daunorubicin citrate liposome injection (DaunoXome®), dexamethasone, docetaxel (Taxotere®), doxorubicin hydrochloride (Adriamycin®, Rubex®), etoposide (Vepesid®), fludarabine phosphate (Fludara®), 5-fluorouracil (Adrucil®, Efudex®), flutamide (Eulexin®), tezacitibine, Gemcitabine (difluorodeoxycitidine), hydroxyurea (Hydrea®), Idarubicin (Idamycin®), ifosfamide (IFEX®), irinotecan (Camptosar®), L-asparaginase (ELSPAR®), leucovorin calcium, melphalan (Alkeran®), 6-mercaptopurine (Purinethol®), methotrexate (Folex®), mitoxantrone (Novantrone®), mylotarg, paclitaxel (Taxol®), nab-paclitaxel (Abraxane®), phoenix (Yttrium90/MX-DTPA), pentostatin, polifeprosan 20 with carmustine implant (Gliadel®), tamoxifen citrate (Nolvadex®), teniposide (Vumon®), 6-thioguanine, thiotepa, tirapazamine (Tirazone®), topotecan hydrochloride for injection (Hycamptin®), vinblastine (Velban®), vincristine (Oncovin®), and vinorelbine (Navelbine®).

Anti-cancer agents of particular interest for combinations with the compounds of the invention include:

Cyclin-Dependent Kinase (CDK) inhibitors: (Chen, S. et al., *Nat Cell Biol.*, 12(11):1108-14 (2010); Zeng, X. et al., *Cell Cycle*, 10(4):579-83 (2011)) Aloisine A; Alvocidib (also known as flavopiridol or HMR-1275, 2-(2-chlorophenyl)-5,7-dihydroxy-8-[(3S,4R)-3-hydroxy-1-methyl-4-piperidinyl]-4-chromenone, and described in U.S. Pat. No. 5,621,002); Crizotinib (PF-02341066, CAS 877399-52-5); 2-(2-Chlorophenyl)-5,7-dihydroxy-8-[(2R,3S)-2-(hydroxymethyl)-1-methyl-3-pyrrolidinyl]-4H-1-benzopyran-4-one, hydrochloride (P276-00, CAS 920113-03-7); 1-Methyl-5-[[2-[5-(trifluoromethyl)-1H-imidazol-2-yl]-4-pyridinyl]oxy]-N-[4-(trifluoromethyl)phenyl]-1H-benzimidazol-2-amine (RAF265, CAS 927880-90-8); Indisulam (E7070); Roscovitine (CYC202); 6-Acetyl-8-cyclopentyl-5-methyl-2-(5-piperazin-1-yl-pyridin-2-ylamino)-8H-pyrido[2,3-d]pyrimidin-7-one, hydrochloride (PD0332991); Dinaciclib (SCH727965); N-[5-[[(5-tert-Butyloxazole-2-yl)methyl]thio]thiazol-2-yl]piperidine-4-carboxamide (B 387032, CAS 345627-80-7); 4-[[9-Chloro-7-(2,6-difluorophenyl)-5H-pyrimido[5,4-d][2]benzazepin-2-yl]amino]-benzoic acid (MLN8054, CAS 869363-13-3); 5-[3-(4,6-Difluoro-1H-benzimidazol-2-yl)-1H-indazol-5-yl]-N-ethyl-4-methyl-3-pyridinemethanamine (AG-024322, CAS 837364-57-5); 4-(2,6-Dichlorobenzoylamino)-1H-pyrazole-3-carboxylic acid N-(piperidin-4-yl)amide (AT7519, CAS 844442-38-2); 4-[2-Methyl-1-(1-methylethyl)-1H-imidazol-5-yl]-N-[4-(methylsulfonyl)phenyl]-2-pyrimidinamine (AZD5438, CAS 602306-29-6); Palbociclib (PD-0332991); and (2R,3R)-3-[[2-[[3-[[S(R)]—S-cyclopropylsulfonimidoyl]-phenyl]amino]-5-(trifluoromethyl)-4-pyrimidinyl]oxy]-2-butanol (BAY 10000394).

Checkpoint Kinase (CHK) inhibitors: (Wu, Z. et al., *Cell Death Differ.*, 18(11):1771-9 (2011)) 7-Hydroxystaurosporine (UCN-01); 6-Bromo-3-(1-methyl-1H-pyrazol-4-yl)-5-(3R)-3-piperidinyl-pyrazolo[1,5-a]pyrimidin-7-amine (SCH900776, CAS 891494-63-6); 5-(3-Fluorophenyl)-3-ureidothiophene-2-carboxylic acid N—[(S)-piperidin-3-yl] amide (AZD7762, CAS 860352-01-8); 4-[((3S)-1-Azabicyclo[2.2.2]oct-3-yl)amino]-3-(1H-benzimidazol-2-yl)-6-chloroquinolin-2(1H)-one (CHIR 124, CAS 405168-58-3); 7-Aminodactinomycin (7-AAD), Isogranulatimide, debromohymenialdisine; N-[5-Bromo-4-methyl-2-[(2S)-2-morpholinylmethoxy]-phenyl]-N'-(5-methyl-2-pyrazinyl)urea (LY2603618, CAS 911222-45-2); Sulforaphane (CAS 4478-93-7, 4-Methylsulfinylbutyl isothiocyanate); 9,10,11,12-Tetrahydro-9,12-epoxy-1H-diindolo[1,2,3-fg:3',2',1'-kl]pyrrolo[3,4-i][1,6]benzodiazocine-1,3(2H)-dione (SB-218078, CAS 135897-06-2); and TAT-S216A (YGRKKRRQRRR-LYRSPAMPENL), and CBP501 ((d-Bpa)sws(d-Phe-F5)(d-Cha)rrrqrr); and (αR)-α-amino-N-[5,6-dihydro-2-(1-methyl-1H-pyrazol-4-yl)-6-oxo-1H-pyrrolo[4,3,2-ef][2,3]benzodiazepin-8-yl]-Cyclohexaneacetamide (PF-0477736).

Protein Kinase B (PKB) or AKT inhibitors: (Rojanasakul, Y., *Cell Cycle*, 12(2):202-3 (2013); Chen B. et al., *Cell Cycle*, 12(1):112-21 (2013)) 8-[4-(1-Aminocyclobutyl)phenyl]-9-phenyl-1,2,4-triazolo[3,4-f][1,6]naphthyridin-3(2H)-one (MK-2206, CAS 1032349-93-1); Perifosine (KRX0401); 4-Dodecyl-N-1,3,4-thiadiazol-2-yl-benzenesulfonamide (PHT-427, CAS 1191951-57-1); 4-[2-(4-Amino-1,2,5-oxadiazol-3-yl)-1-ethyl-7-[(3S)-3-piperidinylmethoxy]-1H-imidazo[4,5-c]pyridin-4-yl]-2-methyl-3-butyn-2-ol (GSK690693, CAS 937174-76-0); 8-(1-Hydroxyethyl)-2-methoxy-3-[(4-methoxyphenyl)methoxy]-6H-dibenzo[b,d]pyran-6-one (palomid 529, P529, or SG-00529); Tricirbine (6-Amino-4-methyl-8-(p-D-ribofuranosyl)-4H,8H-pyrrolo[4,3,2-de]pyrimido[4,5-c]pyridazine); (αS)-α-[[[5-(3-Methyl-1H-indazol-5-yl)-3-pyridinyl]oxy] methyl]-benzeneethanamine (A674563, CAS 552325-73-2); 4-[(4-Chlorophenyl)methyl]-1-(7H-pyrrolo[2,3-d]pyrimidin-4-yl)-4-piperidinamine (CCT128930, CAS 885499-61-6); 4-(4-Chlorophenyl)-4-[4-(1H pyrazol-4-yl)phenyl]-piperidine (AT7867, CAS 857531-00-1); and Archexin (RX-0201, CAS 663232-27-7).

C-RAF Inhibitors: (Chang, C. et al., *Cancer Cell*, 19(1): 86-100 (2011)) Sorafenib (Nexavar®); 3-(Dimethylamino)-N-[3-[(4-hydroxybenzoyl)amino]-4-methylphenyl]-benzamide (ZM336372, CAS 208260-29-1); and 3-(1-cyano-1-methylethyl)-N-[3-[(3,4-dihydro-3-methyl-4-oxo-6-quinazolinyl)amino]-4-methylphenyl]-benzamide (AZ628, CAS 1007871-84-2).

Phosphoinositide 3-kinase (P/3K) inhibitors: (Gonzalez, M. et al., *Cancer Res.*, 71(6): 2360-2370 (2011)) 4-[2-(1H-Indazol-4-yl)-6-[[4-(methylsulfonyl)piperazin-1-yl]methyl] thieno[3,2-d]pyrimidin-4-yl]morpholine (also known as GDC 0941 and described in PCT Publication Nos. WO 09/036082 and WO 09/055730); 2-Methyl-2-[4-[3-methyl-2-oxo-8-(quinolin-3-yl)-2,3-dihydroimidazo[4,5-c]quinolin-1-yl]phenyl]propionitrile (described in PCT Publication No. WO 06/122806 and also known as dactolisib); 4-(trifluoromethyl)-5-(2,6-dimorpholinopyrimidin-4-yl)pyridin-2-amine (described in PCT Publication No. WO2007/084786 and also known as buparlisib); Tozasertib (VX680 or MK-0457, CAS 639089-54-6); (5Z)-5-[[4-(4-Pyridinyl)-6-quinolinyl]methylene]-2,4-thiazolidinedione (GSK1059615, CAS 958852-01-2); (1E,4S,4aR,5R,6αS,9aR)-5-(Acetyloxy)-1-[(di-2-propenylamino)methylene]-4,4a,5,6,6a,8,9,9a-octahydro-11-hydroxy-4-(methoxymethyl)-4a,6a-dimethyl-cyclopenta[5,6]naphtho[1,2-c]pyran-2,7,10(1H)-trione (PX866, CAS 502632-66-8); 8-Phenyl-2-(morpholin-4-yl)-chromen-4-one (LY294002, CAS 154447-36-6); 2-Amino-8-ethyl-4-methyl-6-(1H-pyrazol-5-yl) pyrido[2,3-d]pyrimidin-7(8H)-one (SAR 245409 or XL 765); 1,3-Dihydro-8-(6-methoxy-3-pyridinyl)-3-methyl-1-[4-(1-piperazinyl)-3-(trifluoromethyl)phenyl]-2H-imidazo[4,5-c]quinolin-2-one, (2Z)-2-butenedioate (1:1) (BGT 226); 5-Fluoro-3-phenyl-2-[(1S)-1-(9H-purin-6-ylamino) ethyl]-4(3H)-quinazolinone (CAL101); 2-Amino-N-[3-[N-[3-[(2-chloro-5-methoxyphenyl)amino]quinoxalin-2-yl]sulfamoyl]phenyl]-2-methylpropanamide (SAR 245408 or XL 147); and (S)-Pyrrolidine-1,2-dicarboxylic acid 2-amide 1-({4-methyl-5-[2-(2,2,2-trifluoro-1,1-dimethyl-ethyl)-pyridin-4-yl]-thiazol-2-yl}-amide) (BYL719).

BCL-2 inhibitors: (Béguelin, W. et al., *Cancer Cell*, 23(5):677-92(2013)) 4-[4-[[2-(4-Chlorophenyl)-5,5-dimethyl-1-cyclohexen-1-yl]methyl]-1-piperazinyl]-N-[[4-[[(1R)-3-(4-morpholinyl)-1-[(phenylthio)methyl]propyl] amino]-3-[(trifluoromethyl)sulfonyl]phenyl]sulfonyl] benzamide (also known as ABT-263 and described in PCT Publication No. WO 09/155386); Tetrocarcin A; Antimycin; Gossypol ((−)BL-193); Obatoclax; Ethyl-2-amino-6-cyclopentyl-4-(1-cyano-2-ethoxy-2-oxoethyl)-4Hchromone-3-carboxylate (HA14-1); Oblimersen (G3139, Genasense®); Bak BH3 peptide; (−)-Gossypol acetic acid (AT-101); 4-[4-[(4'-Chloro[1,1'-biphenyl]-2-yl)methyl]-1-piperazinyl]-N-[[4-[[(1R)-3-(dimethylamino)-1-[(phenylthio)methyl]propyl]amino]-3-nitrophenyl]sulfonyl]-benzamide (ABT-737, CAS 852808-04-9); and Navitoclax (ABT-263, CAS 923564-51-6).

Mitogen-activated protein kinase (MEK) inhibitors: (Chang, C. J. et al., *Cancer Cell*, 19(1):86-100 (2011)) XL-518 (also known as GDC-0973, Cas No. 1029872-29-4, available from ACC Corp.); Selumetinib (5-[(4-bromo-2-chlorophenyl)amino]-4-fluoro-N-(2-hydroxyethoxy)-1-methyl-1H-benzimidazole-6-carboxamide, also known as AZD6244 or ARRY 142886, described in PCT Publication No. WO2003077914); Benimetinib (6-(4-bromo-2-fluorophenylamino)-7-fluoro-3-methyl-3H-benzoimidazole-5-carboxylic acid (2-hydroxyethyoxy)-amide, also known as MEK162, CAS 1073666-70-2, described in PCT Publication No. WO2003077914); 2-[(2-Chloro-4-iodophenyl)

amino]-N-(cyclopropylmethoxy)-3,4-difluoro-benzamide (also known as CI-1040 or PD184352 and described in PCT Publication No. WO2000035436); N-[(2R)-2,3-Dihydroxypropoxy]-3,4-difluoro-2-[(2-fluoro-4-iodophenyl)amino]-benzamide (also known as PD0325901 and described in PCT Publication No. WO2002006213); 2,3-Bis[amino[(2-aminophenyl)thio]methylene]-butanedinitrile (also known as U0126 and described in U.S. Pat. No. 2,779,780); N-[3,4-Difluoro-2-[(2-fluoro-4-iodophenyl)amino]-6-methoxyphenyl]-1-[(2R)-2,3-dihydroxypropyl]-cyclopropanesulfonamide (also known as RDEA119 or BAY869766 and described in PCT Publication No. WO2007014011); (3S,4R,5Z,8S,9S,11E)-[4-(Ethylamino)-8,9,16-trihydroxy-3,4-dimethyl-3,4,9,19-tetrahydro-1H-2-benzoxacyclotetradecine-1,7(8H)-dione] (also known as E6201 and described in PCT Publication No. WO2003076424); 2'-Amino-3'-methoxyflavone (also known as PD98059 available from Biaffin GmbH & Co., KG, Germany); Vemurafenib (PLX-4032, CAS 918504-65-1); (R)-3-(2,3-Dihydroxypropyl)-6-fluoro-5-(2-fluoro-4-iodophenylamino)-8-methylpyrido[2,3-d]pyrimidine-4,7(3H,8H)-dione (TAK-733, CAS 1035555-63-5); Pimasertib (AS-703026, CAS 1204531-26-9); Trametinib dimethyl sulfoxide (GSK-1120212, CAS 1204531-25-80); 2-(2-Fluoro-4-iodophenylamino)-N-(2-hydroxyethoxy)-1,5-dimethyl-6-oxo-1,6-dihydropyridine-3-carboxamide (AZD 8330); and 3,4-Difluoro-2-[(2-fluoro-4-iodophenyl)amino]-N-(2-hydroxyethoxy)-5-[(3-oxo-[1,2] oxazinan-2-yl) methyl]benzamide (CH 4987655 or Ro 4987655).

Aromatase inhibitors: (Pathiraja, T. et al., *Sci. Transl. Med.*, 6(229):229 ra41 (2014)) Exemestane (Aromasin®); Letrozole (Femara®); and Anastrozole (Arimidex®).

Topoisomerase II inhibitors: (Bai, J. et al., *Cell Prolif.*, 47(3):211-8 (2014)) Etoposide (VP-16 and Etoposide phosphate, Toposar®, VePesid® and Etopophos®); Teniposide (VM-26, Vumon®); and Tafluposide.

SRC inhibitors: (Hebbard, L., *Oncogene*, 30(3):301-12 (2011)) Dasatinib (Sprycel®); Saracatinib (AZD0530, CAS 379231-04-6); Bosutinib (SKI-606, CAS 380843-75-4); 5-[4-[2-(4-Morpholinyl)ethoxy]phenyl]-N-(phenylmethyl)-2-pyridineacetamide (KX2-391, CAS 897016-82-9); and 4-(2-Chloro-5-methoxyanilino)-6-methoxy-7-(1-methylpiperidin-4-ylmethoxy)quinazoline (AZM475271, CAS 476159-98-5).

Histone deacetylase (HDAC) inhibitors: (Yamaguchi, J. et al., *Cancer Sci.*, 101(2):355-62 (2010)) Voninostat (Zolinza®); Romidepsin (Istodax®); Treichostatin A (TSA); Oxamflatin; Vorinostat (Zolinza®, Suberoylanilide hydroxamic acid); Pyroxamide (syberoyl-3-aminopyridine-amide hydroxamic acid); Trapoxin A (RF-1023A); Trapoxin B (RF-10238); Cyclo[(αS,2S)-α-amino-η-oxo-2-oxiraneoctanoyl-O-methyl-D-tyrosyl-L-isoleucyl-L-prolyl] (Cyl-1); Cyclo[(αS,2S)-α-amino-η-oxo-2-oxiraneoctanoyl-O-methyl-D-tyrosyl-L-isoleucyl-(2 S)-2-piperidinecarbonyl] (Cyl-2); Cyclic[L-alanyl-D-alanyl-(2S)-η-oxo-L-α-aminooxiraneoctanoyl-D-prolyl] (HC-toxin); Cyclo[(αS,2S)-α-amino-η-oxo-2-oxiraneoctanoyl-D-phenylalanyl-L-leucyl-(2S)-2-piperidinecarbonyl] (WF-3161); Chlamydocin ((S)-Cyclic(2-methylalanyl-L-phenylalanyl-D-prolyl-η-oxo-L-α-aminooxiraneoctanoyl); Apicidin (Cyclo(8-oxo-L-2-aminodecanoyl-1-methoxy-L-tryptophyl-L-isoleucyl-D-2-piperidinecarbonyl); Romidepsin (Istodax®, FR-901228); 4-Phenylbutyrate; Spiruchostatin A; Mylproin (Valproic acid); Entinostat (-275, N-(2-Aminophenyl)-4-[N-(pyridine-3-yl-methoxycarbonyl)-amino-methyl]-benzamide); and Depudecin (4,5:8,9-dianhydro-1,2,6,7,11-pentadeoxy-D-threo-D-ido-Undeca-1,6-dienitol).

Anti-tumor antibiotics: (Bai, J. et al., *Cell Prolif.*, 47(3): 211-8 (2014)) Doxorubicin (Adriamycin® and Rubex®); Bleomycin (lenoxane®); Daunorubicin (dauorubicin hydrochloride, daunomycin, and rubidomycin hydrochloride, Cerubidine®); Daunorubicin liposomal (daunorubicin citrate liposome, DaunoXome®); Mitoxantrone (DHAD, Novantrone®); Epirubicin (Ellence™); Idarubicin (Idamycin®, Idamycin PFS®); Mitomycin C (Mutamycin®); Geldanamycin; Herbimycin; Ravidomycin; and Desacetylravidomycin.

Demethylating agents: (Musch, T. et al., *PLoS One*, (5):e10726 (2010)) 5-Azacitidine (Vidaza®); and Decitabine (Dacogen®).

Anti-estrogens: (Bhan, A. et al., *J Mol Biol.*, S0022-2836 (14)00373-8 (2014)) Tamoxifen (Novaldex®); Toremifene (Fareston®); and Fulvestrant (Faslodex®).

Immunomodulators of particular interest for combinations with the compounds of the invention include one or more of: an activator of a costimulatory molecule or an inhibitor of an immune checkpoint molecule (e.g., one or more inhibitors of PD-1, PD-L1, LAG-3, TIM-3 or CTLA4) or any combination thereof.

In certain embodiments, the immunomodulator is an activator of a costimulatory molecule. In one embodiment, the agonist of the costimulatory molecule is chosen from an agonist (e.g., an agonistic antibody or antigen-binding fragment thereof, or a soluble fusion) of OX40, CD2, CD27, CDS, ICAM-1, LFA-1 (CD11a/CD18), ICOS (CD278), 4-1BB (CD137), GITR, CD30, CD40, BAFFR, HVEM, CD7, LIGHT, NKG2C, SLAMF7, NKp80, CD160, B7-H3 or CD83 ligand.

In certain embodiments, the immunomodulator is an inhibitor of an immune checkpoint molecule. In one embodiment, the immunomodulator is an inhibitor of PD-1, PD-L1, PD-L2, CTLA4, TIM3, LAG3, VISTA, BTLA, TIGIT, LAIR1, CD160, 2B4 and/or TGFR beta. In one embodiment, the inhibitor of an immune checkpoint molecule inhibits PD-1, PD-L1, LAG-3, TIM-3 or CTLA4, or any combination thereof. The term "inhibition" or "inhibitor" includes a reduction in a certain parameter, e.g., an activity, of a given molecule, e.g., an immune checkpoint inhibitor. For example, inhibition of an activity, e.g., a PD-1 or PD-L1 activity, of at least 5%, 10%, 20%, 30%, 40% or more is included by this term. Thus, inhibition need not be 100%.

In another aspect, the present invention provides pharmaceutical compositions comprising at least one compound of the present invention (e.g., a compound of Formula (I) or a sub-formulae thereof) or a pharmaceutically acceptable salt thereof, together with a pharmaceutically acceptable carrier suitable for administration to a human or animal subject, either alone or together with other anti-cancer agents.

In combination therapies, compositions will either be formulated together as a combination therapeutic, or as separate compositions. The compound of the invention and the other therapeutic agent may be manufactured and/or formulated by the same or different manufacturers. The structure of therapeutic agents identified by code numbers, generic or trade names may be taken from the actual edition of the standard compendium "The Merck Index" or from databases, e.g. Patents International (e.g. IMS World Publications). The other therapeutic agents, which can be used in combination with a compound of the present invention, can be prepared and administered as described in the art, such as in the documents cited above.

Optionally, the pharmaceutical composition may comprise a pharmaceutically acceptable carrier, as described above. The pharmaceutical composition or combination of the present invention may, for example, be in unit dosage of about 0.5 mg to 1000 mg of active ingredient(s) for a subject of about 50-70 kg.

In another aspect, the present invention provides methods of treating human or animal subjects suffering from a cellular proliferative disease, such as cancer, comprising administering to the subject a therapeutically effective amount of a compound of the present invention or a pharmaceutically acceptable salt thereof, either alone or in combination with other anti-cancer agents. In combination therapy, the compound of the present invention and other anti-cancer agent(s) may be administered either simultaneously, concurrently or sequentially with no specific time limits, wherein such administration provides therapeutically effective levels of the two compounds in the body of the patient. Moreover, the compound of the invention and the other therapeutic may be brought together into a combination therapy: (i) prior to release of the combination product to physicians (e.g. in the case of a kit comprising the compound of the invention and the other therapeutic agent); (ii) by the physician themselves (or under the guidance of the physician) shortly before administration; (iii) in the patient themselves, e.g. during sequential administration of the compound of the invention and the other therapeutic agent.

In one embodiment, the compound of the present invention and the other anti-cancer agent(s) is generally administered sequentially in any order by infusion or orally. The dosing regimen may vary depending upon the stage of the disease, physical fitness of the patient, safety profiles of the individual drugs, and tolerance of the individual drugs, as well as other criteria well-known to the attending physician and medical practitioner(s) administering the combination. The compound of the present invention and other anti-cancer agent(s) may be administered within minutes of each other, hours, days, or even weeks apart depending upon the particular cycle being used for treatment. In addition, the cycle could include administration of one drug more often than the other during the treatment cycle and at different doses per administration of the drug.

In yet another aspect, compounds of the present invention may be combined with other anti-cancer agents, anti-allergic agents, anti-nausea agents (or anti-emetics), pain relievers, cytoprotective agents, and combinations thereof.

In some instances, patients may experience allergic reactions to the compounds of the present invention and/or other anti-cancer agent(s) during or after administration. Therefore, anti-allergic agents may be administered to minimize the risk—of an allergic reaction. Suitable anti-allergic agents include corticosteroids, such as dexamethasone (e.g., DECADRON®), beclomethasone (e.g., BECLOVENT®), hydrocortisone (also known as cortisone, hydrocortisone sodium succinate, hydrocortisone sodium phosphate; e.g., ALA-CORT®, hydrocortisone phosphate, Solu-CORTEF®, HYDROCORT Acetate® and LANACORT®), prednisolone (e.g., DELTA-Cortel®, ORAPRED®, PEDIAPRED® and PRELONE®), prednisone (e.g., DELTASONE®, LIQUID RED®, METICORTEN® and ORASONE®), methylprednisolone (also known as 6-methylprednisolone, methylprednisolone acetate, methylprednisolone sodium succinate; e.g., DURALONE®, MEDRALONE®, MEDROL®, M-PREDNISOL® and SOLU-MEDROL®); antihistamines, such as diphenhydramine (e.g., BENADRYL®), hydroxyzine, and cyproheptadine; and bronchodilators, such as the beta-adrenergic receptor agonists, albuterol (e.g., PROVENTIL®), and terbutaline (BRETHINE®).

In other instances, patients may experience nausea during and after administration of the compound of the present invention and/or other anti-cancer agent(s). Therefore, anti-emetics may be administered in preventing nausea (upper stomach) and vomiting. Suitable anti-emetics include aprepitant (EMEND®), ondansetron (ZOFRAN®), granisetron HCl (KYTRIL®), lorazepam (ATIVAN®), dexamethasone (DECADRON®), prochlorperazine (COMPAZINE®), casopitant (REZONIC® and Zunrisa®), and combinations thereof.

In yet other instances, medication to alleviate the pain experienced during the treatment period is prescribed to make the patient more comfortable. Common over-the-counter analgesics, such TYLENOL®, are often used. Opioid analgesic drugs such as hydrocodone/paracetamol or hydrocodone/acetaminophen (e.g., VICODIN®), morphine (e.g., ASTRAMORPH® or AVINZA®), oxycodone (e.g., OXYCONTIN® or PERCOCET®), oxymorphone hydrochloride (OPANA®), and fentanyl (e.g., DURAGESIC®) are also useful for moderate or severe pain.

Furthermore, cytoprotective agents (such as neuroprotectants, free-radical scavengers, cardioprotectors, anthracycline extravasation neutralizers, nutrients and the like) may be used as an adjunct therapy to protect normal cells from treatment toxicity and to limit organ toxicities. Suitable cytoprotective agents include amifostine (ETHYOL®), glutamine, dimesna (TAVOCEPT®), mesna (MESNEX®), dexrazoxane (ZINECARD® or TOTECT®), xaliproden (XAPRILA®), and leucovorin (also known as calcium leucovorin, citrovorum factor and folinic acid).

In yet another aspect, a compound of the present invention may be used in combination with known therapeutic processes, for example, with the administration of hormones or in radiation therapy. In certain instances, a compound of the present invention may be used as a radiosensitizer, especially for the treatment of tumors which exhibit poor sensitivity to radiotherapy.

In yet another aspect, the present invention provides kits comprising one or more compounds of the present invention and another therapeutic agent as described above. Representative kits include (a) compound of Formula (I) or sub-formulae thereof or a pharmaceutically acceptable salt thereof; and (b) at least one other therapeutic agent e.g., as indicated above; whereby such kit may further comprise a package insert or other labeling including directions for administration. The kits of the invention may be used for administering different dosage forms, for example, oral and parenteral; for administering two or more separate pharmaceutical compositions at different dosage intervals; or for titrating the separate compositions against one another; wherein at least one pharmaceutical composition comprises a compound a Formula (I) or sub-formulae thereof.

Processes for Making Compounds of the Invention

The compounds of the invention can be prepared using the methods described below, or by variations thereon as appreciated by one skilled in the art of organic synthesis. Compounds of Formula (I) that possess a chiral center can be made substantially optically pure by using substantially optically pure starting material or by separation chromatography, recrystallization or other separation techniques well-known in the art.

Schemes 1-8 describe potential routes for producing the compounds of the invention, which include compounds of Formula (I-3):

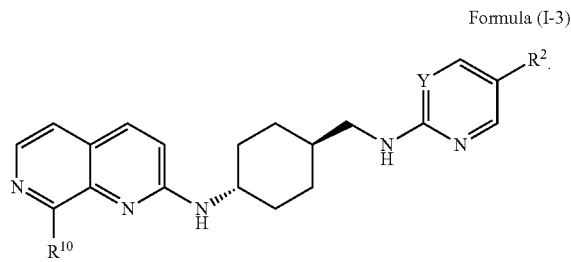

Formula (I-3)

Compounds of Formula (I) that possess a chiral center can be made substantially optically pure by either using substantially optically pure starting material or by separation chromatography, recrystallization or other separation techniques well-known in the art. For a more detailed description, see the Example section below.

Scheme 1

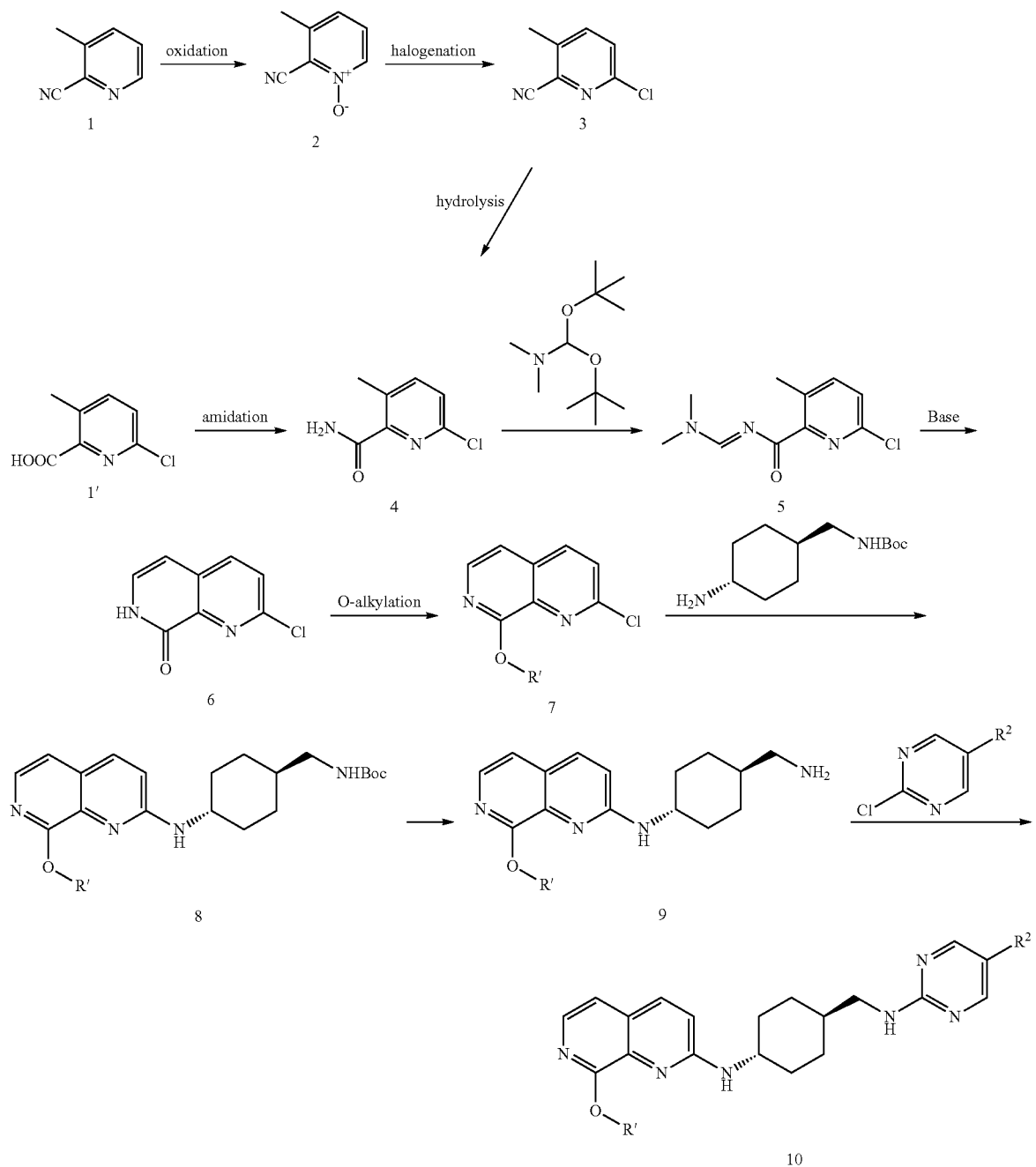

As depicted in Scheme 1, 2-cyano-3-methylpyridine 1 was oxidized with m-CPBA to the corresponding pyridine-N-oxide 2, which was treated with POCl₃ to give the chloro-pyridine 3. Subsequent hydrolysis furnished the picolinamide 4, which could also be prepared via direct amidation of the picolinic acid 1'. Compound 5 was afforded upon treatment of 4 with 1,1-di-tert-butoxy-N,N-dimethyl-methanamine, and was then treated with t-BuOK to give cyclized compound 6. Subsequent O-alkylation with appropriate reagents generated 7, which was reacted with tert-butyl (((1,4-trans)-4-aminocyclohexyl)methyl)carbamate to give the Boc-protected amines 8. Displacement reactions of the de-protected amines (9) with appropriately substituted 2-chloropyrimidines furnished compounds 10.

Scheme 2

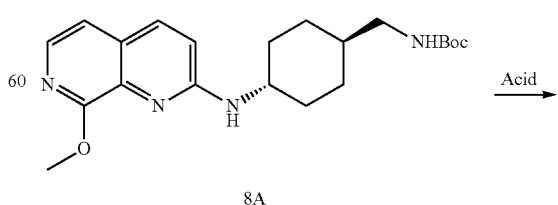

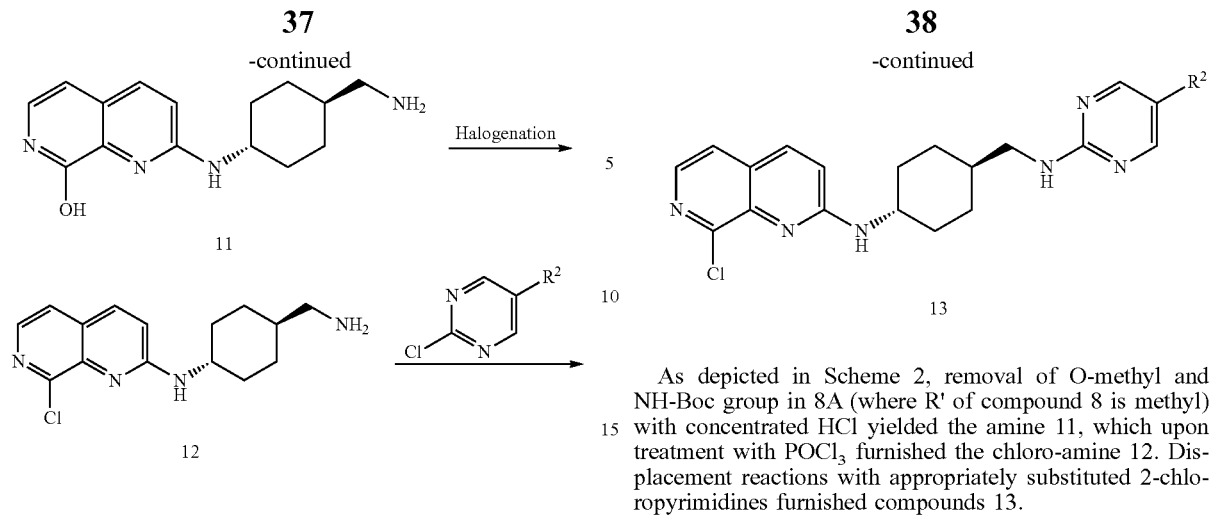
As depicted in Scheme 2, removal of O-methyl and NH-Boc group in 8A (where R' of compound 8 is methyl) with concentrated HCl yielded the amine 11, which upon treatment with POCl₃ furnished the chloro-amine 12. Displacement reactions with appropriately substituted 2-chloropyrimidines furnished compounds 13.
Scheme 3
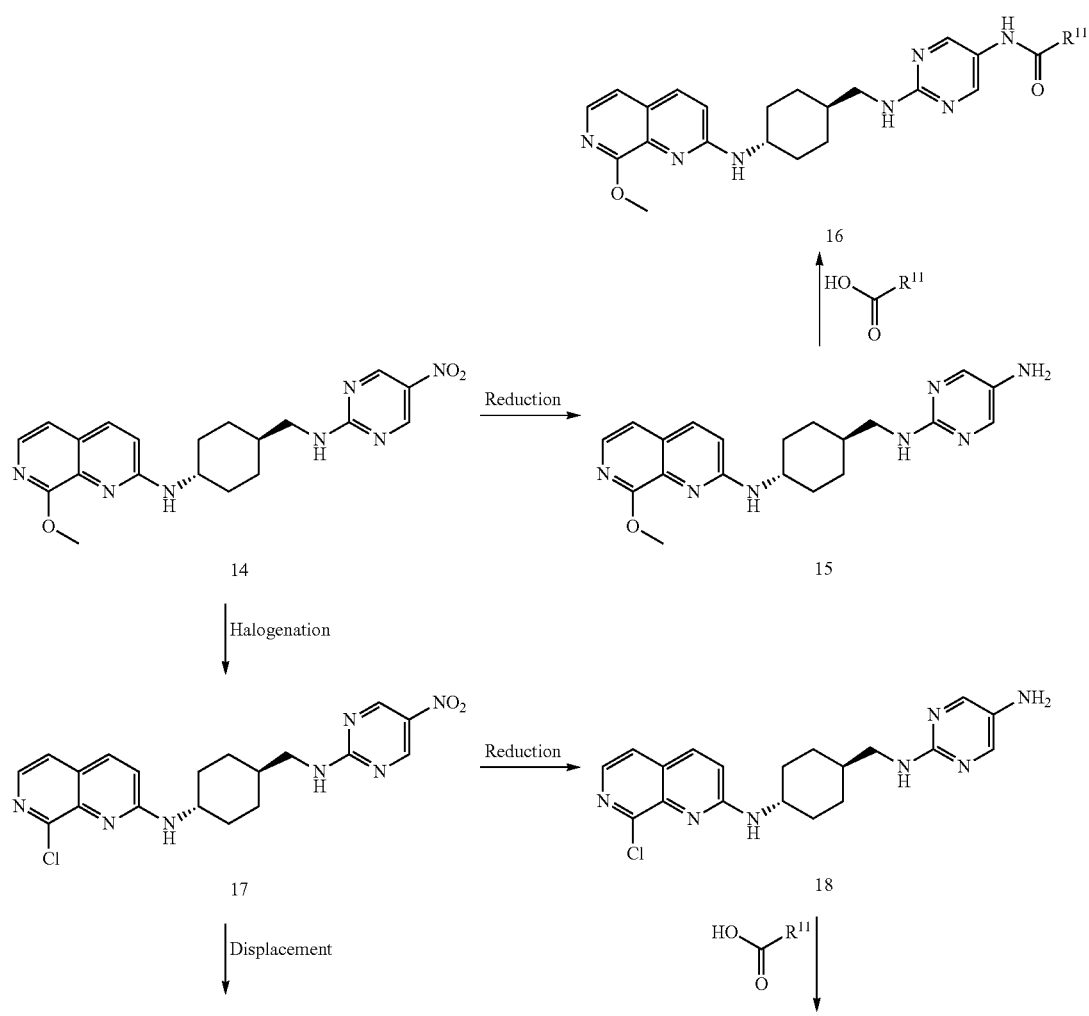

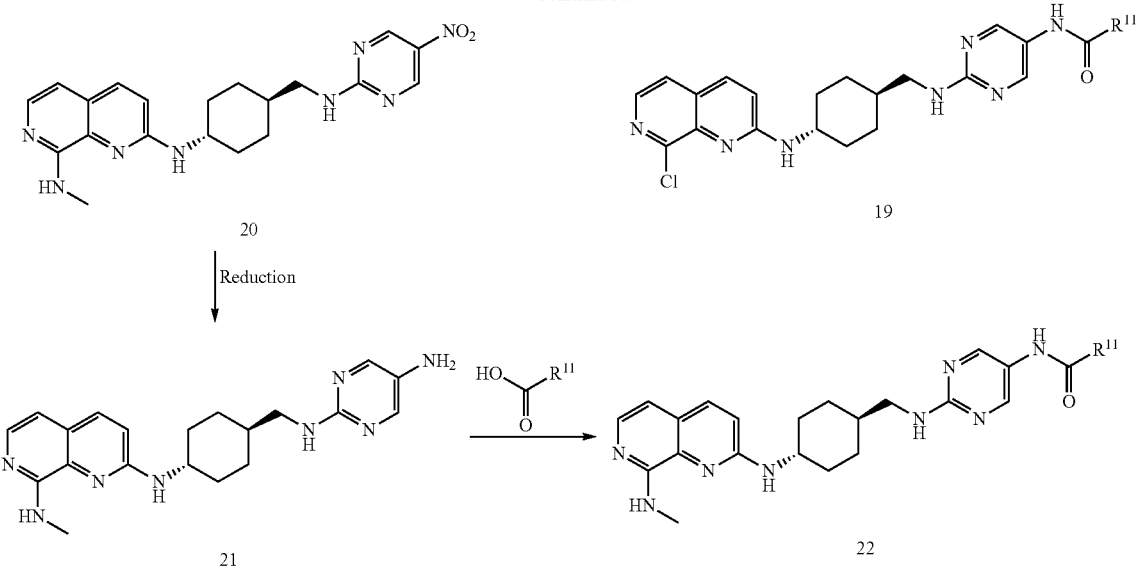

As depicted in Scheme 3, the nitro intermediate 14 (prepared as in scheme 1, where R' is methyl and $R^2$ is $NO_2$) was reacted with $POCl_3$ to give the chloro-azaquinoline 17, which upon treatment with $NH_2CH_3$ furnished displacement product 20. Subsequent reduction of the nitro group in intermediates 14, 17 and 20 with hydrogen on palladium/charcoal or $NaBH_4$ with $NiCl_2$ hydrate furnished the corresponding amines 15, 18 and 21, which were reacted with appropriate reagents to afford corresponding products 16, 19 and 22.

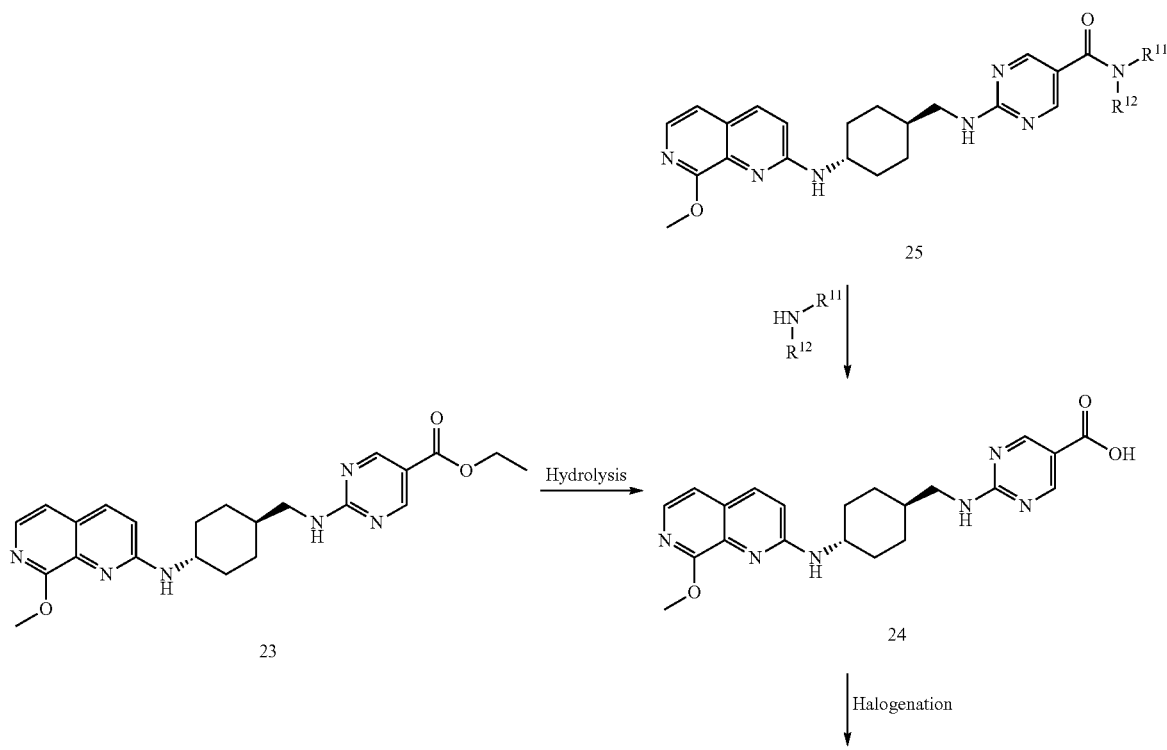

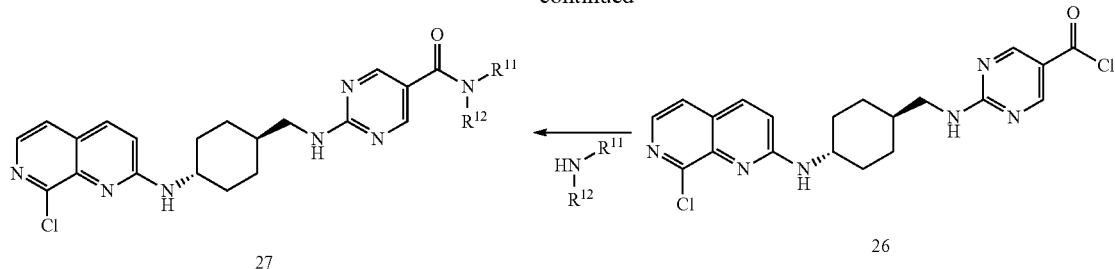

As depicted in Scheme 4, the ethyl ester 23 (prepared as in scheme 1, where R' is methyl and R² is —C(=O)OEt) was hydrolyzed with KOH to give the acid 24, which was treated with appropriate amines or POCl₃ to give compounds 25 and acyl chloride 26 respectively. Subsequent reaction of the acyl chloride 26 with the appropriate amines furnished compounds 27.

Scheme 5

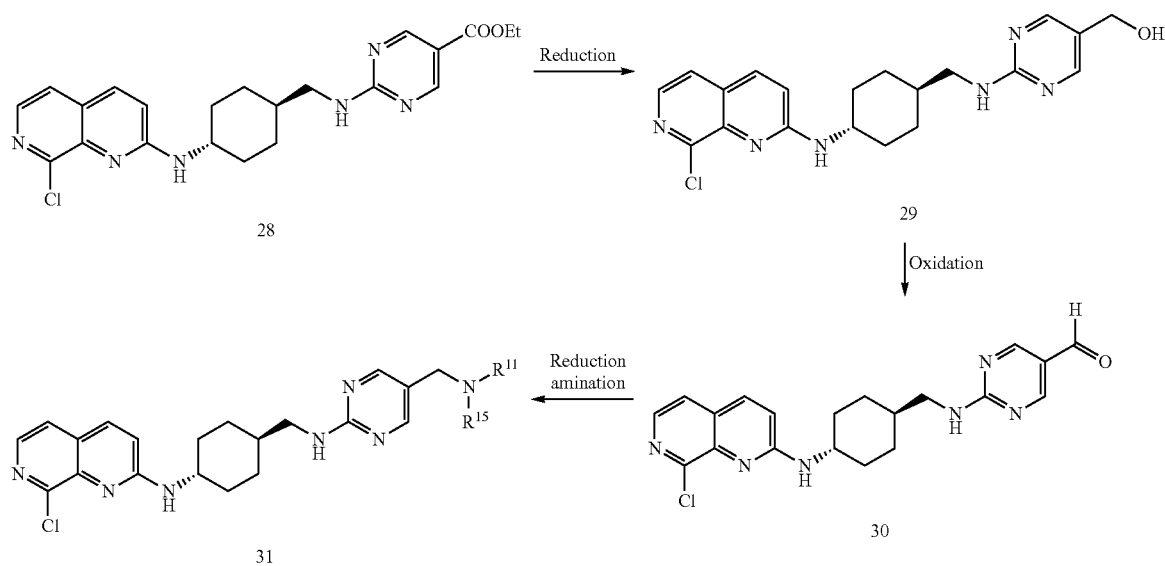

As depicted in Scheme 5, the ethyl ester 28 (prepared as in scheme 2, where R² is —C(=O)OEt) was reduced with DIBAL-H to give the alcohol 29, which was oxidized to the aldehyde 30 with MnO₂. Subsequent reductive amination with the appropriate amines furnished compounds 31.

Scheme 6

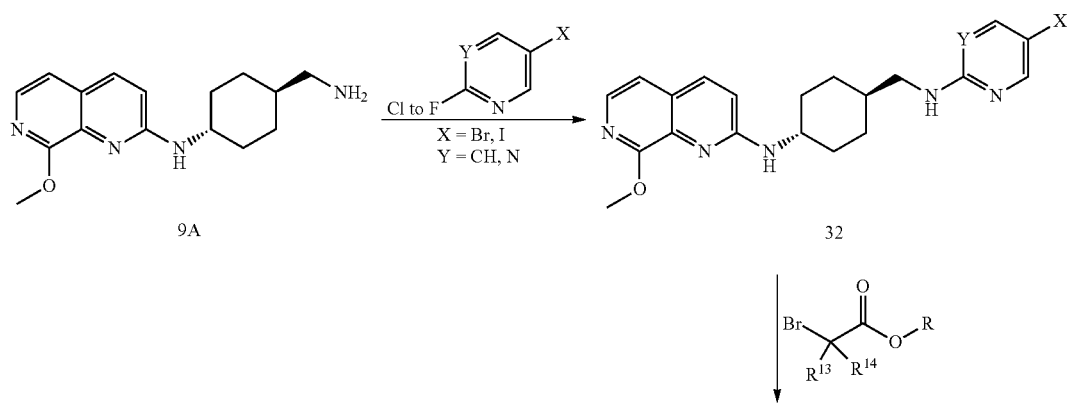

-continued

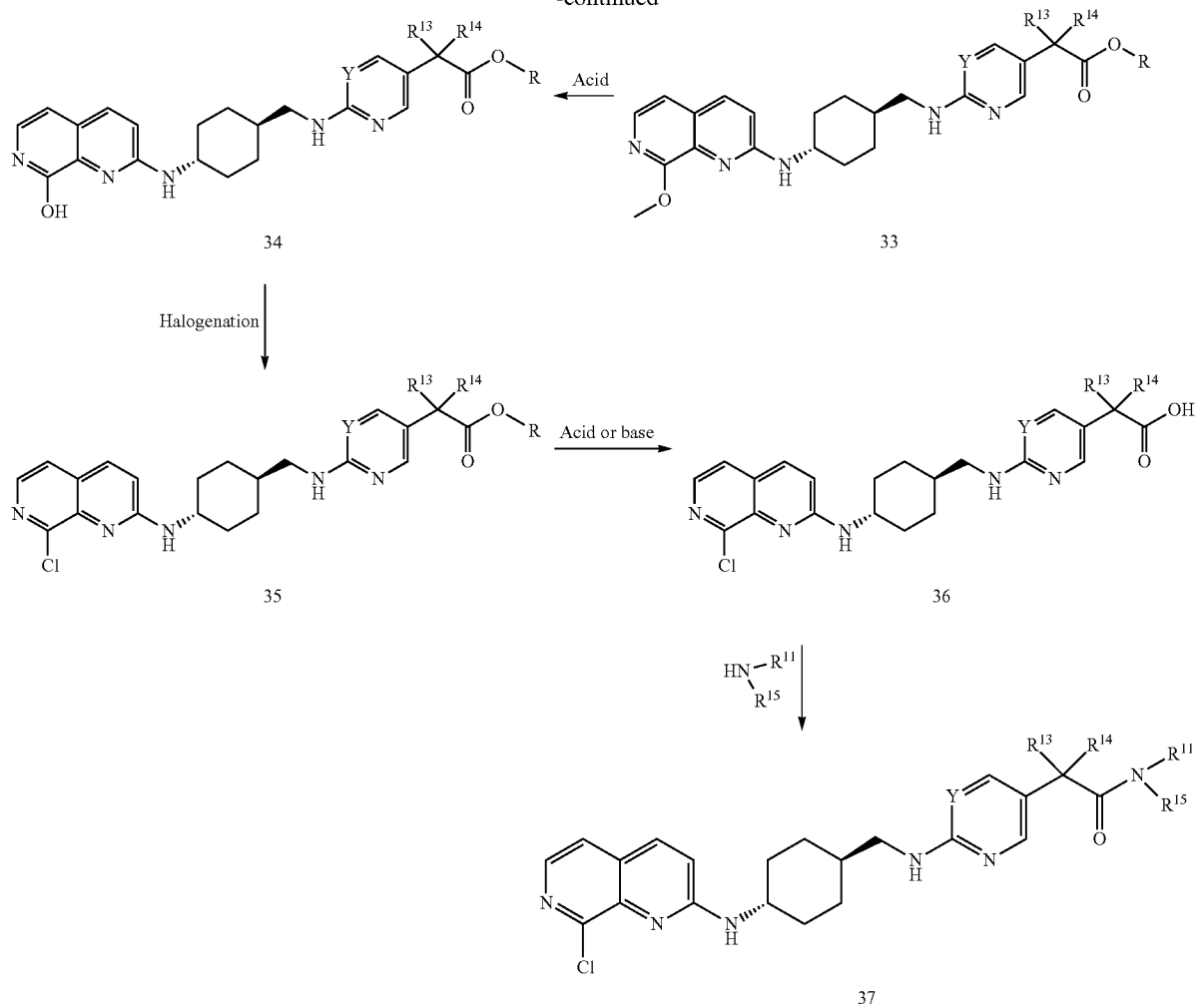

As depicted in Scheme 6, the amine 9A (prepared from scheme 1, where R' is methyl) was reacted with the appropriate pyridine or pyrimidine fluoride/chloride to give the corresponding bromo or iodo intermediates 32. Subsequent coupling with the appropriate bromides furnished the ester 33, which was demethylated with concentrated HCl to give the hydroxyl azaquinolines 34. Following treatment of 34 with POCl₃, the resultant chloro azaquinolines 35 were converted to the acids 36 under acidic or basic conditions. Amide coupling with the appropriate amines furnished compounds 37.

Scheme 7

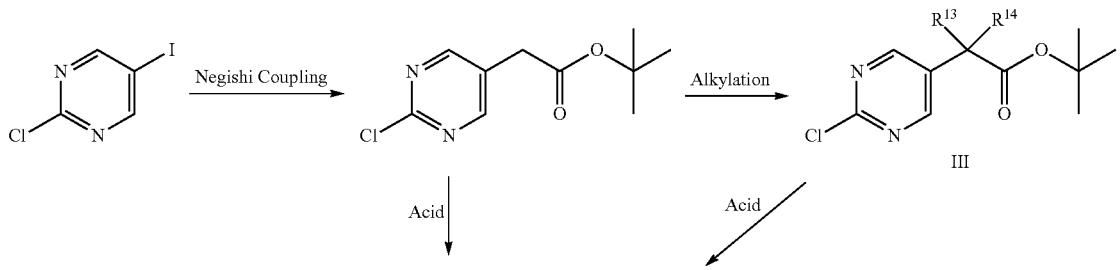

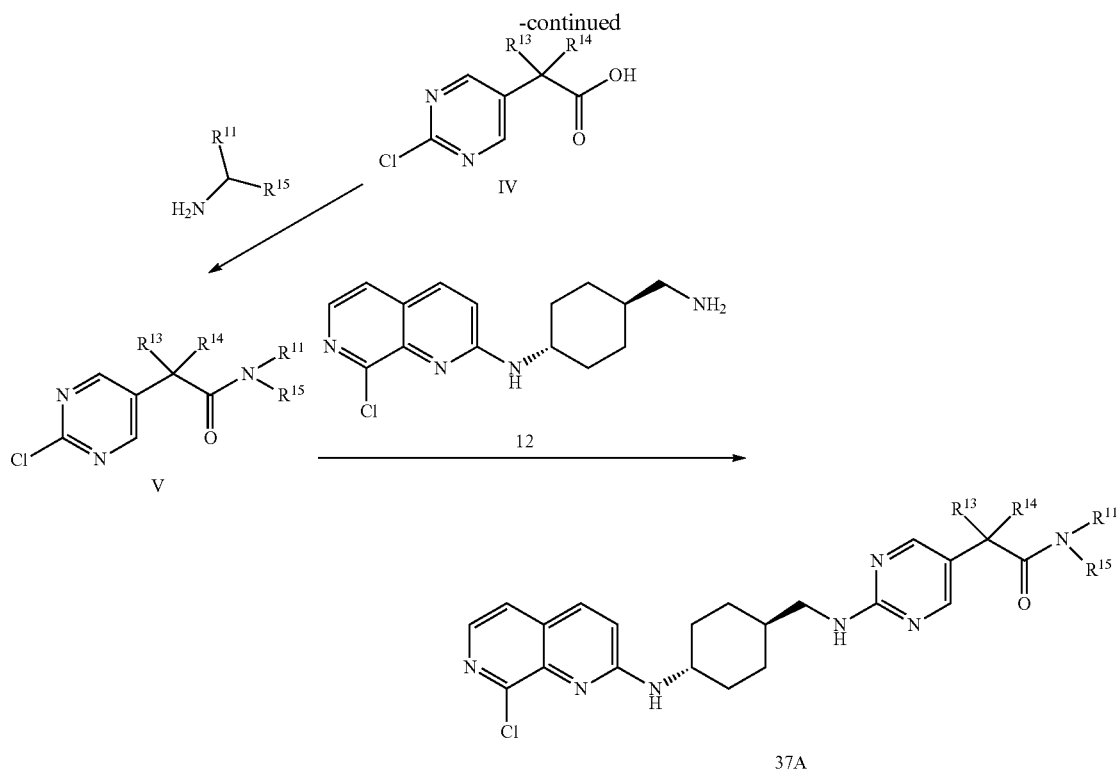

As depicted in Scheme 7 Negishi coupling of 2-chloro-5-iodopyrimidine with the corresponding bromoacetate furnished tert-butyl 2-(2-chloropyrimidin-5-yl)acetate. Subsequent alkylation of tert-butyl 2-(2-chloropyrimidin-5-yl) acetate yielded III. Treatment of acid with the ester II (or III) revealed the acid IV. The preparation of compounds 37A was completed by amide coupling with the acid IV to give V, followed by chloro displacement reaction with the amine 12.

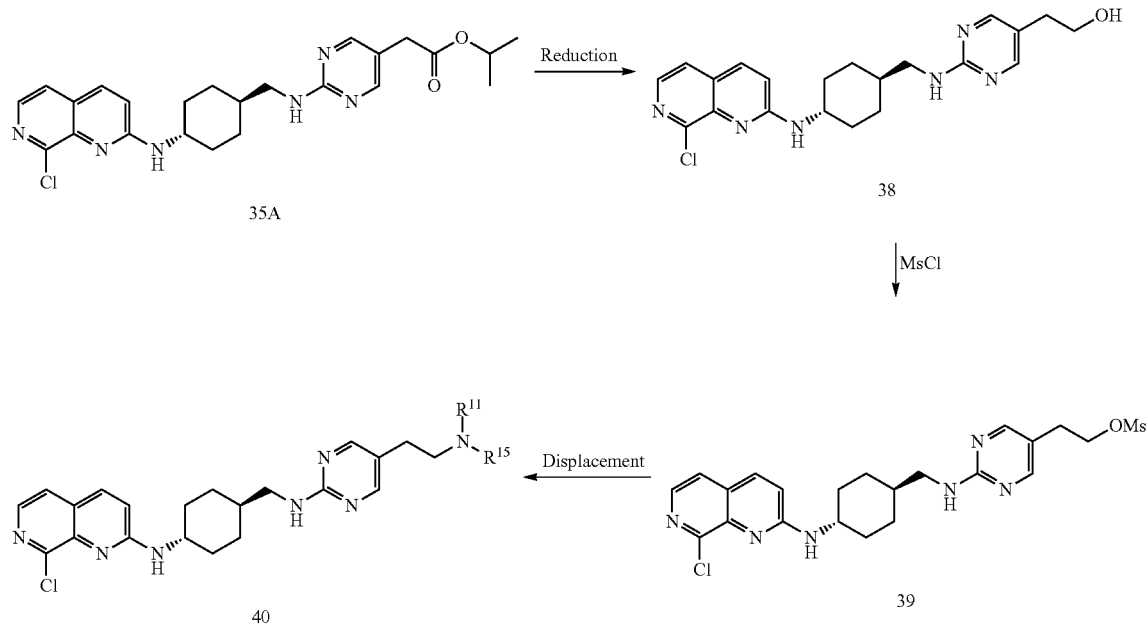

As depicted in Scheme 7, the ester 35A (prepared from scheme 6, where R is isopropyl and $R^{13}$ and $R^{14}$ are each H) was reduced with DIBAL-H to give the corresponding alcohol 38. Subsequent mesylation and displacement reaction with the appropriate amines furnished compounds 40.

EXAMPLES

Temperatures are given in degrees Celsius. The structure of final products, intermediates and starting materials is confirmed by standard analytical methods, e.g., microanalysis and spectroscopic characteristics, e.g., MS, IR, NMR. Abbreviations used are those conventional in the art.

All starting materials, building blocks, reagents, acids, bases, dehydrating agents, solvents, and catalysts utilized to synthesis the compounds of the present invention are either commercially available or can be produced by organic synthesis methods known to one of ordinary skill in the art (Houben-Weyl 4th Ed. 1952, Methods of Organic Synthesis, Thieme, Volume 21). Unless otherwise specified, starting materials are generally available from commercial sources.

Purification of intermediates and final products was carried out via either normal or reverse phase chromatography. Normal phase chromatography was carried out using prepacked $SiO_2$ cartridges eluting with either gradients of hexanes and ethyl acetate or DCM and MeOH unless otherwise indicated. Reverse phase preparative HPLC was carried out using C18 columns with UV 214 nm and 254 nm detection or prep LC-eluting with gradients of Solvent A (water with 0.1% TFA) and Solvent B (acetonitrile with 0.1% TFA), or with gradients of Solvent A (water with 0.05% TFA) and Solvent B (acetonitrile with 0.05% TFA), or with gradients of Solvent A (water with 0.05% ammonia) and Solvent B (acetonitrile with 0.05% ammonia).

Nuclear magnetic resonance (NMR) spectra were obtained with Bruker Fourier transform spectrometers operating at frequencies as follows: $^1H$ NMR: 400 MHz (Bruker). $^{13}C$ NMR: 100 MHz (Bruker). Spectra data are reported in the format: chemical shift (multiplicity, number of hydrogens). Chemical shifts are specified in ppm downfield of a tetramethylsilane internal standard (δ units, tetramethylsilane=0 ppm) and/or referenced to solvent peaks, which in $^1H$ NMR spectra appear at 2.49 ppm for $CD_3SOCD_3$, 3.30 ppm for $CD_3OD$, 1.94 for $CD_3CN$, and 7.24 ppm for $CDCl_3$.

The Examples herein merely illuminate the invention and does not limit the scope of the invention otherwise claimed. Further, the compounds of the present invention can be produced by organic synthesis methods known to one of ordinary skill in the art as shown in the following examples. Where desired, conventional protecting groups are used to protect reactive functional groups in accordance with standard practice, for example, see T. W. Greene and P. G. M. Wuts in "Protecting Groups in Organic Synthesis", John Wiley and Sons, 1991.

The compound names provided herein were obtained using ChemDraw Ultra version 14.0 (CambridgeSoft®).

Abbreviations

Abbreviations as used herein, are defined as follows: "1×" for once, "2×" for twice, "3×" for thrice, "° C." for degrees Celsius, "aq" for aqueous, "FCC" for flash column chromatography, "eq" for equivalent or equivalents, "g" for gram or grams, "mg" for milligram or milligrams, "L" for liter or liters, "mL" for milliliter or milliliters, "µL" for microliter or microliters, "N" for normal, "M" for molar, "nM" for nanomolar, "mol" for mole or moles, "mmol" for millimole or millimoles, "min" for minute or minutes, "h" or "hrs" for hour or hours, "RT" for room temperature, "ON" for overnight, "atm" for atmosphere, "psi" for pounds per square inch, "conc." for concentrate, "sat" or "sat'd" for saturated, "MW" for molecular weight, "mw" or "µwave" for microwave, "mp" for melting point, "Wt" for weight, "MS" or "Mass Spec" for mass spectrometry, "ESI" for electrospray ionization mass spectroscopy, "HR" for high resolution, "HRMS" for high resolution mass spectrometry, "LCMS" or "LC-MS" for liquid chromatography mass spectrometry, "HPLC" for high pressure liquid chromatography, "RP HPLC" for reverse phase HPLC, "TLC" or "tlc" for thin layer chromatography, "NMR" for nuclear magnetic resonance spectroscopy, "nOe" for nuclear Overhauser effect spectroscopy, "$^1H$" for proton, "δ" for delta, "s" for singlet, "d" for doublet, "t" for triplet, "q" for quartet, "m" for multiplet, "br" for broad, "Hz" for hertz, "ee" for "enantiomeric excess" and "α", "β", "R", "r", "S", "s", "E", and "Z" are stereochemical designations familiar to one skilled in the art.

The following abbreviations used herein below have the corresponding meanings:

| | |
|---|---|
| AcOH | acetic acid |
| BINAP | 2,2'-bis(diphenylphosphino)-1,1'-binaphthalene |
| Boc | tert-butoxy carbonyl |
| $Boc_2O$ | di-tert-butyl dicarbonate |
| Bu | butyl |
| CDI | di(1H-imidazol-1-yl)methanone |
| $(COCl)_2$ | oxalyl dichloride |
| CSA | ((1S,4R)-7,7-dimethyl-2-oxobicyclo[2.2.1]heptan-1-yl)methanesulfonic acid |
| $Cs_2CO_3$ | cesium carbonate anhydrous |
| $CHCl_3$ | chloroform |
| $CH_3CN$/MeCN | acetonitrile |
| DAST | diethylaminosulfurtrifluoride |
| DCE | dichloroethane |
| DCM/$CH_2Cl_2$ | dichloromethane |
| DEA | diethylamine |
| DIBL—H | diisobutylaluminum hydride |
| DIEA/DIPEA | N-ethyl-N-isopropylpropan-2-amine |
| DMF | dimethylformamide |
| DMFDMA | 1,1-dimethoxy-N,N-dimethylmethanamine |
| DMSO | dimethylsulfoxide |
| DPPA | diphenylphosphoryl azide |
| EA/EtOAc | ethyl acetate |
| Et | ethyl |
| EtOH | ethanol |
| $H_2$ | hydrogen |
| HATU | 2-(7-aza-1H-benzotriazole-1-yl)-1,1,3,3-tetramethyluronium hexafluorophosphate |
| HCl | hydrochloric acid |
| $(HCHO)_n$ | paraformaldehyde |
| HPLC | high performance liquid chromatography |
| $H_2O$ | water |
| i-Pr | isopropyl |
| KOH | potassium hydroxide |
| $K_2CO_3$ | potassium carbonate |
| LC-MS | liquid chromatograph-mass spectrometer |
| $LiAlH_4$ | lithium aluminium hydride |
| LiOH | lithium hydroxide |
| m-CPBA | 3-chloroperoxybenzoic acid |
| Me | methyl |
| mL | milliliter |
| MeOH | methanol |
| $MeNH_2$ | methanamine |
| $MnO_2$ | manganese dioxide |
| $N_2$ | nitrogen |
| $NaBH_4$ | sodium borohydride |
| $NaBH_3CN$ | Sodium cyanoborohydride |
| $NaB(OAc)_3H$ | sodium triacetoxyhydroborate |
| $Na_2CO_3$ | sodium carbonate |
| $NaHCO_3$ | sodium bicarbonate |
| NaOH | sodium hydroxide |

-continued

| | |
|---|---|
| Na₂SO₄ | sodium sulfate |
| NH₃•H₂O/NH₄OH | ammonia |
| NH₄HCO₃ | ammonium bicarbonate |
| NiCl₂•6H₂O | nickel chloride hexahydrate |
| Pd/C | Palladium on activated carbon |
| Ph | phenyl |
| PPh₃ | triphenylphosphine |
| Pd(dppf)Cl₂ | [1,1'-bis(diphenylphosphino)ferrocene]dichloropalladium(II) |
| Pd(PPh₃)₄/tetrakis | palladium(0)tetrakis(triphenylphosphine) |
| Pd₂dba₃ | Tris(dibenzylideneacetone)dipalladium |
| POCl₃ | phosphoryl trichloride |
| SeO₂ | selenium dioxide |
| SiO₂ | Silicon dioxide |
| SOCl₂ | sulfurous dichloride |
| t-Bu/Buᵗ | tert-butyl |
| t-BuOK | potassium tert-butoxide |
| t-BuONa | sodium tert-butoxide |
| TEA | triethylamine |
| TFA | trifluoroacetic acid |
| TMSCl | chlorotrimethylsilane |
| X-phos | 2-(dicyclohexylphosphino)-2',4',6'-triisopropylbiphenyl |
| Zn(CN)₂ | zinc cyanide |

Example 1

N²-(((1,4-trans)-4-((8-methoxy-1,7-naphthyridin-2-yl)amino)cyclohexyl)methyl)pyrimidine-2,5-diamine (C1)

Step 1: 2-cyano-3-methylpyridine 1-oxide (1-1)

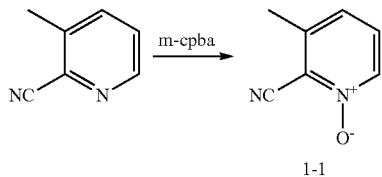

To a solution of compound 3-methylpicolinonitrile (10 g, 84.6 mmol, 1.0 eq) in CH₂Cl₂ (180 mL) was added m-CPBA (29.2 g, 139.3 mmol, 2.0 eq). Then the mixture was stirred at 30° C. for 12 hours. The mixture was neutralized to pH 7-8 with saturated aqueous Na₂CO₃, and extracted three times with CH₂Cl₂/CH₃OH (5/1, v/v, 200 mL), the combined organic layers were dried over anhydrous sodium sulfate and concentrated. The residue was triturated with petroleum ether and EtOAc, then filtered to afford 2-cyano-3-methylpyridine 1-oxide (1-1). ¹H-NMR (400 MHz, DMSO-d₆) δ ppm 8.32 (d, J=6.4 Hz, 1H), 7.60-7.57 (m, 1H), 7.41 (d, J=8.0 Hz, 1H), 2.45 (s, 3H).

Step 2: 6-chloro-3-methylpicolinonitrile (1-2)

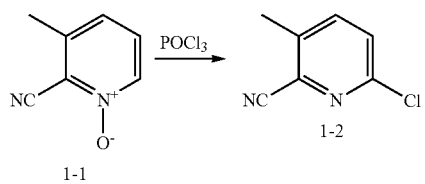

A mixture of (1-1) (4 g, 29.9 mmol, 1.0 eq) in POCl₃ (30 mL) was stirred at 110° C. for 2 hours. The solvent was removed and the residue was neutralized to pH 7-8 with saturated aqueous Na₂CO₃ solution, extracted three times with EtOAc (200 mL). The combined organic layers were dried over anhydrous sodium sulfate and concentrated. The crude product was purified by column chromatography (petroleum ether/EtOAc=50/1) to give 6-chloro-3-methylpicolinonitrile (1-2). ¹H-NMR (400 MHz, CDCl₃) δ ppm 7.65 (d, J=8.4 Hz, 1H), 7.45 (d, J=8.0 Hz, 1H), 2.55 (s, 3H). MS: [M+H]⁺=152.8.

Step 3: 6-chloro-3-methylpicolinamide (1-3)

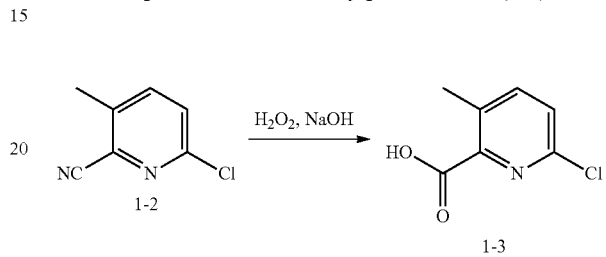

To a solution of (1-2) (1.19 g, 7.9 mmol, 1.0 eq) in DMSO (5 mL) was added a solution of NaOH (0.38 g, 9.44 mmol, 1.2 eq) in water (3 mL). H₂O₂(30% in water, 1.78 g, 15.8 mmol, 2.0 eq) was added dropwise to the mixture at 0° C. The mixture was stirred at 15° C. for 0.5 hour, then poured into water, the resulting white precipitate was collected by filtration to give 6-chloro-3-methylpicolinamide (1-3). ¹H NMR (400 MHz, CD₃OD) δ ppm 7.73 (d, J=8.4 Hz, 1H), 7.46 (d, J=8.0 Hz, 1H), 2.59 (s, 3H). MS: [M+H]⁺=171.0.

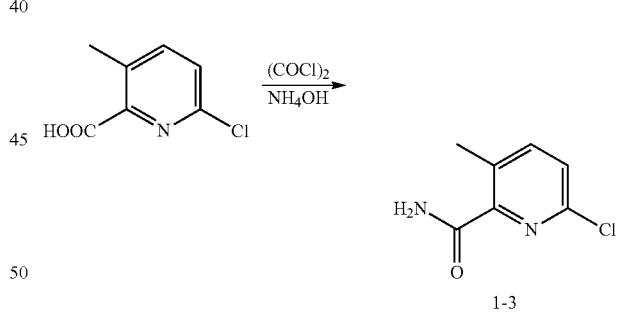

Alternatively, to a stirring solution of 6-chloro-3-methylpicolinic acid (23.94 g, 140 mmol, 1.0 eq) and (COCl)₂ (35.28 g, 280 mmol, 2.0 eq) in CH₂Cl₂ (100 mL) was added dropwise dry DMF (2.0 mL) for 30 minutes, then the resulting solution was stirred at 2-5° C. for 2 hours, then concentrated. The residue was dissolved in CH₂Cl₂ (200 mL) and the solution was added dropwise to NH₄OH (200 mL) for 30 minutes, then the resulting solution was stirred at 2-5° C. for 1 hours. The mixture was extracted with CH₂Cl₂ (200 mL*2) and the combined organic layers were dried over anhydrous sodium sulfate and concentrated to give 6-chloro-3-methylpicolinamide (1-3). ¹H NMR (400 MHz, CD₃OD): δ ppm 7.73 (d, J=8.4 Hz, 1H), 7.46 (d, J=8.0 Hz, 1H), 2.59 (s, 3H). MS: [M+H]⁺=171.0.

Step 4: (E)-6-chloro-N-((dimethylamino)methylene)-3-methylpicolinamide (1-4)

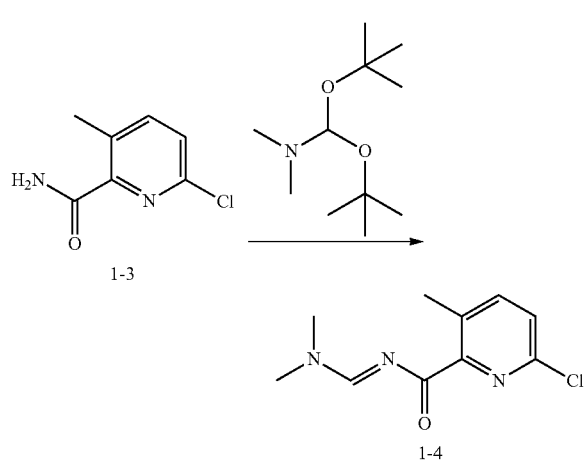

To a solution of (1-3) (2.0 g, 11.7 mmol, 1.0 eq) in THF (400 mL) was added 1,1-di-tert-butoxy-N,N-dimethylmethanamine (20 mL) under $N_2$. Then the mixture was stirred at 85° C. for 0.5 hour. The resulting solution was used in the next step without further purification. MS: [M+H]$^+$=225.9.

Step 5: 2-chloro-1,7-naphthyridin-8(7H)-one (1-5)

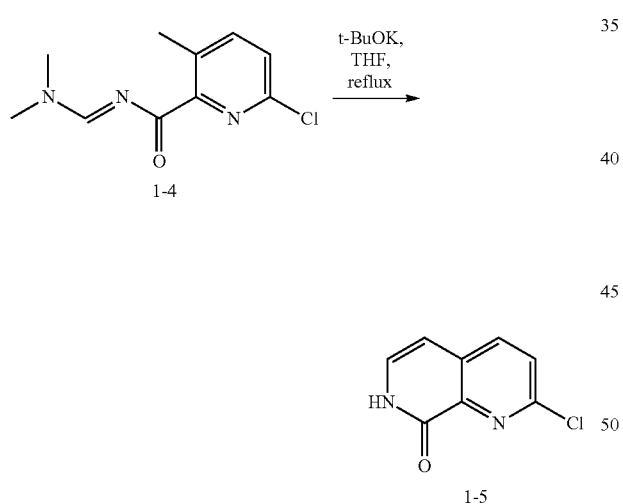

To the above solution of (1-4) was added t-BuOK (1.5 M in THF, 11.5 mL, 17.5 mmol, 1.5 eq). The mixture was stirred at 80° C. for 15 minutes. The solvent was removed and ice was added, then the mixture was adjusted to pH 7-8 with 1 N HCl, extracted four times with $CH_2Cl_2/CH_3OH$ (5/1, 300 mL). The combined organic layers were dried over anhydrous sodium sulfate and concentrated. The residue was triturated with petroleum ether and EtOAc, then filtered to afford 2-chloro-1,7-naphthyridin-8(7H)-one (1-5). $^1$H NMR (400 MHz, DMSO-d$_6$): δ ppm 11.74 (br s, 1H), 8.21 (d, J=8.4 Hz, 1H), 7.77 (d, J=8.4 Hz, 1H), 7.33-7.30 (m, 1H), 6.59 (d, J=6.8 Hz, 1H). MS: [M+H]$^+$=181.1.

Step 6: 2-chloro-8-methoxy-1,7-naphthyridine (1-6)

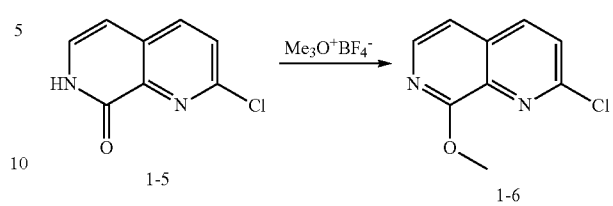

To a solution of (1-5) (1.2 g, 6.6 mmol, 1.0 eq) in $CH_2Cl_2$ (120 mL) was added trimethyloxonium tetrafluoroborate (1.97 g, 13.3 mmol, 2.0 eq). The mixture was stirred at 65° C. for 12 hours. The mixture was added 1N NaOH (40 mL). After stirring for 20 minutes, the mixture was extracted three times with $CH_2Cl_2$ (200 mL). The combined organic layers were dried over anhydrous sodium sulfate and concentrated. The crude product was purified by column chromatography (petroleum ether/EtOAc from 8/1 to 5/1) to give 2-chloro-8-methoxy-1,7-naphthyridine (1-6). $^1$H NMR (400 MHz, CDCl$_3$): δ ppm 8.11 (d, J=5.6 Hz, 1H), 8.04 (d, J=8.8 Hz, 1H), 7.58 (d, J=8.8 Hz, 1H), 7.21 (d, J=5.6 Hz, 1H), 4.20 (s, 3H). MS: [M+H]$^+$=194.8.

Step 7: tert-butyl (((1,4-trans)-4-((8-methoxy-1,7-naphthyridin-2-yl)amino)cyclohexyl)methyl)carbamate (1-7)

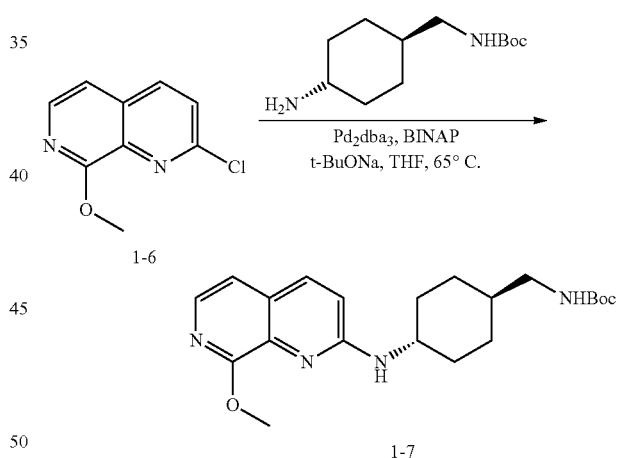

To a solution of (1-6) (650 mg, 3.35 mmol, 1.0 eq) and tert-butyl (((1,4-trans)-4-aminocyclohexyl)methyl)carbamate (993 mg, 4.36 mmol, 1.3 eq) in anhydrous THF (50 mL) was added BINAP (625 mg, 1.0 mmol, 0.3 eq), Pd$_2$(dba)$_3$ (306 mg, 0.34 mmol, 0.1 eq) and t-BuONa (322 mg, 3.35 mmol, 1.0 eq) and the mixture was stirred at 65° C. for 1.5 hours. The mixture was filtered and the filtrate was added H$_2$O (30 mL), and extracted twice with EtOAc (50 mL). The combined organic layers were dried over anhydrous sodium sulfate and concentrated to give the crude product which was purified by silica gel column chromatography (petroleum ether/EtOAc from 4/1 to 3/1) to give tert-butyl (((1, 4-trans)-4-((8-methoxy-1,7-naphthyridin-2-yl)amino)cyclohexyl)methyl)carbamate (1-7). $^1$H NMR (400 MHz, CDCl$_3$): δ ppm 7.79-7.75 (m, 2H), 7.01 (d, J=5.6 Hz, 1H), 6.81 (d, J=8.8 Hz, 1H), 5.07 (d, J=8.0 Hz, 1H), 4.62 (br s, 1H), 4.13 (s, 3H), 3.61-3.54 (m, 1H), 3.00 (t, J=6.4 Hz, 2H), 2.16-2.13 (m, 2H), 1.85-1.80 (m, 2H), 1.51-1.39 (m, 10H), 1.25-1.08 (m, 4H). MS: [M+H]$^+$=387.2.

Step 8: N-((1,4-trans)-4-(aminomethyl)cyclohexyl)-8-methoxy-1,7-naphthyridin-2-amine (1-8)

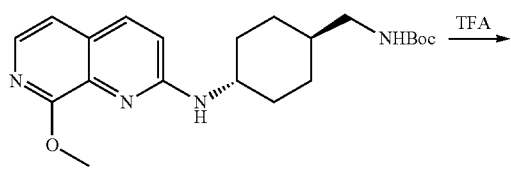

To a solution of (1-7) (320 mg, 0.83 mmol, 1.0 eq) in CH$_2$Cl$_2$ (5 mL) was added TFA (1 mL) and the mixture was stirred at 25° C. for 1.5 hours. The mixture was concentrated to give crude N-((1,4-trans)-4-(aminomethyl)cyclohexyl)-8-methoxy-1,7-naphthyridin-2-amine (1-8), which was used without further purification. MS: [M+H]$^+$=286.9.

Step 9: 8-methoxy-N-((1,4-trans)-4-(((5-nitropyrimidin-2-yl)amino)methyl)cyclohexyl)-1,7-naphthyridin-2-amine (1-9)

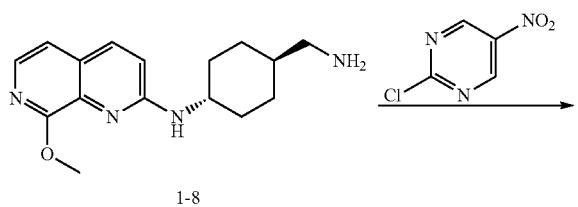

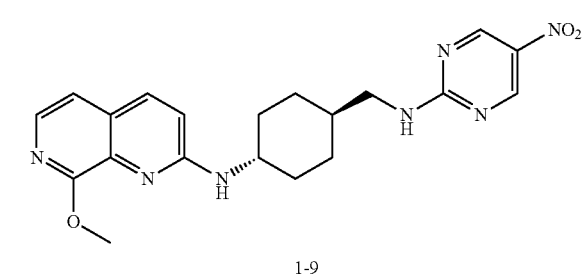

To a solution of (1-8) (230 mg, 0.8 mmol, 1.0 eq) in acetonitrile (2 mL) and THF (2 mL) was added 2-chloro-5-nitropyrimidine (154 mg, 0.96 mmol, 1.20 eq) and DIPEA (310 mg, 2.4 mmol, 5.0 eq) and the mixture was stirred at room temperature for 0.5 hour. The mixture was concentrated to give the crude product, which was purified by silica gel column chromatography (CH$_2$Cl$_2$/CH$_3$OH=30/1) to give 8-methoxy-N-((1,4-trans)-4-(((5-nitropyrimidin-2-yl)amino)methyl)cyclohexyl)-1,7-naphthyridin-2-amine (1-9). $^1$H NMR (400 MHz, CDCl$_3$): δ ppm 9.11 (d, J=3.2 Hz, 1H), 9.03 (d, J=3.6 Hz, 1H), 7.83-7.79 (m, 2H), 7.03 (d, J=5.6 Hz, 1H), 6.84 (d, J=8.8 Hz, 1H), 6.07 (t, J=6.0 Hz, 1H), 5.05 (br s, 1H), 4.14 (s, 3H), 3.76-3.58 (m, 1H), 3.46 (t, J=6.4 Hz, 2H), 2.21-2.18 (m, 2H), 1.94-1.91 (m, 2H), 1.71-1.67 (m, 1H), 1.28-1.20 (m, 4H). MS: [M+H]$^+$=410.1.

Step 10: N$^2$-(((1,4-trans)-4-((8-methoxy-1,7-naphthyridin-2-yl)amino)cyclohexyl)methyl)pyrimidine-2,5-diamine (1)

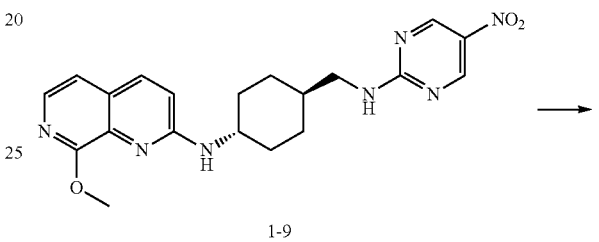

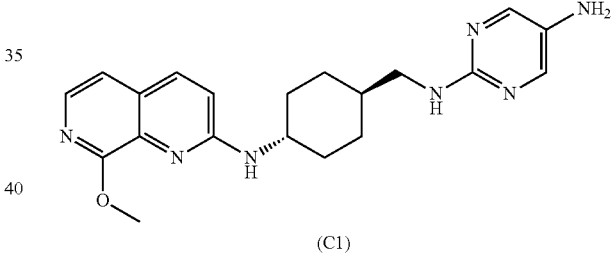

To a solution of (1-9) (230 mg, 0.56 mmol, 1.0 eq) in CH$_3$OH (15 mL) and EtOAc (15 mL) was added Pd/C (10%, 40 mg). The suspension was degassed under vacuum and purged with H$_2$ several times. The mixture was stirred under H$_2$ balloon at 20° C. for 3 hours. The reaction mixture was filtered and the filtrate was concentrated under reduced pressure. The crude product was purified by preparative HPLC (column: Phenomenex Gemini C18 200 mm×25 mm×5 um, gradient: 20-50% B (A=0.5% NH$_4$OH in water, B=acetonitrile)) to give N$^2$-(((1,4-trans)-4-((8-methoxy-1,7-naphthyridin-2-yl)amino)cyclohexyl)methyl)pyrimidine-2,5-diamine (C1). $^1$H NMR (400 MHz, DMSO-d$_6$): δ ppm 7.79 (s, 2H), 7.77 (s, 1H), 7.68 (d, J=5.2 Hz, 1H), 7.09 (d, J=5.6 Hz, 1H), 7.06 (d, J=8.0 Hz, 1H), 6.89 (d, J=8.8 Hz, 1H), 6.25 (t, J=6.0 Hz, 1H), 4.38 (s, 2H), 3.94 (s, 3H), 3.87 (br s, 1H), 3.06 (t, J=6.0 Hz, 2H), 2.03-2.00 (m, 2H), 1.82-1.79 (m, 2H), 1.52 (br s, 1H), 1.21-1.00 (m, 4H). MS: [M+H]$^+$=380.2.

Example 2

N-(2-((((1,4-trans)-4-((8-methoxy-1,7-naphthyridin-2-yl)amino)cyclohexyl)methyl)amino)pyrimidin-5-yl)azetidine-3-carboxamide (C2)

Step 1: tert-butyl 3-((2-((((1,4-trans)-4-((8-methoxy-1,7-naphthyridin-2-yl)amino)cyclohexyl)methyl)amino)pyrimidin-5-yl)carbamoyl)azetidine-1-carboxylate (2-1)

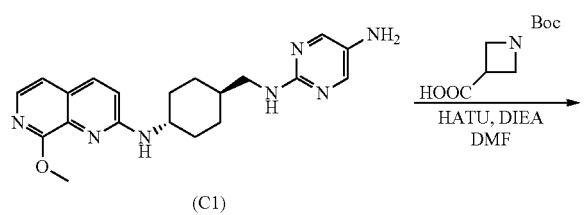

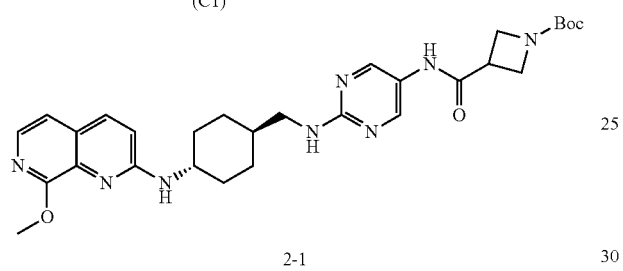

To a solution of compound (C1) (200 mg, 0.53 mmol, 1.0 eq) in DMF (5 mL) was added DIEA (204 mg, 1.58 mmol, 3.0 eq), HATU (603 mg, 1.58 mmol, 3.0 eq), and 1-(tert-butoxycarbonyl)azetidine-3-carboxylic acid (106 mg, 0.53 mmol, 1.0 eq). The mixture was stirred at 22° C. for 1.0 hour. The mixture was added EtOAc (50 mL), and washed twice with brine (20 mL). The organic layer was dried over anhydrous sodium sulfate and concentrated. The crude product was purified by column chromatography ($CH_2Cl_2$/$CH_3OH$ from 50/1 to 20/1) to give tert-butyl 3-((2-((((1,4-trans)-4-((8-methoxy-1,7-naphthyridin-2-yl)amino)cyclohexyl)methyl)amino)pyrimidin-5-yl)carbamoyl)azetidine-1-carboxylate (2-1). $^1$H NMR (400 MHz, $CDCl_3$): δ ppm 8.41 (s, 2H), 7.87-7.85 (m, 2H), 7.40 (br s, 1H), 7.06 (d, J=5.6 Hz, 1H), 6.94 (d, J=9.2 Hz, 1H), 5.57 (br s, 1H), 4.18-4.10 (m, 7H), 3.63 (br s, 1H), 3.41-3.33 (m, 1H), 3.28 (t, J=6.4 Hz, 2H), 2.15-2.12 (m, 2H), 1.92-1.89 (m, 2H), 1.67-1.60 (m, 1H), 1.44 (s, 9H), 1.30-1.10 (m, 4H). MS: $[M+H]^+$=563.3.

Step 2: N-(2-((((1,4-trans)-4-((8-methoxy-1,7-naphthyridin-2-yl)amino)cyclohexyl)methyl)amino)pyrimidin-5-yl)azetidine-3-carboxamide (C2)

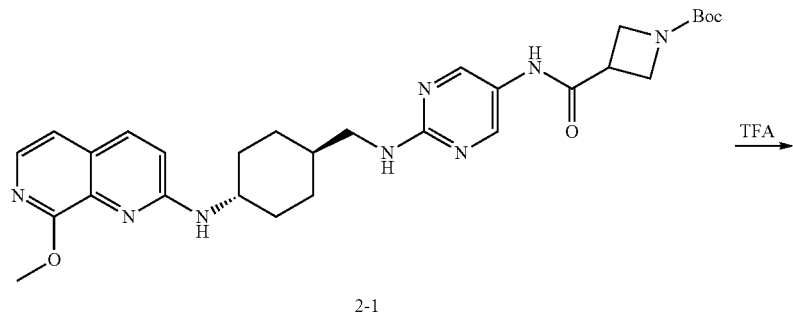

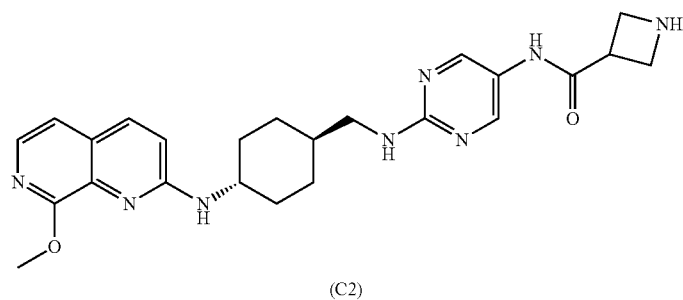

To a solution of (2-1) (250 mg, 0.44 mmol, 1.0 eq) in CH$_2$Cl$_2$ (6.0 mL) was added TFA (1 mL) and the reaction mixture was stirred at 22° C. for 1.0 hour. The mixture was concentrated to give the crude product (200 mg). The crude product (100 mg) was purified by preparative HPLC (column: Phenomenex Gemini C18 250 mm×21.2 mm×5 m, gradient: 20-50% B (A=water, B=acetonitrile), flow rate: 25 mL/min) to give N-(2-((((1,4-trans)-4-((8-methoxy-1,7-naphthyridin-2-yl)amino)cyclohexyl)methyl)amino)pyrimidin-5-yl)azetidine-3-carboxamide (2). H NMR (400 MHz, DMSO-d$_6$): δ ppm 9.62 (s, 1H), 8.39 (s, 2H), 7.79 (d, J=9.2 Hz, 1H), 7.68 (d, J=5.6 Hz, 1H), 7.15-7.08 (m, 2H), 7.05 (d, J=8.0 Hz, 1H), 6.90 (d, J=8.8 Hz, 1H), 3.95 (s, 3H), 3.88 (br s, 1H), 3.73-3.71 (m, 1H), 3.59-3.44 (m, 4H), 3.14 (t, J=6.4 Hz, 2H), 2.06-1.98 (m, 2H), 1.86-1.76 (m, 2H), 1.54 (br s, 1H), 1.24-1.01 (m, 4H). MS: [M+H]$^+$=463.2.

Example 3

N-(2-((((1,4-trans)-4-((8-methoxy-1,7-naphthyridin-2-yl)amino)cyclohexyl)methyl)amino)pyrimidin-5-yl)-1-methylazetidine-3-carboxamide (C3)

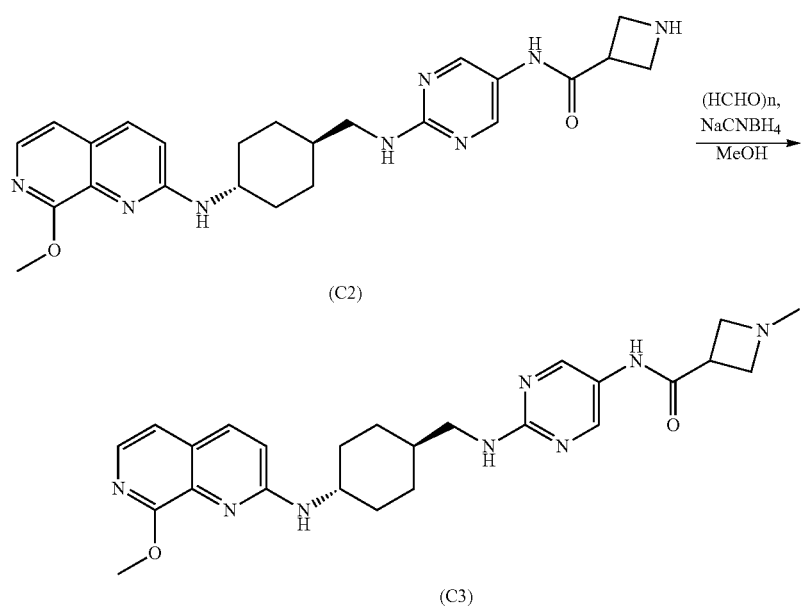

A solution of compound (C2) (100 mg, 0.22 mmol, 1.0 eq) in CH$_3$OH (3.0 mL) was basified to pH 7-8 with DIPEA, then NaBH$_3$CN (42 mg, 0.66 mmol, 3.0 eq) and (HCHO)$_n$ (32 mg, 1.08 mmol, 5.0 eq) were added. The reaction mixture was stirred at 25° C. for 40 minutes. The mixture was quenched with water (20 mL), and extracted twice with CH$_2$Cl$_2$ (50 mL). The combined organic layers were dried over anhydrous sodium sulfate, filtered and concentrated. The crude product was purified by preparative HPLC (column: Phenomenex Gemini C18 250 mm×21.2 mm×5 um, gradient: 20-40% B (A=water, B=acetonitrile), flow rate: 25 mL/min) to give N-(2-((((1,4-trans)-4-((8-methoxy-1,7-naphthyridin-2-yl)amino)cyclohexyl)methyl)amino)pyrimidin-5-yl)-1-methylazetidine-3-carboxamide (C3). $^1$H NMR (400 MHz, DMSO-d$_6$): δ ppm 9.65 (s, 1H), 8.39 (s, 2H), 7.79 (d, J=9.2 Hz, 1H), 7.69 (d, J=5.6 Hz, 1H), 7.12-7.08 (m, 2H), 7.05 (d, J=7.6 Hz, 1H), 6.90 (d, J=9.2 Hz, 1H), 3.95 (s, 3H), 3.86 (br s, 1H), 3.40 (t, J=6.8 Hz, 2H), 3.27-3.21 (m, 1H), 3.16-3.10 (m, 4H), 2.18 (s, 3H), 2.04-2.01 (m, 2H), 1.93-1.79 (m, 2H), 1.55 (br s, 1H), 1.22-1.03 (m, 4H). MS: [M+H]$^+$=477.3.

Example 4

2-((((1,4-trans)-4-((8-methoxy-1,7-naphthyridin-2-yl)amino)cyclohexyl)methyl)amino)pyrimidine-5-carbonitrile (C4)

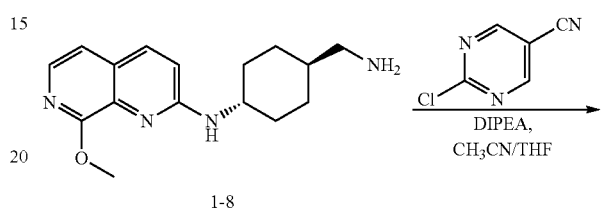

-continued

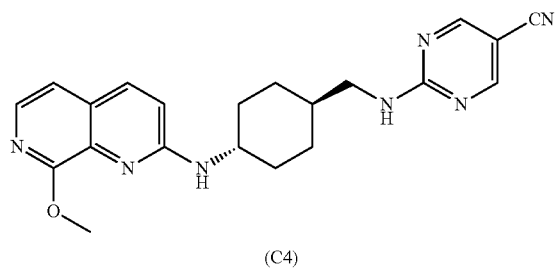

The title compound was prepared using a procedure similar to that in Step 9 of Example 1, with 2-chloro-5- nitropyrimidine being replaced with 2-chloropyrimidine-5-carbonitrile and the product purified by preparative HPLC (column: Phenomenex Gemini C18 200 mm×25 mm×5 m, gradient: 33-63% B (A=water, B=acetonitrile)) to give 2-((((1,4-trans)-4-((8-methoxy-1,7-naphthyridin-2-yl)amino)cyclohexyl)methyl)amino)pyrimidine-5-carbonitrile (C4). $^1$H NMR (400 MHz, DMSO-d$_6$): δ ppm 8.71 (d, J=3.2 Hz, 1H), 8.63 (d, J=3.2 Hz, 1H), 8.41 (t, J=6.0 Hz, 1H), 7.79 (d, J=9.2 Hz, 1H), 7.68 (d, J=5.2 Hz, 1H), 7.09 (d, J=5.6 Hz, 1H), 7.05 (d, J=8.0 Hz, 1H), 6.90 (d, J=9.2 Hz, 1H), 3.94 (s, 3H), 3.87 (br s, 1H), 3.23 (t, J=6.4 Hz, 2H), 2.04-2.01 (m, 2H), 1.81-1.77 (m, 2H), 1.58 (br s, 1H), 1.23-1.05 (m, 4H). MS: [M+H]$^+$=390.1.

Example 5

2-((((1,4-trans)-4-((8-methoxy-1,7-naphthyridin-2-yl)amino)cyclohexyl)methyl)amino)pyrimidine-5-carboxamide (C5)

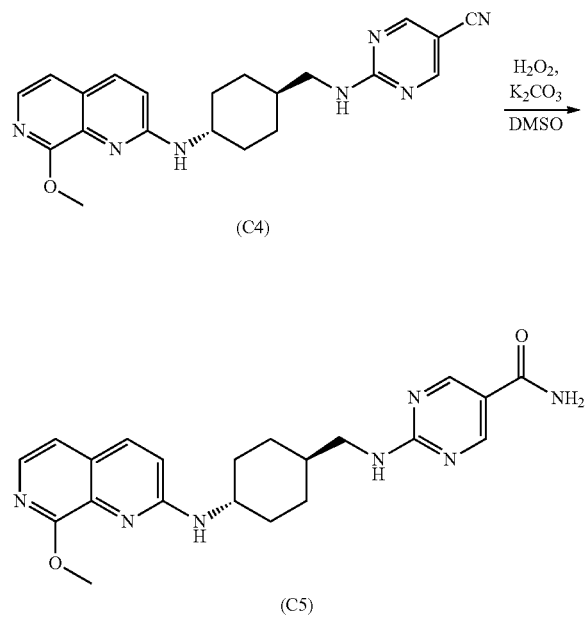

To a solution of compound (C4) (60 mg, 0.15 mmol, 1.0 eq) in DMSO (3 mL) was added K$_2$CO$_3$ (64 mg, 0.46 mmol, 3.0 eq) and water (0.5 mL). H$_2$O$_2$ (30% aqueous solution, 52 mg, 0.46 mmol, 3.0 eq) was added dropwise to the mixture at 0° C. The mixture was stirred at 30° C. for 0.5 hour. The reaction mixture was added to EtOAc (50 mL) and washed twice with brine (20 mL), dried over anhydrous sodium sulfate and concentrated. The crude product was purified by preparative HPLC (column: Phenomenex Gemini C18 200 mm×25 mm×5 um, gradient: 11-48% B (A=water, B=acetonitrile)) to give 2-((((1,4-trans)-4-((8-methoxy-1,7-naphthyridin-2-yl)amino)cyclohexyl)methyl)amino)pyrimidine-5-carboxamide (C5). $^1$H NMR (400 MHz, DMSO-d$_6$): δ ppm 8.73 (s, 1H), 8.69 (s, 1H), 7.85 (t, J=6.0 Hz, 1H), 7.80 (d, J=8.8 Hz, 1H), 7.69 (d, J=5.6 Hz, 1H), 7.23 (br s, 1H), 7.10 (d, J=5.2 Hz, 1H), 7.06 (d, J=8.0 Hz, 1H), 6.91 (d, J=8.8 Hz, 1H), 3.96 (s, 3H), 3.89 (br s, 1H), 3.24 (t, J=6.4 Hz, 2H), 2.05-2.02 (m, 2H), 1.83-1.80 (m, 2H), 1.58 (br s, 1H), 1.23-1.06 (m, 4H). MS: [M+H]$^+$=408.2.

Example 6

N-(2-((((1,4-trans)-4-((8-methoxy-1,7-naphthyridin-2-yl)amino)cyclohexyl)methyl)amino)pyrimidin-5-yl)acetamide (C6)

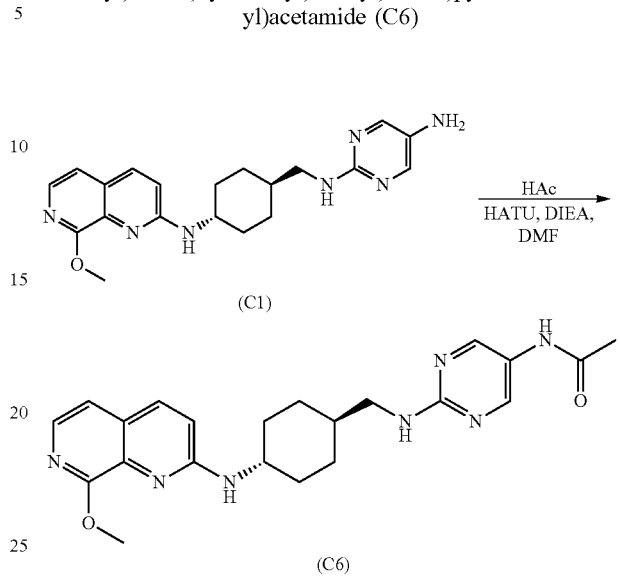

The title compound was prepared using a procedure similar to that in Step 1 of Example 2, with 1-(tert-butoxycarbonyl)azetidine-3-carboxylic acid being replaced with acetic acid and the product purified by preparative HPLC (column: Phenomenex Gemini C18 200 mm×25 mm×5 m, gradient: 19-49% B (A=water, B=acetonitrile)) to give N-(2-((((1,4-trans)-4-((8-methoxy-1,7-naphthyridin-2-yl)amino)cyclohexyl)methyl)amino)pyrimidin-5-yl)acetamide (C6). $^1$H NMR (400 MHz, DMSO-d$_6$): δ ppm 9.73 (s, 1H), 8.36 (s, 2H), 7.78 (d, J=8.8 Hz, 1H), 7.68 (d, J=5.6 Hz, 1H), 7.12-7.04 (m, 3H), 6.90 (d, J=8.8 Hz, 1H), 3.94 (s, 3H), 3.88 (br s, 1H), 3.14 (t, J=6.0 Hz, 2H), 2.03-2.00 (m, 2H), 1.99 (s, 3H), 1.82-1.79 (m, 2H), 1.55 (br s, 1H), 1.21-1.02 (m, 4H). MS: [M+H]$^+$=422.2.

Example 7

2-hydroxy-N-(2-((((1,4-trans)-4-((8-methoxy-1,7-naphthyridin-2-yl)amino)cyclohexyl)methyl)amino)pyrimidin-5-yl)acetamide (C7)

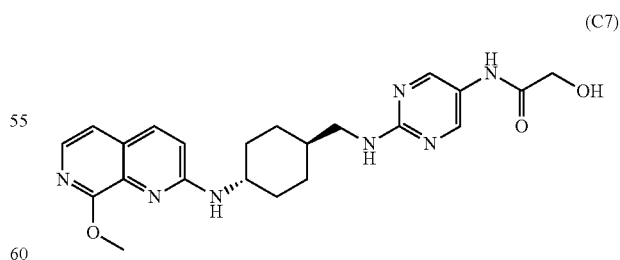

The title compound was prepared using a procedure similar to that in Step 1 of Example 2, with 1-(tert-butoxycarbonyl)azetidine-3-carboxylic acid replaced with 2-hydroxyacetic acid. $^1$H NMR (400 MHz, DMSO-d$_6$): δ ppm 9.59 (s, 1H), 8.46 (s, 2H), 7.79 (d, J=8.8 Hz, 1H), 7.68 (d, J=5.2 Hz, 1H), 7.13 (t, J=6.0 Hz, 1H), 7.09 (d, J=5.6 Hz, 1H), 7.06 (d, J=8.0 Hz, 1H), 6.90 (d, J=8.8 Hz, 1H), 5.75 (t, J=6.0 Hz, 1H), 3.97 (d, J=5.6 Hz, 2H), 3.95 (s, 3H), 3.87 (br s, 1H), 3.14 (t, J=6.4 Hz, 2H), 2.03-2.01 (m, 2H), 1.83-1.80 (m, 2H), 1.55 (br s, 1H), 1.22-1.03 (m, 4H). MS: [M+H]⁺=438.2.

Example 8

(2-((((1,4-trans)-4-((8-methoxy-1,7-naphthyridin-2-yl)amino)cyclohexyl)methyl)amino)pyrimidin-5-yl)(piperazin-1-yl)methanone (C8)

Step 1: Ethyl 2-((((1,4-trans)-4-((8-methoxy-1,7-naphthyridin-2-yl)amino)cyclohexyl)methyl)amino)pyrimidine-5-carboxylate (8-1)

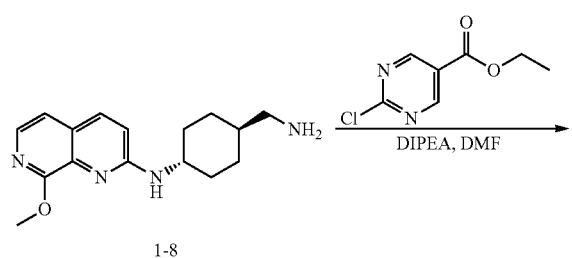

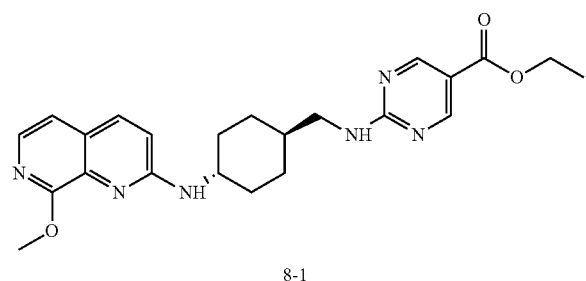

To a solution of (1-8) (2.2 g, 7.7 mmol, 1.0 eq) in DMF (30 mL) was added ethyl 2-chloropyrimidine-5-carboxylate (1.6 g, 8.4 mmol, 1.1 eq) and DIPEA (4.9 g, 38.5 mmol, 5.0 eq) and the mixture was stirred at 100° C. for 2.5 hours. The mixture was added to EtOAc (100 mL), washed three times with brine (30 mL), dried over anhydrous Na₂SO₄ and concentrated. The crude product was purified by column chromatography (petroleum ether/EtOAc from 2/1 to 1/1) to give ethyl 2-((((1,4-trans)-4-((8-methoxy-1,7-naphthyridin-2-yl)amino)cyclohexyl)methyl) amino)pyrimidine-5-carboxylate (8-1). ¹H NMR (400 MHz, CDCl₃): δ ppm 8.87 (s, 1H), 8.78 (s, 1H), 7.80-7.76 (m, 2H), 7.01 (d, J=5.6 Hz, 1H), 6.82 (d, J=9.2 Hz, 1H), 5.81 (br s, 1H), 5.07 (d, J=7.6 Hz, 1H), 4.33 (q, J=6.8 Hz, 1H), 4.13 (s, 3H), 3.62 (br s, 1H), 3.40 (t, J=6.4 Hz, 2H), 2.18-2.16 (m, 2H), 1.92-1.90 (m, 2H), 1.65 (br s, 1H), 1.36 (t, J=6.8 Hz, 3H), 1.24-1.20 (m, 4H). MS: [M+H]⁺=437.2.

Step 2: 2-((((1,4-trans)-4-((8-methoxy-1,7-naphthyridin-2-yl)amino)cyclohexyl)methyl)amino)pyrimidine-5-carboxylic acid (8-2)

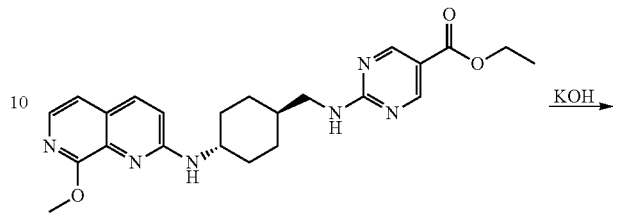

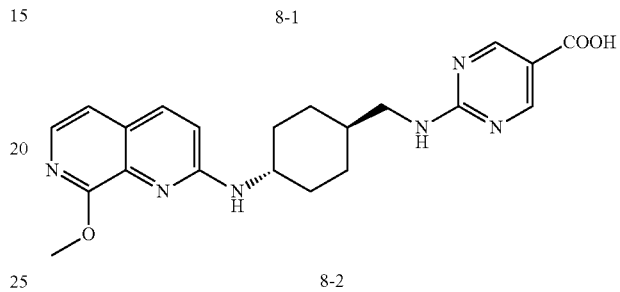

To a solution of (8-1) (2.2 g, 5.0 mmol, 1.0 eq) in MeOH (20 mL) was added H₂O (4 mL) and KOH (1.12 g, 20 mmol, 4.0 eq), the reaction mixture was stirred at 50° C. for 2.5 hours. The mixture was concentrated and adjusted to pH 5-6 with 1N HCl. The formed precipitate was collected by filtration to give 2-((((1,4-trans)-4-((8-methoxy-1,7-naphthyridin-2-yl)amino)cyclohexyl)methyl)amino)pyrimidine-5-carboxylic acid (8-2). ¹H NMR (400 MHz, DMSO-d₆): δ ppm 12.72 (br s, 1H), 8.73 (d, J=2.8 Hz, 1H), 8.66 (d, J=3.2 Hz, 1H), 8.13 (t, J=6.0 Hz, 1H), 7.79 (d, J=9.2 Hz, 1H), 7.68 (d, J=5.2 Hz, 1H), 7.10-7.06 (m, 2H), 6.90 (d, J=9.2 Hz, 1H), 3.94 (s, 3H), 3.88 (br s, 1H), 3.24 (t, J=6.4 Hz, 2H), 2.04-2.01 (m, 2H), 1.82-1.79 (m, 2H), 1.59 (br s, 1H), 1.20-1.08 (m, 4H).

Step 3: (2-((((1,4-trans)-4-((8-methoxy-1,7-naphthyridin-2-yl)amino)cyclohexyl)methyl)amino)pyrimidin-5-yl)(piperazin-1-yl)methanone (C8)

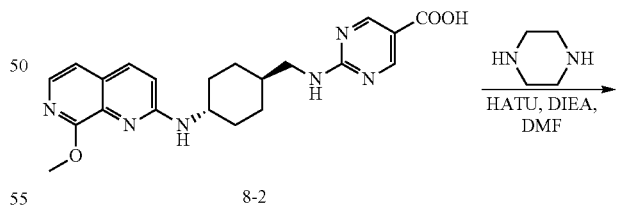

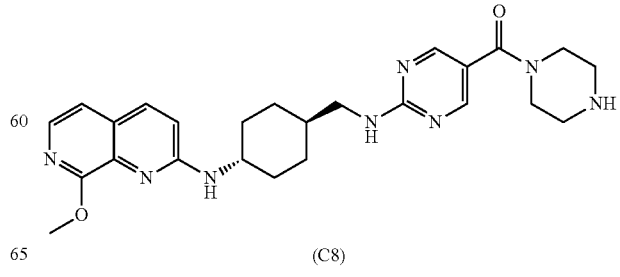

To a solution of compound (8-2) (2.5 g, 6.1 mmol, 1.0 eq) in DMF (20 mL) was added piperazine (10 g, 123 mmol, 20.0 eq), DIEA (2.4 g, 18.3 mmol, 3.0 eq) and HATU (7.0 g, 18.3 mmol, 3.0 eq). The mixture was stirred at 15° C. for 0.5 hour. The mixture was quenched with H₂O (50 ml) and extracted with EtOAc (100 mL*4). The combined organic layers were dried over anhydrous sodium sulfate and concentrated. The residue was purified by column chromatography (CH₂Cl₂/CH₃OH=50/1) to give the crude product which was triturated with petroleum ether/EtOAc (5/1, 100 mL), filtered, and dried to give (2-((((1,4-trans)-4-((8-methoxy-1,7-naphthyridin-2-yl)amino)cyclohexyl)methyl) amino)pyrimidin-5-yl)(piperazin-1-yl)methanone (C8). $^1$H NMR (400 MHz, DMSO-d$_6$): δ ppm 8.36 (s, 1H), 8.32 (s, 1H), 7.79 (d, J=8.8 Hz, 1H), 7.75 (t, J=6.0 Hz, 1H), 7.68 (d, J=5.6 Hz, 1H), 7.09 (d, J=5.6 Hz, 1H), 7.06 (d, J=7.6 Hz, 1H), 6.90 (d, J=9.2 Hz, 1H), 3.95 (s, 3H), 3.88 (br s, 1H), 3.49-3.40 (m, 4H), 3.20 (t, J=6.4 Hz, 2H), 2.72-2.66 (m, 4H), 2.04-2.01 (m, 2H), 1.83-1.80 (m, 2H), 1.58 (br s, 1H), 1.22-1.04 (m, 4H). MS: [M+H]⁺=477.3.

Example 9

N-(2-hydroxypropyl)-2-((((1,4-trans)-4-((8-methoxy-1,7-naphthyridin-2-yl)amino)cyclohexyl)methyl)amino)pyrimidine-5-carboxamide (C9)

(C9)

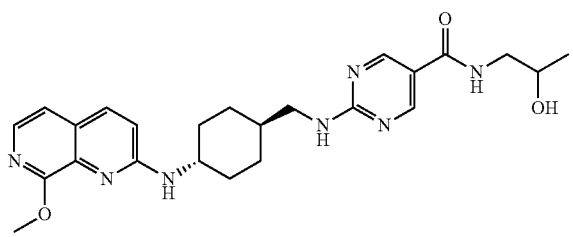

The title compound was prepared by using a procedure similar to that of Example 8, with piperazine being replaced with 1-aminopropan-2-ol. $^1$H NMR (400 MHz, DMSO-d$_6$): δ ppm 8.71 (s, 1H), 8.68 (s, 1H), 8.24 (t, J=5.6 Hz, 1H), 7.83-7.77 (m, 2H), 7.68 (d, J=5.6 Hz, 1H), 7.09 (d, J=5.6 Hz, 1H), 7.05 (d, J=8.0 Hz, 1H), 6.90 (d, J=9.2 Hz, 1H), 4.74 (d, J=4.8 Hz, 1H), 3.95 (s, 3H), 3.87 (br s, 1H), 3.76-3.71 (m, 1H), 3.23 (t, J=6.4 Hz, 2H), 3.19-3.11 (m, 2H), 2.04-2.01 (m, 2H), 1.83-1.79 (m, 2H), 1.58 (br s, 1H), 1.19-1.08 (m, 4H), 1.05 (d, J=6.4 Hz, 3H). MS: [M+H]⁺=466.2.

Example 10

(2-((((1,4-trans)-4-((8-methoxy-1,7-naphthyridin-2-yl)amino)cyclohexyl)methyl)amino)pyrimidin-5-yl)(morpholino)methanone (C10)

(C10)

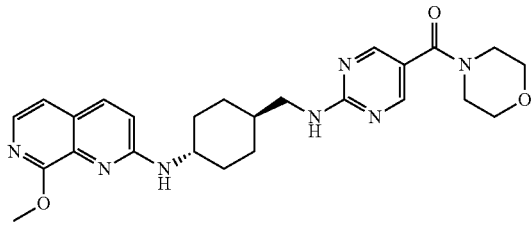

The title compound was prepared by using a procedure similar to that of Example 8, with piperazine being replaced with morpholine. H NMR (400 MHz, DMSO-d$_6$): δ ppm 8.40 (s, 1H), 8.36 (s, 1H), 7.81-7.77 (m, 2H), 7.68 (d, J=5.2 Hz, 1H), 7.09 (d, J=5.2 Hz, 1H), 7.06 (d, J=8.0 Hz, 1H), 6.90 (d, J=8.8 Hz, 1H), 3.95 (s, 3H), 3.89 (br s, 1H), 3.68-3.58 (m, 4H), 3.58-3.49 (m, 4H), 3.21 (t, J=6.4 Hz, 2H), 2.04-2.02 (m, 2H), 1.83-1.80 (m, 2H), 1.58 (br s, 1H), 1.22-1.05 (m, 4H). MS: [M+H]⁺=478.2.

Example 11

(2-((((1,4-trans)-4-((8-methoxy-1,7-naphthyridin-2-yl)amino)cyclohexyl) methyl)amino)pyrimidin-5-yl)(4-methylpiperazin-1-yl)methanone (C11)

(C11)

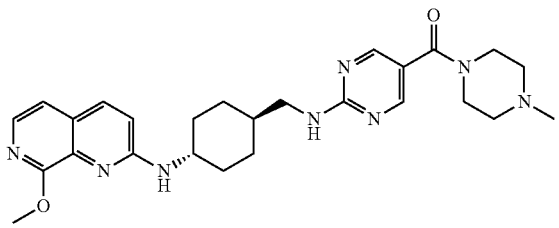

The title compound was prepared by using a procedure similar to that of Example 8, with piperazine being replaced with 1-methylpiperazine. $^1$H NMR (400 MHz, DMSO-d$_6$): δ ppm 8.37 (s, 1H), 8.33 (s, 1H), 7.80-7.76 (m, 2H), 7.68 (d, J=5.2 Hz, 1H), 7.09 (d, J=5.2 Hz, 1H), 7.06 (d, J=7.6 Hz, 1H), 6.90 (d, J=8.8 Hz, 1H), 3.95 (s, 3H), 3.86 (br s, 1H), 3.59 (br s, 4H), 3.21 (t, J=6.4 Hz, 2H), 2.38-2.29 (m, 4H), 2.20 (s, 3H), 2.05-2.02 (m, 2H), 1.84-1.80 (m, 2H), 1.58 (br s, 1H), 1.22-1.04 (m, 4H). MS: [M+H]⁺=491.3.

Example 12

N-((1,4-trans)-4-(((5-(1H-1,2,4-triazol-5-yl)pyrimidin-2-yl)amino)methyl)cyclohexyl)-8-methoxy-1,7-naphthyridin-2-amine (C12)

Step 1: N-((E)-(dimethylamino)methylene)-2-((((1,4-trans)-4-((8-methoxy-1,7-naphthyridin-2-yl)amino)cyclohexyl)methyl)amino)pyrimidine-5-carboxamide (12-1)

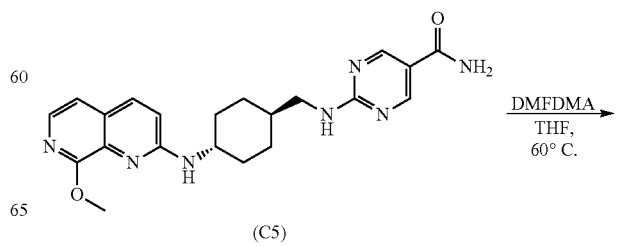

(C5)

-continued

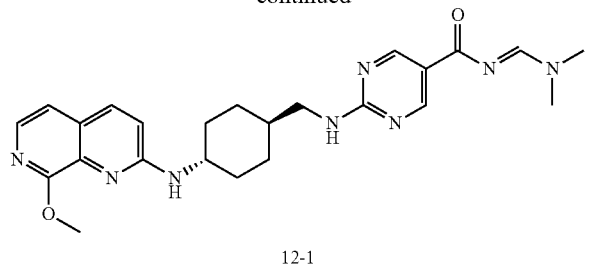

12-1

To a solution of compound (C5) (55 mg, 0.13 mmol, 1.0 eq) in THF (5 mL) was added DMFDMA (0.3 mL). The mixture was heated at 60° C. for 30 minutes. The mixture was concentrated under vacuum to give N-((E)-(dimethylamino)methylene)-2-((((1,4-trans)-4-((8-methoxy-1,7-naphthyridin-2-yl)amino)cyclohexyl)methyl)amino)pyrimidine-5-carboxamide (12-1), which was used directly for next step. MS: [M+H]$^+$=463.2.

Step 2: N-((1,4-trans)-4-(((5-(1H-1,2,4-triazol-5-yl)pyrimidin-2-yl)amino)methyl)cyclohexyl)-8-methoxy-1,7-naphthyridin-2-amine (C12)

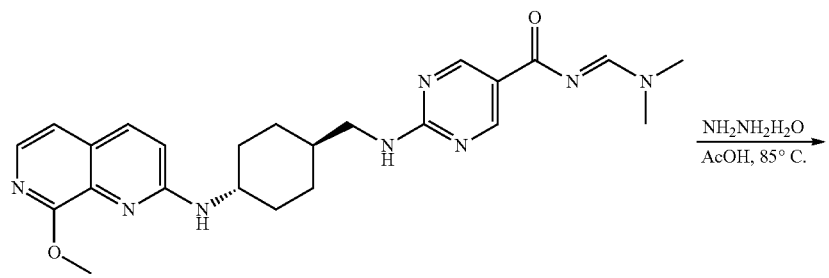

To a solution of (12-1) (50 mg, 0.11 mmol, 1.0 eq) in AcOH (5 mL) was added hydrazine hydrate (127 mg, 2.16 mmol, 20 eq). The reaction was heated at 85° C. for 0.5 hour. Then AcOH was removed under vacuum and the residue was basified by addition of ammonia. The reaction mixture was extracted with EtOAc (30 mL*2) and the organic solvent was dried over anhydrous sodium sulfate, filtered and concentrated under reduced pressure. The crude product was purified by preparative HPLC (column: Waters XSE-LECT C18 150 mm×30 mm×5 m, gradient: 22-37% B (A=0.05% NH$_3$H$_2$O in water, B=acetonitrile)) to give N-((1,4-trans)-4-(((5-(1H-1,2,4-triazol-5-yl)pyrimidin-2-yl)amino)methyl)cyclohexyl)-8-methoxy-1,7-naphthyridin-2-amine (C12). $^1$H NMR (400 MHz, DMSO-d$_6$): δ ppm 8.81 (s, 2H), 8.39 (br s, 1H), 7.79 (d, J=8.8 Hz, 1H), 7.70-7.60 (m, 2H), 7.11-7.06 (m, 2H), 6.90 (d, J=8.4 Hz, 1H), 3.95 (s, 3H), 3.88 (br s, 1H), 3.24 (t, J=5.6 Hz, 2H), 2.06-2.02 (m, 2H), 1.86-1.82 (m, 2H), 1.60 (br s, 1H), 1.21-1.09 (m, 4H). MS: [M+H]$^+$=432.2.

Example 13

2-(2-((((1,4-trans)-4-((8-methoxy-1,7-naphthyridin-2-yl)amino)cyclohexyl)methyl)amino)pyrimidin-5-yl)-N-(oxetan-3-yl)acetamide (C13)

Step 1: N-((1,4-trans)-4-(((5-iodopyrimidin-2-yl)amino)methyl)cyclohexyl)-8-methoxy-1,7-naphthyridin-2-amine (13-1)

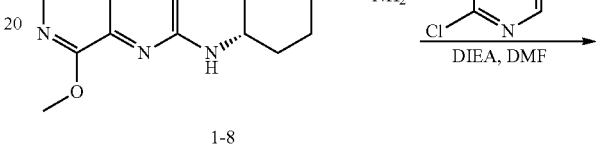

-continued

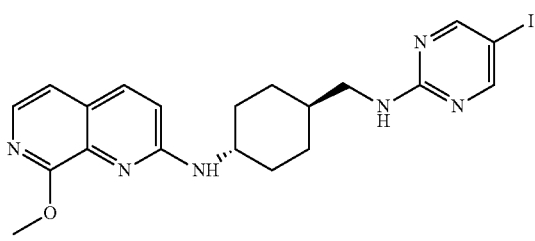

13-1

The title compound was prepared using a procedure similar to that in Step 1 of Example 8, with ethyl 2-chloropyrimidine-5-carboxylate being replaced with 2-chloro-5-iodopyrimidine and the product purified by column chromatography on silica gel (petroleum ether/EtOAc from 5/1 to 1/1) to give N-((1,4-trans)-4-(((5-iodopyrimidin-2-yl)amino)methyl)cyclohexyl)-8-methoxy-1,7-naphthyridin-2-amine (13-1). $^1$H NMR (400 MHz, DMSO-d$_6$): δ ppm 8.39 (s, 2H), 7.78 (d, J=9.2 Hz, 1H), 7.68 (d, J=5.6 Hz, 1H), 7.50 (t, J=6.0 Hz, 1H), 7.09 (d, J=5.6 Hz, 1H), 7.05 (d, J=8.0 Hz, 1H), 6.89 (d, J=8.8 Hz, 1H), 3.95 (s, 3H), 3.88 (br s, 1H), 3.13 (t, J=6.0 Hz, 2H), 2.03-2.00 (m, 2H), 1.81-1.77 (m, 2H), 1.54 (br s, 1H), 1.15-1.05 (m, 4H). MS: [M+H]$^+$=491.1.

Step 2: tert-butyl 2-(2-((((1,4-trans)-4-((8-methoxy-1,7-naphthyridin-2-yl)amino)cyclohexyl)methyl)amino)pyrimidin-5-yl)acetate (13-2)

solution (5 mL), extracted three times with EtOAc (10 mL). The combined organic phase was dried over anhydrous Na$_2$SO$_4$, filtered and concentrated. The crude product was purified by column chromatography on silica gel (petroleum ether/EtOAc from 3/1 to 1/2) to give tert-butyl 2-(2-((((1,4-trans)-4-((8-methoxy-1,7-naphthyridin-2-yl)amino)cyclohexyl)methyl)amino)pyrimidin-5-yl)acetate (13-2)). $^1$H NMR (400 MHz, DMSO-d$_6$): δ ppm 8.13 (s, 2H), 7.78 (d, J=8.8 Hz, 1H), 7.68 (d, J=5.6 Hz, 1H), 7.16 (d, J=6.0 Hz, 1H), 7.09 (d, J=5.2 Hz, 1H), 7.05 (d, J=8.0 Hz, 1H), 6.89 (d, J=9.2 Hz, 1H), 3.95 (s, 3H), 3.88 (br s, 1H), 3.38 (s, 2H), 3.15 (t, J=6.4 Hz, 2H), 2.04-2.01 (m, 2H), 1.83-1.80 (m, 2H), 1.56 (br s, 1H), 1.40 (s, 9H), 1.19-1.06 (m, 4H).

Step 3: 2-(2-((((1,4-trans)-4-((8-methoxy-1,7-naphthyridin-2-yl)amino)cyclohexyl)methyl)amino)pyrimidin-5-yl)acetic acid (13-3)

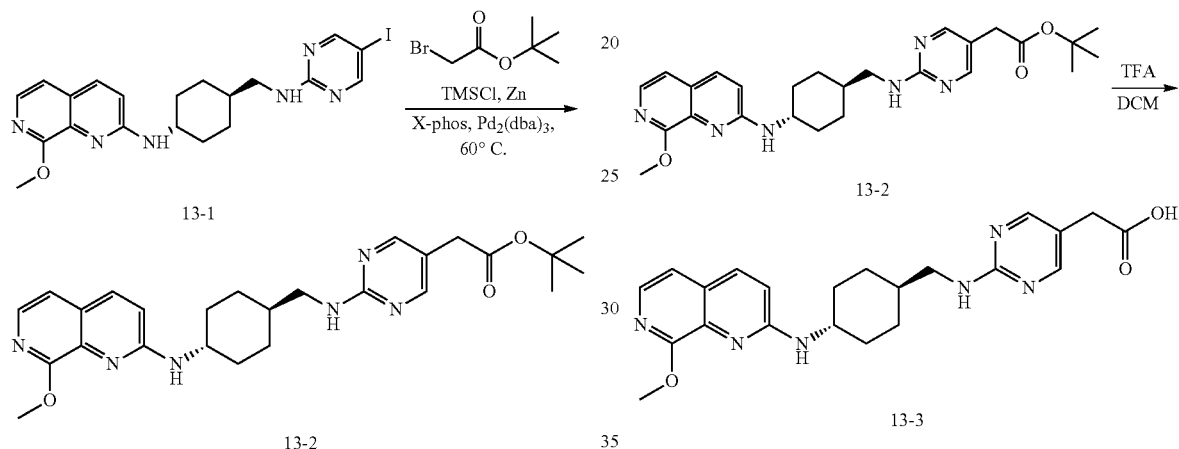

To a mixture of zinc powder (346.7 mg, 5.30 mmol, 20 eq) in THF (8 mL) was added TMSCl (0.1 mL), and the mixture was stirred at 17° C. for 0.5 hour under N$_2$ protection, followed by the dropwise addition of tert-butyl 2-bromoacetate (930.8 mg, 4.77 mmol, 18 eq) over 10 minutes. The resulting mixture was stirred at 17° C. for another 1 hour under nitrogen. Then to the above mixture was added (13-1) (130 mg, 0.27 mmol, 1.0 eq), X-phos (31.6 mg, 0.066 mmol, 0.25 eq) and Pd$_2$(dba)$_3$ (48.6 mg, 0.053 mmol, 0.2 eq). The reaction mixture was stirred at 60° C. for 12 hours under N$_2$. The mixture was quenched with saturated NH$_4$Cl To a solution of (13-2) (100 mg, 0.21 mmol, 1.0 eq) in CH$_2$Cl$_2$ (4 mL) was added TFA (1.0 mL) in portions over 5 minutes. The reaction mixture was stirred at 19° C. for 1.5 hours. The mixture was concentrated to give 2-(2-((((1,4-trans)-4-((8-methoxy-1,7-naphthyridin-2-yl)amino)cyclohexyl)methyl)amino)pyrimidin-5-yl)acetic acid (13-3). MS: [M+H]$^+$=423.0.

Step 4: 2-(2-((((1,4-trans)-4-((8-methoxy-1,7-naphthyridin-2-yl)amino)cyclohexyl)methyl)amino)pyrimidin-5-yl)-N-(oxetan-3-yl)acetamide (C13)

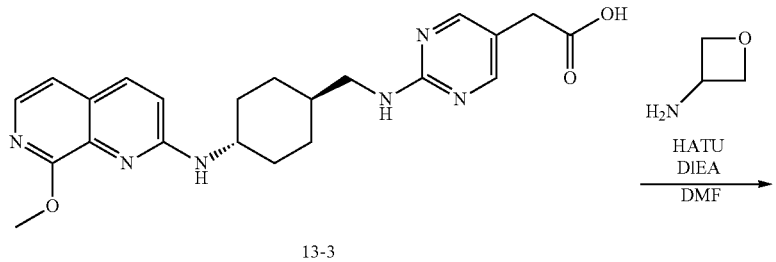

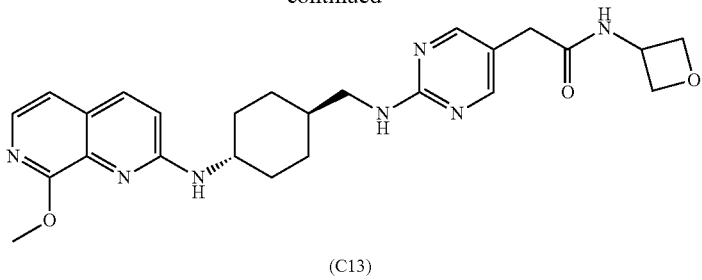

(C13)

To a mixture of (13-3) (80 mg, 0.19 mmol, 1.0 eq) in DMF (4 mL) was added DIEA (97.89 mg, 0.76 mmol, 4.0 eq), followed by the addition of oxetan-3-amine (27.68 mg, 0.38 mmol, 2.0 eq) and HATU (144.0 mg, 0.38 mmol, 2.0 eq). The resulting mixture was stirred at 19° C. for 1.0 hour. The mixture was diluted with water (5 mL), extracted three times with EtOAc (10 mL). The combined organic phase was dried over anhydrous $Na_2SO_4$, filtered and concentrated. The crude product was purified by preparative HPLC (column: DuraShell 150 mm×25 mm×5 um: 22-52% B (A=0.5% $NH_4OH$ in water, B=acetonitrile)) to give 2-(2-((((1,4-trans)-4-((8-methoxy-1,7-naphthyridin-2-yl)amino)cyclohexyl)methyl)amino)pyrimidin-5-yl)-N-(oxetan-3-yl)acetamide (C13). $^1H$ NMR (400 MHz, DMSO-$d_6$): δ ppm 8.80 (d, J=6.4 Hz, 1H), 8.12 (s, 2H), 7.78 (d, J=8.8 Hz, 1H), 7.68 (d, J=5.6 Hz, 1H), 7.12 (d, J=6.0 Hz, 1H), 7.09 (d, J=5.6 Hz, 1H), 7.05 (d, J=7.6 Hz, 1H), 6.89 (d, J=8.8 Hz, 1H), 4.80-4.74 (m, 1H), 4.70 (t, J=6.0 Hz, 2H), 4.41 (t, J=6.4 Hz, 2H), 3.95 (s, 3H), 3.87 (br s, 1H), 3.24 (s, 2H), 3.15 (t, J=6.4 Hz, 2H), 2.04-2.01 (m, 2H), 1.83-1.79 (m, 2H), 1.55 (br s, 1H), 1.22-1.02 (m, 4H). MS: $[M+H]^+$=478.1.

Example 14

$N^2$-(((1,4-trans)-4-((8-chloro-1,7-naphthyridin-2-yl)amino)cyclohexyl)methyl)pyrimidine-2,5-diamine (C14)

Step 1: 8-chloro-N-((1,4-trans)-4-(((5-nitropyrimidin-2-yl)amino)methyl)cyclohexyl)-1,7-naphthyridin-2-amine (14-1)

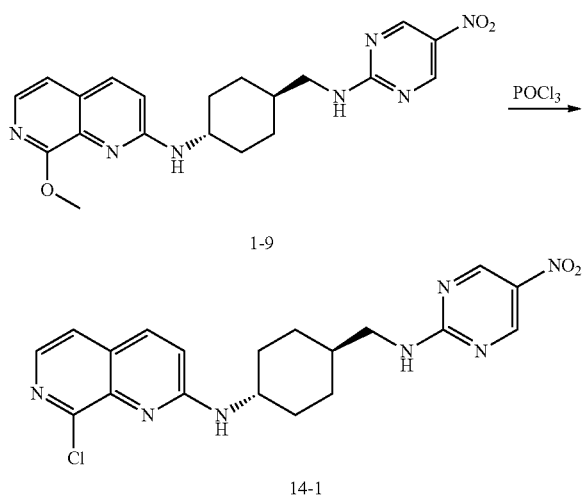

A mixture of (1-9) (160 mg, 0.39 mmol, 1.0 eq) in $POCl_3$ (5 mL) was stirred at 110° C. for 1.5 hours. The solvent was removed and the residue was basified to pH 7-8 with saturated $NaHCO_3$ solution, extracted twice with EtOAc (50 mL). The combined organic layers were dried over anhydrous sodium sulfate and concentrated to give 8-chloro-N-((1,4-trans)-4-(((5-nitropyrimidin-2-yl)amino)methyl)cyclohexyl)-1,7-naphthyridin-2-amine (14-1). MS: $[M+H]^+$=414.0.

Step 2: $N^2$-(((1,4-trans)-4-((8-chloro-1,7-naphthyridin-2-yl)amino)cyclohexyl)methyl)pyrimidine-2,5-diamine (C14)

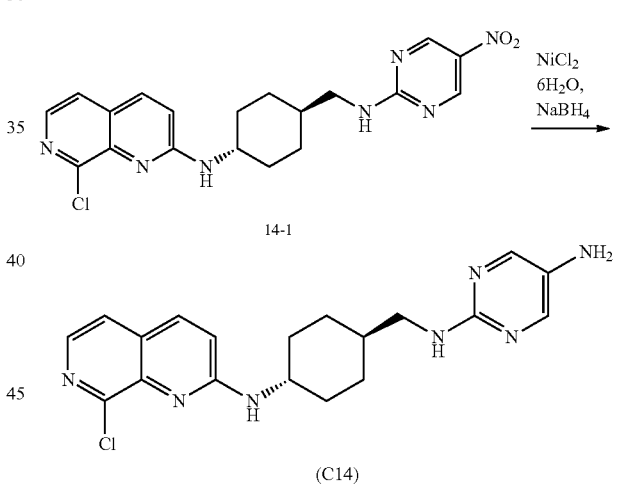

(C14)

To a solution of (14-1) (100 mg, 0.24 mmol, 1.0 eq) in $CH_3OH$ (4 mL) and $CH_2Cl_2$ (1.5 mL) was added $NiCl_2 \cdot 6H_2O$ (114 mg, 0.48 mmol, 2.0 eq) and $NaBH_4$ (36 mg, 0.96 mmol, 4.0 eq). The mixture was stirred at 25° C. for 10 minutes. The reaction mixture was filtered and the filtrate was concentrated under reduced pressure. The crude product was purified by preparative HPLC (column: Phenomenex Gemini C18 250 mm×21.2 mm×5 um, gradient: 32-47% B (A=water, B=acetonitrile)) to give $N^2$-(((1,4-trans)-4-((8-chloro-1,7-naphthyridin-2-yl)amino)cyclohexyl)methyl)pyrimidine-2,5-diamine (C14). $^1H$ NMR (400 MHz, DMSO-$d_6$): δ ppm 7.95 (d, J=5.2 Hz, 1H), 7.91 (d, J=9.2 Hz, 1H), 7.79 (s, 2H), 7.55 (d, J=5.2 Hz, 1H), 7.50 (d, J=7.2 Hz, 1H), 6.99 (d, J=9.2 Hz, 1H), 6.24 (t, J=5.6 Hz, 1H), 4.37 (s, 2H), 3.90 (br s, 1H), 3.07 (t, J=6.4 Hz, 2H), 2.12-2.09 (m, 2H), 1.84-1.80 (m, 2H), 1.55 (br s, 1H), 1.22-1.00 (m, 4H). MS: $[M+H]^+$=384.1.

Example 15

Methyl (2-((((1,4-trans)-4-((8-chloro-1,7-naphthyridin-2-yl)amino)cyclohexyl)methyl)amino)pyrimidin-5-yl)carbamate (C15)

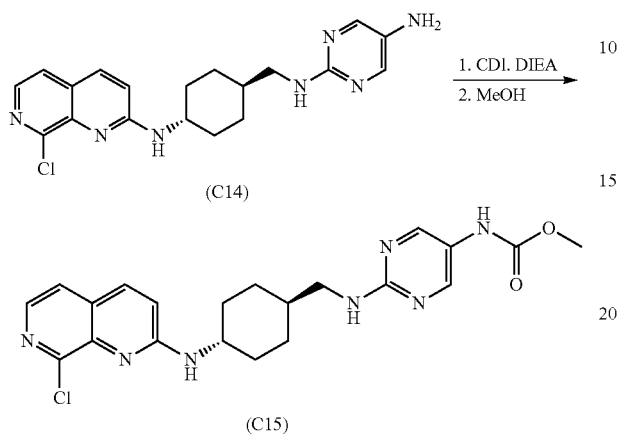

To a solution of (C14) (100 mg, 0.26 mmol, 1.0 eq) in CH$_2$Cl$_2$ (5 mL) was added CDI (carbonyl diimidazole, 168 mg, 1.04 mmol, 5.0 eq) and DIEA (134 mg, 1.04 mmol, 5.0 eq). The mixture was stirred at 25° C. for 2 hours. Then CH$_3$OH (5 mL) was added and stirred at 25° C. for 20 minutes. The reaction mixture was concentrated under reduced pressure. The crude product was purified by preparative HPLC (column: Waters Xbridge Prep OBD C18 150 mm×30 mm×5 um, gradient: 31-61% B (A=0.5% NH$_4$HCO$_3$ in water, B=acetonitrile)) to give methyl (2-((((1,4-trans)-4-((8-chloro-1,7-naphthyridin-2-yl)amino)cyclohexyl)methyl)amino) pyrimidin-5-yl)carbamate (C15). $^1$H NMR (400 MHz, DMSO-d$_6$): δ ppm 9.27 (s, 1H), 8.27 (s, 2H), 7.96 (d, J=5.2 Hz, 1H), 7.91 (d, J=8.8 Hz, 1H), 7.56-7.52 (m, 2H), 7.11 (br s, 1H), 6.99 (d, J=9.2 Hz, 1H), 3.91 (br s, 1H), 3.63 (s, 3H), 3.14 (t, J=6.4 Hz, 2H), 2.13-2.11 (m, 2H), 1.85-1.82 (m, 2H), 1.57 (br s, 1H), 1.24-1.15 (m, 2H), 1.14-1.03 (m, 2H). MS: [M+H]$^+$=442.2.

Example 16

2-methoxyethyl (2-((((1,4-trans)-4-((8-chloro-1,7-naphthyridin-2-yl)amino)cyclohexyl)methyl)amino)pyrimidin-5-yl)carbamate (C16)

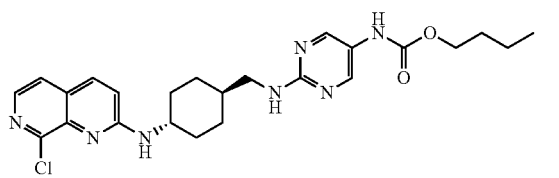

The title compound was prepared by using a procedure similar to that of Example 15, with methanol being replaced with 2-methoxyethan-1-ol. $^1$H NMR (400 MHz, DMSO-d$_6$): δ ppm 9.36 (s, 1H), 8.27 (s, 2H), 7.95 (d, J=5.2 Hz, 1H), 7.91 (d, J=9.2 Hz, 1H), 7.55 (d, J=5.2 Hz, 1H), 7.50 (d, J=7.2 Hz, 1H), 7.08 (br s, 1H), 6.99 (d, J=8.8 Hz, 1H), 4.17 (t, J=4.8 Hz, 2H), 3.90 (br s, 1H), 3.54 (t, J=4.8 Hz, 2H), 3.27 (s, 3H), 3.14 (t, J=6.4 Hz, 2H), 2.13-2.11 (m, 2H), 1.85-1.82 (m, 2H), 1.57 (br s, 1H), 1.25-1.03 (m, 4H). MS: [M+H]$^+$=486.2.

Example 17

2-hydroxyethyl (2-((((1,4-trans)-4-((8-chloro-1,7-naphthyridin-2-yl)amino)cyclohexyl)methyl)amino)pyrimidin-5-yl)carbamate (C17)

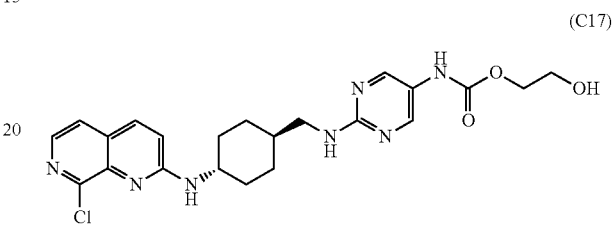

The title compound was prepared by using a procedure similar to that of Example 15, with methanol being replaced with ethane-1,2-diol. $^1$H NMR (400 MHz, DMSO-d$_6$): δ ppm 9.31 (s, 1H), 8.27 (s, 2H), 7.96 (d, J=4.8 Hz, 1H), 7.91 (d, J=8.8 Hz, 1H), 7.55 (d, J=5.2 Hz, 1H), 7.51 (d, J=7.2 Hz, 1H), 7.08 (d, J=5.6 Hz, 1H), 6.99 (d, J=9.2 Hz, 1H), 4.83 (t, J=5.2 Hz, 1H), 4.07 (t, J=5.2 Hz, 2H), 3.90 (br s, 1H), 3.61-3.58 (m, 2H), 3.14 (t, J=6.4 Hz, 2H), 2.13-2.10 (m, 2H), 1.85-1.82 (m, 2H), 1.57 (br s, 1H), 1.29-1.15 (m, 2H), 1.13-1.03 (m, 2H). MS: [M+H]$^+$=472.1.

Example 18

Oxetan-3-ylmethyl (2-((((1,4-trans)-4-((8-chloro-1,7-naphthyridin-2-yl)amino)cyclohexyl)methyl)amino)pyrimidin-5-yl)carbamate (C18)

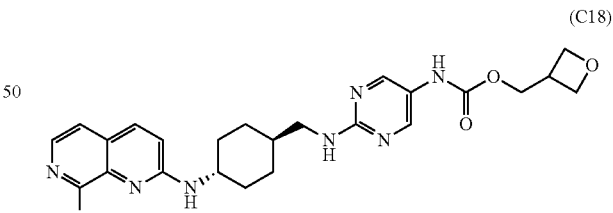

The title compound was prepared by using a procedure similar to that of Example 15, with methanol being replaced with oxetan-3-ylmethanol. $^1$H NMR (400 MHz, DMSO-d$_6$): δ ppm 9.35 (s, 1H), 8.28 (s, 2H), 7.96 (d, J=5.2 Hz, 1H), 7.91 (d, J=8.8 Hz, 1H), 7.56 (d, J=5.2 Hz, 1H), 7.51 (d, J=7.2 Hz, 1H), 7.10 (t, J=6.0 Hz, 1H), 6.99 (d, J=8.4 Hz, 1H), 4.66 (t, J=6.0 Hz, 2H), 4.38 (t, J=6.0 Hz, 2H), 4.27 (d, J=6.4 Hz, 2H), 3.91 (br s, 1H), 3.29-3.24 (m, 1H), 3.14 (t, J=6.0 Hz, 2H), 2.13-2.11 (m, 2H), 1.85-1.82 (m, 2H), 1.57 (br s, 1H), 1.25-1.19 (m, 2H), 1.16-1.06 (m, 2H). MS: [M+H]$^+$=498.2.

Example 19

N-(2-((((1,4-trans)-4-((8-chloro-1,7-naphthyridin-2-yl)amino)cyclohexyl)methyl)amino)pyrimidin-5-yl)-2-hydroxyacetamide (C19)

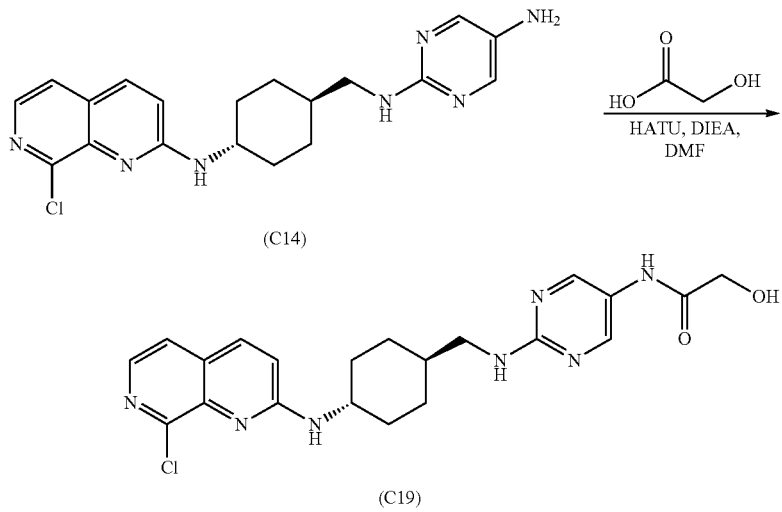

The title compound was prepared using a procedure similar to that in Step 1 of Example 2, with (C1) being replaced with (C14) and 1-(tert-butoxycarbonyl)azetidine-3-carboxylic acid being replaced with 2-hydroxyacetic acid. The product was purified by preparative HPLC (column: Phenomenex Gemini C18 250 mm×21.2 mm×5 um, gradient: 20-50% B (A=0.5% $NH_4HCO_3$ in water, B=acetonitrile)) to give N-(2-((((1,4-trans)-4-((8-chloro-1,7-naphthyridin-2-yl)amino)cyclohexyl)methyl)amino)pyrimidin-5-yl)-2-hydroxyacetamide (C19). $^1$H NMR (400 MHz, DMSO-$d_6$): δ ppm 9.59 (s, 1H), 8.45 (s, 2H), 7.96 (d, J=5.2 Hz, 1H), 7.91 (d, J=8.8 Hz, 1H), 7.56-7.51 (m, 2H), 7.13 (t, J=6.0 Hz, 1H), 7.00 (d, J=8.4 Hz, 1H), 5.74 (t, J=6.4 Hz, 1H), 3.96 (d, J=6.0 Hz, 2H), 3.90 (br s, 1H), 3.15 (t, J=6.4 Hz, 2H), 2.14-2.11 (m, 2H), 1.85-1.82 (m, 2H), 1.58 (br s, 1H), 1.25-1.03 (m, 4H). MS: $[M+H]^+$=442.1.

Example 20

N-(2-((((1,4-trans)-4-((8-chloro-1,7-naphthyridin-2-yl)amino)cyclohexyl)methyl)amino)pyrimidin-5-yl)-4-morpholino-4-oxobutanamide (C20)

Step 1: 4-((2-((((1,4-trans)-4-((8-chloro-1,7-naphthyridin-2-yl)amino)cyclohexyl)methyl)amino)pyrimidin-5-yl)amino)-4-oxobutanoic acid (20-1)

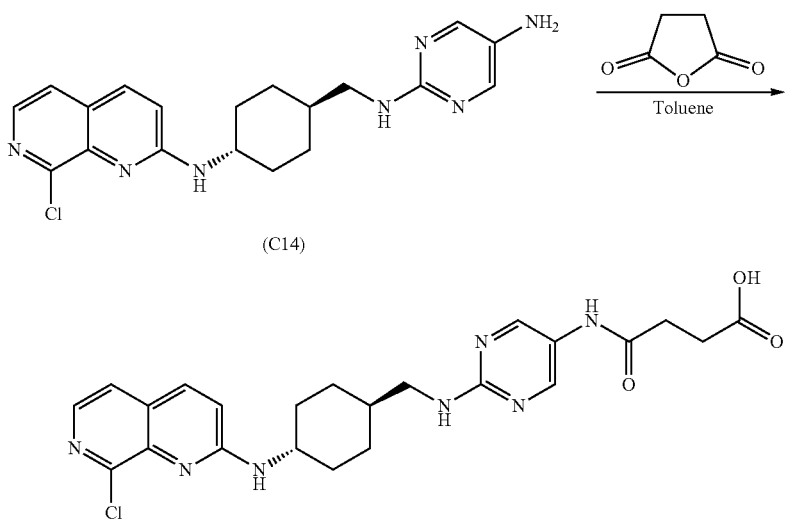

To a solution of (C14) (20 mg, 0.05 mmol, 1.0 eq) in toluene (4 mL) was added dihydrofuran-2,5-dione (11 mg, 0.1 mmol, 2.0 eq). The mixture was stirred at 110° C. for 30 minutes. The reaction mixture was concentrated under reduced pressure to give 4-((2-((((1,4-trans)-4-((8-chloro-1,7-naphthyridin-2-yl)amino)cyclohexyl)methyl)amino)pyrimidin-5-yl)amino)-4-oxobutanoic acid (20-1). MS: [M+H]$^+$=484.2.

Step 2: N-(2-((((1,4-trans)-4-((8-chloro-1,7-naphthyridin-2-yl)amino)cyclohexyl)methyl)amino)pyrimidin-5-yl)-4-morpholino-4-oxobutanamide (C20)

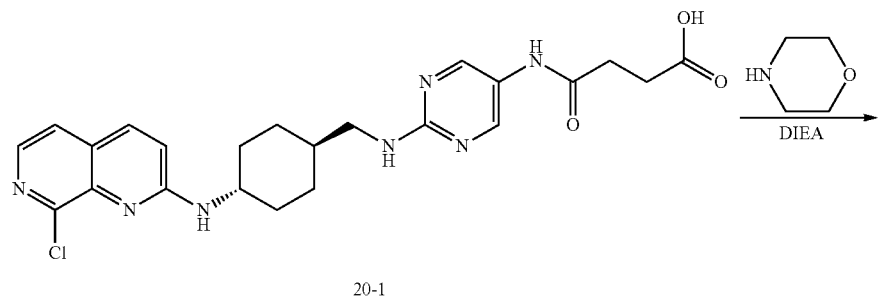

20-1

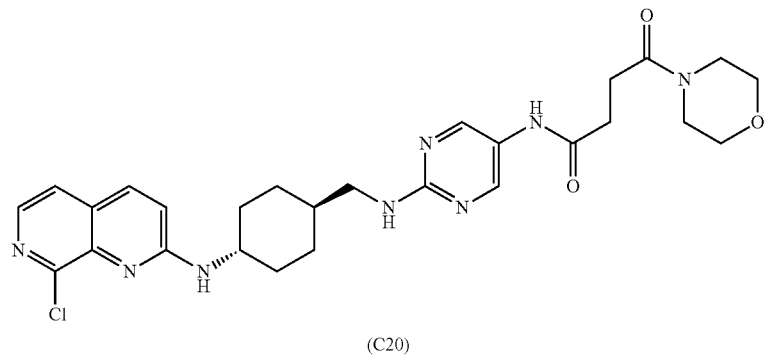

(C20)

The title compound was prepared by using a procedure similar to that in Step 4 of Example 13, with (13-3) being replaced with (20-1) and oxetan-3-amine being replaced with morpholine. The product was purified by preparative HPLC (column: Waters Xbridge Prep OBD C18 150 mm×30 mm×5 um, gradient: 25-55% B (A=0.5% NH$_4$HCO$_3$ in water, B=acetonitrile)) to give N-(2-((((1,4-trans)-4-((8-chloro-1,7-naphthyridin-2-yl)amino)cyclohexyl)methyl) amino)pyrimidin-5-yl)-4-morpholino-4-oxobutanamide (C20). $^1$H NMR (400 MHz, DMSO-d$_6$): δ ppm 9.76 (s, 1H), 8.39 (s, 2H), 7.96 (d, J=5.2 Hz, 1H), 7.91 (d, J=8.8 Hz, 1H), 7.56 (d, J=5.2 Hz, 1 Hz), 7.51 (d, J=7.6 Hz, 1 Hz), 7.08 (t, J=5.6 Hz, 1H), 6.99 (d, J=8.8 Hz, 1H), 3.91 (br s, 1H), 3.59-3.52 (m, 4H), 3.47-3.42 (m, 4H), 3.15 (t, J=6.0 Hz, 2H), 2.61 (t, J=6.0 Hz, 2H), 2.53 (t, J=6.0 Hz, 2H), 2.13-2.11 (m, 2H), 1.85-1.82 (m, 2H), 1.57 (br s, 1H), 1.23-1.16 (m, 2H), 1.13-1.07 (m, 2H). MS: [M+H]$^+$=553.1.

Example 21

2-((((1,4-trans)-4-((8-chloro-1,7-naphthyridin-2-yl)amino)cyclohexyl)methyl)amino)pyrimidine-5-carbonitrile (C21)

Step 1: 2-(((1,4-trans)-4-(aminomethyl)cyclohexyl)amino)-1,7-naphthyridin-8-ol (21-1)

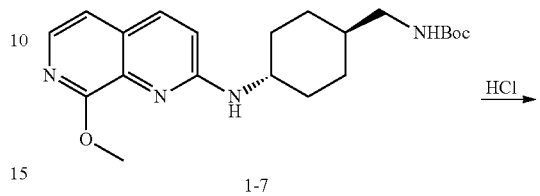

1-7

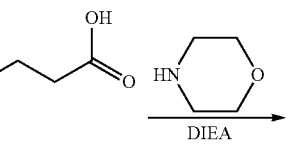

-continued

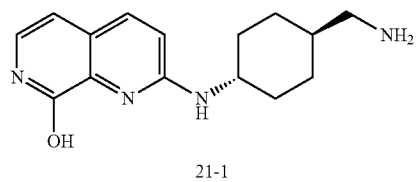

21-1

To a solution of (1-7) (350 mg, 0.90 mmol, 1.0 eq) in EtOAc (5 mL) was added HCl/EtOAc (5 mL, 4N) and the mixture was stirred at 25° C. for 1 hour. The mixture was concentrated to give 2-(((1,4-trans)-4-(aminomethyl)cyclohexyl)amino)-1,7-naphthyridin-8-ol (21-1), which was used in the next step without further purification. MS: [M+H]$^+$ =273.3.

Step 2: 2-((((1,4-trans)-4-((8-hydroxy-1,7-naphthyridin-2-yl)amino)cyclohexyl)methyl)amino)pyrimidine-5-carbonitrile (21-2)

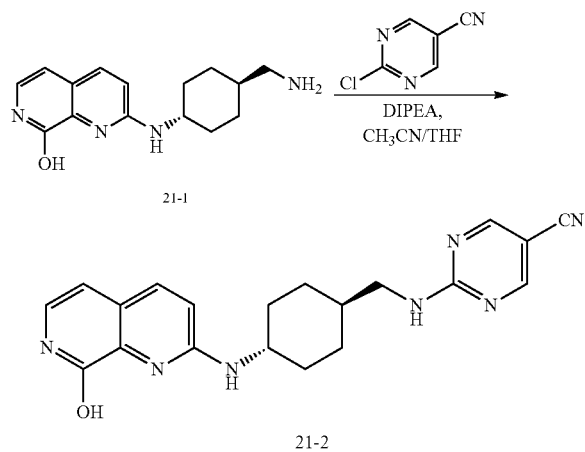

The title compound was prepared by using a procedure similar to that in Step 9 of Example 1, with (1-8) being replaced with (21-1) and 2-chloro-5-nitropyrimidine being replaced with 2-chloropyrimidine-5-carbonitrile. The product was purified by column chromatography (petroleum ether/EtOAc from 1/1 to 0/100, then CH$_2$Cl$_2$/CH$_3$OH 20/1) to give 2-((((1,4-trans)-4-((8-hydroxy-1,7-naphthyridin-2-yl)amino)cyclohexyl)methyl)amino)pyrimidine-5-carbonitrile (21-2). H NMR (400 MHz, DMSO-d$_6$): δ ppm 11.17 (d, J=4.4 Hz, 1H), 8.71 (d, J=2.8 Hz, 1H), 8.63 (d, J=3.2 Hz, 1H), 8.42 (t, J=6.0 Hz, 1H), 7.62 (d, J=8.8 Hz, 1H), 6.87 (t, J=6.4 Hz, 1H), 6.82 (d, J=8.0 Hz, 1H), 6.79 (d, J=8.8 Hz, 1H), 6.29 (d, J=6.4 Hz, 1H), 3.86 (br s, 1H), 3.22 (t, J=6.4 Hz, 2H), 2.01-1.98 (m, 2H), 1.88-1.70 (m, 2H), 1.57 (br s, 1H), 1.18-1.03 (m, 4H). MS: [M+H]$^+$=376.0.

Step 3: 2-((((1,4-trans)-4-((8-chloro-1,7-naphthyridin-2-yl)amino)cyclohexyl)methyl)amino)pyrimidine-5-carbonitrile (C21)

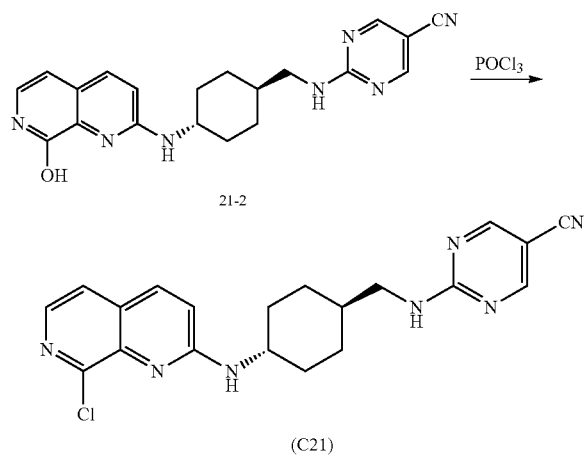

A mixture of (21-2) (350 mg, 0.93 mmol, 1.0 eq) in POCl$_3$ (5 mL) was stirred at 110° C. for 2 hours. The solvent was removed and the residue was basified to pH 7-8 with saturated NaHCO$_3$ solution, extracted twice with EtOAc (50 mL). The combined organic layers were dried over anhydrous sodium sulfate and concentrated to give the crude product (280 mg). The crude product (40 mg) was purified by preparative HPLC (column: Phenomenex Gemini C18 200 mm×21.2 mm×5 um, gradient: 40-70% B (A=water, B=acetonitrile)) to give 2-((((1,4-trans)-4-((8-chloro-1,7-naphthyridin-2-yl)amino)cyclohexyl)methyl)amino)pyrimidine-5-carbonitrile (C21). $^1$H NMR (400 MHz, DMSO-d$_6$): δ ppm 8.71 (d, J=2.8 Hz, 1H), 8.63 (d, J=3.2 Hz, 1H), 8.42 (t, J=6.0 Hz, 1H), 7.96 (d, J=5.2 Hz, 1H), 7.91 (d, J=9.2 Hz, 1H), 7.56 (d, J=5.2 Hz, 1H), 7.52 (d, J=7.2 Hz, 1H), 6.99 (d, J=8.8 Hz, 1H), 3.90 (br s, 1H), 3.24 (t, J=6.4 Hz, 2H), 2.14-2.11 (m, 2H), 1.83-1.80 (m, 2H), 1.59 (br s, 1H), 1.25-1.06 (m, 4H). MS: [M+H]$^+$=394.1.

Example 22

(2-((((1,4-trans)-4-((8-chloro-1,7-naphthyridin-2-yl)amino)cyclohexyl)methyl)amino)pyrimidin-5-yl)(morpholino)methanone (C22)

Step 1: 2-((((1,4-trans)-4-((8-chloro-1,7-naphthyridin-2-yl)amino)cyclohexyl)methyl)amino)pyrimidine-5-carbonyl Chloride (22-1)

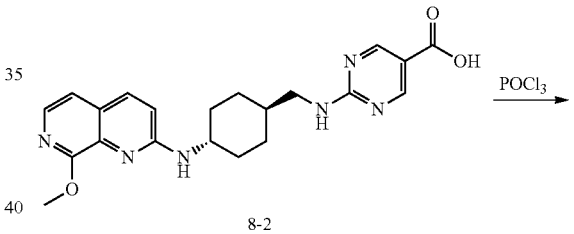

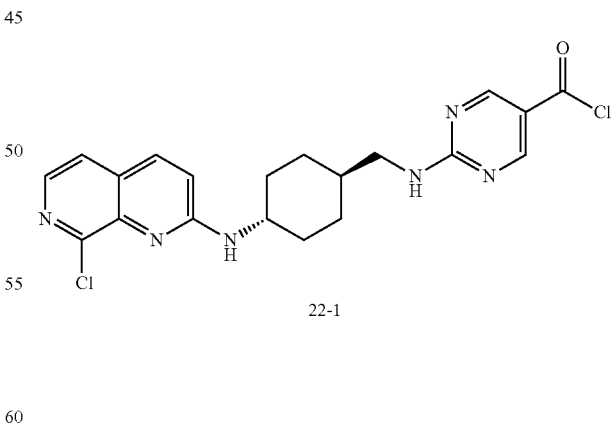

A solution of (8-2) (140 mg, 0.34 mmol, 1.0 eq) in POCl$_3$ (3 mL) was stirred at 110° C. for 2 hours. The mixture was concentrated to give 2-((((1,4-trans)-4-((8-chloro-1,7-naphthyridin-2-yl)amino)cyclohexyl)methyl)amino)pyrimidine-5-carbonyl chloride (22-1), which was used in the next step without further purification.

Step 2: (2-((((1,4-trans)-4-((8-chloro-1,7-naphthyridin-2-yl)amino)cyclohexyl)methyl)amino)pyrimidin-5-yl)(morpholino)methanone (C22)

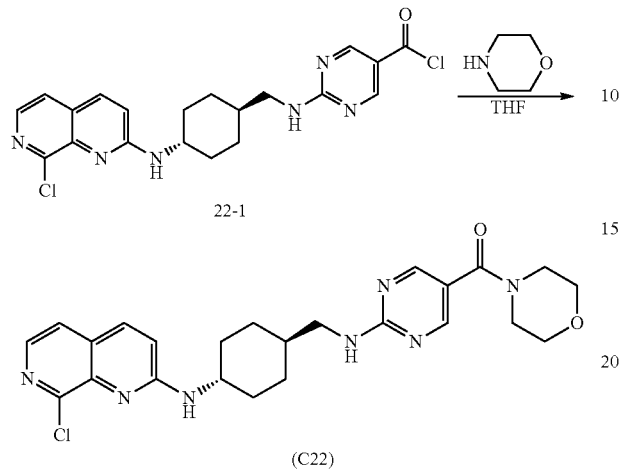

To a solution of morpholine (2 mL) in THF (10 mL) was added dropwise a suspension of (22-1) (70 mg, 0.16 mmol, 1.0 eq) in THF (10 mL) for 10 minutes. The reaction mixture was stirred at 15° C. for 10 minutes. Then the mixture was concentrated to give the crude product which was purified by preparative HPLC (column: Phenomenex Gemini C18 250 mm×21.2 mm×5 um: 29-59% B (A=0.5% NH$_4$HCO$_3$ in water, B=acetonitrile)) to give (2-((((1,4-trans)-4-((8-chloro-1,7-naphthyridin-2-yl)amino)cyclohexyl)methyl)amino)pyrimidin-5-yl)(morpholino)methanone (C22). $^1$H NMR (400 MHz, DMSO-d$_6$): δ ppm 8.40 (s, 1H), 8.36 (s, 1H), 7.96 (d, J=5.2 Hz, 1H), 7.91 (d, J=8.8 Hz, 1H), 7.80 (t, J=6.0 Hz, 1H), 7.56 (d, J=5.2 Hz, 1H), 7.52 (d, J=7.2 Hz, 1H), 7.00 (d, J=8.4 Hz, 1H), 3.91 (br s, 1H), 3.60-3.59 (m, 4H), 3.53-3.52 (m, 4H), 3.21 (t, J=6.4 Hz, 2H), 2.14-2.12 (m, 2H), 1.86-1.83 (m, 2H), 1.59 (br s, 1H), 1.26-1.06 (m, 4H). MS: [M+H]$^+$=482.1.

Example 23

(2-((((1,4-trans)-4-((8-chloro-1,7-naphthyridin-2-yl)amino)cyclohexyl)methyl)amino)pyrimidin-5-yl)(4-methylpiperazin-1-yl)methanone (C23)

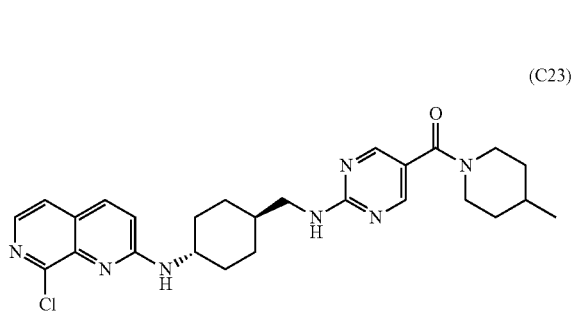 [SMILES: CC1CCN(C(=O)c2cnc(NC[C@H]3CC[C@H](Nc4ccc5ccnc(Cl)c5n4)CC3)nc2)CC1]

The title compound was prepared by using a procedure similar to that in Step 2 of Example 22, with morpholine being replaced with 1-methylpiperazine. $^1$H NMR (400 MHz, DMSO-d$_6$): δ ppm 8.37 (s, 1H), 8.33 (s, 1H), 7.96 (d, J=5.2 Hz, 1H), 7.91 (d, J=8.8 Hz, 1H), 7.78 (t, J=6.0 Hz, 1H), 7.56 (d, J=5.2 Hz, 1H), 7.52 (d, J=7.2 Hz, 1H), 7.00 (d, J=8.8 Hz, 1H), 3.91 (br s, 1H), 3.60-3.46 (m, 4H), 3.21 (t, J=6.4 Hz, 2H), 2.35-2.30 (m, 4H), 2.19 (s, 3H), 2.15-2.12 (m, 2H), 1.86-1.83 (m, 2H), 1.60 (br s, 1H), 1.26-1.06 (m, 4H). MS: [M+H]$^+$=495.1. IC$_{50}$ value in the EZH2 (a) LC-Qualified was >100 μM.

Example 24

(2-((((1,4-trans)-4-((8-chloro-1,7-naphthyridin-2-yl)amino)cyclohexyl)methyl)amino)pyrimidin-5-yl)(piperazin-1-yl)methanone (C24)

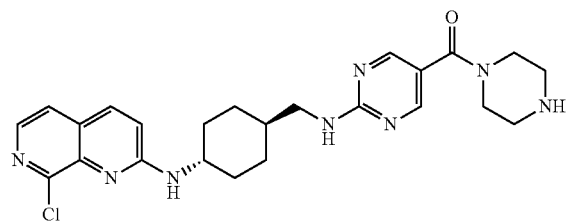

The title compound was prepared by using a procedure similar to that in Step 2 of Example 22, with morpholine being replaced with piperazine. $^1$H NMR (400 MHz, DMSO-d$_6$): δ ppm 8.36 (s, 1H), 8.32 (s, 1H), 7.96 (d, J=5.2 Hz, 1H), 7.91 (d, J=8.8 Hz, 1H), 7.76 (t, J=5.6 Hz, 1H), 7.56-7.52 (m, 2H), 7.00 (d, J=8.8 Hz, 1H), 3.90 (br s, 1H), 3.43 (br s, 4H), 3.21 (t, J=6.4 Hz, 2H), 2.75-2.65 (m, 4H), 2.14-2.12 (m, 2H), 1.86-1.83 (m, 2H), 1.61 (br s, 1H), 1.28-1.05 (m, 4H). MS: [M+H]$^+$=481.1.

Example 25

2-((((1,4-trans)-4-((8-chloro-1,7-naphthyridin-2-yl)amino)cyclohexyl)methyl)amino)-N-(oxetan-3-yl)pyrimidine-5-carboxamide (C25)

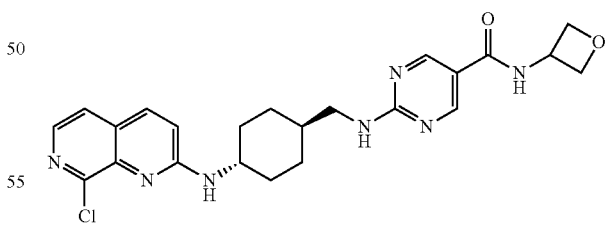

The title compound was prepared by using a procedure similar to that in Step 2 of Example 22, with morpholine being replaced with oxetan-3-amine. $^1$H NMR (400 MHz, DMSO-d$_6$): δ ppm 8.88 (d, J=6.8 Hz, 1H), 8.71 (d, J=9.2 Hz, 2H), 7.97-7.90 (m, 3H), 7.56-7.51 (m, 2H), 6.99 (d, J=9.2 Hz, 1H), 5.00-4.95 (m, 1H), 4.76 (t, J=6.4 Hz, 2H), 4.55 (t, J=6.4 Hz, 2H), 3.90 (br s, 1H), 3.24 (t, J=6.4 Hz, 2H), 2.14-2.12 (m, 2H), 1.85-1.82 (m, 2H), 1.60 (br s, 1H), 1.26-1.07 (m, 4H). MS: [M+H]$^+$=468.0.

Example 26

8-chloro-N-((1,4-trans)-4-(((5-((4-(methylsulfonyl)piperazin-1-yl)methyl)pyrimidin-2-yl)amino)methyl)cyclohexyl)-1,7-naphthyridin-2-amine (C26)

Step 1: N-((1,4-trans)-4-(aminomethyl)cyclohexyl)-8-chloro-1,7-naphthyridin-2-amine (26-1)

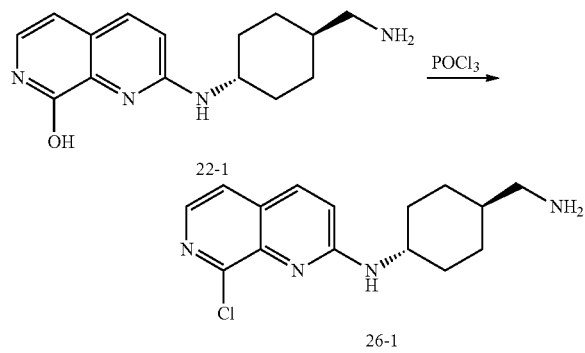

A solution of (21-1) (290 mg, 1.081 mmol, 1.0 eq) in POCl$_3$ (8 mL) was stirred at 110° C. for 5 hours. Then the mixture was concentrated and the residue was basified with NH$_3$—H$_2$O to pH 7-8. The crude product was purified by preparative HPLC (column: Phenomenex Gemini C18 250 mm×21.2 mm×5 um: 45-75% B (A=0.5% NH$_4$OH in water, B=methanol)) to give N-((1,4-trans)-4-(aminomethyl)cyclohexyl)-8-chloro-1,7-naphthyridin-2-amine (26-1). MS: [M+H]$^+$=290.9.

Step 2: Ethyl 2-((((1,4-trans)-4-((8-chloro-1,7-naphthyridin-2-yl)amino)cyclohexyl)methyl)amino)pyrimidine-5-carboxylate (26-2)

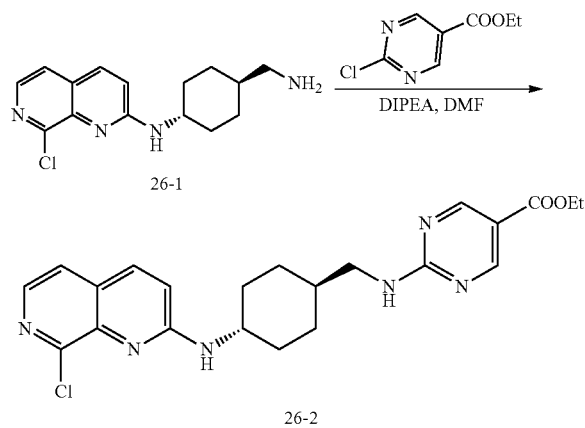

The title compound was prepared by using a procedure similar to that of in Step 1 of Example 8, and purified by column chromatography on silica gel (petroleum ether/EtOAc from 3/1 to 3/2) to give ethyl 2-((((1,4-trans)-4-((8-chloro-1,7-naphthyridin-2-yl)amino)cyclohexyl)methyl)amino)pyrimidine-5-carboxylate (26-2). $^1$H NMR (400 MHz, DMSO-d$_6$): δ ppm 8.75 (d, J=2.8 Hz, 1H), 8.69 (d, J=2.8 Hz, 1H), 8.20 (t, J=6.0 Hz, 1H), 7.96 (d, J=5.2 Hz, 1H), 7.91 (d, J=9.2 Hz, 1H), 7.55 (d, J=5.2 Hz, 1H), 7.51 (d, J=7.2 Hz, 1H), 6.99 (d, J=9.2 Hz, 1H), 4.25 (q, J=7.2 Hz, 2H), 3.91 (br s, 1H), 3.26 (t, J=6.4 Hz, 2H), 2.14-2.11 (m, 2H), 1.84-1.81 (m, 2H), 1.60 (br s, 1H), 1.28 (t, J=7.2 Hz, 3H), 1.22-1.15 (m, 2H), 1.12-1.06 (m, 2H). MS: [M+H]$^+$=441.1.

Step 3: (2-((((1,4-trans)-4-((8-chloro-1,7-naphthyridin-2-yl)amino)cyclohexyl)methyl)amino)pyrimidin-5-yl)methanol (26-3)

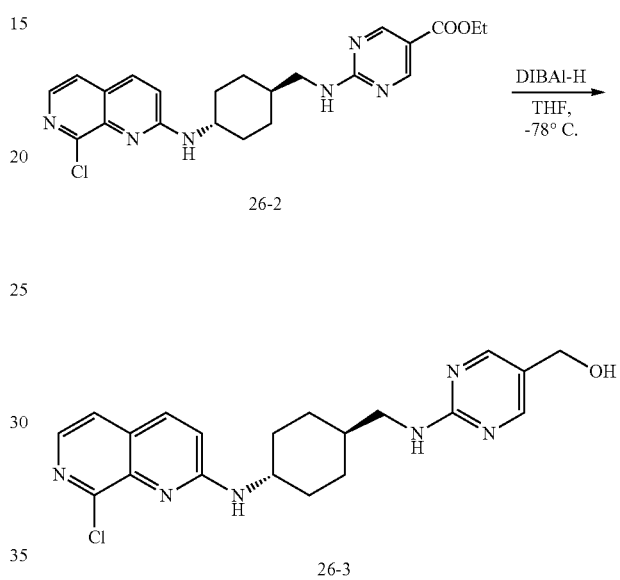

To a solution of (26-2) (40 mg, 0.09 mmol, 1.0 eq) in THF (5 mL) was added dropwise DIBAL-H (0.45 mL, 0.45 mmol, 5.0 eq) at −78° C. The reaction mixture was stirred at 20° C. for 2 hours. Then the mixture was quenched with aqueous NH$_4$Cl (10 mL), filtered and the filtrate was extracted three times with EtOAc (20 mL). The organic layer was washed with brine, dried over anhydrous Na$_2$SO$_4$, filtered and concentrated to give (2-((((1,4-trans)-4-((8-chloro-1,7-naphthyridin-2-yl)amino)cyclohexyl)methyl)amino)pyrimidin-5-yl)methanol (26-3). MS: [M+H]$^+$=399.1.

Step 4: 2-((((1,4-trans)-4-((8-chloro-1,7-naphthyridin-2-yl)amino)cyclohexyl)methyl)amino)pyrimidine-5-carbaldehyde (26-4)

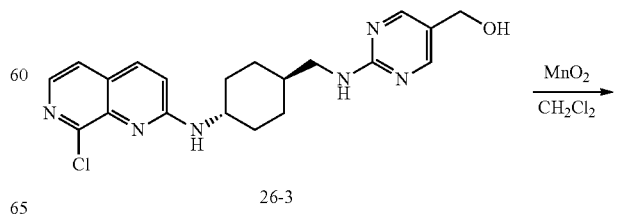

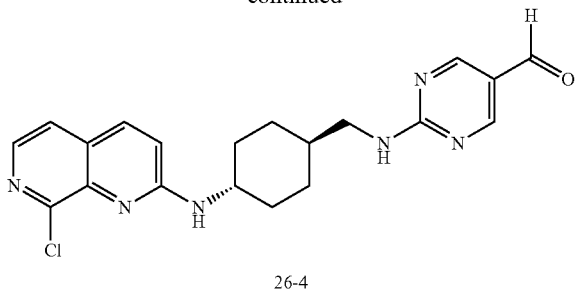

26-4

To a solution of (26-3) (33 mg, 0.08 mmol, 1.0 eq) in CH$_2$Cl$_2$ (5 mL) was added MnO$_2$ (72 mg, 0.8 mmol, 10.0 eq). The reaction mixture was stirred at 45° C. for 2 hours. Then filtered, the filtrate was concentrated to give 2-((((1,4-trans)-4-((8-chloro-1,7-naphthyridin-2-yl)amino)cyclohexyl)methyl)amino)pyrimidine-5-carbaldehyde (26-4). MS: [M+H]$^+$=397.2.

Step 5: 8-chloro-N-((1,4-trans)-4-(((5-((4-(methylsulfonyl)piperazin-1-yl)methyl)pyrimidin-2-yl)amino)methyl)cyclohexyl)-1,7-naphthyridin-2-amine (C26)

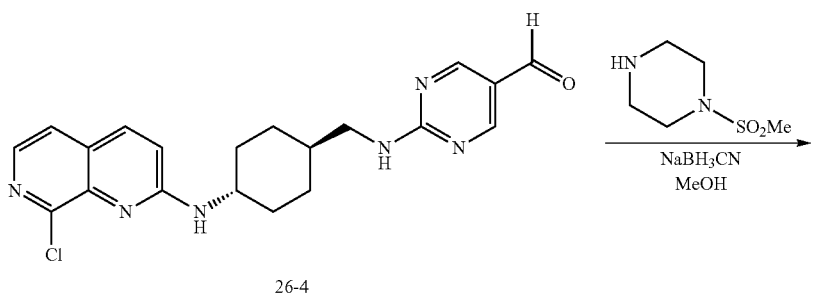

26-4

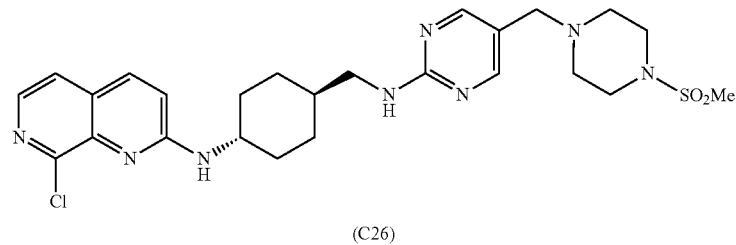

(C26)

To a solution of (26-4) (50 mg, 0.126 mmol, 1.0 eq) in MeOH (3 mL) was added 1-(methylsulfonyl)piperazine (41 mg, 0.252 mmol, 2.0 eq) and NaBH$_3$CN (40 mg, 0.63 mmol, 5.0 eq). The mixture was stirred at 25° C. for 4 hours. The reaction mixture was quenched with aqueous NaHCO$_3$ (10 mL), extracted three times with CH$_2$Cl$_2$ (20 mL). The organic layer was dried over anhydrous Na$_2$SO$_4$, filtered and concentrated to give the crude product which was purified by preparative HPLC (column: DuraShell 150 mm×25 mm×5 um: 33-63% B (A=0.05% ammonia hydroxide in water, B=acetonitrile)) to give 8-chloro-N-((1,4-trans)-4-(((5-((4-(methylsulfonyl)piperazin-1-yl)methyl)pyrimidin-2-yl)amino)methyl)cyclohexyl)-1,7-naphthyridin-2-amine (C26). $^1$H NMR (400 MHz, DMSO-d$_6$): δ ppm 8.16 (s, 2H), 7.96 (d, J=5.2 Hz, 1H), 7.91 (d, J=9.2 Hz, 1H), 7.56 (d, J=5.2 Hz, 1H), 7.51 (d, J=6.8 Hz, 1H), 7.22 (t, J=6.0 Hz, 1H), 6.99 (d, J=9.2 Hz, 1H), 3.90 (br s, 1H), 3.32 (s, 2H), 3.16 (t, J=6.4 Hz, 2H), 3.11-3.08 (m, 4H), 2.86 (s, 3H), 2.44-2.42 (m, 4H), 2.14-2.11 (m, 2H), 1.85-1.82 (m, 2H), 1.58 (br s, 1H), 1.25-1.16 (m, 2H), 1.13-1.04 (m, 2H). MS: [M+H]$^+$=545.3.

The following compounds, as identified in Table 1, were prepared using the general procedures as well as the procedures from the examples described above with the appropriate starting materials and reagents.

TABLE 1

| Ex # | Structure and Compound Name | ¹H NMR and MS Data |
|---|---|---|
| C27 | 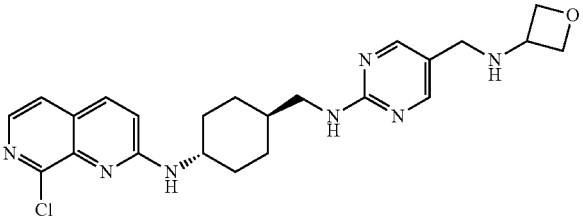 [SMILES: Clc1nccc2ccc(N[C@H]3CC[C@H](CNc4ncc(CNC5COC5)cn4)CC3)nc12]<br>8-chloro-N-((1,4-trans)-4-(((5-((oxetan-3-ylamino)methyl)pyrimidin-2-yl)amino)methyl)cyclohexyl)-1,7-naphthyridin-2-amine | ¹H NMR (400 MHz, DMSO-d$_6$): δ ppm 8.17 (s, 2H), 7.96 (d, J = 5.2 Hz, 1H), 7.91 (d, J = 9.2 Hz, 1H), 7.55 (d, J = 5.2 Hz, 1H), 7.50 (d, J = 7.2 Hz, 1H), 7.10 (t, J = 6.0 Hz, 1H), 6.99 (d, J = 9.2 Hz, 1H), 4.56 (t, J = 6.8 Hz, 2H), 4.27 (t, J = 6.0 Hz, 2H), 3.90-3.83 (m, 2H), 3.40 (s, 2H), 3.16 (t, J = 6.4 Hz, 2H), 2.77 (br s, 1H), 2.13-2.11 (m, 2H), 1.84-1.81 (m, 2H), 1.58 (br s, 1H), 1.25-1.14 (m, 2H), 1.13-1.04 (m, 2H). MS: [M + H]$^+$ = 454.1. |
| C28 | 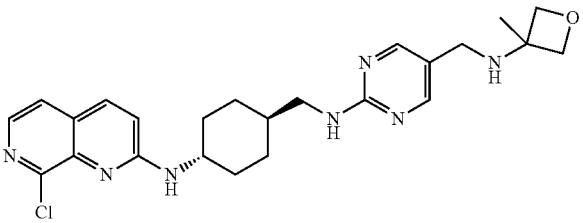 [SMILES: CC1(NCc2cnc(NC[C@H]3CC[C@H](Nc4ccc5ccnc(Cl)c5n4)CC3)nc2)COC1]<br>8-chloro-N-((1,4-trans)-4-(((5-((oxetan-3-ylamino)methyl)pyrimidin-2-yl)amino)methyl)cyclohexyl)-1,7-naphthyridin-2-amine | ¹H NMR (400 MHz, DMSO-d$_6$): δ ppm 8.21 (s, 2H), 7.96 (d, J = 4.8 Hz, 1H), 7.91 (d, J = 9.2 Hz, 1H), 7.55 (d, J = 5.2 Hz, 1H), 7.51 (d, J = 7.2 Hz, 1H), 7.09 (t, J = 6.0 Hz, 1H), 6.99 (d, J = 9.2 Hz, 1H), 4.46 (d, J = 6.0 Hz, 2H), 4.17 (d, J = 5.6 Hz, 2H), 3.90 (br s, 1H), 3.47 (s, 2H), 3.16 (t, J = 6.4 Hz, 2H), 2.13-2.11 (m, 2H), 1.84-1.82 (m, 2H), 1.58 (br s, 1H), 1.41 (s, 3H), 1.25-1.16 (m, 2H), 1.13-1.04 (m, 2H). MS: [M + H]$^+$ = 468.2. |
| C29 | 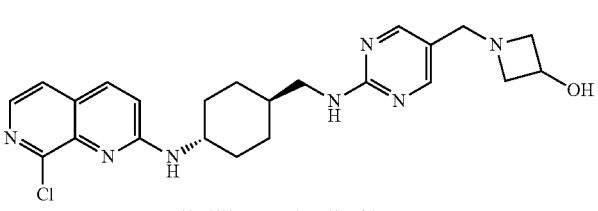 [SMILES: OC1CN(Cc2cnc(NC[C@H]3CC[C@H](Nc4ccc5ccnc(Cl)c5n4)CC3)nc2)C1]<br>1-((2-((((1,4-trans)-4-((8-chloro-1,7-naphthyridin-2-yl)amino)cyclohexyl)methyl)amino)pyrimidin-5-yl)methyl)azetidin-3-ol | ¹H NMR (400 MHz, CD$_3$OD): δ ppm 8.19 (s, 2H), 7.90 (d, J = 5.3 Hz, 1H), 7.82 (d, J = 9.0 Hz, 1H), 7.48 (d, J = 5.3 Hz, 1H), 6.94 (d, J = 9.0 Hz, 1H), 4.37-4.30 (m, 1H), 4.04 (br s, 1H), 3.58 (td, J = 6.4, 2.0 Hz, 2H), 3.47 (s, 2H), 3.26 (d, J = 6.9 Hz, 2H), 3.03-2.90 (m, 2H), 2.25-2.22 (m, 2H), 1.95-1.91 (m, 2H), 1.66 (br s, 1H), 1.32-1.15 (m, 4H). MS: [M + H]$^+$ = 454.2. |
| C30 | 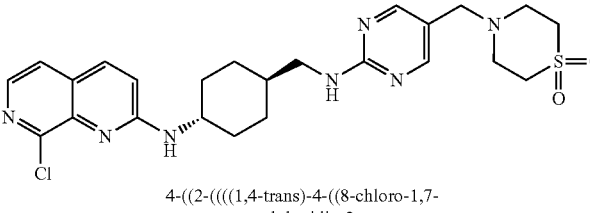<br>4-((2-((((1,4-trans)-4-((8-chloro-1,7-naphthyridin-2-yl)amino)cyclohexyl)methyl)amino)pyrimidin-5-yl)methyl)thiomorpholine 1,1-dioxide | ¹H NMR (400 MHz, DMSO-d$_6$): δ ppm 8.19 (s, 2H), 7.95 (d, J = 5.2 Hz, 1H), 7.91 (d, J = 9.2 Hz, 1H), 7.55 (d, J = 5.2 Hz, 1H), 7.51 (d, J = 7.2 Hz, 1H), 7.24 (t, J = 6.0 Hz, 1H), 7.00 (d, J = 8.8 Hz, 1H), 3.90 (br s, 1H), 3.47 (s, 2H), 3.16 (t, J = 6.4 Hz, 2H), 3.12-3.06 (m, 4H), 2.91-2.81 (m, 4H), 2.15-2.13 (m, 2H), 1.85-1.82 (m, 2H), 1.58 (br s, 1H), 1.25-1.04 (m, 4H). MS: [M + H]$^+$ = 516.1. |
| C31 | 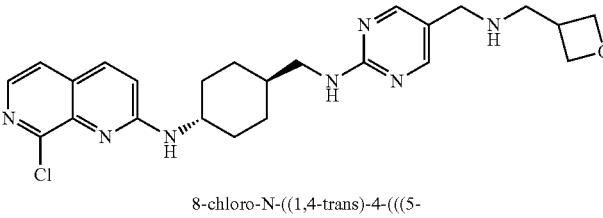<br>8-chloro-N-((1,4-trans)-4-(((5-(((oxetan-3-ylmethyl)amino)methyl)pyrimidin-2-yl)amino)methyl)cyclohexyl)-1,7-naphthyridin-2-amine | ¹H NMR (400 MHz, DMSO-d$_6$): δ ppm 8.18 (s, 2H), 7.95 (d, J = 5.2 Hz, 1H), 7.91 (d, J = 9.6 Hz, 1H), 7.55 (d, J = 5.2 Hz, 1H), 7.50 (d, J = 6.4 Hz, 1H), 7.09 (t, J = 6.0 Hz, 1H), 6.99 (d, J = 9.2 Hz, 1H), 4.61-4.57 (m, 2H), 4.23 (t, J = 6.0 Hz, 2H), 3.90 (br s, 1H), 3.45 (s, 2H), 3.16 (t, J = 6.4 Hz, 2H), 3.03-2.97 (m, 1H), 2.73-2.71 (m, 2H), 2.13-2.10 (m, 2H), 1.85-1.82 (m, 2H), 1.57 (br s, 1H), 1.22-1.15 (m, 2H), 1.12-1.03 (m, 2H). MS: [M + H]$^+$ = 468.2. |

TABLE 1-continued

| Ex # | Structure and Compound Name | ¹H NMR and MS Data |
|---|---|---|
| C32 | 8-chloro-N-(((1,4-trans)-4-(((5-(((3-methoxycyclobutyl)amino)methyl)pyrimidin-2-yl)amino)methyl)cyclohexyl)-1,7-naphthyridin-2-amine | ¹H NMR (400 MHz, DMSO-$d_6$): δ ppm 8.16 (s, 2H), 7.96 (d, J = 4.8 Hz, 1H), 7.91 (d, J = 8.8 Hz, 1H), 7.56 (d, J = 5.2 Hz, 1H), 7.51 (d, J = 7.2 Hz, 1H), 7.11-7.08 (m, 1H), 6.99 (d, J = 8.8 Hz, 1H), 3.92 (br s, 1H), 3.52-3.45 (m, 1H), 3.35-3.33 (m, 2H), 3.16 (t, J = 6.4 Hz, 2H), 3.06 (s, 3H), 2.70-2.64 (m, 1H), 2.44-2.39 (m, 2H), 2.14-2.11 (m, 2H), 1.99-1.92 (m, 1H), 1.84-1.81 (m, 2H), 1.57-1.50 (m, 2H), 1.25-1.16 (m, 2H), 1.13-1.04 (m, 2H). MS: [M + H]⁺ = 482.3. |
| C33 | 3-(((2-((((1,4-trans)-4-((8-chloro-1,7-naphthyridin-2-yl)amino)cyclohexyl)methyl)amino)pyrimidin-5-yl)methyl)amino)cyclobutan-1-ol | ¹H NMR (400 MHz, DMSO-$d_6$), existed of ratomer: δ ppm 8.15 (s, 2H), 7.96 (d, J = 5.2 Hz, 1H), 7.91 (d, J = 8.8 Hz, 1H), 7.55 (d, J = 5.2 Hz, 1H), 7.50 (d, J = 7.2 Hz, 1H), 7.06 (t, J = 6.0 Hz, 1H), 6.99 (d, J = 9.2 Hz, 1H), 4.88-4.83 (m, 1H), 4.25-4.21 (m, 0.5H), 3.91 (br s, 1H), 3.75-3.69 (m, 0.5H), 3.37 (s, 2H), 3.16 (t, J = 6.4 Hz, 2H), 2.60-2.56 (m, 0.5H), 2.43-2.37 (m, 2H), 2.13-2.11 (m, 2H), 1.98-1.89 (m, 2H), 1.88-1.85 (m, 2H), 1.57-1.54 (m, 1H), 1.53-1.47 (m, 1.5H), 1.25-1.14 (m, 2H), 1.12-1.03 (m, 2H). MS: [M + H]⁺ = 468.1. |

Example 34

(2-(2-((((1,4-trans)-4-((8-chloro-1,7-naphthyridin-2-yl)amino)cyclohexyl)methyl)amino)pyrimidin-5-yl)-1,3-dioxan-5-yl)methanol (C34)

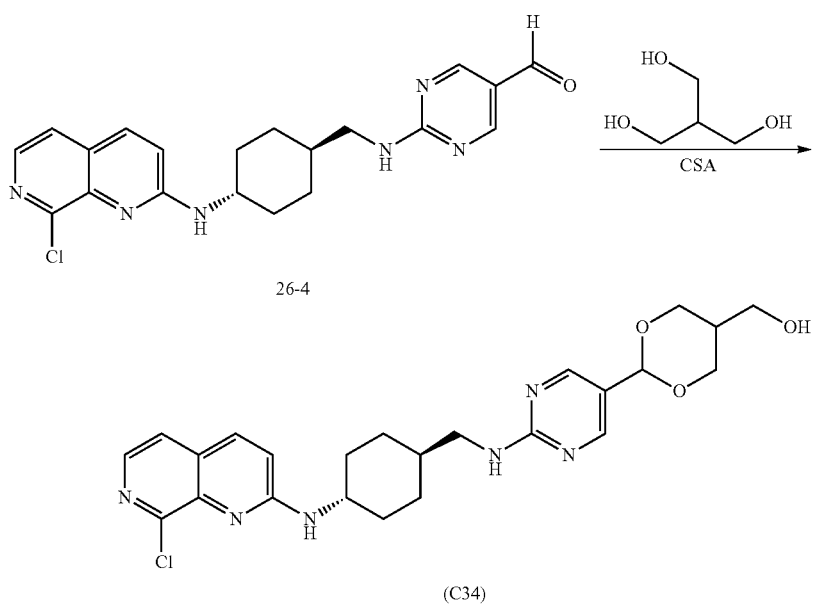

To a solution of (26-4) (50 mg, 0.126 mmol, 1.0 eq) and CSA (1 mg, 0.005 mmol, 0.05 eq) in $CH_2Cl_2$ (3 mL) was added 2-(hydroxymethyl)propane-1,3-diol (11 mg, 0.106 mmol, 0.84 eq). The mixture was stirred at 30° C. for 2 hours. The reaction mixture was concentrated to give the crude product which was purified by preparative HPLC (column: DuraShell 150 mm×25 mm×5 um: 38-68% B (A=10 mM NH$_4$OH, B=acetonitrile) to give (2-(2-((((1,4-trans)-4-((8-chloro-17-naphthyridin-2-yl)amino)cyclohexyl)methyl)amino)pyrimidin-5-yl)-1,3-dioxan-5-yl)methanol (C34). $^1$H NMR (400 MHz, DMSO-d$_6$), cis/trans mixture: δ ppm 8.23 (d, J=5.6 Hz, 2H), 7.96 (d, J=5.2 Hz, 1H), 7.91 (d, J=8.8 Hz, 1H), 7.55 (d, J=5.2 Hz, 1H), 7.51 (d, J=7.2 Hz, 1H), 7.39-7.35 (m, 1H), 6.99 (d, J=9.2 Hz, 1H), 5.42 (s, 0.5H), 5.33 (s, 0.5H), 4.71 (t, J=5.2 Hz, 0.5H), 4.60 (t, J=5.2 Hz, 0.5H), 4.12 (dd, J=4.4 Hz, 7.6 Hz, 1H), 4.06-4.03 (m, 1H), 3.96-4.00 (m, 1H), 3.92-3.88 (m, 1H), 3.71 (dd, J=5.2 Hz, 7.6 Hz, 1H), 3.60 (t, J=11.6 Hz, 1H), 3.26 (t, J=5.6 Hz, 1H), 3.18 (t, J=6.4 Hz, 2H), 2.13-2.07 (m, 2.5H), 1.84-1.81 (m, 2H), 1.58-1.48 (m, 1.5H), 1.25-1.16 (m, 2H), 1.13-1.04 (m, 2H). MS: [M+H]$^+$=485.2.

Example 35

8-chloro-N-((1,4-trans)-4-(((5-((oxetan-3-yloxy)methyl)pyrimidin-2-yl)amino)methyl)cyclohexyl)-1,7-naphthyridin-2-amine (C35)

Step 1: Oxetan-3-yl 4-methylbenzenesulfonate (35-1)

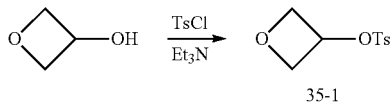

To a solution of oxetan-3-ol (300 mg, 4 mmol, 1.0 eq) in CH$_2$Cl$_2$ (10 mL) was added Et$_3$N (1.62 g, 16 mmol, 4.0 eq) and TsCl (1.52 g, 2 mmol, 2.0 eq), the reaction mixture was stirred at 23-31° C. for 16 hours. The mixture was quenched with aqueous NaHCO$_3$ solution (20 mL), extracted three times with CH$_2$Cl$_2$ (20 mL), the organic layer was dried over Na$_2$SO$_4$, filtered and concentrated to give the crude product, which was purified by column chromatography on silica gel (petroleum ether/EtOAc from 50/1 to 10/1) to give oxetan-3-yl 4-methylbenzenesulfonate (35-1). $^1$H NMR (400 MHz, CDCl$_3$): δ ppm 7.78 (d, J=8.4 Hz, 2H), 7.36 (d, J=8.0 Hz, 2H), 5.32-5.26 (m, 1H), 4.73-4.64 (m, 4H), 2.45 (s, 3H).

Step 2: 8-chloro-N-((1,4-trans)-4-(((5-((oxetan-3-yloxy)methyl)pyrimidin-2-yl)amino)methyl)cyclohexyl)-1,7-naphthyridin-2-amine (C35)

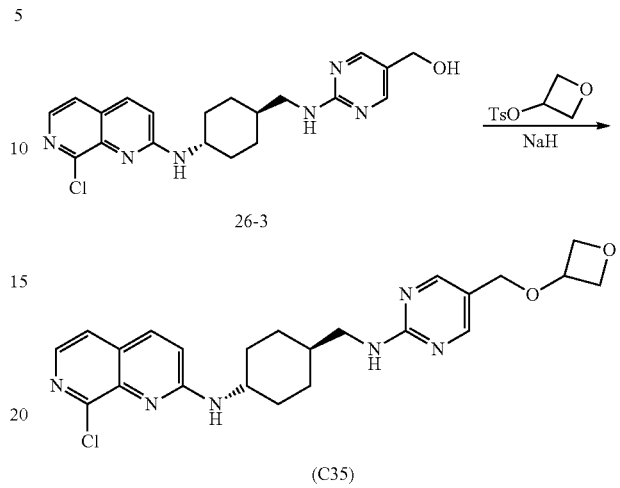

To a solution of (26-3) (50 mg, 0.126 mmol, 1.0 eq) and (35-1) (29 mg, 0.126 mmol, 1.0 eq) in DMF (2 mL) was added NaH (60% in mineral oil, 6 mg, 0.15 mmol, 1.2 eq) at 0° C. in portions. The mixture was stirred at 25° C. for 4 hours. The reaction mixture was quenched with H$_2$O (20 mL), extracted with EtOAc (3*20 mL), the organic layer was dried over Na$_2$SO$_4$, filtered and concentrated to give the crude product, which was purified by preparative HPLC (column: Waters Xbridge Prep OBD C18 100 mm×19 mm×5 um: 30-45% B (A=0.05% NH$_4$OH in water, B=acetonitrile)) to give 8-chloro-N-((1,4-trans)-4-(((5-((oxetan-3-yloxy)methyl)pyrimidin-2-yl)amino)methyl)cyclohexyl)-1,7-naphthyridin-2-amine (C35). $^1$H NMR (400 MHz, DMSO-d$_6$): δ ppm 8.25 (s, 2H), 7.96 (d, J=5.2 Hz, 1H), 7.91 (d, J=8.8 Hz, 1H), 7.55 (d, J=5.2 Hz, 1H), 7.50 (t, J=8.0 Hz, 1H), 7.33 (t, J=6.0 Hz, 1H), 6.99 (d, J=8.8 Hz, 1H), 4.67-4.59 (m, 3H), 4.40-4.38 (m, 2H), 4.21 (s, 2H), 3.90 (br s, 1H), 3.18 (t, J=6.4 Hz, 2H), 2.13-2.11 (m, 2H), 1.85-1.81 (m, 2H), 1.58 (br s, 1H), 1.22-1.16 (m, 2H), 1.13-1.07 (m, 2H). MS: [M+H]$^+$=455.2.

Example 36

2-(2-((((1,4-trans)-4-((8-chloro-1,7-naphthyridin-2-yl)amino)cyclohexyl)methyl)amino)pyrimidin-5-yl)-N-(oxetan-3-yl)acetamide (C36)

Step 1: Ethyl 2-(2-((((1,4-trans)-4-((8-hydroxy-1,7-naphthyridin-2-yl)amino)cyclohexyl)methyl)amino)pyrimidin-5-yl)acetate (36-1)

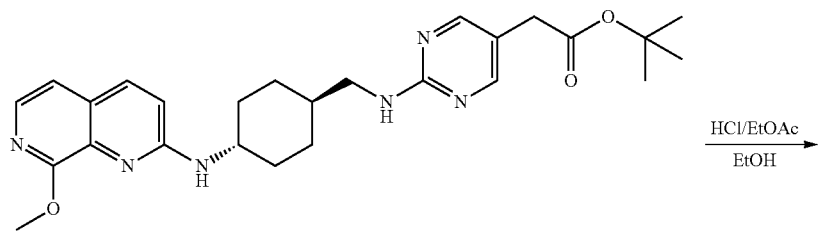

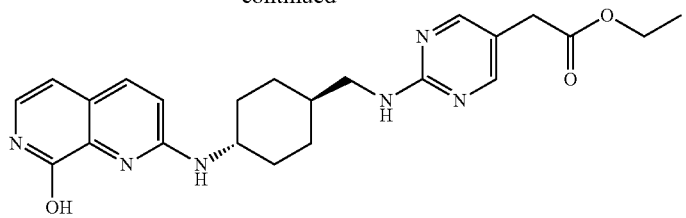

36-1

To a solution of (13-2) (43 g, 89.8 mmol, 1.0 eq) in EtOAc (20 mL) was added dropwise 4 N HC in EtOAc solution (40 mL). The reaction mixture was stirred at 40° C. for 20 hours. Then EtOH (40 mL) was added to the above solution, and the mixture was stirred at 90° C. for 20 hours. Then the solution was concentrated to give ethyl 2-(2-((((1,4-trans)-4-((8-hydroxy-1,7-naphthyridin-2-yl)amino)cyclohexyl)methyl)amino)pyrimidin-5-yl)acetate (36-1), which was used in the next step without further purification. MS: $[M+H]^+=437.2$.

Step 2: Ethyl 2-(2-((((1,4-trans)-4-((8-chloro-1,7-naphthyridin-2-yl)amino)cyclohexyl)methyl)amino)pyrimidin-5-yl)acetate (36-2)

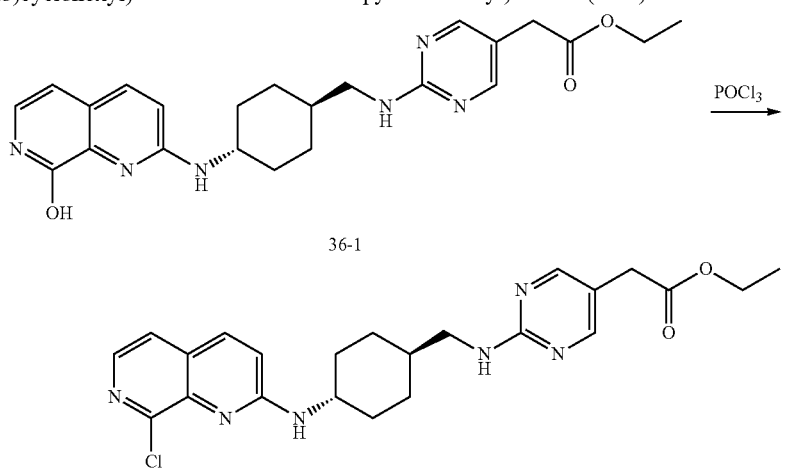

A solution of (36-1) (45 g, 103.09 mmol, 1.0 eq) in POCl₃ (390 mL) was stirred at 110° C. for 1.5 hour. Then the mixture was concentrated under reduced pressure, the residue was diluted with ethyl acetate (450 mL), then basified with aq. NaHCO₃ to pH 8-9 at 0° C., the organic layer was separated and the aqueous layer was extracted twice with ethyl acetate (400 mL), the combined organic layer was washed with brine (400 mL), dried over Na₂SO₄, filtered and concentrated under reduce pressure to give ethyl 2-(2-((((1,4-trans)-4-((8-chloro-1,7-naphthyridin-2-yl)amino)cyclohexyl)methyl)amino)pyrimidin-5-yl)acetate (36-2). MS: $[M+H]^+=455.2$.

Step 3: 2-(2-((((1,4-trans)-4-((8-chloro-1,7-naphthyridin-2-yl)amino)cyclohexyl)methyl)amino)pyrimidin-5-yl)acetic acid (36-3)

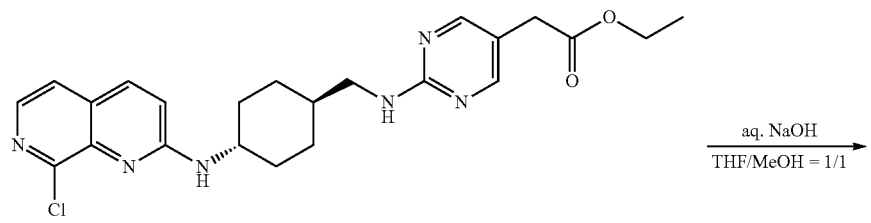

36-2

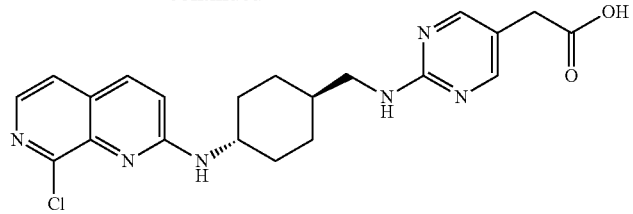

36-3

To a solution of (36-2) (40 g, 88.1 mmol, 1.0 eq) in MeOH (300 mL) and THF (300 mL) was added NaOH (17.6 g, 441 mmol, 5.0 eq) in H$_2$O (200 mL). The mixture was stirred at 20° C. for 2 hours. Then the mixture was acidified with 2N HCl to pH 6-7, and extracted with CH$_2$Cl$_2$ (200 mL×3). The combined organic layers were dried over anhydrous sodium sulfate, filtered and concentrated to give 2-(2-((((1,4-trans)-4-((8-chloro-1,7-naphthyridin-2-yl)amino)cyclohexyl)methyl)amino)pyrimidin-5-yl)acetic acid (36-3), which was used in the next step without further purification. MS: [M+H]$^+$=427.2.

Step 4: 2-(2-((((1,4-trans)-4-((8-chloro-1,7-naphthyridin-2-yl)amino)cyclohexyl)methyl)amino)pyrimidin-5-yl)-N-(oxetan-3-yl)acetamide (C36)

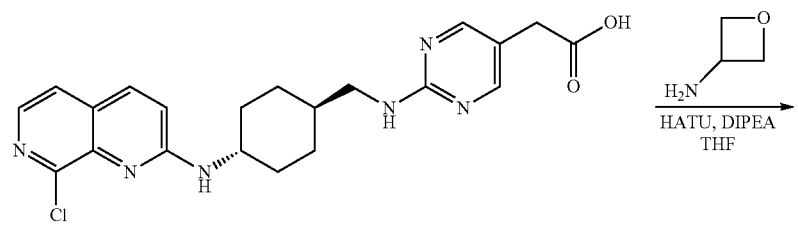

36-3

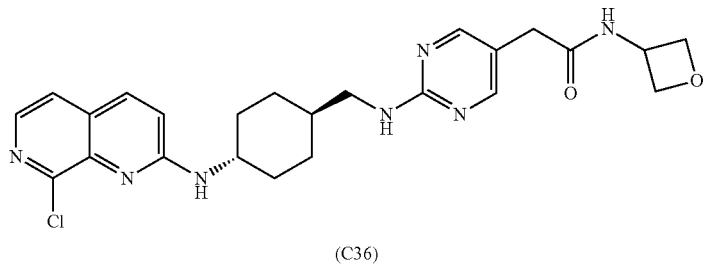

(C36)

To a solution of (36-3) (40.9 g, 0.096 mol, 1.0 eq) in DMF (200 mL) and CH$_2$Cl$_2$ (400 mL) was added oxetan-3-amine (8.4 g, 0.115 mol, 1.2 eq), HATU (54.7 g, 0.144 mol, 1.5 eq) and DIEA (37 g, 0.288 mol, 2.0 eq). The mixture was stirred at 15° C. for 3 hours. Then the mixture was diluted with H$_2$O (300 mL), extracted three times with CH$_2$Cl$_2$ (300 mL), the organic layer was dried over Na$_2$SO$_4$, filtered and concentrated to give the crude product which was purified by column chromatography on silica gel (CH$_2$Cl$_2$/MeOH from 100/1 to 40/1) to give the crude compound, which was triturated with EtOAc, filtered and dried to afford 2-(2-((((1,4-trans)-4-((8-chloro-1,7-naphthyridin-2-yl)amino)cyclohexyl)methyl)amino)pyrimidin-5-yl)-N-(oxetan-3-yl)acetamide (C36). $^1$H NMR (400 MHz, DMSO-d$_6$): δ ppm 8.79 (d, J=6.4 Hz, 1H), 8.12 (s, 2H), 7.96 (d, J=5.2 Hz, 1H), 7.91 (d, J=9.2 Hz, 1H), 7.55 (d, J=5.2 Hz, 1H), 7.51 (d, J=6.8 Hz, 1H), 7.13 (t, J=6.0 Hz, 1H), 6.99 (d, J=9.2 Hz, 1H), 4.79-4.73 (m, 1H), 4.69 (t, J=6.4 Hz, 2H), 4.41 (t, J=6.0 Hz, 2H), 3.90 (br s, 1H), 3.24 (s, 2H), 3.15 (t, J=6.4 Hz, 2H), 2.13-2.11 (m, 2H), 1.85-1.82 (m, 2H), 1.57 (br s, 1H), 1.24-1.12 (m, 2H), 1.09-1.03 (m, 2H). MS: [M+H]$^+$=482.2.

The following compounds, as identified in Table 2, were prepared using the general procedures as well as the procedures from the examples described above with the appropriate starting materials and reagents.

TABLE 2

| Ex # | Structure and Compound Name | ¹H NMR and MS Data |
|---|---|---|
| C37 | 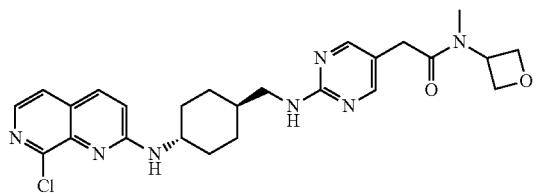 [SMILES: CN(C(=O)Cc1cnc(NC[C@H]2CC[C@H](Nc3ccc4ccnc(Cl)c4n3)CC2)nc1)C1COC1]2-(2-((((1,4-trans)-4-((8-chloro-1,7-naphthyridin-2-yl)amino)cyclohexyl)methyl)amino)pyrimidin-5-yl)-N-methyl-N-(oxetan-3-yl)acetamide | ¹H NMR (400 MHz, DMSO-$d_6$), existed of rotamer: δ ppm 8.06 (s, 1.3H), 8.04 (s, 0.7H), 7.96 (d, J = 5.1 Hz, 1H), 7.91 (d, J = 9.0 Hz, 1H), 7.55 (d, J = 5.2 Hz, 1H), 7.50 (d, J = 7.0 Hz, 1H), 7.07 (t, J = 6.0 Hz, 1H), 7.00 (d, J = 8.6 Hz, 1H), 5.36-5.22 (m, 1H), 4.72-4.57 (m, 4H), 3.90 (br s, 1H), 3.51 (s, 1.3H), 3.48 (s, 0.7H), 3.16 (t, J = 6.4 Hz, 2H), 3.12 (s, 2H), 3.02 (s, 1H), 2.14-2.11 (m, 2H), 1.85-1.82 (m, 2H), 1.58 (br s, 1H), 1.23-1.04 (m, 4H). MS: [M + H]⁺ = 496.1. |
| C38 | 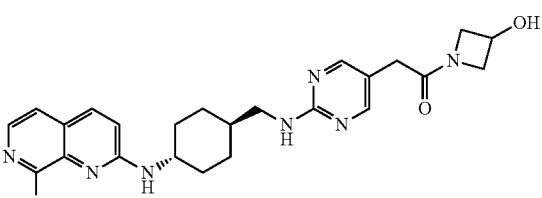2-(2-((((1,4-trans)-4-((8-chloro-1,7-naphthyridin-2-yl)amino)cyclohexyl)methyl)amino)pyrimidin-5-yl)-N-methyl-N-(oxetan-3-yl)acetamide | ¹H NMR (400 MHz, DMSO-$d_6$): δ ppm 8.09 (s, 2H), 7.96 (d, J = 5.2 Hz, 1H), 7.91 (d, J = 8.8 Hz, 1H), 7.56 (d, J = 5.2 Hz, 1H), 7.51 (d, J = 6.8 Hz, 1H), 7.11 (t, J = 6.0 Hz, 1H), 7.00 (d, J = 8.8 Hz, 1H), 5.73 (d, J = 6.0 Hz, 1H), 4.46-4.43 (m, 1H), 4.39-4.36 (m, 1H), 4.05-4.01 (m, 1H), 3.94-3.91 (m, 2H), 3.59-3.56 (m, 1H), 3.22 (s, 2H), 3.15(t, J = 6.4 Hz, 2H), 2.14-2.11 (m, 2H), 1.85-1.82 (m, 2H), 1.58 (br s, 1H), 1.25-1.17 (m, 2H), 1.13-1.04 (m, 2H). MS: [M + H]⁺ = 482.2. |
| C39 | 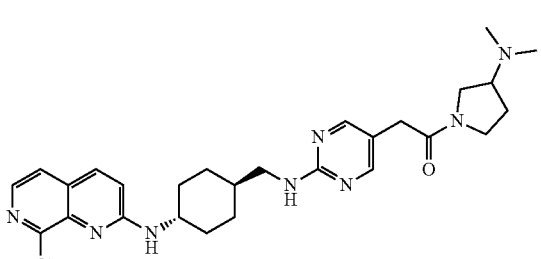2-(2-((((1,4-trans)-4-((8-chloro-1,7-naphthyridin-2-yl)amino)cyclohexyl)methyl)amino)pyrimidin-5-yl)-1-(3-(dimethylamino)pyrrolidin-1-yl)ethan-1-one | ¹H NMR (400 MHz, DMSO-$d_6$): existed of ratomers, δ ppm 8.08 (d, J = 2.4 Hz, 2H), 7.96 (d, J = 4.8 Hz, 1H), 7.91 (d, J = 9.2 Hz, 1H), 7.56 (d, J = 4.8 Hz, 1H), 7.52 (d, J = 7.2 Hz, 1H), 7.09 (t, J = 6.0 Hz, 1H), 6.99 (d, J = 8.0 Hz, 1H), 3.91 (br s, 1H), 3.80-3.39 (m, 5H), 3.25-3.11 (m, 2.5H), 2.99-2.94 (m, 0.5H), 2.73-2.67 (m, 1H), 2.97-2.17 (m, 9H), 1.85-1.51 (m, 4H), 1.25-1.04 (m, 4H). MS: [M + H]⁺ = 523.3. |
| C40 | 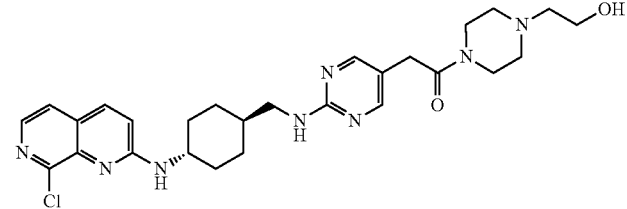 [SMILES: O=C(Cc1cnc(NC[C@H]2CC[C@H](Nc3ccc4ccnc(Cl)c4n3)CC2)nc1)N1CCN(CCO)CC1]2-(2-((((1,4-trans)-4-((8-chloro-1,7-naphthyridin-2-yl)amino)cyclohexyl)methyl)amino)pyrimidin-5-yl)-1-(4-(2-hydroxyethyl)piperazin-1-yl)ethan-1-one | ¹H NMR (400 MHz, DMSO-$d_6$): δ ppm 8.07 (s, 2H), 7.96 (d, J = 4.8 Hz, 1H), 7.91 (d, J = 8.8 Hz, 1H), 7.56 (d, J = 4.8 Hz, 1H), 7.52 (d, J = 7.2 Hz, 1H), 7.08 (t, J = 6.0 Hz, 1H), 6.99 (d, J = 9.6 Hz, 1H), 4.44 (t, J = 5.6 Hz, 1H), 3.90 (br s, 1H), 3.52-3.48 (m, 6H), 3.45-3.42 (m, 2H), 3.15 (t, J = 6.4 Hz, 2H), 2.42-2.34 (m, 6H), 2.14-2.11 (m, 2H), 1.85-1.82 (m, 2H), 1.58 (br s, 1H), 1.25-1.04 (m, 4H). MS: [M + H]⁺ = 539.3. |

TABLE 2-continued

| Ex # | Structure and Compound Name | ¹H NMR and MS Data |
|---|---|---|
| C41 | 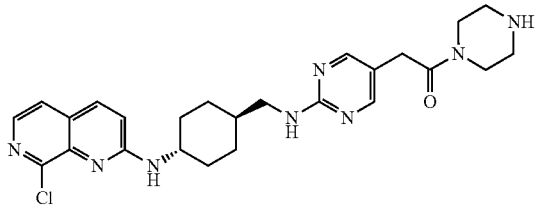 [SMILES: O=C(Cc1cnc(NC[C@H]2CC[C@H](Nc3ccc4ccnc(Cl)c4n3)CC2)nc1)N1CCNCC1]<br>2-(2-((((1,4-trans)-4-((8-chloro-1,7-naphthyridin-2-yl)amino)cyclohexyl)methyl)amino)pyrimidin-5-yl)-1-(piperazin-1-yl)ethan-1-one | ¹H NMR (400 MHz, DMSO-d₆): δ ppm 8.07 (s, 2H), 7.95 (d, J = 5.2 Hz, 1H), 7.91 (d, J = 9.2 Hz, 1H), 7.55 (d, J = 5.2 Hz, 1H), 7.51 (d, J = 7.2 Hz, 1H), 7.07 (t, J = 6.0 Hz, 1H), 6.99 (d, J = 8.4 Hz, 1H), 3.90 (br s, 1H), 3.48 (s, 2H), 3.47-3.44 (m, 2H), 3.43-3.41 (m, 2H), 3.16 (t, J = 6.4 Hz, 2H), 2.67-2.60 (m, 4H), 2.14-2.11 (m, 2H), 1.86-1.83 (m, 2H), 1.58 (br s, 1H), 1.26-1.04 (m, 4H). MS: [M + H]⁺ = 495.2. |
| C42 | 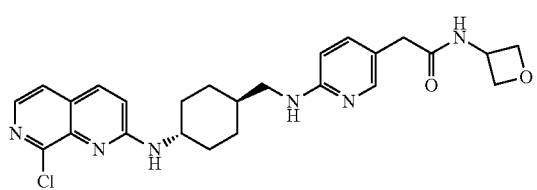 [SMILES: O=C(Cc1ccc(NC[C@H]2CC[C@H](Nc3ccc4ccnc(Cl)c4n3)CC2)nc1)NC1COC1]<br>2-(6-((((1,4-trans)-4-((8-chloro-1,7-naphthyridin-2-yl)amino)cyclohexyl)methyl)amino)pyridin-3-yl)-N-(oxetan-3-yl)acetamide | . ¹H NMR (400 MHz, DMSO-d₆): δ ppm 8.74 (d, J = 6.4 Hz, 1H), 7.96 (d, J = 5.2 Hz, 1H), 7.91 (d, J = 8.8 Hz, 1H), 7.79 (d, J = 2.4 Hz, 1H), 7.55 (d, J = 5.2 Hz, 1H), 7.51 (d, J = 7.2 Hz, 1H), 7.24 (dd, J = 2.4 Hz, 8.8 Hz, 1H), 6.99 (d, J = 8.8 Hz, 1H), 6.45-6.41 (m, 2H), 4.79-4.71 (m, 1H), 4.70-4.67 (m, 2H), 4.40 (t, J = 6.0 Hz, 2H), 3.91 (br s, 1H), 3.21 (s, 2H), 3.10 (t, J = 6.0 Hz, 2H), 2.14-2.12 (m, 2H), 1.94-1.84 (m, 2H), 1.55 (br s, 1H), 1.26-1.17 (m, 2H), 1.13-1.04 (m, 2H). MS: [M + H]⁺ = 481.2. |
| C43 | 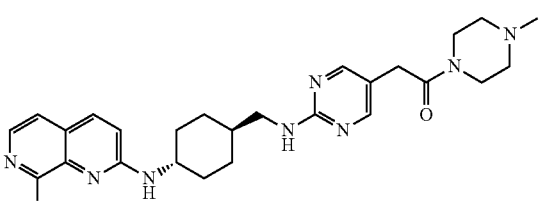<br>2-(2-((((1,4-trans)-4-((8-chloro-1,7-naphthyridin-2-yl)amino)cyclohexyl)methyl)amino)pyrimidin-5-yl)-1-(4-methylpiperazin-1-yl)ethan-1-one | ¹H NMR (400 MHz, DMSO-d₆): δ ppm 8.07 (s, 2H), 7.95 (d, J = 5.2 Hz, 1H), 7.91 (d, J = 9.2 Hz, 1H), 7.55 (d, J = 5.2 Hz, 1H), 7.52 (d, J = 7.2 Hz, 1H), 7.09 (t, J = 6.0 Hz, 1H), 6.99 (d, J = 9.2 Hz, 1H), 3.91 (br s, 1H), 3.57-3.48 (m, 4H), 3.46-3.43 (m, 2H), 3.16 (t, J = 6.4 Hz, 2H), 2.30-2.28 (m, 2H), 2.25-2.22 (m, 2H), 2.17 (s, 3H), 2.14-2.11 (m, 2H), 1.85-1.82 (m, 2H), 1.58 (br s, 1H), 1.25-1.04 (m, 4H). MS: [M + H]⁺ = 509.0. |
| C44 | 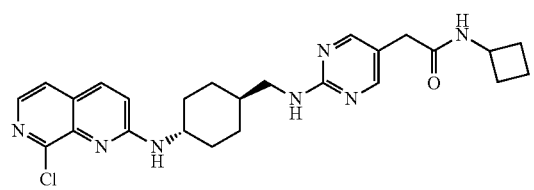 [SMILES: O=C(Cc1cnc(NC[C@H]2CC[C@H](Nc3ccc4ccnc(Cl)c4n3)CC2)nc1)NC1CCC1]<br>2-(2-((((1,4-trans)-4-((8-chloro-1,7-naphthyridin-2-yl)amino)cyclohexyl)methyl)amino)pyrimidin-5-yl)-N-cyclobutylacetamide | ¹H NMR (400 MHz, DMSO-d₆): δ ppm 8.26 (d, J = 7.6 Hz, 1H), 8.10 (s, 2H), 7.96 (d, J = 5.2 Hz, 1H), 7.91 (d, J = 8.8 Hz, 1H), 7.55 (d, J = 5.2 Hz, 1H), 7.51 (d, J = 6.8 Hz, 1H), 7.10 (t, J = 6.4 Hz, 1H), 7.00 (d, J = 8.8 Hz, 1H), 4.18-4.12 (m, 1H), 3.89 (br s, 1H), 3.16-3.13 (m, 4H), 2.14-2.10 (m, 4H), 1.87-1.82 (m, 4H), 1.65-1.55 (m, 3H), 1.23-1.18 (m, 2H), 1.12-1.03 (m, 2H). MS: [M + H]⁺ = 480.3. |
| C45 | 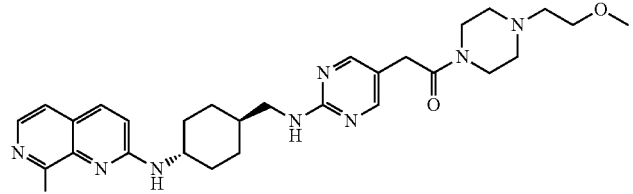<br>2-(2-((((1,4-trans)-4-((8-chloro-1,7-naphthyridin-2-yl)amino)cyclohexyl)methyl)amino)pyrimidin-5-yl)-1-(4-(2-methoxyethyl)piperazin-1-yl)ethan-1-one | ¹H NMR (400 MHz, DMSO-d₆): δ ppm 8.07 (s, 2H), 7.96 (d, J = 4.8 Hz, 1H), 7.91 (d, J = 8.8 Hz, 1H), 7.56 (d, J = 4.8 Hz, 1H), 7.52 (d, J = 6.8 Hz, 1H), 7.09 (t, J = 6.0 Hz, 1H), 6.99 (d, J = 8.8 Hz, 1H), 3.90 (br s, 1H), 3.52-3.49 (m, 4H), 3.44-3.42 (m, 4H), 3.22 (s, 3H), 3.15 (t, J = 6.0 Hz, 2H), 2.48-2.46 (m, 2H), 2.42-2.39 (m, 2H), 2.37-2.34 (m, 2H), 2.14-2.11 (m, 2H), 1.85-1.83 (m, 2H), 1.58 (br s, 1H), 1.26-1.17 (m, 2H), 1.13-1.04 (m, 2H). MS: [M + H]⁺ = 553.4. |

Example 46

2-(2-((((1,4-trans)-4-((8-chloro-1,7-naphthyridin-2-yl)amino)cyclohexyl)methyl)amino)pyrimidin-5-yl)ethan-1-ol (C46)

Step 1: Isopropyl 2-(2-((((1,4-trans)-4-((8-methoxy-1,7-naphthyridin-2-yl)amino)cyclohexyl)methyl)amino)pyrimidin-5-yl)acetate (46-1)

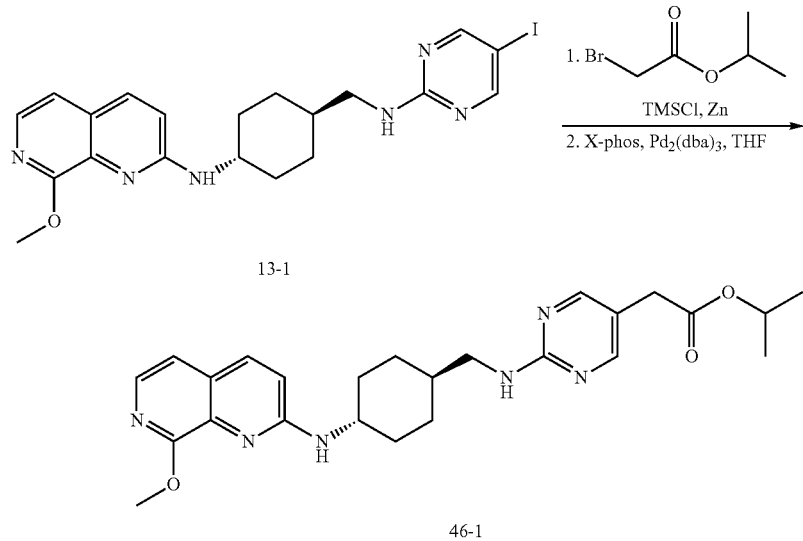

The title compound was prepared by using a procedure similar to that in Step 2 of Example 13, Intermediate (13-2), with tert-butyl 2-bromoacetate being replaced with isopropyl 2-bromoacetate and the product purified by column chromatography on silica gel (petroleum ether/EtOAc from 3/1 to 1/2) to give isopropyl 2-(2-((((1,4-trans)-4-((8-methoxy-1,7-naphthyridin-2-yl)amino)cyclohexyl)methyl)amino)pyrimidin-5-yl)acetate (46-1). $^1$H NMR (400 MHz, DMSO-$d_6$): δ 8.14 (s, 2H), 7.78 (d, J=8.8 Hz, 1H), 7.68 (d, J=5.6 Hz, 1H), 7.17 (t, J=6.0 Hz, 1H), 7.09 (d, J=5.6 Hz, 1H), 7.05 (d, J=7.6 Hz, 1H), 6.89 (d, J=9.2 Hz, 1H), 4.93-4.86 (m, 1H), 3.95 (s, 3H), 3.87 (br s, 1H), 3.45 (s, 2H), 3.15 (t, J=6.0 Hz, 2H), 2.04-2.01 (m, 2H), 1.83-1.80 (m, 2H), 1.56 (br s, 1H), 1.20-1.03 (m, 10H). MS: [M+H]$^+$=465.2.

Step 2: Isopropyl 2-(2-((((1,4-trans)-4-((8-hydroxy-1,7-naphthyridin-2 yl)amino)cyclohexyl)methyl)amino)pyrimidin-5-yl)acetate (46-2)

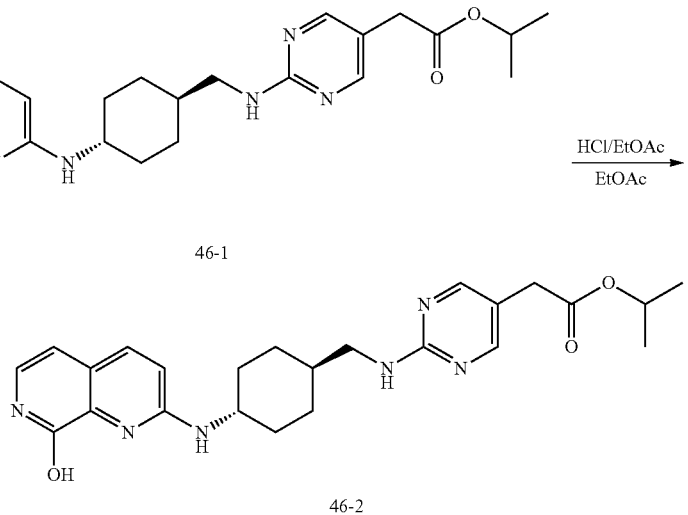

To a solution of (46-1) (720 mg, 1.55 mmol, 1.0 eq) in EtOAc (5 mL) was added HCl/EtOAc (10 mL, 4N). The reaction mixture was stirred at 35° C. for 3 hours. The reaction mixture was concentrated under reduced pressure to isopropyl 2-(2-((((1,4-trans)-4-((8-hydroxy-1,7-naphthyridin-2 yl)amino)cyclohexyl)methyl)amino)pyrimidin-5-yl) acetate (46-2), which was used without further purification. MS: [M+H]$^+$=451.2.

Step 3: Isopropyl 2-(2-((((1,4-trans)-4-((8-chloro-1, 7-naphthyridin-2-yl)amino)cyclohexyl)methyl) amino)pyrimidin-5-yl)acetate (46-3)

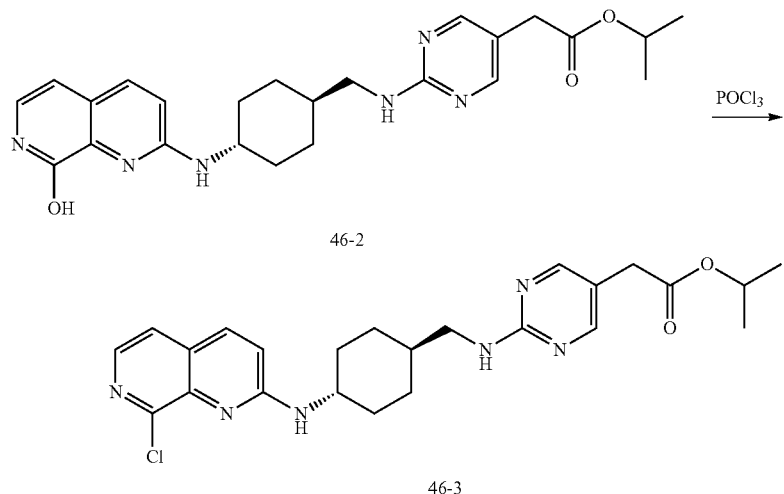

46-2

46-3

A solution of compound (46-2) (850 mg, 1.88 mmol, 1.0 eq) in POCl$_3$ (10 mL) was stirred at 110° C. for 1.5 hours. Then the mixture was concentrated under reduced pressure. The crude product was dissolved in EtOAc (100 mL) and the organic phase was washed with saturated aqueous NaHCO$_3$ solution (50 mL) and brine (50 mL), dried over anhydrous sodium sulfate, filtered and concentrated in vacuum to give isopropyl 2-(2-((((1,4-trans)-4-((8-chloro-1,7-naphthyridin-2-yl)amino)cyclohexyl)methyl)amino)pyrimidin-5-yl)acetate (46-3), which was used without further purification. MS: [M+H]$^+$=469.2.

Step 4: 2-(2-((((1,4-trans)-4-((8-chloro-1,7-naphthyridin-2-yl)amino)cyclohexyl)methyl)amino)pyrimidin-5-yl)ethan-1-ol (C46)

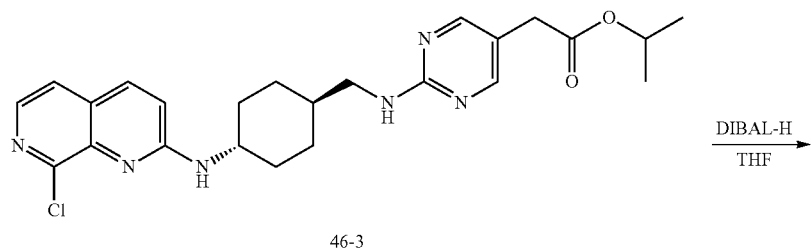

46-3

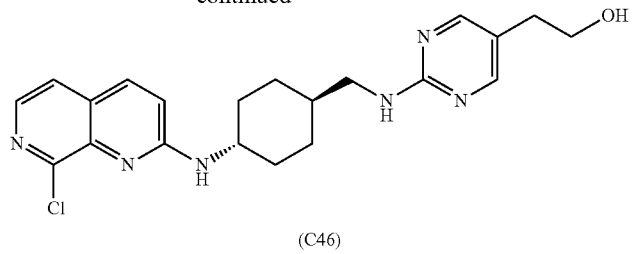

(C46)

To a solution of (46-3) (310 mg, 0.66 mmol, 1.0 eq) in anhydrous THF (10 mL) was added dropwise DIBAL-H (3.3 mL, 3.30 mmol, 5.0 eq, 1.0 M in toluene) over 10 minutes under $N_2$ protection at −78° C. After the addition was completed, the reaction mixture was stirred at 19-22° C. for 2 hours. Then the reaction mixture was diluted with EtOAc (50 mL), quenched with saturated aqueous $NH_4Cl$ (3.5 mL). After stirred for 30 minutes at 19-22° C., the mixture was filtered and the filtrate was washed with brine (30 mL), dried over anhydrous sodium sulfate, filtered and concentrated under reduced pressure to give 2-(2-((((1,4-trans)-4-((8-chloro-1,7-naphthyridin-2-yl)amino)cyclohexyl)methyl)amino)pyrimidin-5-yl)ethan-1-ol (C46). $^1$H NMR (400 MHz, DMSO-$d_6$): δ ppm 8.12 (s, 2H), 7.96 (d, J=5.2 Hz, 1H), 7.91 (d, J=8.8 Hz, 1H), 7.56 (d, J=5.2 Hz, 1H), 7.51 (d, J=7.2 Hz, 1H), 7.03-6.99 (m, 2H), 4.65 (t, J=5.2 Hz, 1H), 3.90 (br s, 1H), 3.51 (dd, J=12.0, 6.8 Hz, 2H), 3.14 (t, J=6.4 Hz, 2H), 2.49-2.47 (m, 2H), 2.13-2.11 (m, 2H), 1.85-1.82 (m, 2H), 1.57 (br s, 1H), 1.25-1.16 (m, 2H), 1.12-1.06 (m, 2H). MS: [M+H]$^+$=413.2.

Example 47

8-chloro-N-((1,4-trans)-4-(((5-(2-((3-methyloxetan-3-yl)amino)ethyl)pyrimidin-2-yl)amino)methyl)cyclohexyl)-1,7-naphthyridin-2-amine (C47)

Step 1: 2-(2-((((1,4-trans)-4-((8-chloro-1,7-naphthyridin-2-yl)amino)cyclohexyl)methyl)amino)pyrimidin-5-yl)ethyl methanesulfonate (47-1)

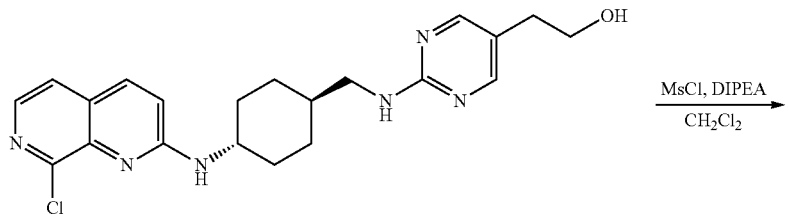

Example 46

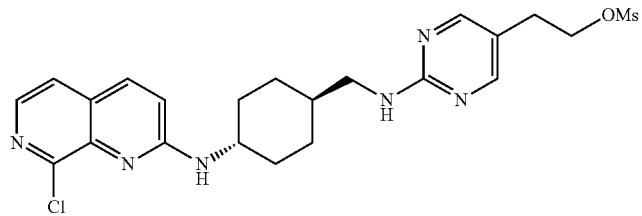

47-1

To a solution of compound (C46) (50 mg, 0.12 mmol, 1.0 eq) in anhydrous $CH_2Cl_2$ (5 mL) was added DIPEA (46.5 mg, 0.36 mmol, 3.0 eq) and MsCl (20.6 mg, 0.18 mmol, 1.5 eq). The resulting mixture was stirred at 28-38° C. for 4 hours. Then the mixture was poured into water (60 mL), extracted with $CH_2Cl_2$ (30 mL×2). The combined organic phase was washed with brine (30 mL), dried over anhydrous $Na_2SO_4$, filtered and concentrated under reduced pressure to give 2-(2-((((1,4-trans)-4-((8-chloro-1,7-naphthyridin-2-yl)amino)cyclohexyl)methyl)amino)pyrimidin-5-yl)ethyl methanesulfonate (47-1), which was used without further purification. MS: [M+H]$^+$=491.1.

Step 2: 8-chloro-N-((1,4-trans)-4-(((5-(2-((3-methyl-oxetan-3-yl)amino)ethyl)pyrimidin-2-yl)amino)methyl)cyclohexyl)-1,7-naphthyridin-2-amine (C47)

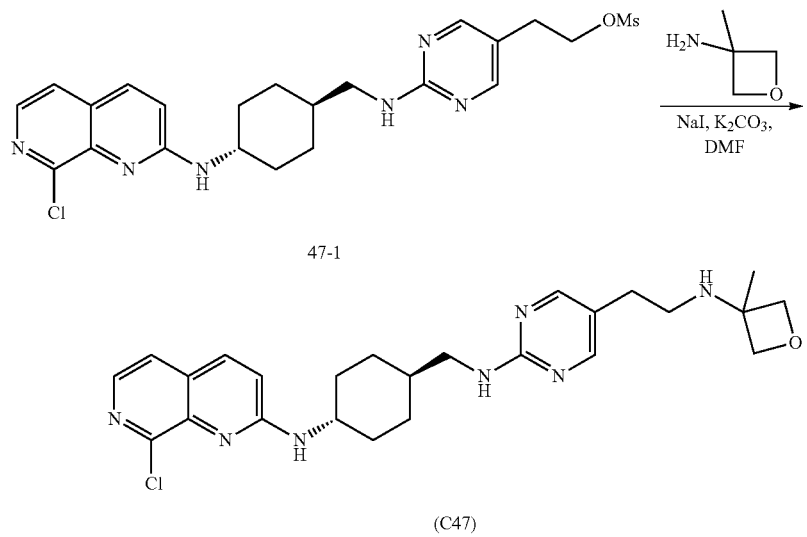

To a solution of (47-1) (65 mg, 0.13 mmol, 1.0 eq) in DMF (5 mL) was added 3-methyloxetan-3-amine (23 mg, 0.26 mmol, 2.0 eq), K₂CO₃ (90 mg, 0.65 mmol, 5.0 eq) and NaI (97.4 mg, 0.65 mmol, 5.0 eq). The reaction mixture was heated at 80° C. for 18 hours. Then the reaction mixture was cooled to room temperature, filtered and the filtrate was concentrated under reduced pressure. The crude product was purified by preparative HPLC (column: DuraShell 150 mm×25 mm×5 um: 24-54% B (A=0.05% NH₄OH in water, B=acetonitrile)) to give Synthesis of 8-chloro-N-((1,4-trans)-4-(((5-(2-((3-methyloxetan-3-yl)amino)ethyl)pyrimidin-2-yl)amino)methyl)cyclohexyl)-1,7-naphthyridin-2-amine (C47). $^1$H NMR (400 MHz, DMSO-d$_6$): δ ppm 8.15 (s, 2H), 7.96 (d, J=4.8 Hz, 1H), 7.91 (d, J=8.8 Hz, 1H), 7.56 (d, J=5.2 Hz, 1H), 7.51 (d, J=6.8 Hz, 1H), 7.02-6.99 (m, 2H), 4.41 (d, J=5.2 Hz, 2H), 4.16 (d, J=5.6 Hz, 2H), 3.91 (br s, 1H), 3.15 (t, J=6.4 Hz, 2H), 2.64 (t, J=7.2 Hz, 2H), 2.46 (t, J=7.2 Hz, 2H), 2.24 (br s, 1H), 2.14-2.11 (m, 2H), 1.85-1.82 (m, 2H), 1.57 (br s, 1H), 1.33 (s, 3H), 1.25-1.19 (m, 2H), 1.12-1.03 (m, 2H). MS: [M+H]⁺=482.3.

Example 48

8-chloro-N-((1,4-trans)-4-(((5-(2-(oxetan-3-ylamino)ethyl)pyrimidin-2-yl)amino)methyl)cyclohexyl)-1,7-naphthyridin-2-amine (C48)

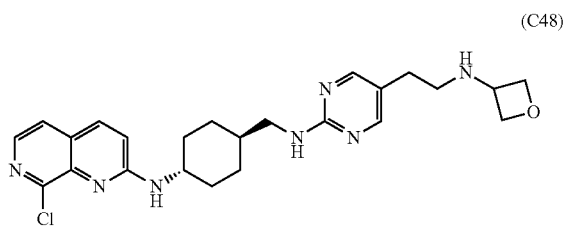 [SMILES: Clc1nccc2ccc(N[C@H]3CC[C@H](CNc4ncc(CCNC5COC5)cn4)CC3)nc12]

The title compound was prepared by using a procedure similar to that of in Step 2 of Example 47, with 3-methyloxetan-3-amine being replaced with oxetan-3-amine. $^1$H NMR (400 MHz, DMSO-d$_6$): δ ppm 8.12 (s, 2H), 7.96 (d, J=5.2 Hz, 1H), 7.91 (d, J=9.2 Hz, 1H), 7.56 (d, J=5.2 Hz, 1H), 7.51 (d, J=7.2 Hz, 1H), 7.03-6.98 (m, 2H), 4.60 (t, J=6.4 Hz, 2H), 4.31 (t, J=6.0 Hz, 2H), 3.88-3.85 (m, 2H), 3.14 (t, J=6.4 Hz, 2H), 2.60 (t, J=7.2 Hz, 2H), 2.44 (t, J=7.2 Hz, 2H), 2.13-2.11 (m, 2H), 1.85-1.82 (m, 2H), 1.57 (br s, 1H), 1.19-1.16 (m, 2H), 1.12-1.06 (m, 2H). MS: [M+H]⁺=468.2.

Example 49

2-(2-((((1,4-trans)-4-((8-chloro-1,7-naphthyridin-2-yl)amino)cyclohexyl)methyl)amino)pyrimidin-5-yl)-N-(2-cyanoethyl)-N-(oxetan-3-yl)acetamide (C49)

Step 1: 3-(oxetan-3-ylamino)propanenitrile (49-1)

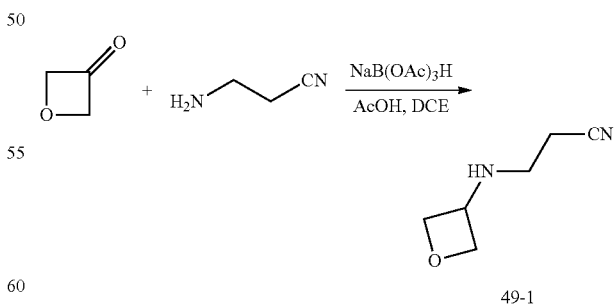

To a solution of 3-aminopropanenitrile (280 mg, 4.00 mmol, 1.0 eq) in DCE (25 mL) was added oxetan-3-one (432.4 mg, 6.00 mmol, 1.5 eq) and AcOH (720.6 mg, 12.00 mmol, 3.0 eq). After stirred for 10 minutes, NaB(OAc)₃H (2.54 g, 12.00 mmol, 3.0 eq) was added to the reaction mixture. The resulting mixture was stirred at 23-31° C. for 18 hours. Then the reaction mixture was diluted with CH$_2$Cl$_2$ (100 mL), and the organic phase was washed with saturated aqueous NaHCO$_3$ solution (100 mL) and brine (50 mL), dried over anhydrous sodium sulfate, filtered and concentrated under reduced pressure to 3-(oxetan-3-ylamino)propanenitrile (49-1), which was used directly for next step.

Step 2: 2-(2-((((1,4-trans)-4-((8-chloro-1,7-naphthyridin-2-yl)amino)cyclohexyl)methyl)amino) pyrimidin-5-yl)-N-(2-cyanoethyl)-N-(oxetan-3-yl)acetamide (C49)

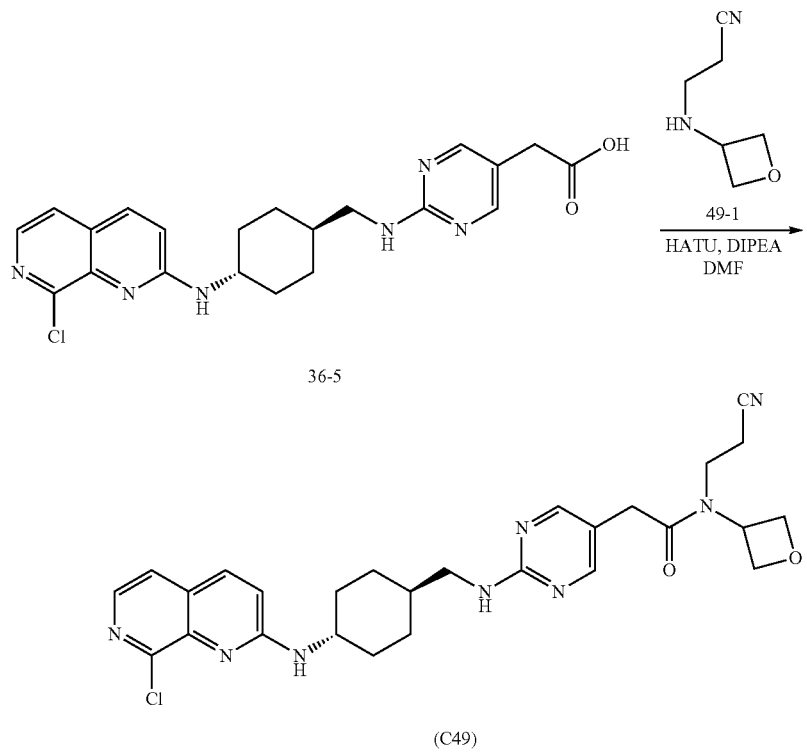

To a solution of (36-5) (50 mg, 0.12 mmol, 1.0 eq) in DMF (5 mL) was added (49-1) (23 mg, 0.18 mmol, 1.5 eq), DIPEA (77.5 mg, 0.60 mmol, 5.0 eq) and HATU (91 mg, 0.24 mmol, 2.0 eq). The resulting mixture was stirred at 25-32° C. for 2 hours. The mixture was concentrated under reduced pressure. The crude product was purified by preparative HPLC (column: DuraShell 150 mm×25 mm×5 um: 29-39% B (A=0.05% NH$_4$OH in water, B=acetonitrile)) to give 2-(2-((((1,4-trans)-4-((8-chloro-1,7-naphthyridin-2-yl)amino)cyclohexyl)methyl)amino)pyrimidin-5-yl)-N-(2-cyanoethyl)-N-(oxetan-3-yl)acetamide (C49). $^1$H NMR (400 MHz, DMSO-d$_6$), existed of ratomers: δ ppm 8.06 (d, J=9.6 Hz, 2H), 7.96 (d, J=5.2 Hz, 1H), 7.91 (d, J=9.2 Hz, 1H), 7.56 (d, J=5.2 Hz, 1H), 7.51 (d, J=6.8 Hz, 1H), 7.12 (t, J=6.4 Hz, 1H), 7.00 (d, J=8.8 Hz, 1H), 5.33-5.29 (m, 0.5H), 4.84-4.80 (m, 0.5H), 4.73-4.70 (m, 2H), 4.61-4.59 (m, 2H), 3.91 (br s, 1H), 3.81-3.74 (m, 2H), 3.61 (s, 1H), 3.49 (s, 1H), 3.16 (t, J=6.0 Hz, 2H), 2.84-2.78 (m, 2H), 2.14-2.11 (m, 2H), 1.85-1.82 (m, 2H), 1.58 (br s, 1H), 1.25-1.16 (m, 2H), 1.13-1.04 (m, 2H). MS: [M+H]$^+$=535.2.

Example 50

2-(2-((((1,4-trans)-4-((8-chloro-1,7-naphthyridin-2-yl)amino)cyclohexyl) methyl)amino)pyrimidin-5-yl)-N-(2-cyanoethyl)-N-ethylacetamide (C50)

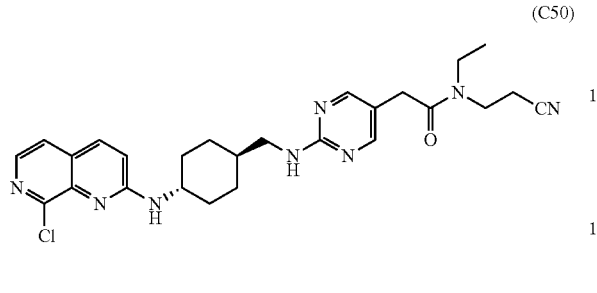

The title compound was prepared by using a procedure similar to that in Step 2 of Example 49, with 3-(oxetan-3-ylamino)propanenitrile (49-1) being replaced with 3-(ethylamino)propanenitrile. $^1$H NMR (400 MHz, DMSO-d$_6$): δ ppm 8.08 (d, J=8.4 Hz, 2H), 7.96 (d, J=5.2 Hz, 1H), 7.91 (d, J=8.8 Hz, 1H), 7.56 (d, J=4.8 Hz, 1H), 7.52 (d, J=7.2 Hz, 1H), 7.12 (t, J=5.6 Hz, 1H), 7.00 (d, J=8.8 Hz, 1H), 3.91 (br s, 1H), 3.69 (t, J=6.8 Hz, 1H), 3.56-3.44 (m, 5H), 3.15 (t, J=6.0 Hz, 2H), 2.87 (t, J=6.8 Hz, 1H), 2.72 (t, J=6.8 Hz, 1H), 2.14-2.11 (m, 2H), 1.86-1.83 (m, 2H), 1.58 (br s, 1H), 1.25-1.19 (m, 2H), 1.17-1.00 (m, 5H). MS: [M+H]$^+$=507.4.

Example 51

2-(2-((((1,4-trans)-4-((8-chloro-1,7-naphthyridin-2-yl)amino)cyclohexyl) methyl)amino)pyrimidin-5-yl)-N-(2-hydroxyethyl)-N-(oxetan-3-yl)acetamide (C51)

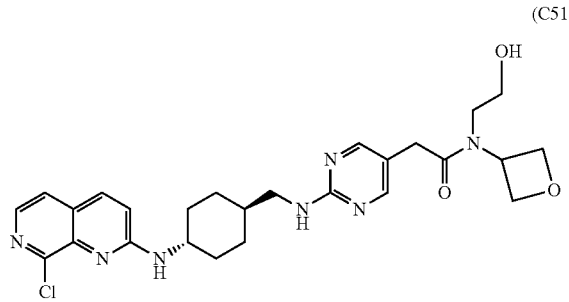

The title compound was prepared by using a procedure similar to that in Step 2 of Example 49 with 3-(oxetan-3-ylamino)propanenitrile (49-1) being replaced with 2-(oxetan-3-ylamino)ethan-1-ol. $^1$H NMR (400 MHz, DMSO-d$_6$, T=80° C.): δ ppm 8.09 (s, 2H), 7.95 (d, J=5.6 Hz, 1H), 7.88 (d, J=9.2 Hz, 1H), 7.52 (d, J=4.8 Hz, 1H), 7.18 (d, J=7.2 Hz, 1H), 7.02 (d, J=9.2 Hz, 1H), 6.66 (t, J=5.6 Hz, 1H), 4.98 (br s, 1H), 4.65-4.63 (m, 4H), 3.89 (br s, 1H), 3.57-3.52 (m, 6H), 3.22 (t, J=6.0 Hz, 2H), 2.17-2.14 (m, 2H), 1.89-1.86 (m, 2H), 1.63 (br s, 1H), 1.33-1.23 (m, 2H), 1.19-1.09 (m, 2H). MS: [M+H]$^+$=526.2.

Example 52

2-(2-((((1,4-trans)-4-((8-chloro-1,7-naphthyridin-2-yl)amino)cyclohexyl)methyl)amino)pyrimidin-5-yl)-N-(oxetan-3-yl)propanamide (C52)

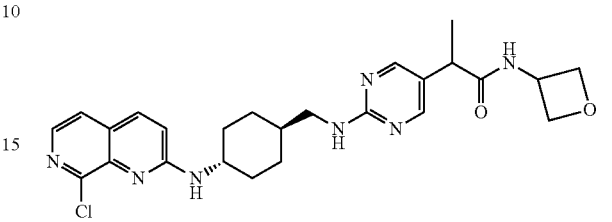

The title compound was prepared by using a procedure similar to that of Example 36, except (13-2) was replaced with

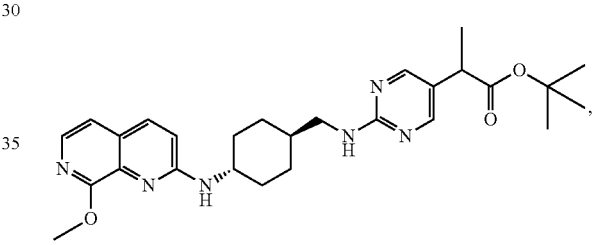

which was prepared by using a procedure similar to that in Step 2 of Example 13, with tert-butyl 2-bromoacetate being replaced with tert-butyl 2-bromopropanoate. The product was purified by preparative HPLC (column: DuraShell 150 mm×25 mm×5 m: 35-65% B (A=0.5% NH$_4$OH in water, B=acetonitrile)) to give 2-(2-((((1,4-trans)-4-((8-chloro-1,7-naphthyridin-2-yl)amino)cyclohexyl)methyl)amino)pyrimidin-5-yl)-N-(oxetan-3-yl)propanamide (C52). $^1$H NMR (400 MHz, DMSO-d$_6$): δ ppm 8.73 (d, J=6.8 Hz, 1H), 8.17 (s, 2H), 7.96 (d, J=5.2 Hz, 1H), 7.91 (d, J=8.8 Hz, 1H), 7.55 (d, J=5.2 Hz, 1H), 7.50 (d, J=6.8 Hz, 1H), 7.15 (t, J=6.0 Hz, 1H), 7.00 (d, J=8.8 Hz, 1H), 4.76-4.65 (m, 3H), 4.41 (t, J=6.0 Hz, 1H), 4.35 (t, J=6.0 Hz, 1H), 3.91 (br s, 1H), 3.41 (q, J=6.8 Hz, 1H), 3.15 (t, J=6.0 Hz, 2H), 2.13-2.11 (m, 2H), 1.85-1.82 (m, 2H), 1.57 (br s, 1H), 1.29 (d, J=7.2 Hz, 3H), 1.25-1.16 (m, 2H), 1.13-1.03 (m, 2H). MS: [M+H]$^+$=496.2.

Example 53 and Example 54

(S)-2-(2-((((1,4-trans)-4-((8-chloro-1,7-naphthyridin-2-yl)amino)cyclohexyl)methyl)amino)pyrimidin-5-yl)-N-(oxetan-3-yl)propanamide (C53) and (R)-2-(2-((((1,4-trans)-4-((8-chloro-1,7-naphthyridin-2-yl)amino)cyclohexyl)methyl)amino)pyrimidin-5-yl)-N-(oxetan-3-yl)propanamide (C54)

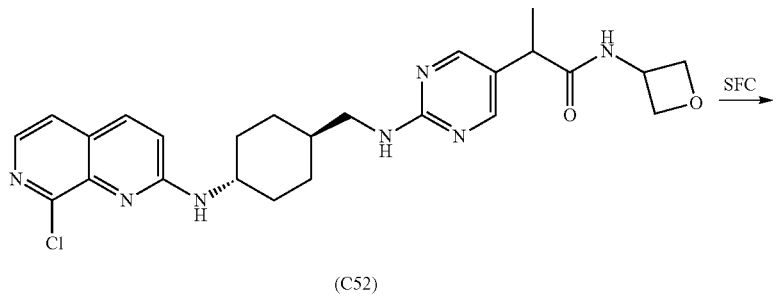

(C52)

SFC →

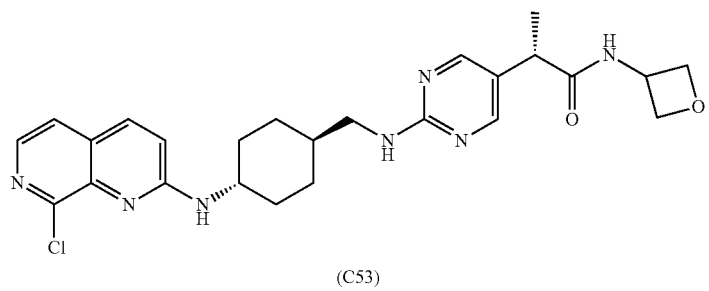

(C53)

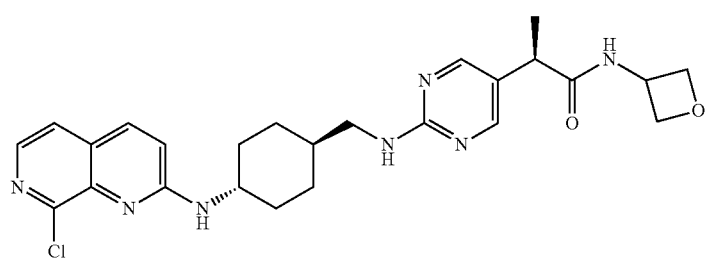

(C54)

Compound (C52) (32 mg, 0.0645 mmol) was separated by SFC (Chiralpak AD-3 100×4.6 mm I.D., 3 um; 40% of ethanol (0.05% DEA) in CO$_2$, Flow rate: 2.8 mL/min) to give Peak 1 ($t_R$=3.61 min) and Peak 2 ($t_R$=4.22 min).

Peak 1 (C53 or C54): $^1$H NMR (400 MHz, DMSO-d6): δ ppm 8.74 (d, J=6.4 Hz, 1H), 8.17 (s, 2H), 7.96 (d, J=5.2 Hz, 1H), 7.91 (d, J=9.2 Hz, 1H), 7.55 (d, J=5.6 Hz, 1H), 7.51 (d, J=6.8 Hz, 1H), 7.15 (t, J=5.6 Hz, 1H), 6.99 (d, J=9.2 Hz, 1H), 4.77-4.65 (m, 3H), 4.41 (t, J=5.6 Hz, 1H), 4.35 (t, J=6.0 Hz, 1H), 3.90 (br s, 1H), 3.41 (q, J=7.2 Hz, 1H), 3.15 (t, J=6.0 Hz, 2H), 2.13-2.10 (m, 2H), 1.84-1.81 (m, 2H), 1.57 (br s, 1H), 1.30 (d, J=7.2 Hz, 3H), 1.22-1.16 (m, 2H), 1.12-1.06 (m, 2H). MS: [M+H]$^+$=496.2.

Peak 2 (C53 or C54): $^1$H NMR (400 MHz, DMSO-d6): δ ppm 8.74 (d, J=5.6 Hz, 1H), 8.17 (s, 2H), 7.96 (d, J=5.2 Hz, 1H), 7.91 (d, J=8.8 Hz, 1H), 7.55 (d, J=5.6 Hz, 1H), 7.51 (d, J=7.2 Hz, 1H), 7.15 (t, J=6.0 Hz, 1H), 6.99 (d, J=8.8 Hz, 1H), 4.77-4.65 (m, 3H), 4.41 (t, J=5.6 Hz, 1H), 4.35 (t, J=5.6 Hz, 1H), 3.90 (br s, 1H), 3.41 (q, J=7.2 Hz, 1H), 3.15 (t, J=6.0 Hz, 2H), 2.13-2.11 (m, 2H), 1.85-1.82 (m, 2H), 1.57 (br s, 1H), 1.30 (d, J=7.2 Hz, 3H), 1.21-1.16 (m, 2H), 1.11-1.05 (m, 2H). MS: [M+H]$^+$=496.2.

Example 55

2-(2-((((1,4-trans)-4-((8-chloro-1,7-naphthyridin-2-yl)amino)cyclohexyl) methyl)amino)pyrimidin-5-yl)-N-methyl-N-(oxetan-3-yl)propanamide (C55)

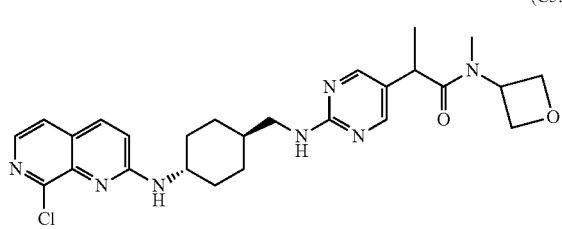

(C55)

The title compound was prepared by using a procedure similar to that of Example 52, except in Step 4 of Example 36 oxetan-3-amine is replaced with N-methyloxetan-3-amine. The product was purified by prep-HPLC (column: Waters Xbridge Prep OBD C18 150 mm×30 mm×5 um: 22-52% B (A=NH$_4$OH 0.5%, B=acetonitrile)) to give 2-(2-((((1,4-trans)-4-((8-chloro-1,7-naphthyridin-2-yl)amino)cyclohexyl)methyl)amino)pyrimidin-5-yl)-N-methyl-N-(oxetan-3-yl)propanamide (C55). $^1$H NMR (400 MHz, DMSO-d$_6$, T=80° C.): δ ppm 8.16 (s, 2H), 7.95 (d, J=5.2 Hz, 1H), 7.88 (d, J=9.2 Hz, 1H), 7.51 (d, J=5.2 Hz, 1H), 7.18 (d, J=6.8 Hz, 1H), 7.02 (d, J=9.2 Hz, 1H), 6.73 (t, J=6.0 Hz, 1H), 5.21-5.18 (m, 1H), 4.69-4.67 (m, 1H), 4.60-4.55 (m, 3H), 3.95-3.89 (m, 2H), 3.21 (t, J=6.4 Hz, 2H), 3.05 (s, 3H), 2.16-2.14 (m, 2H), 1.88-1.85 (m, 2H), 1.56 (br s, 1H), 1.33-1.26 (m, 5H), 1.16-1.12 (m, 2H). MS: [M+H]$^+$=510.2.

Example 56 and Example 57

(S)-2-(2-((((1,4-trans)-4-((8-chloro-1,7-naphthyridin-2-yl)amino)cyclohexyl) methyl)amino)pyrimidin-5-yl)-N-methyl-N-(oxetan-3-yl)propanamide (C56)
and (R)-2-(2-((((1,4-trans)-4-((8-chloro-1,7-naphthyridin-2-yl)amino)cyclohexyl) methyl)amino)pyrimidin-5-yl)-N-methyl-N-(oxetan-3-yl)propanamide (C57)

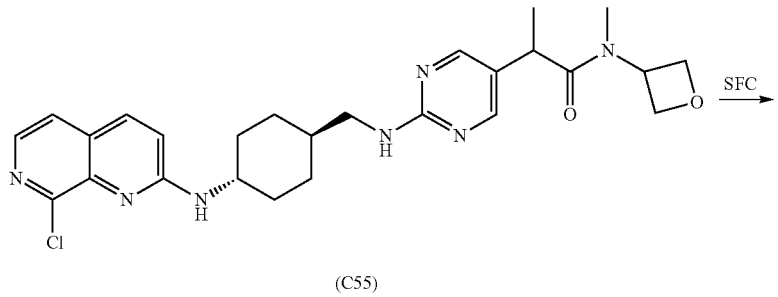

(C55) →SFC

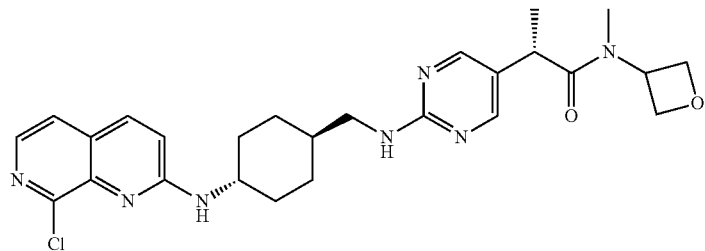

(C56)

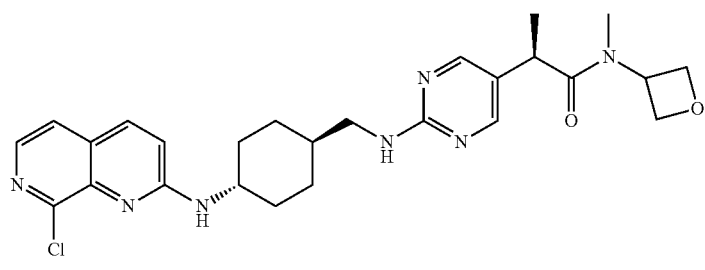

(C57)

Compound (C55) was separated by SFC (Chiralpak AD-3 100×4.6 mm I.D., 3 um; 40% of ethanol (0.05% DEA) in $CO_2$; Flow rate: 2.8 mL/min) to give Peak 1 ($t_R$=3.61 min) and Peak 2 ($t_R$=4.22 min).

Peak 1 (C56 or C57): $^1$H NMR (400 MHz, DMSO-$d_6$), existed as rotamers: δ ppm 8.16 (s, 1.2H), 8.12 (s, 0.8H), 7.96 (d, J=5.1 Hz, 1H), 7.91 (d, J=8.9 Hz, 1H), 7.56 (d, J=5.2 Hz, 1H), 7.53 (d, J=7.0 Hz, 1H), 7.24-7.17 (m, 1H), 6.99 (d, J=8.6 Hz, 1H), 5.38-5.15 (m, 1H), 4.78-4.33 (m, 4H), 3.96-3.88 (m, 2H), 3.14 (t, J=6.3 Hz, 2H), 3.03 (s, 1.5H), 3.02 (s, 1.5H), 2.13-2.10 (m, 2H), 1.84-1.82 (m, 2H), 1.57 (br s, 1H), 1.26-1.03 (m, 7H). MS: [M+H]$^+$=510.0.

Peak 2 (C56 or C57): $^1$H NMR (400 MHz, DMSO-$d_6$), existed as rotamers: δ ppm 8.16 (s, 1.3H), 8.12 (s, 0.8H), 7.96 (d, J=5.1 Hz, 1H), 7.91 (d, J=8.9 Hz, 1H), 7.56 (d, J=5.2 Hz, 1H), 7.53 (d, J=7.1 Hz, 1H), 7.24-7.14 (m, 1H), 6.99 (d, J=8.6 Hz, 1H), 5.34-5.15 (m, 1H), 4.78-4.33 (m, 4H), 3.94-3.90 (m, 2H), 3.15 (t, J=6.2 Hz, 2H), 3.03 (s, 1.5H), 3.02 (s, 1.5H), 2.13-2.11 (m, 2H), 1.84-1.82 (m, 2H), 1.56 (br s, 1H), 1.26-1.03 (m, 7H). MS: [M+H]$^+$=510.0.

Example 58

N-((2-((((1,4-trans)-4-((8-chloro-1,7-naphthyridin-2-yl)amino)cyclohexyl)methyl)amino)pyrimidin-5-yl)methyl)azetidine-2-carboxamide (C58)

Step 1: 2-((2-((((1,4-trans)-4-((8-chloro-1,7-naphthyridin-2-yl)amino)cyclohexyl)methyl)amino)pyrimidin-5-yl)methyl)isoindoline-1,3-dione (58-1)

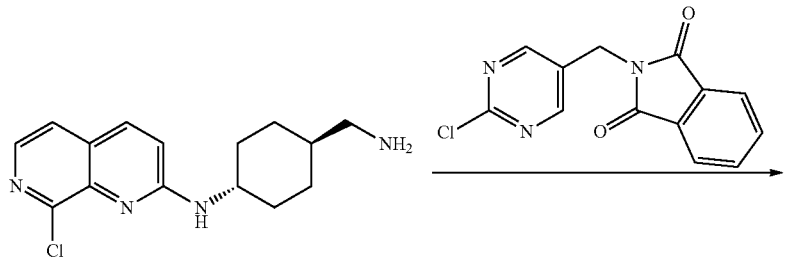

26-1

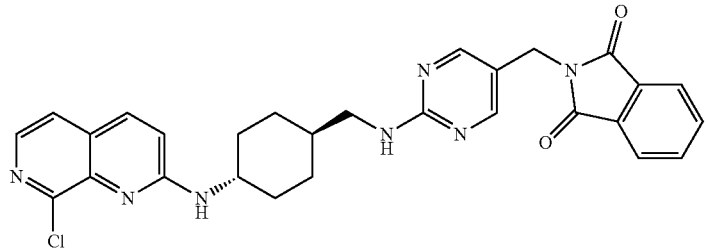

58-1

To a solution of (26-1) (75 mg, 0.26 mmol, 1.0 eq) in NMP (3 mL) was added DIEA (168 mg, 1.3 mmol, 5.0 eq) and 2-((2-chloropyrimidin-5-yl)methyl)isoindoline-1,3-dione (78 mg, 0.28 mmol, 1.1 eq). The reaction mixture was heated at 100° C. for 4 hours. The mixture was diluted with EtOAc (10 mL) and washed three times with brine (20 mL). The organic phase was dried over anhydrous $Na_2SO_4$, filtered and concentrated. The crude product was purified by column chromatography on silica gel (petroleum ether/EtOAc=1/1) to give 2-((2-((((1,4-trans)-4-((8-chloro-1,7-naphthyridin-2-yl)amino)cyclohexyl)methyl)amino)pyrimidin-5-yl)methyl)isoindoline-1,3-dione (58-1). MS: [M+H]$^+$=528.3.

Step 2: N-((1,4-trans)-4-(((5-(aminomethyl)pyrimidin-2-yl)amino)methyl)cyclohexyl)-8-chloro-1,7-naphthyridin-2-amine (58-2)

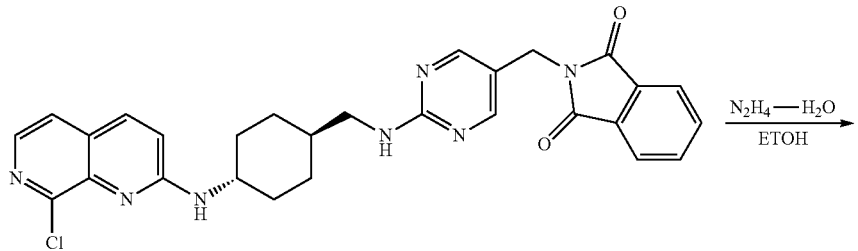

58-1

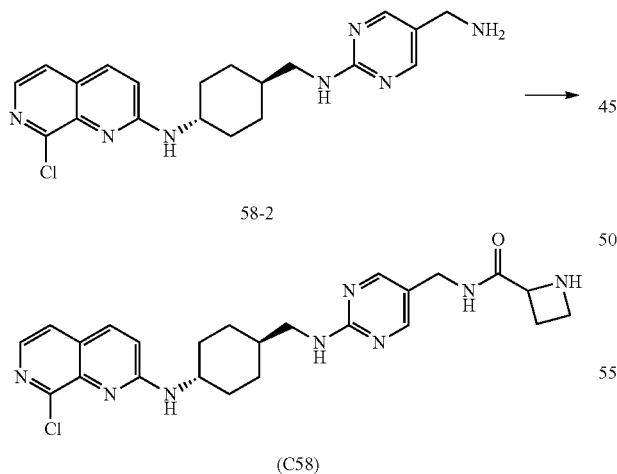

58-2

To a solution of (58-1) (100 mg, 0.185 mmol, 1.0 eq) in EtOH (4 mL) was added N₂H₂—H₂O (1 mL, 85%). The reaction mixture was stirred at 25° C. for 1 hour. The mixture was lyophilized to give N-((1,4-trans)-4-(((5-(aminomethyl)pyrimidin-2-yl)amino)methyl)cyclohexyl)-8-chloro-1,7-naphthyridin-2-amine (58-2).

Step 3: N-((2-((((1,4-trans)-4-((8-chloro-1,7-naphthyridin-2-yl)amino)cyclohexyl)methyl)amino)pyrimidin-5-yl)methyl)azetidine-2-carboxamide (C58)

To a solution of (58-2) (37 mg, 0.09 mmol, 1.0 eq) in DMF (3 mL) was added 1-(tert-butoxycarbonyl)azetidine-2-carboxylic acid (20 mg, 0.09 mmol, 1.0 eq), DIEA (35 mg, 0.27 mmol, 3.0 eq) and HATU (89 mg, 0.27 mmol, 3.0 eq). The resulting mixture was stirred at 25° C. for 1 hour. The mixture was diluted with EtOAc (50 mL) and washed three times with brine (30 mL). The organic phase was dried over anhydrous Na₂SO₄, filtered and concentrated. The residue was dissolved in Cl₂CH₂ (2 mL) and TFA (0.4 mL). The mixture was stirred at 25° C. for 1.5 hours. The mixture was concentrated to give the crude product which was purified by preparative HPLC (column: Waters Xbridge 150 mm×25 mm×5 um: 20-50% B (A=10 mM NH₄HCO₃ in water, B=acetonitrile)) to give N-((2-((((1,4-trans)-4-((8-chloro-1,7-naphthyridin-2-yl)amino)cyclohexyl)methyl)amino)pyrimidin-5-yl)methyl)azetidine-2-carboxamide (C58). ¹H NMR (400 MHz, DMSO-d₆): δ ppm 8.30 (t, J=6.0 Hz, 1H), 8.18 (s, 2H), 7.95 (d, J=5.2 Hz, 1H), 7.91 (d, J=9.2 Hz, 1H), 7.55 (d, J=5.2 Hz, 1H), 7.50 (d, J=7.2 Hz, 1H), 7.17 (t, J=6.0 Hz, 1H), 6.99 (d, J=9.2 Hz, 1H), 4.12-4.09 (m, 3H), 3.90 (br s, 1H), 3.52 (q, J=8.0 Hz, 2H), 3.17-3.14 (m, 2H), 2.42-2.39 (m, 1H), 2.14-2.07 (m, 3H), 1.84-1.81 (m, 2H), 1.57 (br s, 1H), 1.22-1.09 (m, 4H). MS: [M+H]⁺=481.3.

Example 59

N-((2-((((1,4-trans)-4-((8-chloro-1,7-naphthyridin-2-yl)amino)cyclohexyl)methyl)amino)pyrimidin-5-yl)methyl)oxetane-3-carboxamide (C59)

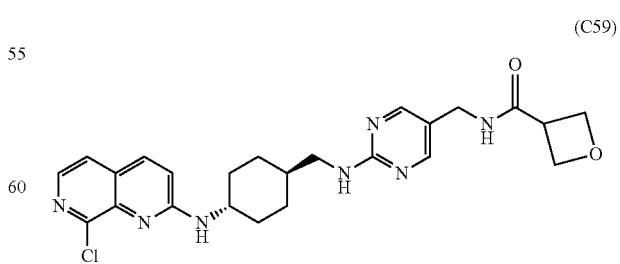

The title compound was prepared by using a procedure similar to that in Step 3 of Example 58, with 1-(tert-butoxycarbonyl)azetidine-2-carboxylic acid being replaced with oxetane-3-carboxylic acid. $^1$H NMR (400 MHz, DMSO-d$_6$): δ ppm 8.27 (t, J=5.2 Hz, 1H), 8.17 (s, 2H), 7.95 (d, J=5.2 Hz, 1H), 7.91 (d, J=8.8 Hz, 1H), 7.55 (d, J=5.2 Hz, 1H), 7.50 (d, J=7.2 Hz, 1H), 7.20 (t, J=5.6 Hz, 1H), 6.99 (d, J=8.0 Hz, 1H), 4.63-4.57 (m, 4H), 4.07 (d, J=5.2 Hz, 2H), 3.89 (br s, 1H), 3.76-3.69 (m, 1H), 3.16 (t, J=6.4 Hz, 2H), 2.13-2.11 (m, 2H), 1.84-1.81 (m, 2H), 1.57 (br s, 1H), 1.24-1.03 (m, 4H). MS: [M+H]$^+$=482.2.

Example 60

2-((((1,4-trans)-4-((8-(methylamino)-1,7-naphthyridin-2-yl)amino)cyclohexyl)methyl)amino)pyrimidine-5-carbonitrile (C60)

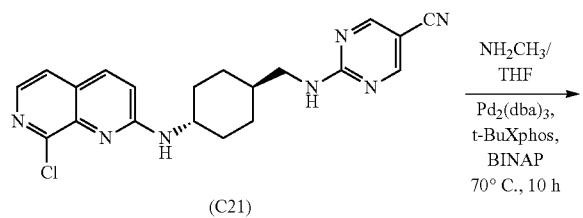

To a solution of compound (C21) (140 mg, 0.36 mmol, 1.0 eq) in THF (2 mL) was added t-BuONa (48 mg, 0.5 mmol, 1.4 eq) and Pd$_2$(dba)$_3$ (33 mg, 0.036 mmol, 0.1 eq), t-BuXphos (15 mg, 0.036 mmol, 0.1 eq) and MeNH$_2$ (2 mL, 2 M in THF) under N$_2$ protection. The mixture was stirred at 70° C. for 12 hours. The mixture was filtered and the filtrate was added to H$_2$O (20 mL), and extracted twice with EtOAc (50 mL). The combined organic layers were dried over anhydrous sodium sulfate and concentrated. The crude product was purified by column chromatography (petroleum ether/EtOAc from 3/1 to EtOAc) to give 2-((((1,4-trans)-4-((8-(methylamino)-1,7-naphthyridin-2-yl)amino)cyclohexyl)methyl)amino)pyrimidine-5-carbonitrile (C60) which was re-purified by preparative HPLC (column: YMC-Actus Triart C18 150 mm×30 mm×5 um, gradient: 50-80% B (A=0.05% NH$_4$OH in water, B=acetonitrile)) to give (C60). $^1$H NMR (400 MHz, DMSO-d$_6$): δ ppm 8.71 (d, J=2.8 Hz, 1H), 8.63 (d, J=2.8 Hz, 1H), 8.42 (t, J=6.0 Hz, 1H), 7.64 (d, J=8.8 Hz, 1H), 7.58 (d, J=5.6 Hz, 1H), 6.89 (d, J=8.0 Hz, 1H), 6.80 (d, J=9.2 Hz, 1H), 6.70 (d, J=4.8 Hz, 1H), 6.61 (d, J=5.6 Hz, 1H), 3.98 (br s, 1H), 3.24 (t, J=6.4 Hz, 2H), 2.97 (d, J=5.2 Hz, 3H), 2.04-2.01 (m, 2H), 1.79-1.77 (m, 2H), 1.57 (br s, 1H), 1.23-1.09 (m, 4H). MS: [M+H]$^+$=389.2.

Example 61

2-((((1,4-trans)-4-((8-(methylamino)-1,7-naphthyridin-2-yl)amino)cyclohexyl)methyl)amino)pyrimidine-5-carboxamide (C61)

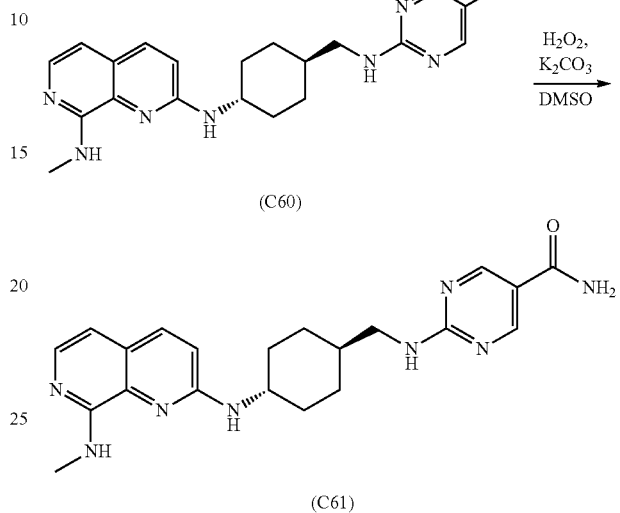

The title compound was prepared by using a procedure similar to that of Example 5, except Compound (C4) was replaced with Compound (C60) and the product was purified by preparative HPLC (column: YMC-Actus Triart C18 150 mm×30 mm×5 um, gradient: 38-68% B (A=0.05% NH$_4$OH in water, B=acetonitrile)) to give 2-((((1,4-trans)-4-((8-(methylamino)-1,7-naphthyridin-2-yl)amino)cyclohexyl)methyl)amino)pyrimidine-5-carboxamide (C61). $^1$H NMR (400 MHz, DMSO-d$_6$): δ ppm 8.72 (s, 1H), 8.68 (s, 1H), 7.84 (t, J=6.0 Hz, 1H), 7.78 (br s, 1H), 7.64 (d, J=9.2 Hz, 1H), 7.58 (d, J=5.6 Hz, 1H), 7.22 (br s, 1H), 6.89 (d, J=8.0 Hz, 1H), 6.70 (q, J=5.2 Hz, 1H), 6.61 (d, J=5.6 Hz, 1H), 3.99 (br s, 1H), 3.24 (t, J=6.4 Hz, 2H), 2.98 (d, J=4.8 Hz, 3H), 2.04-2.02 (m, 2H), 1.81-1.78 (m, 2H), 1.57 (br s, 1H), 1.24-1.10 (m, 4H). MS: [M+H]$^+$=407.2.

Example 62

N$^2$-((1,4-trans)-4-(((5-aminopyrimidin-2-yl)amino)methyl)cyclohexyl)-N$^8$-methyl-1,7-naphthyridine-2,8-diamine (C62)

Step 1: N$^8$-methyl-N$^2$-((1,4-trans)-4-(((5-nitropyrimidin-2-yl)amino)methyl)cyclohexyl)-1,7-naphthyridine-2,8-diamine (62-1)

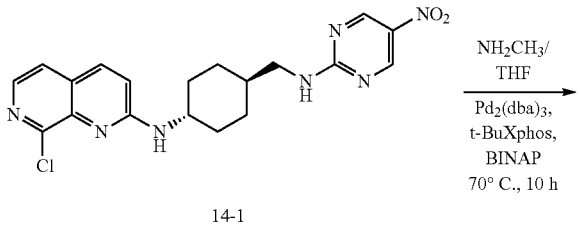

-continued

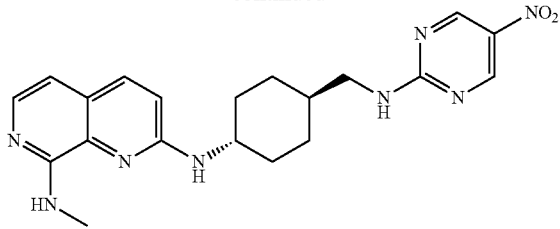

62-1

The title compound was prepared by using a procedure similar to that of Example 60, except Compound (C21) was replaced with (14-1) The product was purified by column chromatography (petroleum ether/EtOAc from 1/1 to 0/1) to give $N^8$-methyl-$N^2$-((1,4-trans)-4-(((5-nitropyrimidin-2-yl)amino)methyl)cyclohexyl)-1,7-naphthyridine-2,8-diamine (62-1). H NMR (400 MHz, CDCl$_3$): δ ppm 9.11 (d, J=3.2 Hz, 1H), 9.03 (d, J=3.2 Hz, 1H), 7.78 (d, J=6.0 Hz, 1H), 7.65 (d, J=8.8 Hz, 1H), 6.69 (t, J=6.0 Hz, 1H), 6.55 (br s, 1H), 6.09 (br s, 1H), 4.60 (d, J=6.0 Hz, 1H), 3.88 (br s, 1H), 3.49 (t, J=6.4 Hz, 2H), 3.24 (d, J=4.8 Hz, 3H), 2.23-2.21 (m, 2H), 1.95-1.93 (m, 2H), 1.26-1.23 (m, 5H). MS: [M+H]$^+$=409.1.

Step 2: $N^2$-((1,4-trans)-4-(((5-aminopyrimidin-2-yl)amino)methyl)cyclohexyl)-$N^8$-methyl-1,7-naphthyridine-2,8-diamine (C62)

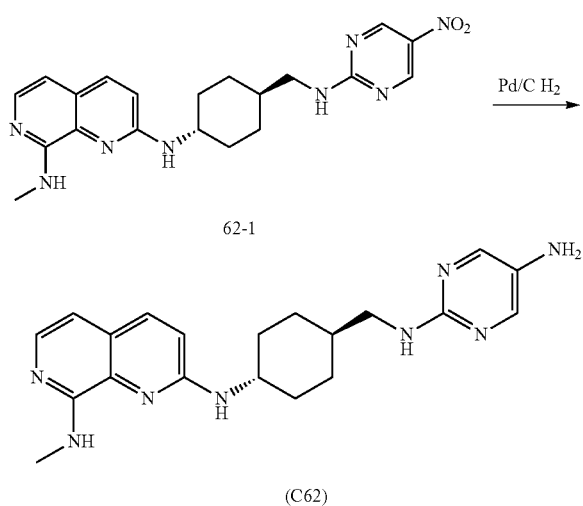

To a solution of (62-1) (50 mg, 0.12 mmol, 1.0 eq) in CH$_3$OH (10 mL) was added Pd/C (10%, 10 mg). The suspension was degassed and then purged with H$_2$ several times. The mixture was stirred under H$_2$ balloon at 30° C. for 1 hour. The reaction mixture was filtered and the filtrate was concentrated under reduced pressure. The crude product was purified by preparative HPLC (column: Phenomenex Gemini C18 200 mm×25 mm*×5 um, gradient: 29-49% B (A=0.05% NH$_4$HCO$_3$ in water, B=acetonitrile)) to give $N^2$-((1,4-trans)-4-(((5-aminopyrimidin-2-yl)amino)methyl)cyclohexyl)-$N^8$-methyl-1,7-naphthyridine-2,8-diamine (C62). $^1$H NMR (400 MHz, DMSO-d$_6$): δ ppm 7.79 (s, 2H), 7.64 (d, J=8.8 Hz, 1H), 7.58 (d, J=5.6 Hz, 1H), 6.88 (d, J=8.0 Hz, 1H), 6.80 (d, J=9.2 Hz, 1H), 6.68 (q, J=4.8 Hz, 1H), 6.61 (d, J=5.6 Hz, 1H), 6.22 (t, J=6.4 Hz, 1H), 4.36 (s, 2H), 3.97 (br s, 1H), 3.08 (t, J=6.4 Hz, 2H), 2.98 (d, J=4.8 Hz, 3H), 2.02 (br s, 2H), 1.79 (br s, 2H), 1.53 (br s, 1H), 1.19-1.08 (m, 4H). MS: [M+H]$^+$=379.2.

Example 63

N-(2-((((1,4-trans)-4-((8-(methylamino)-1,7-naphthyridin-2-yl)amino)cyclohexyl)methyl)amino)pyrimidin-5-yl)acetamide (C63)

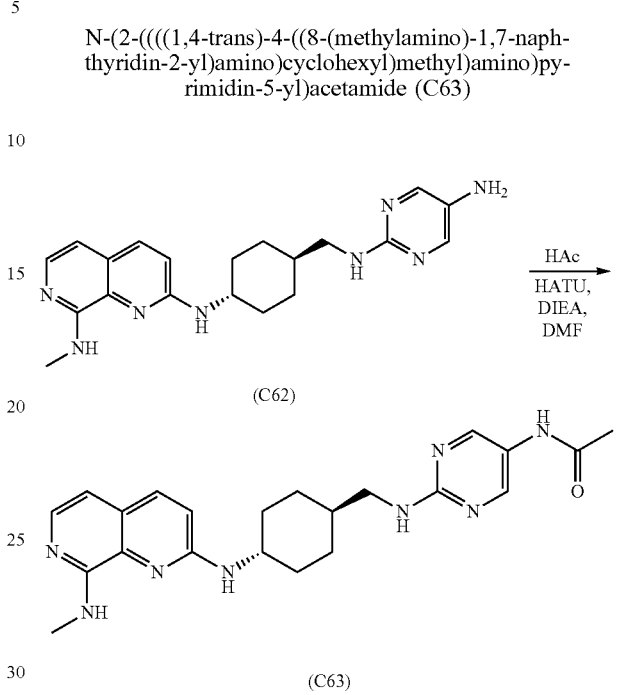

The title compound was prepared by using a procedure similar to that of intermediate (2-1), except Compound (C1) was replaced with Compound (C62) and the product was purified by preparative HPLC (column: Phenomenex Gemini C18 200 mm×25 mm×5 um, gradient: 24-44% B (A=0.05% NH$_4$CO$_3$ in water, B=acetonitrile)) to give N-(2-((((1,4-trans)-4-((8-(methylamino)-1,7-naphthyridin-2-yl)amino)cyclohexyl)methyl)amino)pyrimidin-5-yl)acetamide (C63). $^1$H NMR (400 MHz, DMSO-d$_6$): δ ppm 9.72 (s, 1H), 8.36 (s, 2H), 7.64 (d, J=8.8 Hz, 1H), 7.57 (d, J=5.6 Hz, 1H), 7.09 (t, J=6.0 Hz, 1H), 6.89 (d, J=7.6 Hz, 1H), 6.80 (d, J=8.8 Hz, 1H), 6.71 (d, J=4.8 Hz, 1H), 6.61 (d, J=5.6 Hz, 1H), 3.98 (br s, 1H), 3.15 (t, J=6.4 Hz, 2H), 2.98 (d, J=4.8 Hz, 3H), 2.03-2.01 (m, 2H), 2.00 (s, 3H), 1.79 (br s, 2H), 1.55 (br s, 1H), 1.21-1.09 (m, 4H). MS: [M+H]$^+$=421.2.

Example 64

3-(2-((((1,4-trans)-4-((8-chloro-1,7-naphthyridin-2-yl)amino)cyclohexyl)methyl)amino)pyrimidin-5-yl)oxazolidin-2-one (C64)

Step 1: N-((1,4-trans)-4-(((5-bromopyrimidin-2-yl)amino)methyl)cyclohexyl)-8-methoxy-1,7-naphthyridin-2-amine (64-1)

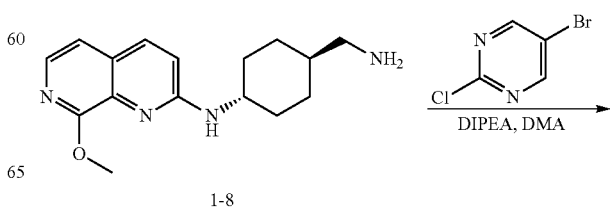

1-8

-continued

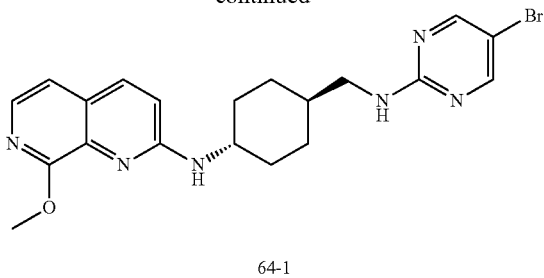

64-1

To a solution of (1-8) (518 mg, 1.81 mmol, 1.0 eq) in DMA (5 mL) was added 5-bromo-2-chloropyrimidine (454 mg, 2.35 mmol, 1.3 eq) and DIPEA (1167 mg, 9.05 mmol, 5.0 eq) and the mixture was stirred at 100° C. for 8 hour. The mixture was diluted with EtOAc (50 mL) and washed twice with brine (30 mL). The organic layer was dried over anhydrous sodium sulfate, filtered and concentrated. The crude product was purified by column chromatography on silica gel (petroleum ether/EtOAc from 2/1 to 1/1) to give N-((1,4-trans)-4-(((5-bromopyrimidin-2-yl)amino)methyl)cyclohexyl)-8-methoxy-1,7-naphthyridin-2-amine (64-1). MS: [M+H]$^+$=443.1/445.1.

Step 2: 3-(2-((((1,4-trans)-4-((8-methoxy-1,7-naphthyridin-2-yl)amino)cyclohexyl)methyl)amino)pyrimidin-5-yl)oxazolidin-2-one (64-2)

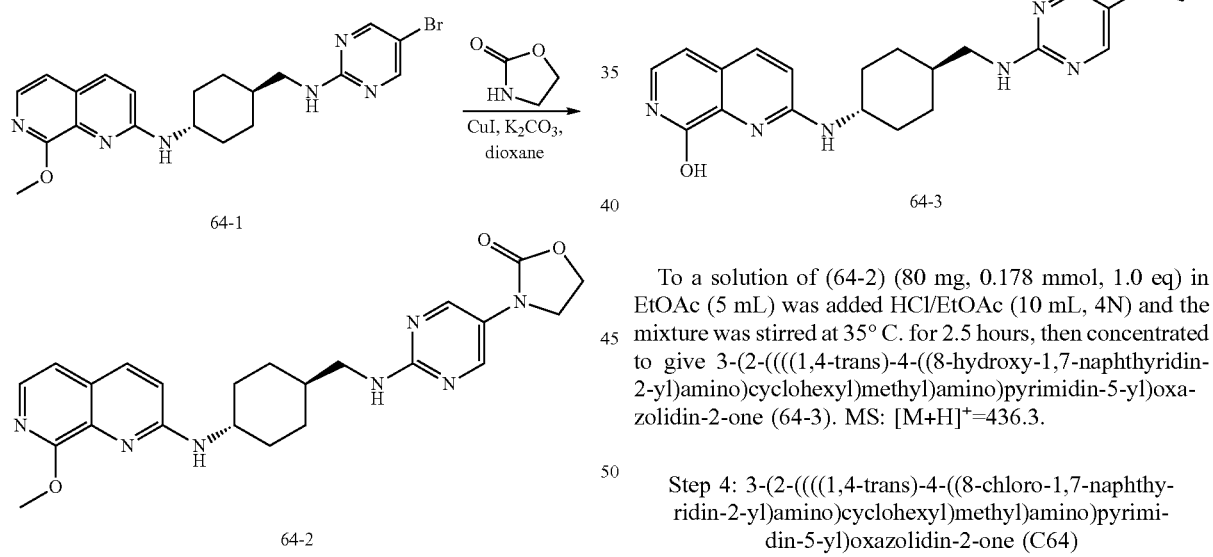

To a solution of (64-1) (100 mg, 0.23 mmol, 1.0 eq) in dioxane (2.5 mL) was added oxazolidin-2-one (98 mg, 1.13 mmol, 5.0 eq) and (1S,2S)-cyclohexane-1,2-diamine (26 mg, 0.23 mmol, 1.0 eq), CuI (13 mg, 0.07 mmol, 0.3 eq) and K$_2$CO$_3$ (63 mg, 0.46 mmol, 2.0 eq). The reaction mixture was stirred at 120° C. for 2 hours under microwave irradiation. The mixture was filtered and the filtrate was concentrated. The crude product was purified by column chromatography on silica gel (petroleum ether/EtOAc from 1/1 to 0/100) to give 3-(2-((((1,4-trans)-4-((8-methoxy-1,7-naphthyridin-2-yl)amino)cyclohexyl)methyl)amino)pyrimidin-5-yl)oxazolidin-2-one (64-2). $^1$H NMR (400 MHz, CDCl$_3$): δ ppm 8.45 (s, 2H), 7.81-7.78 (m, 2H), 7.02 (d, J=5.6 Hz, 1H), 6.84 (d, J=8.8 Hz, 1H), 5.26 (t, J=6.0 Hz, 1H), 5.09 (br s, 1H), 4.52 (t, J=8.4 Hz, 2H), 4.14 (s, 3H), 3.98 (t, J=8.0 Hz, 2H), 3.69-3.56 (m, 1H), 3.32 (t, J=6.4 Hz, 2H), 2.19-2.17 (m, 2H), 1.94-1.92 (m, 2H), 1.60 (br s, 1H), 1.27-1.17 (m, 4H). MS: [M+H]$^+$=450.1.

Step 3: 3-(2-((((1,4-trans)-4-((8-hydroxy-1,7-naphthyridin-2-yl)amino)cyclohexyl)methyl)amino)pyrimidin-5-yl)oxazolidin-2-one (64-3)

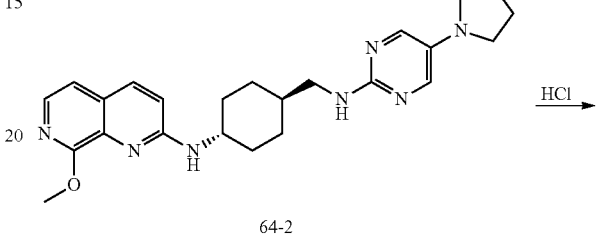

64-2

To a solution of (64-2) (80 mg, 0.178 mmol, 1.0 eq) in EtOAc (5 mL) was added HCl/EtOAc (10 mL, 4N) and the mixture was stirred at 35° C. for 2.5 hours, then concentrated to give 3-(2-((((1,4-trans)-4-((8-hydroxy-1,7-naphthyridin-2-yl)amino)cyclohexyl)methyl)amino)pyrimidin-5-yl)oxazolidin-2-one (64-3). MS: [M+H]$^+$=436.3.

Step 4: 3-(2-((((1,4-trans)-4-((8-chloro-1,7-naphthyridin-2-yl)amino)cyclohexyl)methyl)amino)pyrimidin-5-yl)oxazolidin-2-one (C64)

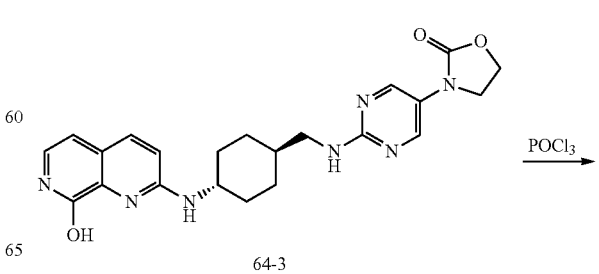

64-3

-continued

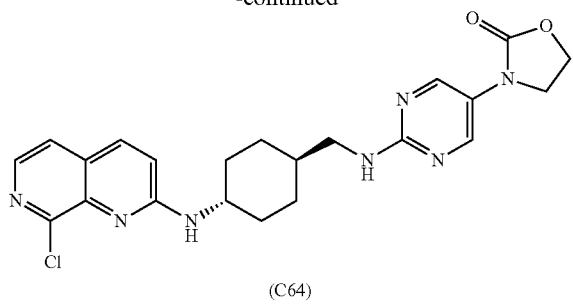

(C64)

A solution of (64-3) (75 mg, 0.17 mmol, 1.0 eq) in POCl$_3$ (5 mL) was stirred at 110° C. for 1.5 hours. The reaction mixture was concentrated under reduced pressure. The crude product was purified by preparative HPLC (column: DuraShell 150*25 mm*5 um, gradient: 34-64% B (A=0.5% NH$_4$HCO$_3$ in water, B=acetonitrile)) to give 3-(2-((((1,4-trans)-4-((8-chloro-1,7-naphthyridin-2-yl)amino)cyclohexyl)methyl)amino)pyrimidin-5-yl)oxazolidin-2-one (C64). H NMR (400 MHz, DMSO-d$_6$): δ ppm 8.42 (s, 2H), 7.95 (d, J=4.8 Hz, 1H), 7.91 (d, J=9.2 Hz, 1H), 7.55 (d, J=5.2 Hz, 1H), 7.51 (d, J=7.2 Hz, 1H), 7.31 (t, J=6.0 Hz, 1H), 6.99 (d, J=9.2 Hz, 1H), 4.45-4.41 (m, 2H), 3.97 (t, J=8.0 Hz, 2H), 3.91 (br s, 1H), 3.17 (t, J=6.4 Hz, 2H), 2.14-2.11 (m, 2H), 1.85-1.82 (m, 2H), 1.58 (br s, 1H), 1.25-1.04 (m, 4H). MS: [M+H]$^+$=454.1.

Example 65

Methyl (2-((((1,4-trans)-4-((8-chloro-1,7-naphthyridin-2-yl)amino)cyclohexyl)methyl)amino)pyrimidin-5-yl)(methyl)carbamate (C65)

Step 1: N$^2$-(((1,4-trans)-4-((8-methoxy-1,7-naphthyridin-2-yl)amino)cyclohexyl)methyl)-N$^5$-methylpyrimidine-2,5-diamine (65-1)

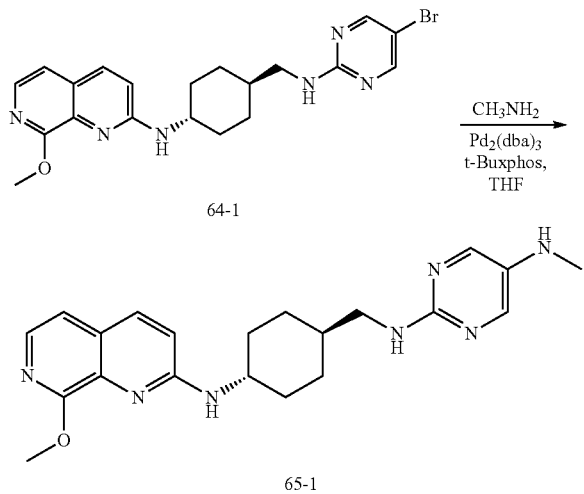

The title compound was prepared by using a procedure similar to that of Example 60, except Compound (C21) was replaced with (64-1) and the product was purified by column chromatography (petroleum ether/EtOAc from 1/1 to 0/100) to give N$^2$-(((1,4-trans)-4-((8-methoxy-1,7-naphthyridin-2-yl)amino)cyclohexyl)methyl)-N$^5$-methylpyrimidine-2,5-diamine (65-1). $^1$H NMR (400 MHz, CDCl$_3$): δ ppm 7.87 (s, 2H), 7.80-7.78 (m, 2H), 7.02 (d, J=5.6 Hz, 1H), 6.84 (d, J=9.2 Hz, 1H), 5.11 (br s, 1H), 4.76 (t, J=5.6 Hz, 1H), 4.14 (s, 3H), 3.79-3.52 (m, 1H), 3.27 (t, J=6.4 Hz, 2H), 2.81 (s, 3H), 2.18-2.16 (m, 2H), 1.96-1.93 (m, 2H), 1.50 (br s, 1H), 1.27-1.16 (m, 4H). MS: [M+H]$^+$=394.1.

Step 2: Methyl (2-((((1,4-trans)-4-((8-methoxy-1,7-naphthyridin-2-yl)amino)cyclohexyl)methyl)amino)pyrimidin-5-yl)(methyl)carbamate (65-2)

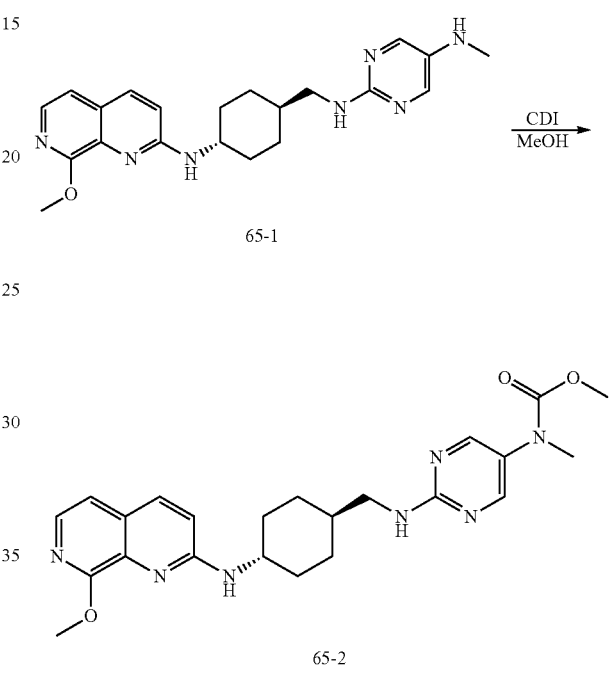

To a solution of (65-1) (130 mg, 0.33 mmol, 1.0 eq) in Cl$_2$CH$_2$ (5 mL) was added CDI (430 mg, 2.64 mmol, 8.0 eq) and DIPEA (426 mg, 2.64 mmol, 8.0 eq). The mixture was stirred at 40° C. for 1.5 hours. Then CH$_3$OH (10 mL) was added and stirred at 50° C. for 12 hours. The reaction mixture was concentrated under reduced pressure. The residue was dissolved with EtOAc (50 mL) and washed three times with brine (30 mL). The organic layer was dried over anhydrous sodium sulfate, filtered and concentrated. The crude product was purified by column chromatography on silica gel (petroleum ether/EtOAc from 1/1 to 0/100) to give methyl (2-((((1,4-trans)-4-((8-methoxy-1,7-naphthyridin-2-yl)amino)cyclohexyl)methyl)amino)pyrimidin-5-yl)(methyl)carbamate (65-2). $^1$H NMR (400 MHz, CDCl$_3$): δ ppm 8.15 (br s, 2H), 7.81-7.78 (m, 2H), 7.02 (d, J=5.6 Hz, 1H), 6.84 (d, J=9.2 Hz, 1H), 5.29 (br s, 1H), 5.07 (br s, 1H), 4.14 (s, 3H), 3.82-3.52 (m, 4H), 3.32 (t, J=6.4 Hz, 2H), 3.24 (s, 3H), 2.20-2.17 (m, 2H), 1.96-1.93 (m, 2H), 1.66 (br s, 1H), 1.27-1.21 (m, 4H). MS: [M+H]$^+$=452.2.

Step 3: Methyl (2-((((1,4-trans)-4-((8-hydroxy-1,7-naphthyridin-2-yl)amino)cyclohexyl)methyl)amino) pyrimidin-5-yl)(methyl)carbamate (65-3)

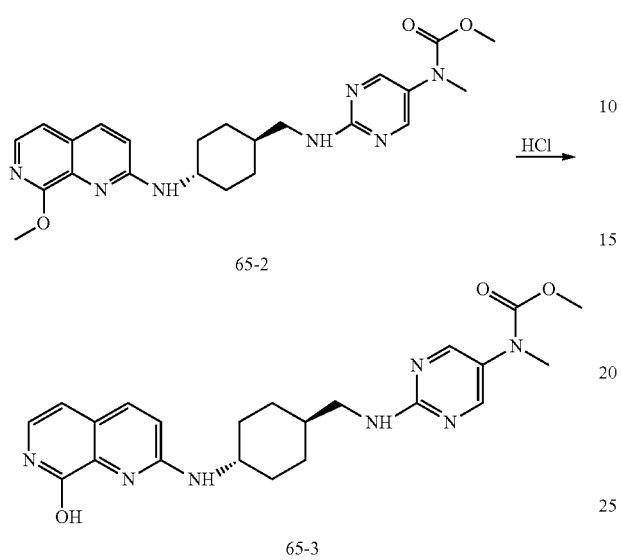

The title compound was prepared by using a procedure similar to that of (64-3), except (64-2) was replaced with (65-2). MS: [M+H]⁺=438.2.

Step 3: methyl (2-((((1,4-trans)-4-((8-chloro-1,7-naphthyridin-2-yl)amino)cyclohexyl)methyl)amino) pyrimidin-5-yl)(methyl)carbamate (C65)

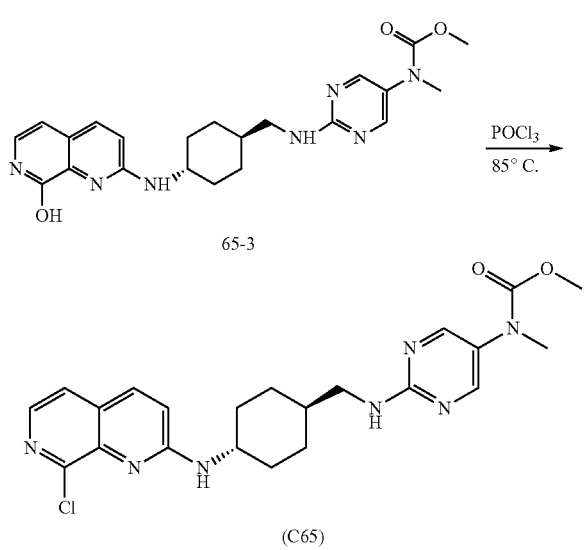

The title compound was prepared by using a procedure similar to that of in Step 4 of Example 64, except (64-3) was replaced with (65-3). The product was purified by preparative HPLC (column: DuraShell 150 mm×25 mm×5 m, gradient: 35-65% B (A=0.05% ammonia hydroxide in water, B=acetonitrile)) to give methyl (2-((((1,4-trans)-4-((8-chloro-1,7-naphthyridin-2-yl)amino)cyclohexyl)methyl) amino)pyrimidin-5-yl)(methyl)carbamate (C65). ¹H NMR (400 MHz, DMSO-d₆): δ ppm 8.22 (s, 2H), 7.95 (d, J=5.2 Hz, 1H), 7.91 (d, J=8.8 Hz, 1H), 7.55 (d, J=5.2 Hz, 1H), 7.51 (d, J=6.8 Hz, 1H), 7.38 (br s, 1H), 6.99 (d, J=8.8 Hz, 1H), 3.91 (br s, 1H), 3.56 (br s, 3H), 3.17-3.14 (m, 5H), 2.14-2.11 (m, 2H), 1.86-1.83 (m, 2H), 1.59 (br s, 1H), 1.26-1.04 (m, 4H). MS: [M+H]⁺=456.2.

Example 66

N²-(((1,4-trans)-4-((8-(difluoromethoxy)-1,7-naphthyridin-2-yl)amino)cyclohexyl)methyl)pyrimidine-2,5-diamine (C66)

Step 1: 2-chloro-8-(difluoromethoxy)-1,7-naphthyridine (66-1)

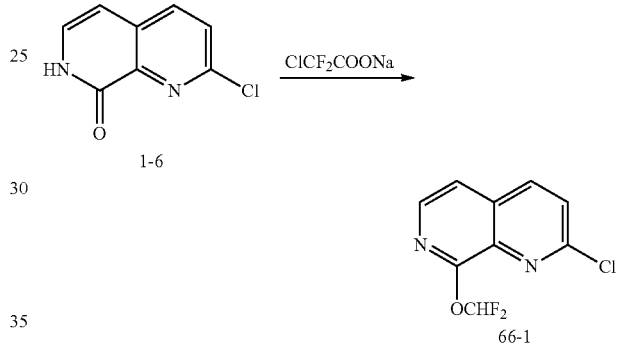

To a solution of (1-6) (300 mg, 1.66 mmol, 1.0 eq) in CH₃CN (70 mL) was added ClCF₂COONa (303 mg, 1.99 mmol, 1.2 eq). The mixture was stirred at 90° C. for 15 hours. The mixture was added saturated aqueous NH₄Cl solution (30 mL) and extracted twice with EtOAc (50 mL). The combined organic layers were dried over anhydrous sodium sulfate and concentrated. The crude product was purified by column chromatography (petroleum ether/ EtOAc=3/1) to give 2-chloro-8-(difluoromethoxy)-1,7-naphthyridine (66-1). ¹H NMR (400 MHz, DMSO-d₆): δ ppm 8.55 (d, J=8.8 Hz, 1H), 8.24 (d, J=5.6 Hz, 1H), 7.96 (t, J=72 Hz, 1H), 7.94 (d, J=4.0 Hz, 1H), 7.81 (d, J=5.6 Hz, 1H). MS: [M+H]⁺=230.8.

Step 2: tert-butyl (((1,4-trans)-4-((8-(difluoromethoxy)-1,7-naphthyridin-2-yl)amino)cyclohexyl)methyl)carbamate (66-2)

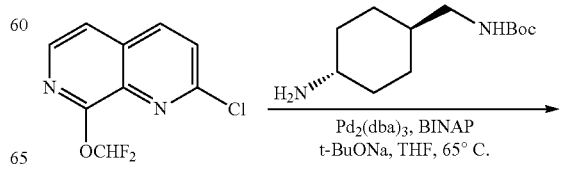

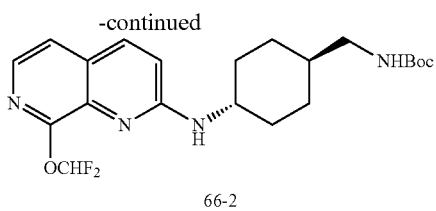

66-2

The title compound was prepared using a procedure similar to that in Step 7 of Example 1, (1-6) being replaced with (66-1) and the product was purified by column chromatography (petroleum ether/EtOAc from 5/1 to 3/1) to give tert-butyl (((1,4-trans)-4-((8-(difluoromethoxy)-1,7-naphthyridin-2-yl)amino)cyclohexyl)methyl)carbamate (66-2). MS: [M+H]$^+$=423.1.

Step 3: N-((1,4-trans)-4-(aminomethyl)cyclohexyl)-8-(difluoromethoxy)-1,7-naphthyridin-2-amine (66-3)

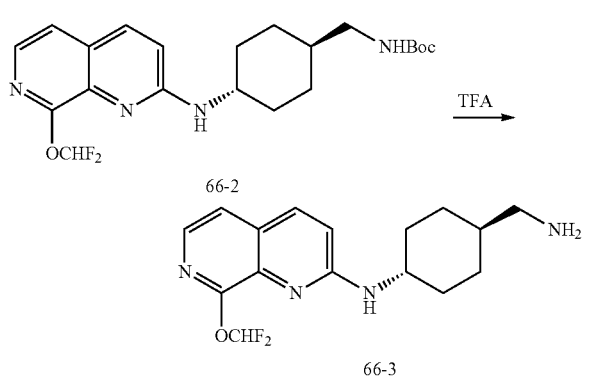

To a solution of (66-2) (160 mg, 0.38 mmol, 1.0 eq) in CH$_2$Cl$_2$ (5 mL) was added TFA (1 mL) and the mixture was stirred at 15° C. for 2 hours. The mixture was concentrated to give N-((1,4-trans)-4-(aminomethyl)cyclohexyl)-8-(difluoromethoxy)-1,7-naphthyridin-2-amine (66-3), which was used without further purification. MS: [M+H]$^+$=323.1.

Step 4: 8-(difluoromethoxy)-N-((1,4-trans)-4-(((5-nitropyrimidin-2-yl)amino)methyl)cyclohexyl)-1,7-naphthyridin-2-amine (66-4)

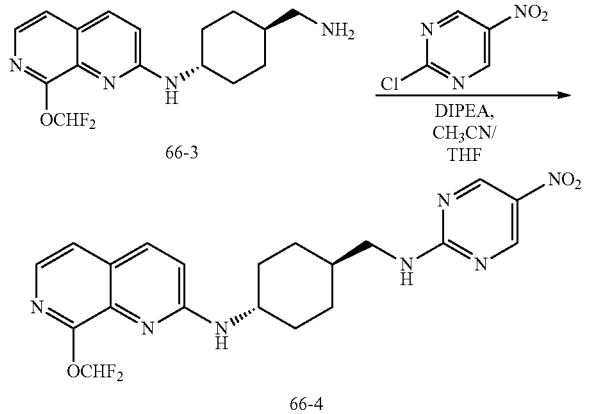

The title compound was prepared by using a procedure similar to that in Step 9 of Example 1, with (1-8) being replaced with (66-3) and the product was purified by column chromatography (petroleum ether/EtOAc from 3/1 to 1/1) to give 8-(difluoromethoxy)-N-((1,4-trans)-4-(((5-nitropyrimidin-2-yl)amino)methyl)cyclohexyl)-1,7-naphthyridin-2-amine (66-4). $^1$H NMR (400 MHz, DMSO-d$_6$): δ ppm 9.10 (d, J=3.2 Hz, 1H), 9.02 (d, J=3.2 Hz, 1H), 8.91 (t, J=5.6 Hz, 1H), 7.89 (d, J=8.8 Hz, 1H), 7.79 (t, J=73.2 Hz, 1H), 7.76 (d, J=4.8 Hz, 1H), 7.41-7.36 (m, 2H), 6.99 (d, J=8.4 Hz, 1H), 3.87 (br s, 1H), 3.31 (t, J=6.4 Hz, 2H), 2.08-2.06 (m, 2H), 1.83-1.80 (m, 2H), 1.62 (br s, 1H), 1.22-1.11 (m, 4H). MS: [M+H]$^+$=446.2.

Step 4: N$^2$-(((1,4-trans)-4-((8-(difluoromethoxy)-1,7-naphthyridin-2-yl)amino)cyclohexyl)methyl)pyrimidine-2,5-diamine (C66)

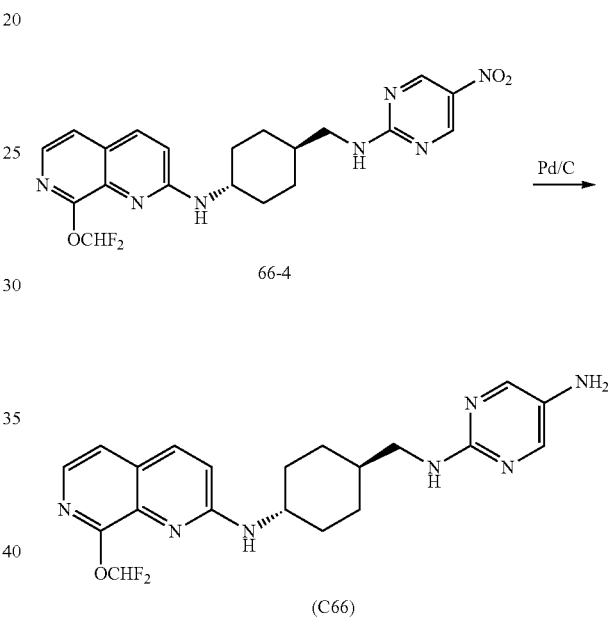

To a solution of (66-4) (100 mg, 0.22 mmol, 1.0 eq) in CH$_3$OH (20 mL) and EtOAc (20 mL) was added Pd/C (10%, 80 mg). The suspension was degassed under vacuum and purged with H$_2$ several times. The mixture was stirred under H$_2$ balloon at 15° C. for 1.5 hours. The reaction mixture was filtered and the filtrate was concentrated under reduced pressure. The crude product was purified by preparative HPLC (column: Phenomenex Gemini C18 200 mm×25 mm×5 um, gradient: 29-39% B (A=0.5% NH$_4$HCO$_3$ in water, B=acetonitrile)) to give N$^2$-(((1,4-trans)-4-((8-(difluoromethoxy)-1,7-naphthyridin-2-yl)amino)cyclohexyl)methyl) pyrimidine-2,5-diamine (C66). $^1$H NMR (400 MHz, DMSO-d$_6$): δ ppm 7.89 (d, J=8.8 Hz, 1H), 7.80 (t, J=73.6 Hz, 1H), 7.79 (s, 2H), 7.75 (d, J=5.2 Hz, 1H), 7.40 (d, J=5.2 Hz, 1H), 7.36 (d, J=7.6 Hz, 1H), 6.99 (d, J=8.4 Hz, 1H), 4.37 (s, 2H), 3.86 (br s, 1H), 3.06 (t, J=6.4 Hz, 2H), 2.06-2.04 (m, 2H), 1.83-1.81 (m, 2H), 1.52 (br s, 1H), 1.22-1.00 (m, 4H). $^{19}$F NMR (400 MHz, DMSO-d$_6$): δ ppm −86.34, −86.50. MS: [M+H]$^+$=416.1.

Example 67

N-((1,4-trans)-4-(((5-(4H-1,2,4-triazol-3-yl)pyrimidin-2-yl)amino)methyl)cyclohexyl)-8-chloro-1,7-naphthyridin-2-amine (C67)

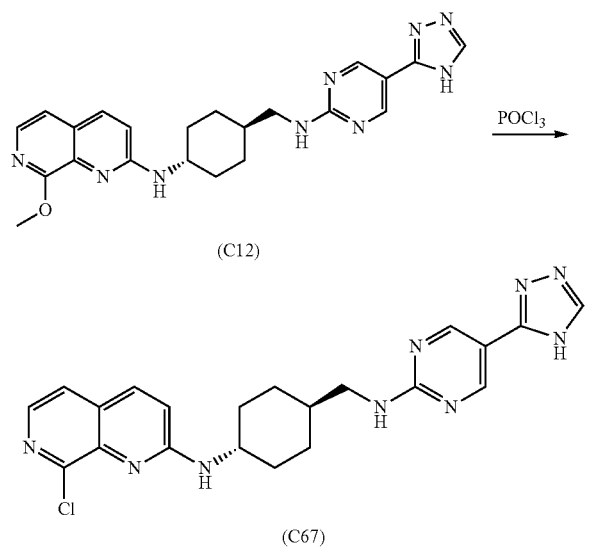

The solution of compound (C12) (100 mg, 0.23 mmol, 1.0 eq) in POCl₃ (10 g) was heated at 110° C. for 5 hours. Then POCl₃ was removed under vacuum and the residue was basified by addition of ammonia. The reaction mixture was extracted twice with EtOAc (50 mL) and the organic solvent was dried over anhydrous sodium sulfate, filtered and concentrated under reduced pressure. The crude product was purified by preparative HPLC (column: Waters XSELECT C18 150 mm×30 mm×5 m, gradient: 22-37% B (A=0.05% NH₃H₂O in water, B=acetonitrile)) to give N-((1,4-trans)-4-(((5-(4H-1,2,4-triazol-3-yl)pyrimidin-2-yl)amino)methyl)cyclohexyl)-8-chloro-1,7-naphthyridin-2-amine (C67). $^1$H NMR (400 MHz, DMSO-d₆): δ ppm 13.91 (br s, 1H), 8.81 (s, 2H), 8.39 (br s, 1H), 7.96 (d, J=5.2 Hz, 1H), 7.91 (d, J=9.2 Hz, 1H), 7.69-7.66 (m, 1H), 7.56 (d, J=5.6 Hz, 1H), 7.52 (d, J=7.6 Hz, 1H), 7.00 (d, J=9.2 Hz, 1H), 3.91 (br s, 1H), 3.24 (t, J=6.0 Hz, 2H), 2.15-2.13 (m, 2H), 1.87-1.84 (m, 2H), 1.58 (br s, 1H), 1.24-1.10 (m, 4H). MS: [M+H]⁺=436.2.

Example 68

2-((2-(((((1,4-trans)-4-((8-chloro-1,7-naphthyridin-2-yl)amino)cyclohexyl)methyl)amino)pyrimidin-5-yl)oxy)propan-1-ol (C68)

Step 1: Ethyl 2-((2-(((((1,4-trans)-4-((8-hydroxy-1,7-naphthyridin-2-yl)amino)cyclohexyl)methyl)amino)pyrimidin-5-yl)oxy)propanoate (68-1)

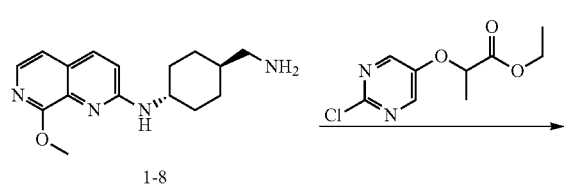

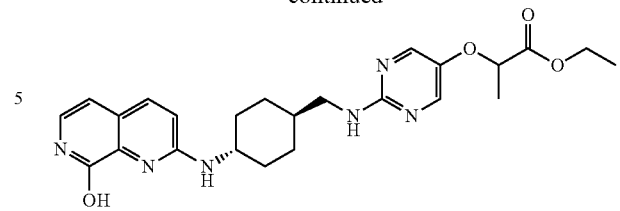

The title compound was prepared by using a procedure similar to that of Step 9 in Example 1, by replacing 2-chloro-5-nitropyrimidine with ethyl 2-((2-chloropyrimidin-5-yl)oxy)propanoate. MS: [M+H]⁺=467.0.

Step 2: Ethyl 2-((2-(((((1,4-trans)-4-((8-chloro-1,7-naphthyridin-2-yl)amino)cyclohexyl)methyl)amino)pyrimidin-5-yl)oxy)propanoate (68-2)

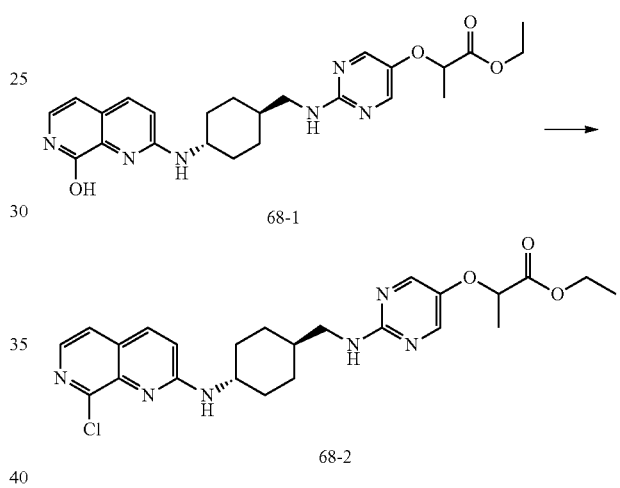

The title compound was prepared by using a procedure similar to that of Example 67, except Compound (C12) was replaced with (68-1). $^1$H NMR (400 MHz, DMSO-d₆): δ ppm 8.09 (s, 2H), 7.97 (d, J=5.3 Hz, 1H), 7.92 (d, J=9.0 Hz, 1H), 7.56 (d, J=5.3 Hz, 1H), 7.53 (d, J=7.0 Hz, 1H), 7.00 (d, J=6.0 Hz, 2H), 4.83 (q, J=6.8 Hz, 1H), 4.14 (qd, J=7.1, 2.3 Hz, 2H), 3.44-3.42 (m, 1H), 3.12 (t, J=6.3 Hz, 2H), 2.12 (d, J=11.0 Hz, 2H), 1.83 (d, J=11.8 Hz, 2H), 1.61-1.53 (m, 1H), 1.48 (d, J=6.8 Hz, 3H), 1.25-1.16 (m, 5H), 1.13-1.02 (m, 2H). MS: [M+H]⁺=485.0.

Step 3: 2-((2-(((((1,4-trans)-4-((8-chloro-1,7-naphthyridin-2-yl)amino)cyclohexyl)methyl)amino)pyrimidin-5-yl)oxy)propan-1-ol (C68)

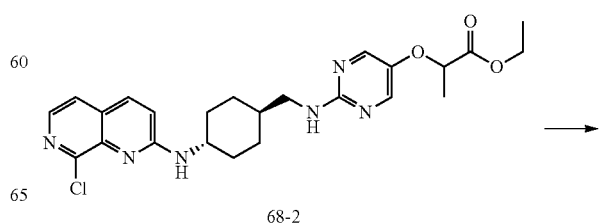

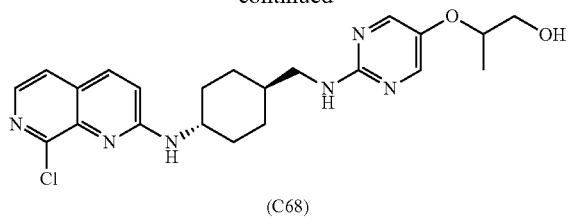

(C68)

To a solution of (68-2) (18 mg, 0.037 mmol) in EtOH (2 mL) was added NaBH₄ (42.1 mg, 1.113 mmol). The mixture was stirred at 0° C. for 10 min, then at rt for 4 h. The mixture was purified by preparative HPLC to give 2-((2-((((1,4-trans)-4-((8-chloro-1,7-naphthyridin-2-yl)amino)cyclohexyl)methyl)amino)pyrimidin-5-yl)oxy)propan-1-ol (C68). $^1$H NMR (400 MHz, DMSO-d$_6$): δ ppm 8.09 (s, 2H), 7.96 (d, J=5.3 Hz, 1H), 7.92 (d, J=9.0 Hz, 1H), 7.56 (d, J=5.3 Hz, 1H), 7.53 (d, J=7.3 Hz, 1H), 7.00 (d, J=8.5 Hz, 1H), 6.89 (t, J=5.8 Hz, 1H), 4.20-4.11 (m, 1H), 3.95 (br s, 1H), 3.57-3.25 (m, 2H), 3.12 (t, J=6.4 Hz, 2H), 2.13-2.11 (m, 2H), 1.85-1.82 (m, 2H), 1.57 (br s, 1H), 1.25-1.06 (m, 7H). MS: [M+H]⁺=443.0.

Example 69

2-(2-((((1,4-trans)-4-((8-chloro-1,7-naphthyridin-2-yl)amino)cyclohexyl) methyl)amino)pyrimidin-5-yl)-1-(3-hydroxyazetidin-1-yl)propan-1-one (C69)

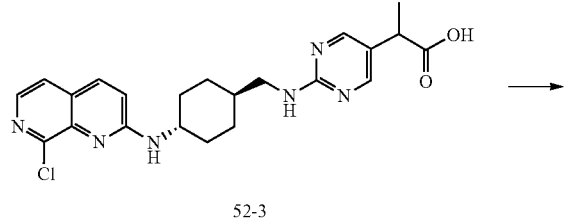

52-3

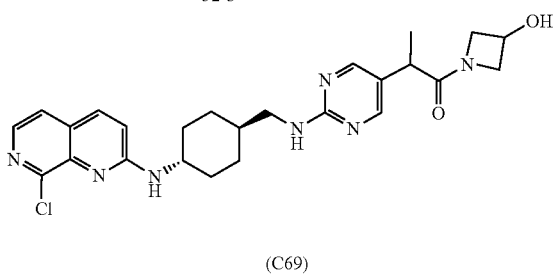

(C69)

The title compound was prepared by using a procedure similar to that of Example 52, with oxetan-3-amine being replaced with azetidin-3-ol. $^1$H NMR (400 MHz, DMSO-d$_6$), existed of ratomer: δ ppm 8.17 (s, 1H), 8.16 (s, 1H), 7.96 (d, J=5.2 Hz, 1H), 7.91 (d, J=9.1 Hz, 1H), 7.55 (d, J=5.2 Hz, 1H), 7.51 (d, J=7.0 Hz, 1H), 7.21-7.13 (m, 1H), 7.00 (d, J=9.2 Hz, 1H), 5.71 (d, J=6.2 Hz, 0.5H), 5.67 (d, J=6.3 Hz, 0.5H), 4.49-4.33 (m, 1.5H), 4.24 (t, J=7.6 Hz, 0.5H), 4.07-3.82 (m, 2.5H), 3.74 (d, J=5.1 Hz, 0.5H), 3.62-3.55 (m, 0.5H), 3.50 (q, J=7.1 Hz, 1.5), 3.15 (br s, 2H), 2.13-2.11 (m, 2H), 1.85-1.82 (m, 2H), 1.57 (br s, 1H), 1.26-1.07 (m, 7H). MS: [M+H]⁺=496.2.

Example 70 and Example 71

(S)-2-(2-((((1,4-trans)-4-((8-chloro-1,7-naphthyridin-2-yl)amino)cyclohexyl) methyl)amino)pyrimidin-5-yl)-1-(3-hydroxyazetidin-1-yl)propan-1-one (C70) and (R)-2-(2-((((1,4-trans)-4-((8-chloro-1,7-naphthyridin-2-yl)amino)cyclohexyl) methyl)amino)pyrimidin-5-yl)-1-(3-hydroxyazetidin-1-yl)propan-1-one (C71)

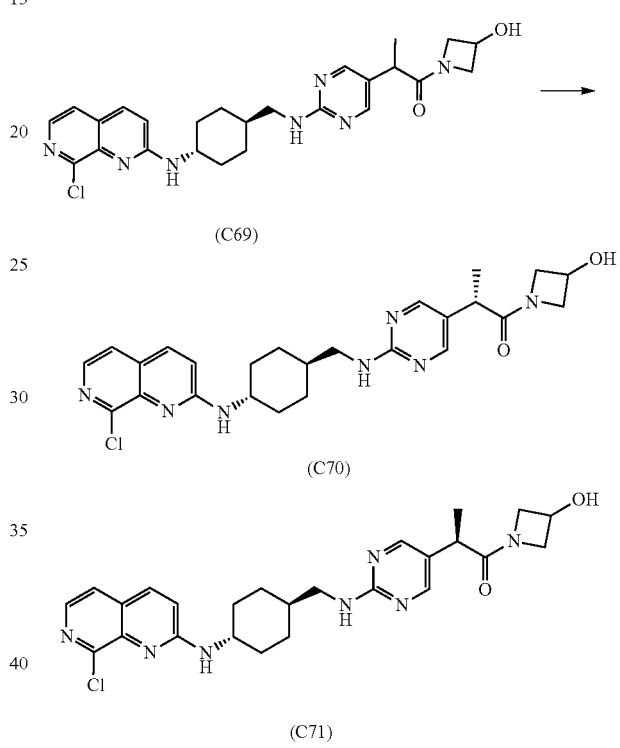

Racemic compound (C69) was separated by SFC (Chiralpak AD-3 50*4.6 mm I.D., 3 um; 40% of iso-propanol (0.05% DEA) in CO₂; Flow rate: 4 mL/min; 40° C.) to give Peak 1 (t$_R$=0.57 min) and Peak 2 (t$_R$=1.04 min).

Peak 1 (C70 or C71): $^1$H NMR (400 MHz, DMSO-d$_6$), existed as rotamers: δ ppm 8.17 (s, 1H), 8.16 (s, 1H), 7.96 (d, J=5.1 Hz, 1H), 7.91 (d, J=8.9 Hz, 1H), 7.56 (d, J=5.2 Hz, 1H), 7.51 (d, J=7.1 Hz, 1H), 7.19 (q, J=6.7 Hz, 1H), 7.00 (d, J=8.7 Hz, 1H), 5.68 (br s, 1H), 4.50-4.34 (m, 1.5H), 4.24 (t, J=7.8 Hz, 0.5H), 4.08-3.82 (m, 2.5H), 3.75 (d, J=4.9 Hz, 0.5H), 3.63-3.56 (m, 0.5H), 3.50 (q, J=6.9 Hz, 1.5H), 3.15 (br s, 2H), 2.14-2.11 (m, 2H), 1.85-1.82 (m, 2H), 1.58 (br s, 1H), 1.26-1.04 (m, 7H). MS: [M+H]⁺=496.2.

Peak 2 (C70 or C71): 1H NMR (400 MHz, DMSO-d$_6$): δ ppm 8.19 (s, 1H), 8.18 (s, 1H), 7.96 (d, J=5.1 Hz, 1H), 7.91 (d, J=8.9 Hz, 1H), 7.56 (d, J=5.2 Hz, 1H), 7.52 (d, J=7.1 Hz, 1H), 7.29-7.19 (m, 1H), 7.00 (d, J=9.0 Hz, 1H), 5.71 (br s, 1H), 4.48-4.35 (m, 1.5H), 4.25 (t, J=7.9 Hz, 0.5H), 4.08-3.93 (m, 2.5H), 3.78-3.72 (m, 0.5H), 3.58 (dd, J=10.1, 4.4 Hz, 0.5H), 3.55-3.47 (m, 1.5H), 3.16 (br s, 2H), 2.14-2.11 (m, 2H), 1.85-1.82 (m, 2H), 1.57 (br s, 1H), 1.28-1.04 (m, 7H). MS: [M+H]⁺=496.2.

Example 72

2-(2-((((1,4-trans)-4-((8-chloro-1,7-naphthyridin-2-yl)amino)cyclohexyl) methyl)amino)pyrimidin-5-yl)-3-hydroxy-N-(oxetan-3-yl)propanamide (C72)

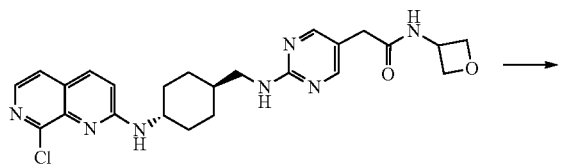

(C36)

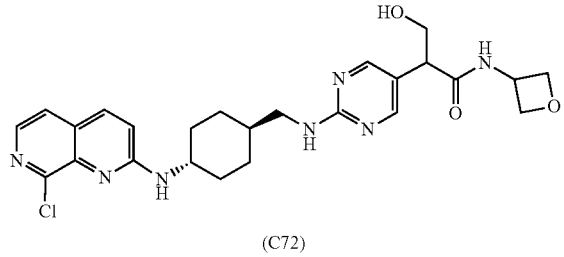

(C72)

To a solution of Compound (C36) (200 mg, 0.207 mmol, 1.0 eq) in DMF (5 mL) was added $K_2CO_3$ (172 mg, 0.621 mmol, 3.0 eq) and paraformaldehyde (24 mg, 0.414 mmol, 2.0 eq). The mixture was stirred at 30° C. for 4 hours, then diluted with $H_2O$ (20 mL), extracted three times with $CH_2Cl_2$ (20 mL), the organic layer was dried over $Na_2SO_4$, filtered and concentrated to give the residue which was purified by column chromatography on silica gel ($CH_2Cl_2$/MeOH from 100/1 to 20/1) to give 2-(2-((((1,4-trans)-4-((8-chloro-1,7-naphthyridin-2-yl)amino)cyclohexyl)methyl)amino)pyrimidin-5-yl)-3-hydroxy-N-(oxetan-3-yl)propanamide (C72).

$^1$H NMR (400 MHz, DMSO-d$_6$): δ ppm 8.80 (d, J=6.4 Hz, 1H), 8.15 (s, 2H), 7.96 (d, J=5.2 Hz, 1H), 7.91 (d, J=8.8 Hz, 1H), 7.55 (d, J=5.2 Hz, 1H), 7.51 (d, J=7.2 Hz, 1H), 7.16 (t, J=6.0 Hz, 1H), 6.99 (d, J=8.8 Hz, 1H), 4.88 (t, J=5.2 Hz, 1H), 4.79-4.65 (m, 3H), 4.41 (t, J=6.0 Hz, 1H), 4.34 (t, J=6.0 Hz, 1H), 3.90-3.89 (m, 1H), 3.86-3.80 (m, 1H), 3.53-3.47 (m, 1H), 3.41-3.37 (m, 1H), 3.14 (t, J=6.4 Hz, 2H), 2.13-2.10 (m, 2H), 1.84-1.81 (m, 2H), 1.56 (br s, 1H), 1.24-1.16 (m, 2H), 1.12-1.03 (m, 2H). MS: [M+H]$^+$=512.1.

Example 73 and Example 74

(R)-2-(2-((((1,4-trans)-4-((8-chloro-1,7-naphthyridin-2-yl)amino)cyclohexyl) methyl)amino)pyrimidin-5-yl)-3-hydroxy-N-(oxetan-3-yl)propanamide (C73) and (S)-2-(2-((((1,4-trans)-4-((8-chloro-1,7-naphthyridin-2-yl)amino)cyclohexyl) methyl)amino)pyrimidin-5-yl)-3-hydroxy-N-(oxetan-3-yl)propanamide (C74)

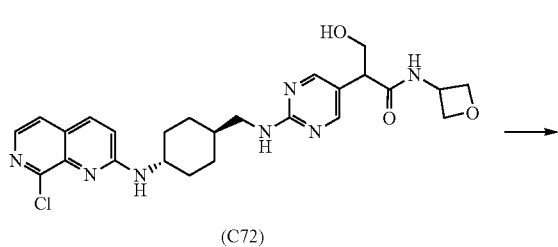

(C72)

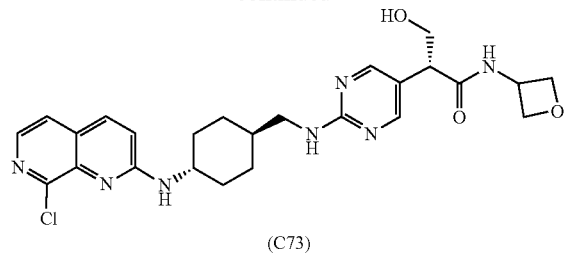

(C73)

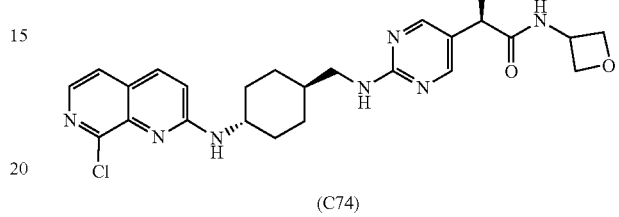

(C74)

Racemic compound Example 72 was separated by SFC (Chiralpak AS-H, 150*4.6 mm I.D., 5 um; Mobile phase: A: $CO_2$ B: ethanol (0.05% DEA); Gradient: hold 5% for 0.5 min, then from 5% to 40% of B in 3.5 min and hold 40% for 2.5 min, then 5% of B for 1.5 min; Flow rate: 3 mL/min Column temp: 40° C.) to give Peak 1 (t$_R$=4.56 min) and Peak 2 (t$_R$=5.05 min).

Peak 1 (C73 or C74): $^1$H NMR (400 MHz, DMSO-d$_6$): δ ppm 8.80 (d, J=6.4 Hz, 1H), 8.15 (s, 2H), 7.96 (d, J=5.2 Hz, 1H), 7.91 (d, J=8.8 Hz, 1H), 7.55 (d, J=5.2 Hz, 1H), 7.51 (d, J=6.8 Hz, 1H), 7.17 (t, J=6.0 Hz, 1H), 6.99 (d, J=9.2 Hz, 1H), 4.88 (t, J=5.2 Hz, 1H), 4.77-4.65 (m, 3H), 4.41 (t, J=6.0 Hz, 1H), 4.34 (t, J=6.0 Hz, 1H), 3.90-3.89 (m, 1H), 3.86-3.82 (m, 1H), 3.51-3.47 (m, 1H), 3.41-3.33 (m, 1H), 3.14 (t, J=6.4 Hz, 2H), 2.13-2.10 (m, 2H), 1.84-1.81 (m, 2H), 1.56 (br s, 1H), 1.22-1.16 (m, 2H), 1.12-1.03 (m, 2H). MS: [M+H]$^+$=512.1.

Peak 2 (C73 or C74): $^1$H NMR (400 MHz, DMSO-d$_6$): δ ppm 8.80 (d, J=6.4 Hz, 1H), 8.15 (s, 2H), 7.96 (d, J=5.2 Hz, 1H), 7.91 (d, J=8.8 Hz, 1H), 7.55 (d, J=4.8 Hz, 1H), 7.51 (d, J=7.2 Hz, 1H), 7.17 (t, J=6.0 Hz, 1H), 6.99 (d, J=8.8 Hz, 1H), 4.88 (t, J=5.2 Hz, 1H), 4.77-4.65 (m, 3H), 4.41 (t, J=6.0 Hz, 1H), 4.34 (t, J=6.0 Hz, 1H), 3.90 (br s, 1H), 3.86-3.80 (m, 1H), 3.51-3.47 (m, 1H), 3.41-3.37 (m, 1H), 3.14 (t, J=6.4 Hz, 2H), 2.13-2.10 (m, 2H), 1.84-1.81 (m, 2H), 1.56 (br s, 1H), 1.22-1.16 (m, 2H), 1.12-1.03 (m, 2H). MS: [M+H]$^+$=512.1.

Example 75 and Example 76

(S)-2-(2-((((1,4-trans)-4-((8-chloro-1,7-naphthyridin-2-yl)amino)cyclohexyl) methyl)amino)pyrimidin-5-yl)-2-hydroxy-N-(oxetan-3-yl)acetamide (C75) and (R)-2-(2-((((1,4-trans)-4-((8-chloro-1,7-naphthyridin-2-yl)amino)cyclohexyl) methyl)amino)pyrimidin-5-yl)-2-hydroxy-N-(oxetan-3-yl)acetamide (C76)

Step 1: 2-(2-((((1,4-trans)-4-((8-chloro-1,7-naphthyridin-2-yl)amino)cyclohexyl)methyl)amino)pyrimidin-5-yl)-2-oxoacetic acid (75-1)

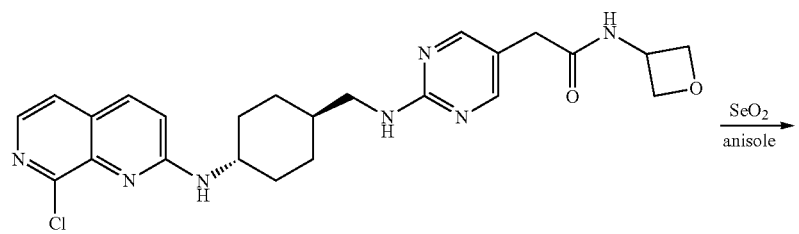

Example 36

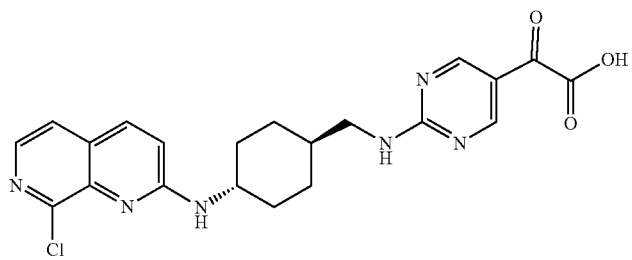

75-1

To a solution of compound (C36) (212 mg, 0.44 mmol, 1.0 eq) in anisole (15 mL) was added $SeO_2$ (195.3 mg, 1.76 mmol, 4.0 eq). The reaction mixture was heated to 125° C. for 3 hours. Then the mixture was cooled to room temperature, filtered and washed with $CH_2Cl_2$/MeOH (100 mL, 10/1). The filtrate was concentrated under reduced pressure and the crude product was purified by preparative HPLC (column: Xtimate C18 150 mm×25 mm×5 um, gradient: 21-51% B (A=0.05% ammonia in water, B=acetonitrile)) to give 2-(2-((((1,4-trans)-4-((8-chloro-1,7-naphthyridin-2-yl)amino)cyclohexyl)methyl)amino)pyrimidin-5-yl)-2-oxoacetic acid (75-1). MS: $[M+H]^+$=441.0.

Step 2: Ethyl 2-(2-((((1,4-trans)-4-((8-chloro-1,7-naphthyridin-2-yl)amino)cyclohexyl)methyl)amino)pyrimidin-5-yl)-2-oxoacetate (75-2)

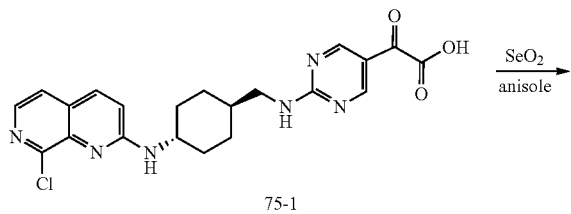

75-1

-continued

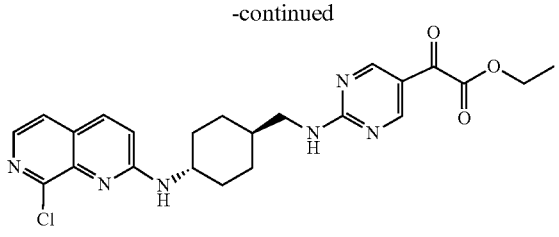

75-2

To a solution of (75-1) (120 mg, 0.27 mmol) in anhydrous EtOH (10 mL) was added $SOCl_2$ (161 mg, 1.35 mmol). The reaction mixture was stirred at 1-9° C. for 24 hours under $N_2$ protection. Then the reaction mixture was diluted with ice/$H_2O$ (30 mL), basified with saturated aqueous $NaHCO_3$ to pH 8-9, then extracted with $CH_2Cl_2$ (3*50 mL). The combined organic layers were washed with brine (30 mL), dried over anhydrous $Na_2SO_4$, filtered and concentrated under reduced pressure to give ethyl 2-(2-((((1,4-trans)-4-((8-chloro-1,7-naphthyridin-2-yl)amino)cyclohexyl)methyl)amino)pyrimidin-5-yl)-2-oxoacetate (75-2). MS: $[M+H]^+$=469.1.

Step 3: Ethyl 2-(2-((((1,4-trans)-4-((8-chloro-1,7-naphthyridin-2-yl)amino)cyclohexyl)methyl)amino)pyrimidin-5-yl)-2-hydroxyacetate (75-3)

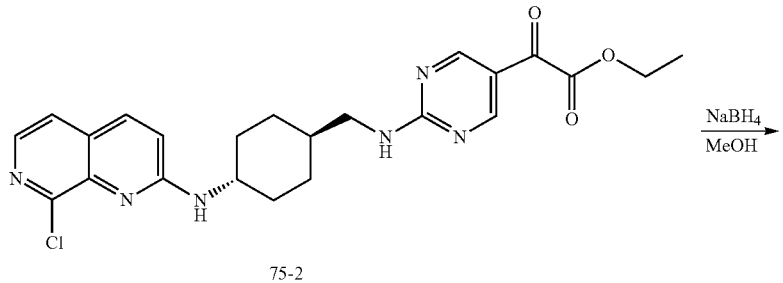

To a solution of (75-2) (132 mg, 0.28 mmol, 1.0 eq) in anhydrous MeOH (12 mL) was added NaBH$_4$ (10.6 mg, 0.28 mmol, 1.0 eq) at 0° C. under N$_2$ protection. The reaction mixture was stirred at this temperature for 10 minutes. Then the reaction mixture was quench with H$_2$O (5 mL), diluted with brine (30 mL), extracted three times with CH$_2$Cl$_2$ (50 mL). The combined organic layers were dried over anhydrous Na$_2$SO$_4$, filtered and concentrated under reduced pressure to give the crude compound, which was purified by column chromatography on silica gel (CH$_2$Cl$_2$/MeOH from 50/1 to 20/1) to afford ethyl 2-(2-((((1,4-trans)-4-((8-chloro-1,7-naphthyridin-2-yl)amino)cyclohexyl)methyl)amino)pyrimidin-5-yl)-2-hydroxyacetate (75-3). H NMR (400 MHz, CDCl$_3$): δ ppm 8.32 (s, 2H), 8.05 (d, J=5.2 Hz, 1H), 7.77 (d, J=9.2 Hz, 1H), 7.34 (d, J=5.2 Hz, 1H), 6.81 (d, J=8.8 Hz, 1H), 5.41-5.40 (m, 1H), 5.03 (s, 1H), 4.32-4.20 (m, 2H), 3.51-3.49 (m, 1H), 3.35 (t, J=6.4 Hz, 2H), 2.27 (br s, 2H), 1.96-1.94 (m, 2H), 1.66-1.65 (m, 1H), 1.30-1.27 (m, 3H), 1.24-1.21 (m, 4H). MS: [M+H]$^+$=471.2.

Step 4: 2-(2-((((1,4-trans)-4-((8-chloro-1,7-naphthyridin-2-yl)amino)cyclohexyl)methyl)amino)pyrimidin-5-yl)-2-hydroxy-N-(oxetan-3-yl)acetamide (75-4)

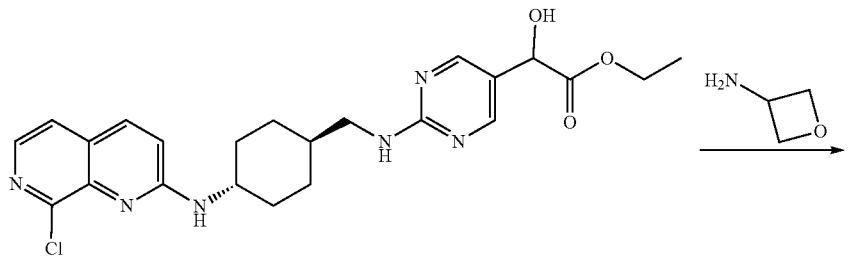

-continued

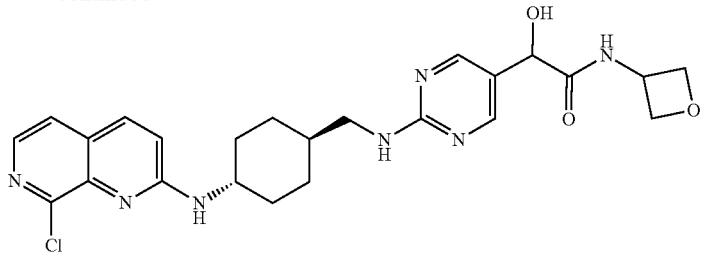

75-4

A mixture of (75-3) (35 mg, 0.074 mmol, 1.0 eq) in oxetan-3-amine (0.5 mL) was heated to 65° C. for 16 hours. Then the mixture was cooled to room temperature and purified by prep-HPLC (column: Xtimate C18 150*25 mm*5 um, gradient: 24-54% B (A=water/0.05% ammonia hydroxide, B=acetonitrile)) to give 2-(2-((((1,4-trans)-4-((8-chloro-1,7-naphthyridin-2-yl)amino)cyclohexyl)methyl)amino)pyrimidin-5-yl)-2-hydroxy-N-(oxetan-3-yl)acetamide (75-4). MS: [M+H]$^+$=498.1.

Step 4: (S)-2-(2-((((1,4-trans)-4-((8-chloro-1,7-naphthyridin-2-yl)amino)cyclohexyl)methyl)amino)pyrimidin-5-yl)-2-hydroxy-N-(oxetan-3-yl)acetamide (C75) and (R)-2-(2-((((1,4-trans)-4-((8-chloro-1,7-naphthyridin-2-yl)amino)cyclohexyl)methyl)-amino)pyrimidin-5-yl)-2-hydroxy-N-(oxetan-3-yl)acetamide (C76)

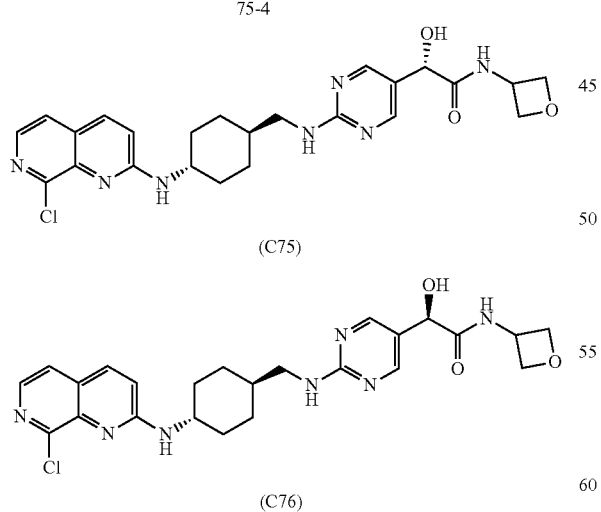

(75-4) was purified by SFC separation (Chiralpak AD-3 50*4.6 mm I.D., 3 um; Mobile phase: 40% of ethanol (0.05% DEA) in CO$_2$; Flow rate: 4 mL/min; Column temp: 40° C.) to give Peak 1 (t$_R$=1.40 min) and Peak 2 (t$_R$=4.80 min).

Peak 1 (C75 or C76): $^1$H NMR (400 MHz, DMSO-d$_6$): δ ppm 8.77 (d, J=6.4 Hz, 1H), 8.22 (s, 2H), 7.96 (d, J=5.2 Hz, 1H), 7.91 (d, J=8.8 Hz, 1H), 7.56 (d, J=5.2 Hz, 1H), 7.51 (d, J=6.8 Hz, 1H), 7.27 (t, J=6.0 Hz, 1H), 6.99 (d, J=8.4 Hz, 1H), 6.15 (d, J=4.8 Hz, 1H), 4.84-4.78 (m, 2H), 4.67-4.65 (m, 2H), 4.55-4.52 (m, 2H), 3.90 (br s, 1H), 3.16 (t, J=6.0 Hz, 2H), 2.13-2.11 (m, 2H), 1.85-1.81 (m, 2H), 1.57 (br s, 1H), 1.22-1.16 (m, 2H), 1.13-1.04 (m, 2H). MS: [M+H]$^+$=498.2.

Peak 2 (C75 or C76): $^1$H NMR (400 MHz, DMSO-d$_6$): δ ppm 8.77 (d, J=6.8 Hz, 1H), 8.22 (s, 2H), 7.96 (d, J=5.2 Hz, 1H), 7.91 (d, J=8.8 Hz, 1H), 7.56 (d, J=5.2 Hz, 1H), 7.51 (d, J=6.8 Hz, 1H), 7.27 (t, J=6.0 Hz, 1H), 6.99 (d, J=9.2 Hz, 1H), 6.15 (d, J=4.4 Hz, 1H), 4.84-4.78 (m, 2H), 4.68-4.65 (m, 2H), 4.55-4.52 (m, 2H), 3.90 (br s, 1H), 3.16 (t, J=6.0 Hz, 2H), 2.13-2.11 (m, 2H), 1.84-1.81 (m, 2H), 1.57 (br s, 1H), 1.22-1.16 (m, 2H), 1.13-1.06 (m, 2H). MS: [M+H]$^+$=498.1.

Example 77

2-(2-((((1,4-trans)-4-((8-chloro-1,7-naphthyridin-2-yl)amino)cyclohexyl)methyl)amino)pyrimidin-5-yl)-2,2-difluoro-N-(oxetan-3-yl)acetamide (C77)

Step 1: Ethyl 2-(2-chloropyrimidin-5-yl)-2,2-difluoroacetate (77-1)

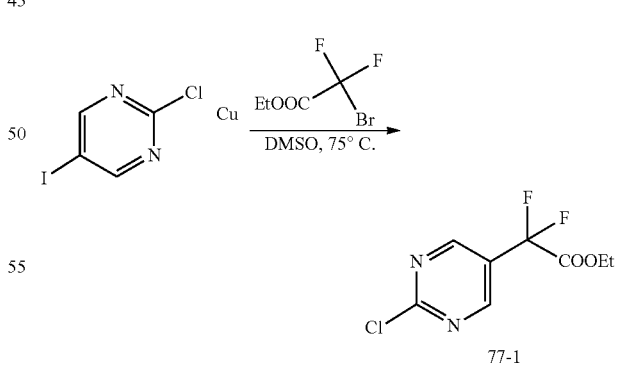

77-1

A mixture of 2-chloro-5-iodopyrimidine (4.0 g, 16.64 mmol, 1.0 eq), Cu (3.17 g, 49.91 mmol, 3.0 eq) and ethyl 2-bromo-2,2-difluoroacetate (4.05 g, 19.96 mmol, 1.2 eq) in dried DMSO (40 mL, dried with MgSO$_4$) was heated at 75° C. for 2 hours under N$_2$ protection. The mixture was quenched with saturated NH$_4$Cl solution (20 mL), extracted three times with EtOAc (40 mL). The organic phase was washed with water (100 mL*3), dried with anhydrous Na₂SO₄, filtered and concentrated. The crude was purified by column chromatography on silica gel (Petroleum Ether/EtOAc=40:1) to give ethyl 2-(2-chloropyrimidin-5-yl)-2,2-difluoroacetate (77-1). ¹H NMR (400 MHz, DMSO-d₆): δ ppm 9.08 (s, 2H), 4.33 (q, J=7.2 Hz, 2H), 1.25 (t, J=7.2 Hz, 3H). MS: [M+H]⁺=236.9.

Step 2: Ethyl 2-(2-((((1,4-trans)-4-((8-chloro-1,7-naphthyridin-2-yl)amino)cyclohexyl)methyl)amino)pyrimidin-5-yl)-2,2-difluoroacetate (77-2)

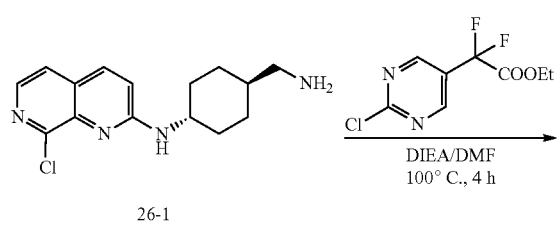

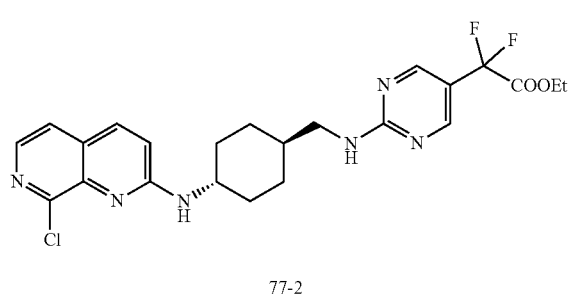

To a mixture of (26-1) (150 mg, 0.46 mmol, 1.0 eq) in DMF (5 mL) was added (77-1) (130 mg, 0.55 mmol, 1.2 eq) and DIEA (355 mg, 2.75 mmol, 6.0 eq). The resulting solution was heated at 100° C. for 4 hours. Then diluted with water (6 mL), extracted three times with EtOAc (10 mL). The organic layers were washed three times with water (30 mL), dried with anhydrous Na₂SO₄, filtered and concentrated. The crude product was purified by column chromatography on silica gel (Petroleum Ether/EtOAc from 10:1 to 6:1) to give ethyl 2-(2-((((1,4-trans)-4-((8-chloro-1,7-naphthyridin-2-yl)amino)cyclohexyl)methyl)amino)pyrimidin-5-yl)-2,2-difluoroacetate (77-2). ¹H NMR (400 MHz, DMSO-d₆): δ ppm 8.48 (s, 1H), 8.43 (s, 1H), 8.03 (t, J=5.6 Hz, 1H), 7.96 (d, J=5.2 Hz, 1H), 7.91 (d, J=8.4 Hz, 1H), 7.56 (d, J=5.2 Hz, 1H), 7.52 (d, J=7.2 Hz, 1H), 6.99 (d, J=9.2 Hz, 1H), 4.33 (q, J=6.8 Hz, 2H), 3.90 (br s, 1H), 3.22 (t, J=6.8 Hz, 2H), 2.15-2.11 (m, 2H), 1.85-1.81 (m, 2H), 1.60 (br s, 1H), 1.26 (t, J=7.2 Hz, 3H), 1.12-1.08 (m, 4H). MS: [M+H]⁺=491.2.

Step 3: 2-(2-((((1,4-trans)-4-((8-chloro-1,7-naphthyridin-2-yl)amino)cyclohexyl)methyl)amino)pyrimidin-5-yl)-2,2-difluoro-N-(oxetan-3-yl)acetamide (C77)

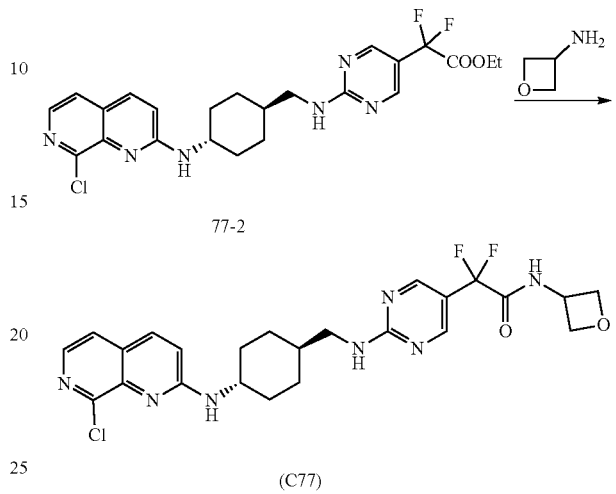

A mixture of (77-2) (50 mg, 0.10 mmol, 1.0 eq) and oxetan-3-amine (372.22 mg, 5.09 mmol, 50 eq) in a 50 mL of round-bottom flask was stirred at 15° C. for 2 hours. The mixture was diluted with water (3 mL), extracted three times with EtOAc (5 mL). The combined organic layers were concentrated and the crude product was purified by preparative HPLC (column: Xtimate C18 150 mm×25 mm×5 um, gradient: 35-65% B (A=0.05% ammonia in water, B=ACN), flow rate: 25 mL/min) to give 2-(2-((((1,4-trans)-4-((8-chloro-1,7-naphthyridin-2-yl)amino)cyclohexyl)methyl)amino)pyrimidin-5-yl)-2,2-difluoro-N-(oxetan-3-yl)acetamide (C77).

¹H NMR (400 MHz, DMSO-d₆): δ ppm 9.65 (d, J=6.4 Hz, 1H), 8.44-8.40 (m, 2H), 7.96 (d, J=5.2 Hz, 1H), 7.94-7.90 (m, 1H), 7.55 (d, J=5.2 Hz, 1H), 7.51 (d, J=6.8 Hz, 1H), 6.99 (d, J=8.8 Hz, 1H), 4.90-4.82 (m, 1H), 4.70 (t, J=6.8 Hz, 2H), 4.55 (t, J=6.8 Hz, 2H), 3.90 (br s, 1H), 3.21 (t, J=6.8 Hz, 2H), 2.14-2.11 (m, 2H), 1.84-1.81 (m, 2H), 1.60 (br s, 1H), 1.26-1.05 (m, 4H).

¹⁹F NMR (400 MHz, DMSO-d₆): δ ppm −100.00. MS: [M+H]⁺=518.1.

Biological Assays

The compounds of the present invention may be evaluated for their ability to inhibit PRC2 using assays described below, as well as other assays known in the art.

EZH2 LC-MS Assay

Representative compounds of the invention were serially and separately diluted 3-fold in DMSO to obtain twelve concentrations. Then the test compounds at each concentration (120 nL of each) were transferred by Mosquito into a 384-well Perkin Elmer ProxiPlate 384 plus plates. Solutions (6 µL) of 80 nM wild type PRC2 (wtPRC2) complex and 60 µM SAM in reaction buffer (20 mM Tris, pH 8.0, 0.1% BSA, 0.01% Triton, 0.5 mM DTT) were added to the wells that were then incubated with the test compound for 20 min. A 6 µL solution of 3 µM of the substrate peptide H3K27me1 (histone H3[21-44]-K27me1-biotin) and 6 µM regulatory peptide H3K27me3 (histone H3[21-44]-K27me3) in reaction buffer was added to initiate each reaction. The final components in the reaction solution include 40 nM wtPRC2 complex, 30 µM SAM, 1.5 µM H3K27me1 and 3 µM H3K27me3 peptides with varying concentration of the compounds. A positive control consisted of the enzyme at 40 nM, 30 µM SAM, 1.5 µM H3K27me1 and 3 µM H3K27me3 in the absence of the test compound, and a negative control consisted of 30 µM SAM, 1.5 µM H3K27me1 and 3 µM H3K27me3 only. Each reaction was incubated at room temperature for 120 min, then stopped by addition of 3 µL per of quench solution (2.5% TFA with 320 nM d4-SAH). The reaction mixture was centrifuged (Eppendorf centrifuge 5810, Rotor A-4-62) for 2 min at 2000 rpm and read on an API 4000 triple quadrupole mass spec with Turbulon Spray (Applied Biosystem) coupled with Prominence UFLC (Shimadzu). The levels of SAH production were normalized based on the values coming from the positive and negative controls to give percent enzyme activities. The data were fit to a dose response equation using the program Helios to get the $IC_{50}$ values of the test compound.

ELISA (H3K27 Methylation) Assay

Representative compounds of the invention were serially and separately diluted 3-fold in DO to obtain a total of eight or twelve concentrations. Then the compounds were added to G401 cell cultured in 384-well plate at 1:500 dilution to obtain the highest concentration of 20 µM. The cells were further cultured for 48 h before ELISA procedure.

Histone extraction: Cells, in 384-well plate, were washed with PBS (10×PBS buffer (80 g NaCl (Sigma, S3014), 2 g KCl (Sigma, 60128), 14.4 g $Na_2HPO_4$ (Sigma, S5136), 2.4 g $KH_2PO_4$ (Sigma, P9791) to 1 L water, pH to 7.4) and lysed with the addition of lysis buffer (0.4N HCl; 45 µL per well). The plate was gently agitated at 4° C. for 30 min. The cell lysate was neutralized with neutralization buffer (0.5 M sodium phosphate dibasic, pH 12.5, 1 mM DTT; 36 µL per well). The plate was agitated to ensure the lysates were well mixed prior to the ELISA protocol.

ELISA protocol: Cell lysates were transferred to the wells of a 384-well plate and the final volume was adjusted to 50 µL per well with PBS. The plate was sealed, centrifuged at 2,000 rpm for 2 min and incubated at 4° C. for about 16 h. The plate was washed with TBST buffer (1×TBS (10×TBS: 24.2 g Tris (Sigma, T6066), 80 g NaCl (Sigma, S3014) to 1 L of water and adjust pH to 7.6 with HCl) with 0.1% Tween-20). Blocking buffer (TBST, 5% BSA; 50 µL per well) was added and the plate was incubated for 1 h at rt. The blocking buffer was removed and primary antibody was added (30 µL per well). The following dilutions were performed with blocking buffer: for anti-H3K27me3 antibody (Cell Signaling Technology, #9733), dilution was 1:1000; for anti-H3K27me2 antibody (Cell Signaling Technology, #9288), dilution was 1:100; for anti-H3 antibody (Abcam, Cat #24834), dilution was 1:1000. The primary antibody was incubated in the plate at rt for 1 h. The wells were washed with TBST and incubated with secondary antibody for 1 h at rt. For secondary antibodies, the following dilutions were carried out with blocking buffer: anti-rabbit antibody (Jackson ImmunoResearch, #111-035-003), dilution was 1:2000; and anti-mouse antibody (Cell signaling technology, #7076), dilution was 1:1000.

After 1 h of incubation at rt, the wells were washed with TBST. ECL substrate (Pierce, #34080) was added at 30 µL per well and the plates were centrifuged at 2,000 rpm for 2 min. The signal was read using a PerkinElmer Envision Reader. The H3K27 methylation readouts were normalized using H3 signal and then percentage inhibition was calculated against the samples treated with DO. The data were fit to a dose response curve using the program Helios to get the $IC_{50}$ values of the test compound.

Analysis of Cell Proliferation

B cell lymphoma cell KARPAS422 was cultured using standard cell culture conditions in RPMI-1640 (Invitrogen, cat #11875) supplemented with 15% FBS (Invitrogen, cat #10099-141) in humidified incubator at 37° C., 5% $CO_2$. To assess the effect of PRC2 inhibition on cell proliferation, exponentially growing cells were seeded at a density of $1×10^5$ cells/mL in 12-well plate (Corning, cat #CLS3513). After cell seeding, a compound of the invention was added to the cell media (in concentrations ranging from 0 to 100 µM, 3× dilution series). Viable cell numbers were determined every 3-4 days for up to 14 days using Vi-CELL (Beckman Coulter). On days of cell counting, fresh growth media and compound were replenished and cells split back to a density of $1×10^5$ cells/mL. Total cell number is expressed as split-adjusted viable cells per mL. The dose response curves and $IC_{50}$ values were generated using Prism.

The exemplified Examples disclosed below were tested in the EZH2 LC- and/or EZH2 ELISA assays described above and found having EZH2 inhibitory activity.

Table 3 below lists $IC_{50}$ values in the EZH2 (a) LC-Qualified and/or (b) ELISA Qualified assays measured for the following examples.

TABLE 3

| Compound No. | EZH2 $IC_{50}$ (µM) (a) | EZH2 $IC_{50}$ (µM) (b) |
| --- | --- | --- |
| C1 | 0.121 | 0.042 |
| C2 | 0.087 | 0.783 |
| C3 | 0.054 | 0.025 |
| C4 | 0.046 | 0.031 |
| C5 | 0.063 | 0.062 |
| C6 | 0.101 | 0.066 |
| C7 | 0.111 | 0.131 |
| C8 | 0.070 | 0.077 |
| C9 | 0.105 | 0.061 |
| C10 | 0.194 | 0.191 |
| C11 | 0.120 | 0.029 |
| C12 | 0.075 | 0.052 |
| C13 | 0.042 | 0.013 |
| C14 | 0.116 | 0.056 |
| C15 | 0.017 | 0.028 |
| C16 | 0.015 | 0.027 |
| C17 | 0.088 | 0.010 |
| C18 | 0.028 | 0.039 |
| C19 | N.D. | 0.069 |
| C20 | 0.068 | 0.127 |
| C21 | 0.040 | 0.040 |
| C22 | 0.046 | 0.188 |
| C24 | 0.112 | 0.296 |
| C25 | 0.023 | 0.285 |
| C26 | 0.012 | 0.006 |
| C27 | 0.027 | 0.019 |
| C28 | 0.031 | 0.005 |
| C29 | 0.020 | 0.022 |
| C30 | 0.017 | 0.007 |
| C31 | 0.026 | 0.060 |
| C32 | 0.079 | 0.498 |
| C33 | 0.042 | 0.044 |
| C34 | 0.028 | 0.038 |
| C35 | 0.027 | 0.024 |
| C36 | 0.009 | 0.011 |
| C37 | 0.015 | 0.002 |
| C38 | 0.024 | 0.029 |
| C39 | 0.081 | 0.020 |
| C40 | 0.046 | 0.028 |
| C41 | 0.035 | 0.031 |
| C42 | 0.018 | 0.007 |
| C43 | 0.057 | 0.067 |
| C44 | 0.054 | 0.163 |
| C45 | 0.747 | 0.642 |
| C46 | 0.012 | 0.013 |

TABLE 3-continued

| Compound No. | EZH2 IC$_{50}$ (µM) (a) | EZH2 IC$_{50}$ (µM) (b) |
| --- | --- | --- |
| C47 | 0.051 | 0.032 |
| C48 | 0.039 | 0.027 |
| C49 | 0.008 | 0.002 |
| C50 | 0.023 | 0.027 |
| C51 | 0.038 | 0.018 |
| C52 | 0.030 | 0.001 |
| C53 or C54 (Peak 1) | 0.015 | 0.001 |
| C53 or C54 (Peak 2) | 0.115 | 0.075 |
| C55 | 0.054 | 0.002 |
| C56 or C57 (Peak 1) | 0.223 | 0.046 |
| C56 or C57 (Peak 2) | 0.015 | 0.003 |
| C58 | 0.038 | 0.117 |
| C59 | 0.045 | 0.033 |
| C60 | 0.022 | 0.021 |
| C61 | 0.049 | 0.032 |
| C62 | 0.149 | 0.031 |
| C63 | 0.096 | 0.037 |
| C64 | 0.053 | 0.054 |
| C65 | 0.059 | 0.065 |
| C66 | 0.204 | 0.160 |
| C67 | 0.029 | 0.036 |
| C68 | 0.049 | 0.018 |
| C69 | 0.035 | 0.136 |
| C70 or C71 (Peak 1) | 0.217 | 0.846 |
| C70 or C71 (Peak 2) | 0.028 | 0.019 |
| C72 | 0.049 | 0.056 |
| C73 or C74 (Peak 1) | 0.071 | 0.229 |
| C73 or C74 (Peak 2) | 0.010 | 0.018 |
| C75 or C76 (Peak 1) | 0.280 | 0.557 |
| C75 or C76 (Peak 2) | 0.021 | 0.005 |
| C77 | 0.012 | 0.025 | n.d = not determined

Table 4 below lists antiproliferative activities (IC$_{50}$ values) in B cell lymphoma cell KARPAS422 after 14 days of treatment for the following examples.

TABLE 4

| Compound No. | IC$_{50}$ (µM) |
| --- | --- |
| C1 | 0.020 |
| C6 | 0.069 |
| C8 | 0.072 |
| C15 | 0.031 |
| C27 | 0.008 |
| C28 | 0.002 |
| C34 | 0.018 |
| C36 | 0.003 |
| C37 | 0.0007 |
| C42 | 0.002 |
| C49 | 0.0005 |
| C51 | 0.008 |
| C53 | 0.0003 |
| C61 | 0.041 |
| C71 | 0.002 |
| C76 | 0.001 |
| C77 | 0.002 |

It is understood that the examples and embodiments described herein are for illustrative purposes only and that various modifications or changes in light thereof will be suggested to persons skilled in the art and are to be included within the spirit and purview of this application and scope of the appended claims. All publications, patents, and patent applications cited herein are hereby incorporated by reference for all purposes.

The invention claimed is:

1. A compound of Formula (I)

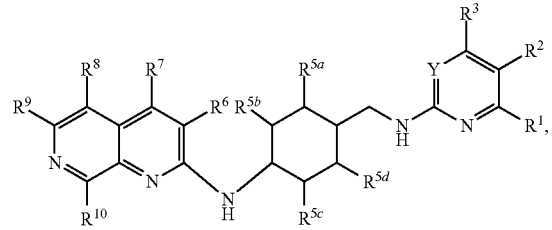

Formula (I)

or a stereoisomer, enantiomer, enantiomeric mixture or a pharmaceutically acceptable salt thereof, wherein:

Y is N or $CR^4$;

$R^1$, $R^3$ and $R^4$ are H;

$R^2$ is —CN, —$C_1$-$C_6$ alkyl, —$C_1$-$C_4$ alkylene-hydroxy, —$C_1$-$C_6$ alkyl substituted with —N($C_1$-$C_4$ alkyl)$_2$, —$C_1$-$C_4$ alkoxy, —$C_2$-$C_4$ alkoxy substituted with 1-2 hydroxyl or cyano, —$NH_2$, —$NR^{11}C(=O)R^{15}$, —C(=O)$NH_2$, —$(CH_2)_nR^{15}$, —$R^{15}$, —NHC(=O)$R^{11}$, —$NR^{12}C(=O)OR^{11}$, —C(=O)$NR^{11}R^{12}$, —$(CH_2)_nC(=O)NR^{11}R^{12}$, —$(CH_2)_nNR^{11}R^{15}$, —$(CH_2)_nC(=O)NR^{11}R^{15}$, —C(=O)$NR^{11}R^{15}$, —$CR^{13}R^{14}C(=O)NR^{11}R^{15}$,

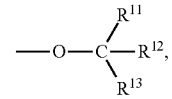

—$(CH_2)_nC(=O)R^{15}$, —C(=O)$R^{15}$, —$CR^{13}R^{14}C(=O)R^{15}$, —$(CH_2)_nNR^{11}C(=O)R^{15}$, —$(CH_2)_nNR^{11}(CH_2)_2C(=O)R^{15}$, —$NR^{12}C(=O)(CH_2)_2C(=O)R^{15}$, —$(CH_2)_nOR^{15}$, —$(CH_2)_nNR^{11}C(=O)OCH_2R^{15}$, —$NR^{11}C(=O)OCH_2R^{15}$, —$(CH_2)_nNR^{11}(CH_2)_nR^{15}$,

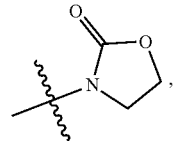 [SMILES: *N1CCOC1=O]

—$C_1$-$C_6$ alkyl substituted with one $R^a$, —$C_1$-$C_4$ alkoxy substituted with one $R^b$, or a 5- to 6-membered heteroaryl having 1 to 4 ring members independently selected from O, S, N and —$NR^c$, wherein $R^a$ is —$C_1$-$C_4$ alkoxy and $R^b$ is —$C_1$-$C_4$ alkoxy;

$R^{5a}$, $R^{5b}$, $R^{5c}$, $R^{5d}$ and $R^e$ are H;

$R^6$, $R^7$, $R^8$ and $R^9$ are H;

$R^{10}$ is H, halogen, —$C_1$-$C_4$ alkoxy, —$C_1$-$C_4$ haloalkoxy or —NH($C_1$-$C_4$ alkyl);

$R^{11}$ is H, —$C_1$-$C_4$ alkyl, —$SO_2$($C_1$-$C_4$ alkyl), —$C_1$-$C_4$ alkylene-hydroxy, —$C_1$-$C_4$ alkylene-cyano or —$C_1$-$C_4$ alkyl substituted with —$C_1$-$C_4$ alkoxy;

$R^{12}$ is H or —$C_1$-$C_4$ alkyl;

$R^{13}$ is H, halogen, —CN, —OH, —$C_1$-$C_4$ alkyl or —$C_1$-$C_4$ alkylene-hydroxy;

$R^{14}$ is H, halogen or —$C_1$-$C_4$ alkyl;

$R^{15}$ is

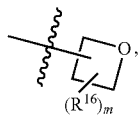

—$C_3$-$C_6$cycloalkyl, or a 4- to 6-membered heterocycloalkyl having 1-2 ring members independently selected from O, S, S(=O)$_2$, N and —$NR^{11}$; wherein said —$C_3$-$C_6$cycloalkyl and 4- to 6-membered heterocycloalkyl are independently unsubstituted or substituted with 1-2 substituents selected from —OH, —$C_1$-$C_4$ alkyl, —$C_1$-$C_4$ alkylene-hydroxy, —$C_1$-$C_4$ alkoxy and —N($C_1$-$C_4$ alkyl)$_2$;

$R^{16}$, if present, is halogen, —CN, —OH, —$C_1$-$C_4$ alkyl or -hydroxy$C_1$-$C_4$ alkylene;

m is 0, 1 or 2; and each n is independently selected from 1 and 2;

provided that the compound of Formula (I) is not (2-((((1,4-trans)-4-((8-chloro-1,7-naphthyridin-2-yl)amino)cyclohexyl)methyl)amino)pyrimidin-5-yl)(4-methylpiperazin-1-yl)methanone.

2. The compound of claim 1, wherein said compound is of Formula (I-4)

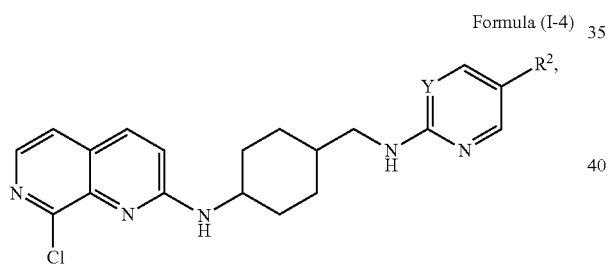

Formula (I-4)

or a stereoisomer, enantiomer, enantiomeric mixture or a pharmaceutically acceptable salt thereof.

3. The compound of claim 1 wherein $R^2$ is —CN, —$NH_2$, —C(=O) $NH_2$, —NHC(=O)$R^{11}$, —$NR^{12}$C(=O)$OR^{11}$, —C(=O)$NR^{11}R^{12}$, —$(CH_2)_nC$(=O)$NR^{11}R^{12}$, —$(CH_2)_nNR^{11}R^{15}$, —$(CH_2)_nC$(=O)$NR^{11}R^{15}$, —C(=O)$NR^{11}R^{15}$, —$CR^{13}R^{14}C$(=O)$NR^{11}R^{15}$,

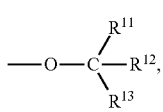

—$(CH_2)_nR^{15}$, —$NR^{12}C$(=O)$(CH_2)_2C$(=O)$R^{15}$, —$(CH_2)_nNR^{11}C$(=O)$OCH_2R^{15}$, —$NR^{11}C$(=O)$OCH_2R^{15}$, —$(CH_2)_nNR^{11}(CH_2)_nR^{15}$, —$(CH_2)_nC$(=O)$R^{15}$, —$CR^{13}R^{14}C$(=O)$R^{15}$, —$(CH_2)_nNR^{11}C$(=O)$R^{15}$, —$NR^{11}C$(=O)$R^{15}$, —$(CH_2)_nNR^{11}(CH_2)_2C$(=O)$R^{15}$, —$(CH_2)_nOR^{15}$,

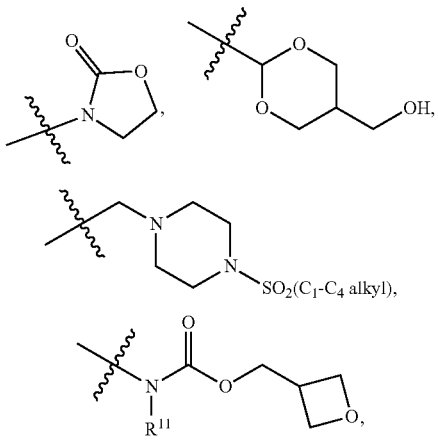

—$C_1$-$C_6$ alkyl substituted with one $R^a$, —$C_1$-$C_4$ alkoxy substituted with one $R^b$, or a 5- to 6-membered heteroaryl having 1 to 4 heteroatoms independently selected from N and —$NR^c$ wherein $R^c$ is H or —$C_1$-$C_4$ alkyl;

$R^a$ is $C_1$-$C_4$ alkoxy; and $R^b$ is $C_1$-$C_4$ alkoxy.

4. The compound of claim 1, wherein $R^2$ is —CN, —$NH_2$, —C(=O) $NH_2$, —NHC(=O)$R^{11}$, —$NR^{12}$C(=O)$OR^{11}$, —C(=O)$NR^{11}R^{12}$, —$CH_2C$(=O)$NR^{11}R^{12}$, triazolyl,

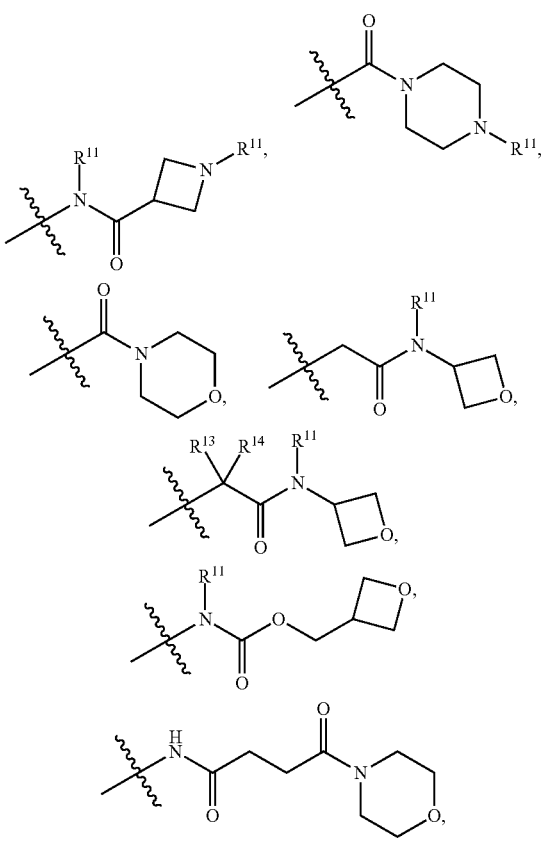

151
-continued
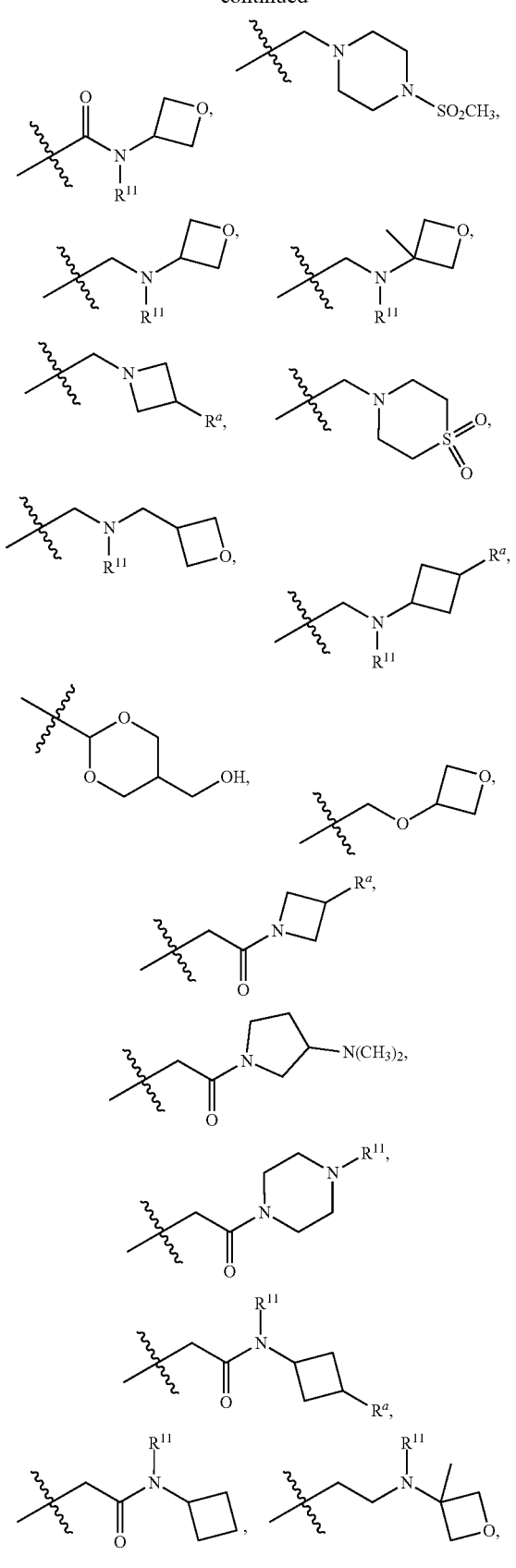
152
-continued
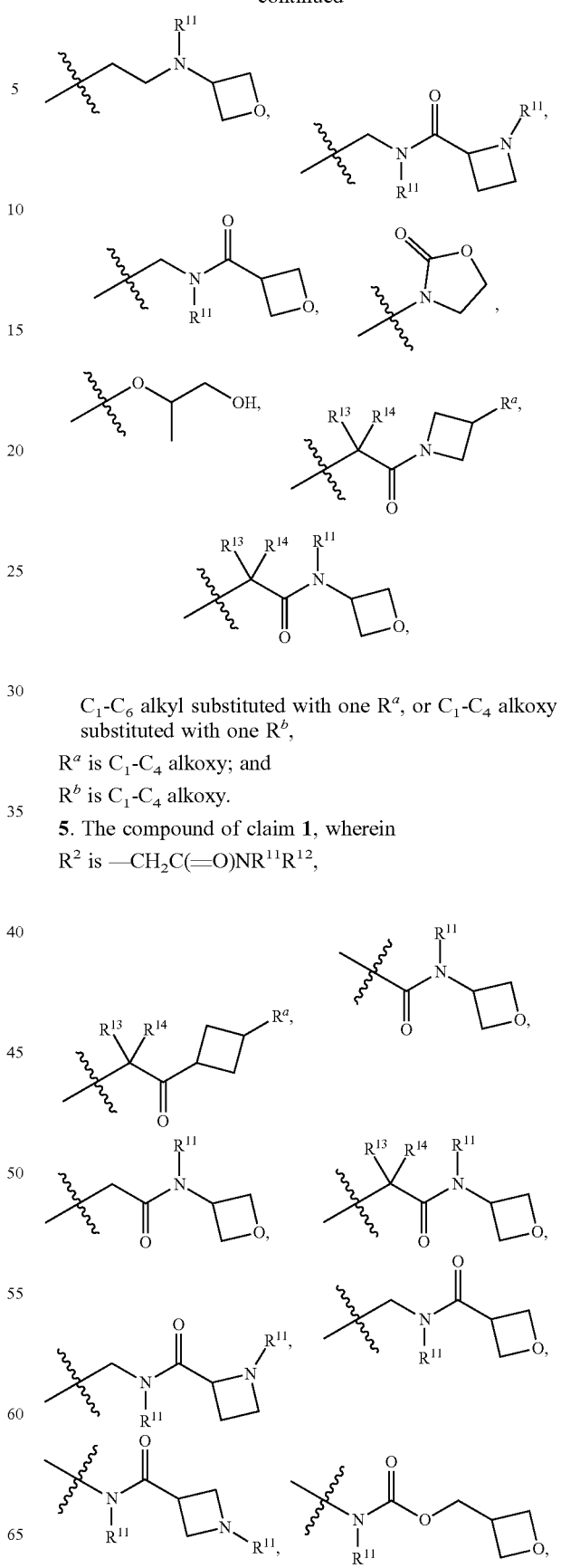
$C_1$-$C_6$ alkyl substituted with one $R^a$, or $C_1$-$C_4$ alkoxy substituted with one $R^b$,
$R^a$ is $C_1$-$C_4$ alkoxy; and
$R^b$ is $C_1$-$C_4$ alkoxy.
5. The compound of claim 1, wherein
$R^2$ is —$CH_2C(=O)NR^{11}R^{12}$, -continued
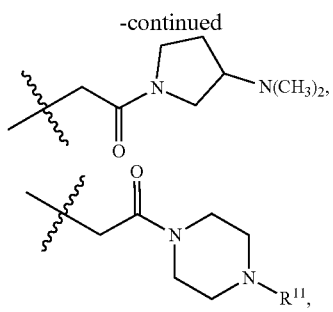
or C$_1$-C$_6$ alkyl substituted with one R$^a$; and R$^a$ is C$_1$-C$_4$ alkoxy.
6. The compound of claim 1, wherein R$^2$ is
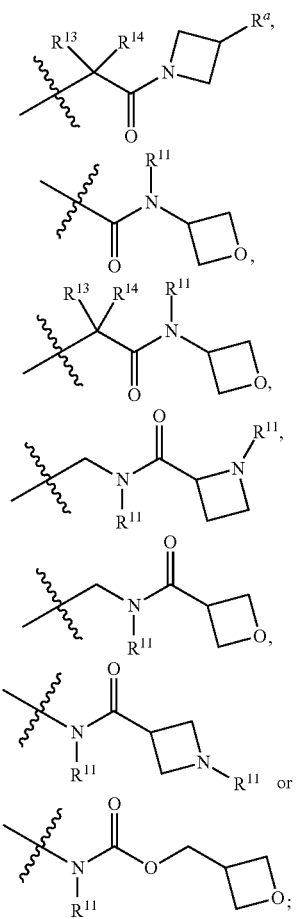
and
R$^a$ is C$_1$-C$_4$ alkoxy.
7. The compound of claim 1, wherein R$^2$ is —CN, —NH$_2$, —C(=O) NH$_2$, triazolyl,
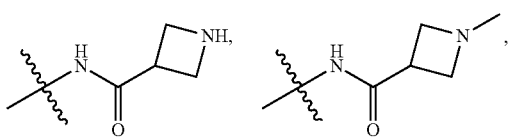
-continued
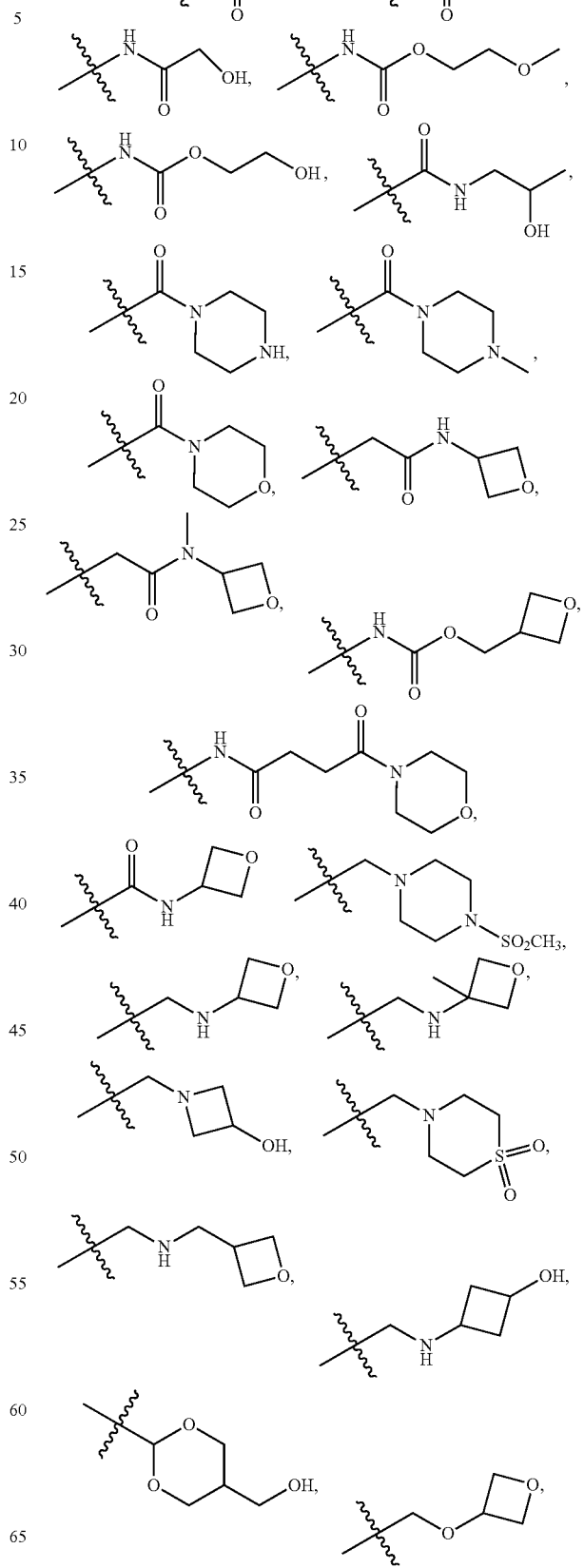

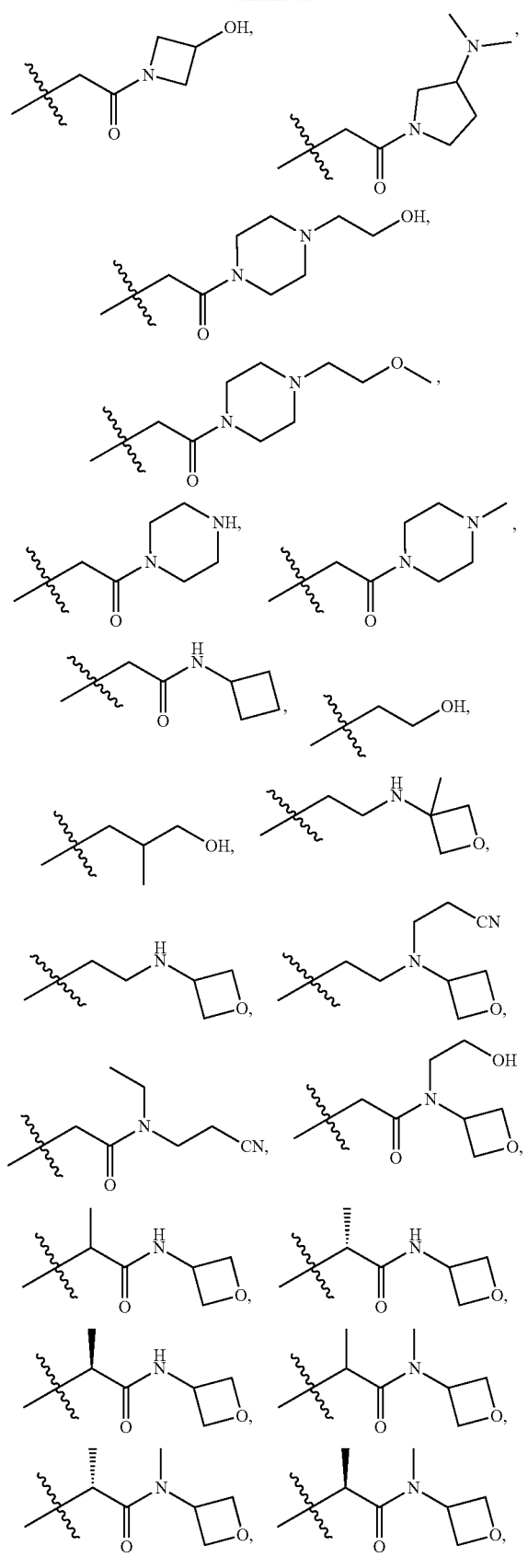
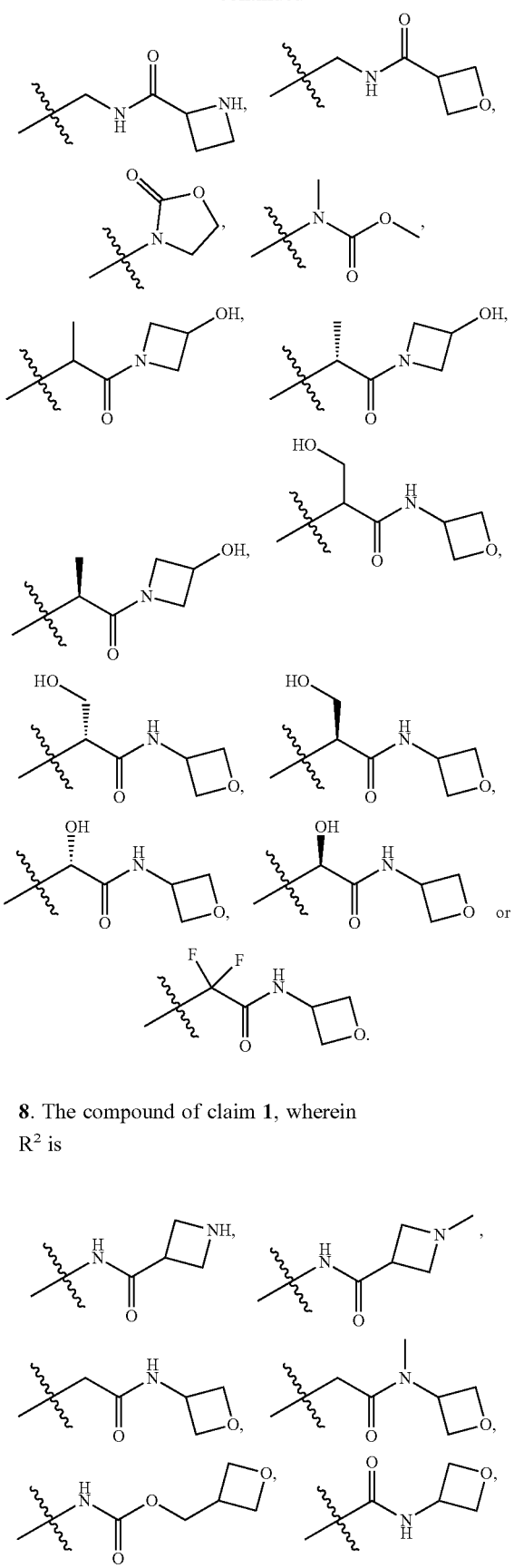
8. The compound of claim 1, wherein R² is

-continued

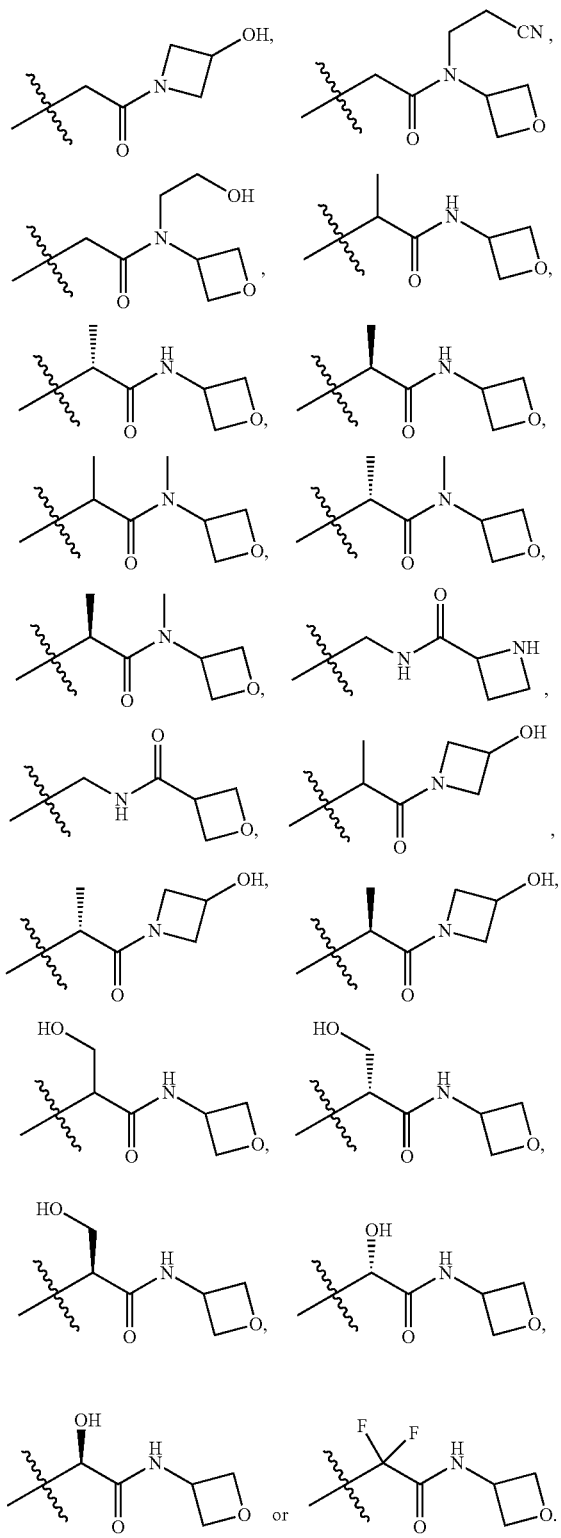

9. The compound of claim 1, wherein said compound is of Formula (II)

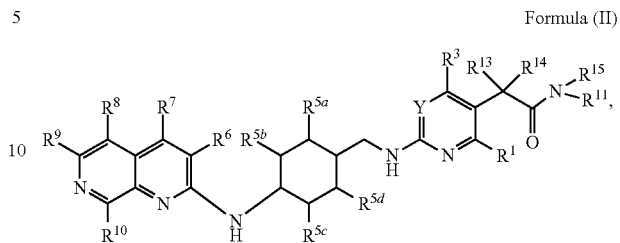

Formula (II)

or a stereoisomer, enantiomer, enantiomeric mixture or a pharmaceutically acceptable salt thereof, wherein:
Y is CH or N;
$R^1$, $R^3$, $R^{5a}$, $R^{5b}$, $R^{5c}$ and $R^{5d}$ are H;
$R^6$, $R^7$, $R^8$ and $R^9$ are H;
$R^{10}$ is halogen or —$C_1$-$C_4$ alkoxy;
$R^{11}$ is H, —$C_1$-$C_4$ alkyl, —$C_1$-$C_4$ alkylene-hydroxy, —$C_1$-$C_4$ alkylene-cyano, or —$C_1$-$C_4$ alkyl substituted with —$C_1$-$C_4$ alkoxy;
$R^{13}$ is H, halogen, —OH, —$C_1$-$C_4$ alkyl or —$C_1$-$C_4$ alkylene-hydroxy;
$R^{14}$ is H, halogen or —$C_1$-$C_4$ alkyl; and
$R^{15}$ is a 4- to 6-membered heterocycloalkyl having 1-2 heteroatoms independently selected from O, S and N; and wherein said 4- to 6-membered heterocycloalkyl is unsubstituted or substituted with 1-2 substituents selected from —OH, —$C_1$-$C_4$ alkyl, —$C_1$-$C_4$ alkylene-hydroxy, —$C_1$-$C_4$ alkoxy and —$N(C_1$-$C_4$ alkyl$)_2$.

10. The compound of claim 9, wherein said compound is of Formula (II-2)

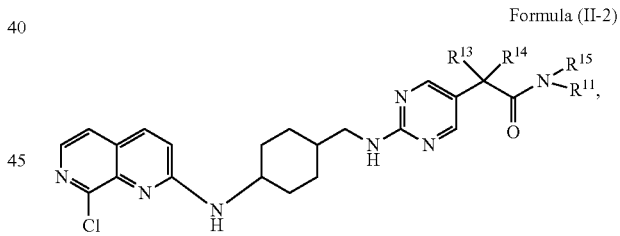

Formula (II-2)

or a stereoisomer, enantiomer, enantiomeric mixture or a pharmaceutically acceptable salt thereof.

11. The compound of claim 9, wherein $R^{14}$ is H, F or —$CH_3$.

12. The compound of claim 9, wherein $R^{15}$ is azetidinyl or oxetanyl, each of which is unsubstituted or substituted with —OH, —$C_1$-$C_4$ alkyl or —$C_1$-$C_4$ alkylene-hydroxy.

13. The compound of claim 12, wherein $R^{15}$ is

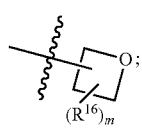

$R^{16}$, if present, is —$C_1$-$C_4$ alkyl; and m is 0-1.

14. The compound of claim 12, wherein R$^{15}$ is

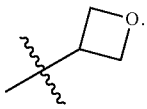

15. The compound of claim 1, wherein R$^{11}$ is H, —C$_1$-C$_4$ alkyl or —C$_1$-C$_4$ alkyl substituted with one —CN, one —OH or one —OCH$_3$.

16. The compound of claim 1, wherein R$^{13}$ is H, F, —CN, —OH, —CH$_3$ or —CH$_2$OH.

17. The compound of claim 1, wherein the compound is selected from:

N$^2$-(((1,4-trans)-4-((8-methoxy-1,7-naphthyridin-2-yl) amino)cyclohexyl)methyl)pyrimidine-2,5-diamine;
N-(2-((((1,4-trans)-4-((8-methoxy-1,7-naphthyridin-2-yl) amino)cyclohexyl)methyl)amino)pyrimidin-5-yl) azetidine-3-carboxamide;
N-(2-((((1,4-trans)-4-((8-methoxy-1,7-naphthyridin-2-yl) amino)cyclohexyl)methyl)amino)pyrimidin-5-yl)-1-methylazetidine-3-carboxamide;
2-((((1,4-trans)-4-((8-methoxy-1,7-naphthyridin-2-yl) amino)cyclohexyl)methyl)amino)pyrimidine-5-carbonitrile;
2-((((1,4-trans)-4-((8-methoxy-1,7-naphthyridin-2-yl) amino)cyclohexyl)methyl)amino)pyrimidine-5-carboxamide;
N-(2-((((1,4-trans)-4-((8-methoxy-1,7-naphthyridin-2-yl) amino)cyclohexyl)methyl)amino)pyrimidin-5-yl)acetamide;
2-hydroxy-N-(2-(((((1,4-trans)-4-((8-methoxy-1,7-naphthyridin-2-yl)amino)cyclohexyl)methyl)amino)pyrimidin-5-yl)acetamide;
(2-((((1,4-trans)-4-((8-methoxy-1,7-naphthyridin-2-yl) amino)cyclohexyl)methyl)amino)pyrimidin-5-yl)(piperazin-1-yl) methanone;
N-(2-hydroxypropyl)-2-((((1,4-trans)-4-((8-methoxy-1,7-naphthyridin-2-yl)amino)cyclohexyl)methyl)amino) pyrimidine-5-carboxamide;
(2-((((1,4-trans)-4-((8-methoxy-1,7-naphthyridin-2-yl) amino)cyclohexyl)methyl)amino)pyrimidin-5-yl) (morpholino) methanone;
(2-((((1,4-trans)-4-((8-methoxy-1,7-naphthyridin-2-yl) amino)cyclohexyl)methyl)amino)pyrimidin-5-yl) (4-methylpiperazin-1-yl) methanone;
N-((1,4-trans)-4-(((5-(1H-1,2,4-triazol-5-yl)pyrimidin-2-yl)amino)methyl)cyclohexyl)-8-methoxy-1,7-naphthyridin-2-amine;
2-(2-((((1,4-trans)-4-((8-methoxy-1,7-naphthyridin-2-yl) amino)cyclohexyl)methyl)amino)pyrimidin-5-yl)-N-(oxetan-3-yl)acetamide;
N$^2$-(((1,4-trans)-4-((8-chloro-1,7-naphthyridin-2-yl) amino)cyclohexyl)methyl)pyrimidine-2,5-diamine;
methyl (2-((((1,4-trans)-4-((8-chloro-1,7-naphthyridin-2-yl)amino)cyclohexyl)methyl)amino)pyrimidin-5-yl) carbamate;
2-methoxyethyl (2-(((((1,4-trans)-4-((8-chloro-1,7-naphthyridin-2-yl)amino)cyclohexyl)methyl)amino)pyrimidin-5-yl)carbamate;
2-hydroxyethyl (2-(((((1,4-trans)-4-((8-chloro-1,7-naphthyridin-2-yl)amino)cyclohexyl)methyl)amino)pyrimidin-5-yl)carbamate;
oxetan-3-ylmethyl (2-(((((1,4-trans)-4-((8-chloro-1,7-naphthyridin-2-yl)amino)cyclohexyl)methyl)amino) pyrimidin-5-yl)carbamate;
N-(2-(((((1,4-trans)-4-((8-chloro-1,7-naphthyridin-2-yl) amino)cyclohexyl)methyl)amino)pyrimidin-5-yl)-2-hydroxyacetamide;
N-(2-(((((1,4-trans)-4-((8-chloro-1,7-naphthyridin-2-yl) amino)cyclohexyl)methyl)amino)pyrimidin-5-yl)-4-morpholino-4-oxobutanamide;
2-((((1,4-trans)-4-((8-chloro-1,7-naphthyridin-2-yl) amino)cyclohexyl)methyl)amino)pyrimidine-5-carbonitrile;
(2-((((1,4-trans)-4-((8-chloro-1,7-naphthyridin-2-yl) amino)cyclohexyl)methyl)amino)pyrimidin-5-yl) (morpholino) methanone;
(2-((((1,4-trans)-4-((8-chloro-1,7-naphthyridin-2-yl) amino)cyclohexyl)methyl)amino)pyrimidin-5-yl)(piperazin-1-yl) methanone;
2-((((1,4-trans)-4-((8-chloro-1,7-naphthyridin-2-yl) amino)cyclohexyl)methyl)amino)-N-(oxetan-3-yl)pyrimidine-5-carboxamide;
8-chloro-N-((1,4-trans)-4-(((5-((4-(methylsulfonyl) piperazin-1-yl)methyl)pyrimidin-2-yl)amino)methyl)cyclohexyl)-1,7-naphthyridin-2-amine;
8-chloro-N-((1,4-trans)-4-(((5-((oxetan-3-ylamino) methyl)pyrimidin-2-yl)amino)methyl)cyclohexyl)-1,7-naphthyridin-2-amine;
8-chloro-N-((1,4-trans)-4-(((5-(((3-methyloxetan-3-yl) amino)methyl)pyrimidin-2-yl)amino)methyl)cyclohexyl)-1,7-naphthyridin-2-amine;
1-((2-((((1,4-trans)-4-((8-chloro-1,7-naphthyridin-2-yl) amino)cyclohexyl)methyl)amino)pyrimidin-5-yl) methyl) azetidin-3-ol;
4-((2-((((1,4-trans)-4-((8-chloro-1,7-naphthyridin-2-yl) amino)cyclohexyl)methyl)amino)pyrimidin-5-yl) methyl) thiomorpholine 1,1-dioxide;
8-chloro-N-((1,4-trans)-4-(((5-(((oxetan-3-ylmethyl) amino)methyl)pyrimidin-2-yl)amino)methyl)cyclohexyl)-1,7-naphthyridin-2-amine;
8-chloro-N-((1,4-trans)-4-(((5-(((3-methoxycyclobutyl) amino)methyl)pyrimidin-2-yl)amino)methyl)cyclohexyl)-1,7-naphthyridin-2-amine;
3-(((2-((((1,4-trans)-4-((8-chloro-1,7-naphthyridin-2-yl) amino)cyclohexyl)methyl)amino)pyrimidin-5-yl) methyl)amino) cyclobutan-1-ol;
(2-(2-((((1,4-trans)-4-((8-chloro-1,7-naphthyridin-2-yl) amino)cyclohexyl)methyl)amino)pyrimidin-5-yl)-1,3-dioxan-5-yl) methanol;
8-chloro-N-((1,4-trans)-4-(((5-((oxetan-3-yloxy)methyl) pyrimidin-2-yl)amino)methyl)cyclohexyl)-1,7-naphthyridin-2-amine;
2-(2-((((1,4-trans)-4-((8-chloro-1,7-naphthyridin-2-yl) amino)cyclohexyl)methyl)amino)pyrimidin-5-yl)-N-(oxetan-3-yl)acetamide;
2-(2-((((1,4-trans)-4-((8-chloro-1,7-naphthyridin-2-yl) amino)cyclohexyl)methyl)amino)pyrimidin-5-yl)-N-methyl-N-(oxetan-3-yl)acetamide;
2-(2-((((1,4-trans)-4-((8-chloro-1,7-naphthyridin-2-yl) amino)cyclohexyl)methyl)amino)pyrimidin-5-yl)-1-(3-hydroxyazetidin-1-yl) ethan-1-one;
2-(2-((((1,4-trans)-4-((8-chloro-1,7-naphthyridin-2-yl) amino)cyclohexyl)methyl)amino)pyrimidin-5-yl)-1-(3-(dimethylamino) pyrrolidin-1-yl) ethan-1-one;
2-(2-((((1,4-trans)-4-((8-chloro-1,7-naphthyridin-2-yl) amino)cyclohexyl)methyl)amino)pyrimidin-5-yl)-1-(4-(2-hydroxyethyl) piperazin-1-yl) ethan-1-one;

2-(2-((((1,4-trans)-4-((8-chloro-1,7-naphthyridin-2-yl)amino)cyclohexyl)methyl)amino)pyrimidin-5-yl)-1-(piperazin-1-yl) ethan-1-one;

2-(6-((((1,4-trans)-4-((8-chloro-1,7-naphthyridin-2-yl)amino)cyclohexyl)methyl)amino) pyridin-3-yl)-N-(oxetan-3-yl)acetamide;

2-(2-((((1,4-trans)-4-((8-chloro-1,7-naphthyridin-2-yl)amino)cyclohexyl)methyl)amino)pyrimidin-5-yl)-1-(4-methylpiperazin-1-yl) ethan-1-one;

2-(2-((((1,4-trans)-4-((8-chloro-1,7-naphthyridin-2-yl)amino)cyclohexyl)methyl)amino)pyrimidin-5-yl)-N-cyclobutylacetamide;

2-(2-((((1,4-trans)-4-((8-chloro-1,7-naphthyridin-2-yl)amino)cyclohexyl)methyl)amino)pyrimidin-5-yl)-1-(4-(2-methoxyethyl) piperazin-1-yl) ethan-1-one;

2-(2-((((1,4-trans)-4-((8-chloro-1,7-naphthyridin-2-yl)amino)cyclohexyl)methyl)amino)pyrimidin-5-yl) ethan-1-ol;

8-chloro-N-((1,4-trans)-4-(((5-(2-((3-methyloxetan-3-yl)amino) ethyl)pyrimidin-2-yl)amino)methyl)cyclohexyl)-1,7-naphthyridin-2-amine;

8-chloro-N-((1,4-trans)-4-(((5-(2-(oxetan-3-ylamino) ethyl)pyrimidin-2-yl)amino)methyl)cyclohexyl-1,7-naphthyridin-2-amine;

2-(2-((((1,4-trans)-4-((8-chloro-1,7-naphthyridin-2-yl)amino)cyclohexyl)methyl)amino)pyrimidin-5-yl)-N-(2-cyanoethyl)-N-(oxetan-3-yl)acetamide;

2-(2-((((1,4-trans)-4-((8-chloro-1,7-naphthyridin-2-yl)amino)cyclohexyl)methyl)amino)pyrimidin-5-yl)-N-(2-cyanoethyl)-N-ethylacetamide;

2-(2-((((1,4-trans)-4-((8-chloro-1,7-naphthyridin-2-yl)amino)cyclohexyl)methyl)amino)pyrimidin-5-yl)-N-(2-hydroxyethyl)-N-(oxetan-3-yl)acetamide;

2-(2-((((1,4-trans)-4-((8-chloro-1,7-naphthyridin-2-yl)amino)cyclohexyl)methyl)amino)pyrimidin-5-yl)-N-(oxetan-3-yl)propanamide;

(S)-2-(2-((((1,4-trans)-4-((8-chloro-1,7-naphthyridin-2-yl)amino)cyclohexyl)methyl)amino)pyrimidin-5-yl)-N-(oxetan-3-yl)propanamide;

(R)-2-(2-((((1,4-trans)-4-((8-chloro-1,7-naphthyridin-2-yl)amino)cyclohexyl)methyl)amino)pyrimidin-5-yl)-N-(oxetan-3-yl)propanamide;

2-(2-((((1,4-trans)-4-((8-chloro-1,7-naphthyridin-2-yl)amino)cyclohexyl)methyl)amino)pyrimidin-5-yl)-N-methyl-N-(oxetan-3-yl)propanamide;

(S)-2-(2-((((1,4-trans)-4-((8-chloro-1,7-naphthyridin-2-yl)amino)cyclohexyl)methyl)amino)pyrimidin-5-yl)-N-methyl-N-(oxetan-3-yl)propanamide;

(R)-2-(2-((((1,4-trans)-4-((8-chloro-1,7-naphthyridin-2-yl)amino)cyclohexyl)methyl)amino)pyrimidin-5-yl)-N-methyl-N-(oxetan-3-yl)propanamide;

N-((2-((((1,4-trans)-4-((8-chloro-1,7-naphthyridin-2-yl)amino)cyclohexyl)methyl)amino)pyrimidin-5-yl) methyl) azetidine-2-carboxamide;

N-((2-((((1,4-trans)-4-((8-chloro-1,7-naphthyridin-2-yl)amino)cyclohexyl)methyl)amino)pyrimidin-5-yl) methyl) oxetane-3-carboxamide;

2-((((1,4-trans)-4-((8-(methylamino)-1,7-naphthyridin-2-yl)amino)cyclohexyl)methyl)amino)pyrimidine-5-carbonitrile;

2-((((1,4-trans)-4-((8-(methylamino)-1,7-naphthyridin-2-yl)amino)cyclohexyl)methyl)amino)pyrimidine-5-carboxamide;

$N^2$-((1,4-trans)-4-(((5-aminopyrimidin-2-yl)amino) methyl)cyclohexyl)-N8-methyl-1,7-naphthyridine-2,8-diamine;

N-(2-((((1,4-trans)-4-((8-(methylamino)-1,7-naphthyridin-2-yl)amino)cyclohexyl)methyl)amino)pyrimidin-5-yl)acetamide;

3-(2-((((1,4-trans)-4-((8-chloro-1,7-naphthyridin-2-yl)amino)cyclohexyl)methyl)amino)pyrimidin-5-yl) oxazolidin-2-one;

methyl (2-((((1,4-trans)-4-((8-chloro-1,7-naphthyridin-2-yl)amino)cyclohexyl)methyl)amino)pyrimidin-5-yl)(methyl)carbamate;

$N^2$-(((1,4-trans)-4-((8-(difluoromethoxy)-1,7-naphthyridin-2-yl)amino)cyclohexyl)methyl)pyrimidine-2,5-diamine;

N-((1,4-trans)-4-(((5-(4H-1,2,4-triazol-3-yl)pyrimidin-2-yl)amino)methyl)cyclohexyl)-8-chloro-1,7-naphthyridin-2-amine;

2-((2-((((1,4-trans)-4-((8-chloro-1,7-naphthyridin-2-yl)amino)cyclohexyl)methyl)amino)pyrimidin-5-yl)oxy) propan-1-ol;

2-(2-((((1,4-trans)-4-((8-chloro-1,7-naphthyridin-2-yl)amino)cyclohexyl)methyl)amino)pyrimidin-5-yl)-1-(3-hydroxyazetidin-1-yl)propan-1-one;

(S)-2-(2-((((1,4-trans)-4-((8-chloro-1,7-naphthyridin-2-yl)amino)cyclohexyl)methyl)amino)pyrimidin-5-yl)-1-(3-hydroxyazetidin-1-yl)propan-1-one;

(R)-2-(2-((((1,4-trans)-4-((8-chloro-1,7-naphthyridin-2-yl)amino)cyclohexyl)methyl)amino)pyrimidin-5-yl)-1-(3-hydroxyazetidin-1-yl)propan-1-one;

2-(2-((((1,4-trans)-4-((8-chloro-1,7-naphthyridin-2-yl)amino)cyclohexyl)methyl)amino)pyrimidin-5-yl)-3-hydroxy-N-(oxetan-3-yl)propanamide;

(R)-2-(2-((((1,4-trans)-4-((8-chloro-1,7-naphthyridin-2-yl)amino)cyclohexyl)methyl)amino)pyrimidin-5-yl)-3-hydroxy-N-(oxetan-3-yl)propanamide;

(S)-2-(2-((((1,4-trans)-4-((8-chloro-1,7-naphthyridin-2-yl)amino)cyclohexyl)methyl)amino)pyrimidin-5-yl)-3-hydroxy-N-(oxetan-3-yl)propanamide;

(S)-2-(2-((((1,4-trans)-4-((8-chloro-1,7-naphthyridin-2-yl)amino)cyclohexyl)methyl)amino)pyrimidin-5-yl)-2-hydroxy-N-(oxetan-3-yl)acetamide;

(R)-2-(2-((((1,4-trans)-4-((8-chloro-1,7-naphthyridin-2-yl)amino)cyclohexyl)methyl)amino)pyrimidin-5-yl)-2-hydroxy-N-(oxetan-3-yl)acetamide; and 2-(2-((((1,4-trans)-4-((8-chloro-1,7-naphthyridin-2-yl)amino)cyclohexyl)methyl)amino)pyrimidin-5-yl)-2,2-difluoro-N-(oxetan-3-yl)acetamide;

or a pharmaceutically acceptable salt thereof.

18. A pharmaceutical composition comprising the compound of claim 1 and a pharmaceutically acceptable carrier.

19. A pharmaceutical combination comprising the compound of claim 1, and one or more therapeutically active agent, wherein said one or more therapeutically active agent is an anti-cancer agent, an analgesic, an anti-inflammatory agent, immunomodulator, or a combination thereof.

20. A method for treating a disease or condition mediated by Enhancer of Zeste Homolog 2 (EZH2), Polycomb Repressive Complex 2 (PRC2), or a combination of EZH2 and PRC2, comprising administering to a subject in need thereof a therapeutically effective amount of the compound of claim 1, wherein said disease or condition is diffuse large B cell lymphoma (DLBCL) or follicular lymphoma.

21. A compound selected from:

(R)-2-(2-((((1,4-trans)-4-((8-chloro-1,7-naphthyridin-2-yl)amino)cyclohexyl)methyl)amino)pyrimidin-5-yl)-1-(3-hydroxyazetidin-1-yl)propan-1-one;

2-(2-((((1,4-trans)-4-((8-chloro-1,7-naphthyridin-2-yl)amino)cyclohexyl)methyl)amino)pyrimidin-5-yl)-3-hydroxy-N-(oxetan-3-yl)propanamide;

2-(2-((((1,4-trans)-4-((8-chloro-1,7-naphthyridin-2-yl)amino)cyclohexyl)methyl)amino)pyrimidin-5-yl)-N-(oxetan-3-yl)acetamide;

2-(2-((((1,4-trans)-4-((8-chloro-1,7-naphthyridin-2-yl)amino)cyclohexyl)methyl)amino)pyrimidin-5-yl)-N-(oxetan-3-yl)propanamide;

(S)-2-(2-((((1,4-trans)-4-((8-chloro-1,7-naphthyridin-2-yl)amino)cyclohexyl)methyl)amino)pyrimidin-5-yl)-N-(oxetan-3-yl)propanamide; and (R)-2-(2-((((1,4-trans)-4-((8-chloro-1,7-naphthyridin-2-yl)amino)cyclohexyl)methyl)amino)pyrimidin-5-yl)-N-(oxetan-3-yl)propanamide.

22. The compound of claim 21, wherein said compound is (R)-2-(2-((((1,4-trans)-4-((8-chloro-1,7-naphthyridin-2-yl)amino)cyclohexyl)methyl)amino)pyrimidin-5-yl)-1-(3-hydroxyazetidin-1-yl)propan-1-one.

23. The compound of claim 21, wherein said compound is 2-(2-((((1,4-trans)-4-((8-chloro-1,7-naphthyridin-2-yl)amino)cyclohexyl)methyl)amino)pyrimidin-5-yl)-3-hydroxy-N-(oxetan-3-yl)propanamide.

24. The compound of claim 21, wherein said compound is 2-(2-((((1,4-trans)-4-((8-chloro-1,7-naphthyridin-2-yl)amino)cyclohexyl)methyl)amino)pyrimidin-5-yl)-N-(oxetan-3-yl)acetamide.

25. The compound of claim 21, wherein said compound is(S)

2-(2-((((1,4-trans)-4-((8-chloro-1,7-naphthyridin-2-yl)amino)cyclohexyl)methyl)amino)pyrimidin-5-yl)-N-(oxetan-3-yl)propanamide.

26. The compound of claim 21, wherein said compound is (R)-2-(2-((((1,4-trans)-4-((8-chloro-1,7-naphthyridin-2-yl)amino)cyclohexyl)methyl)amino)pyrimidin-5-yl)-N-(oxetan-3-yl)propanamide.

27. The compound of claim 21, wherein said compound is 2-(2-((((1,4-trans)-4-((8-chloro-1,7-naphthyridin-2-yl)amino)cyclohexyl)methyl)amino)pyrimidin-5-yl)-N-(oxetan-3-yl)propanamide.

\* \* \* \* \*